(12) United States Patent
Meitav et al.

(10) Patent No.: US 11,828,946 B2
(45) Date of Patent: Nov. 28, 2023

(54) SYSTEMS AND METHODS FOR RETINAL IMAGING AND TRACKING

(71) Applicant: Magic Leap, Inc., Plantation, FL (US)

(72) Inventors: Nizan Meitav, Kiryat Ata (IL); Barak Freedman, Binyamina (IL); Ori Weinstein, Haifa (IL); Asaf Pellman, Bet-Yehoshua (IL); Chulwoo Oh, Sammamish, WA (US); Frédéric Montfort, Froideville (CH)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 17/901,326

(22) Filed: Sep. 1, 2022

(65) Prior Publication Data
US 2022/0413302 A1     Dec. 29, 2022

Related U.S. Application Data

(63) Continuation of application No. 17/207,381, filed on Mar. 19, 2021, now Pat. No. 11,474,358.
(Continued)

(51) Int. Cl.
*G02B 27/01* (2006.01)
*G02B 27/00* (2006.01)
(Continued)

(52) U.S. Cl.
CPC ..... *G02B 27/0172* (2013.01); *G02B 27/0093* (2013.01); *G06F 3/013* (2013.01);
(Continued)

(58) Field of Classification Search
USPC .......................................................... 345/8
See application file for complete search history.

(56) References Cited

U.S. PATENT DOCUMENTS

| | | | | |
|---|---|---|---|---|
| 6,086,204 A | * | 7/2000 | Magnante | A61B 3/1015 219/121.75 |
| 6,152,563 A | * | 11/2000 | Hutchinson | G06F 3/013 351/209 |

(Continued)

FOREIGN PATENT DOCUMENTS

WO    WO 2018/169974    9/2018

OTHER PUBLICATIONS

ARToolKit https://web.archive.org/web/20051013062315/http://www.hitl.washington.edu:80/artoolkit/documentation/hardware.htm, archived Oct. 13, 2005, 3 pages.
(Continued)

*Primary Examiner* — Chineyere D Wills-Burns
(74) *Attorney, Agent, or Firm* — Fish & Richardson P.C.

(57) ABSTRACT

A head mounted display system configured to project light to an eye of a user to display augmented reality images can include a frame configured to be supported on a head of the user, a camera disposed temporally on said frame, an eyepiece configured to direct light into said user's eye to display augmented reality image content to the user's vision field, a reflective element disposed on the frame, and at least one VCSEL disposed to illuminate said eye, wherein the camera is disposed with respect to the reflective element such that light from the VCSEL is reflected from the user's eye to the reflective element and is reflected from the reflective element to the camera to form images of the eye that are captured by the camera.

30 Claims, 61 Drawing Sheets

Related U.S. Application Data

(60) Provisional application No. 62/992,858, filed on Mar. 20, 2020.

(51) Int. Cl.
  *G06F 3/01* (2006.01)
  *G06T 7/73* (2017.01)
  *H04N 23/56* (2023.01)

(52) U.S. Cl.
  CPC .............. *G06T 7/73* (2017.01); *H04N 23/56* (2023.01); *G02B 2027/014* (2013.01); *G02B 2027/0138* (2013.01); *G02B 2027/0178* (2013.01); *G06T 2207/30201* (2013.01)

(56) References Cited

U.S. PATENT DOCUMENTS

| | | | |
|---|---|---|---|
| 6,850,221 | B1 | 2/2005 | Tickle |
| 10,782,537 | B1 | 9/2020 | Chao et al. |
| 11,474,358 | B2* | 10/2022 | Meitav .............. G06T 7/73 |
| 2006/0028436 | A1 | 2/2006 | Armstrong |
| 2007/0030450 | A1* | 2/2007 | Liang .............. A61B 3/14 351/206 |
| 2007/0081123 | A1 | 4/2007 | Lewis |
| 2012/0127062 | A1 | 5/2012 | Bar-Zeev et al. |
| 2012/0162549 | A1 | 6/2012 | Gao et al. |
| 2013/0082922 | A1 | 4/2013 | Miller |
| 2013/0117377 | A1 | 5/2013 | Miller |
| 2013/0125027 | A1 | 5/2013 | Abovitz |
| 2013/0208234 | A1* | 8/2013 | Lewis ............... G06F 3/015 351/158 |
| 2013/0242262 | A1 | 9/2013 | Lewis |
| 2014/0071539 | A1 | 3/2014 | Gao |
| 2014/0177023 | A1 | 6/2014 | Gao et al. |
| 2014/0218468 | A1 | 8/2014 | Gao et al. |
| 2014/0267420 | A1 | 9/2014 | Schowengerdt |
| 2014/0364212 | A1 | 12/2014 | Osman et al. |
| 2015/0016777 | A1 | 1/2015 | Abovitz et al. |
| 2015/0098620 | A1 | 4/2015 | Wu et al. |
| 2015/0103306 | A1 | 4/2015 | Kaji et al. |
| 2015/0178939 | A1 | 6/2015 | Bradski et al. |
| 2015/0205126 | A1 | 7/2015 | Schowengerdt |
| 2015/0309263 | A2 | 10/2015 | Abovitz et al. |
| 2015/0326570 | A1 | 11/2015 | Publicover et al. |
| 2015/0346495 | A1 | 12/2015 | Welch et al. |
| 2016/0011419 | A1 | 1/2016 | Gao |
| 2016/0026253 | A1 | 1/2016 | Bradski et al. |
| 2016/0035140 | A1* | 2/2016 | Bickerstaff ......... G02B 27/0172 345/633 |
| 2016/0081547 | A1 | 3/2016 | Gramatikov et al. |
| 2016/0210503 | A1* | 7/2016 | Yin ................ G06T 7/73 |
| 2016/0349514 | A1 | 12/2016 | Alexander et al. |
| 2017/0082858 | A1 | 3/2017 | Klug et al. |
| 2017/0205875 | A1 | 7/2017 | Kaehler |
| 2018/0095212 | A1* | 4/2018 | Bablumyan ......... G03H 1/0248 |
| 2018/0113508 | A1 | 4/2018 | Berkner-Cieslicki et al. |
| 2018/0131160 | A1 | 5/2018 | Zhang et al. |
| 2018/0143438 | A1 | 5/2018 | Oh |
| 2018/0143485 | A1 | 5/2018 | Oh |
| 2018/0143509 | A1 | 5/2018 | Oh |
| 2018/0164627 | A1 | 6/2018 | Oh |
| 2018/0190011 | A1* | 7/2018 | Platt ............... G02B 27/017 |
| 2018/0192058 | A1* | 7/2018 | Chen ............... G06T 3/403 |
| 2018/0239147 | A1 | 8/2018 | Schowengerdt et al. |
| 2018/0239177 | A1* | 8/2018 | Oh ................. G02B 27/0172 |
| 2018/0275409 | A1 | 9/2018 | Gao et al. |
| 2018/0322688 | A1 | 11/2018 | Ozguner et al. |
| 2019/0004325 | A1* | 1/2019 | Connor ............. G02B 27/0172 |
| 2019/0086674 | A1* | 3/2019 | Sinay .............. G06T 19/006 |
| 2019/0155033 | A1* | 5/2019 | Gelman ............ G02B 27/0093 |
| 2019/0293930 | A1 | 9/2019 | Zhang et al. |
| 2019/0302464 | A1* | 10/2019 | Li ................. G06F 3/013 |
| 2019/0361523 | A1 | 11/2019 | Sharma et al. |
| 2020/0012095 | A1* | 1/2020 | Edwin .............. G02B 6/0031 |
| 2020/0043236 | A1 | 2/2020 | Miller et al. |
| 2020/0051320 | A1 | 2/2020 | Laffont |
| 2020/0074651 | A1 | 3/2020 | Zhang et al. |
| 2020/0082790 | A1 | 3/2020 | Moore et al. |
| 2020/0134867 | A1* | 4/2020 | Zachrisson ........ G06T 7/74 |
| 2020/0150425 | A1* | 5/2020 | Hatzilias .......... G02B 27/0093 |
| 2020/0153203 | A1* | 5/2020 | Hatzilias .......... F21K 9/65 |
| 2020/0153204 | A1* | 5/2020 | Hatzilias .......... H01S 5/18347 |
| 2020/0192473 | A1* | 6/2020 | Wang .............. G06V 40/19 |
| 2020/0214559 | A1* | 7/2020 | Krueger ............ A61B 5/163 |
| 2020/0292818 | A1* | 9/2020 | Amitai ............. G02B 27/0172 |
| 2021/0294106 | A1 | 9/2021 | Meitav et al. |
| 2022/0050521 | A1* | 2/2022 | Drozdov ........... G06V 10/255 |

OTHER PUBLICATIONS

Azuma, "A Survey of Augmented Reality," Teleoperators and Virtual Environments 6, 4 (Aug. 1997), pp. 355-385. https://web.archive.org/web/20010604100006/http://www.cs.unc.edu/-azuma/AR presence.pdf.

Azuma, "Predictive Tracking for Augmented Realty," TR95-007, Department of Computer Science, UNC-Chapel Hill, NC, Feb. 1995, 262 pages.

Bimber, et al., "Spatial Augmented Reality—Merging Real and Virtual Worlds," 2005, 393 pages https://web.media.mit.edu/~raskar/book/BimberRaskarAugmentedRealityBook.pdf.

International Search Report and Written Opinion for PCT Application No. PCT/US 21/23201, dated Jun. 7, 2021, 14 pages.

Jacob, "Eye Tracking in Advanced Interface Design," Human-Computer Interaction Lab Naval Research Laboratory, Washington, D.C. /paper/in Virtual Environments and Advanced Interface Design, ed. by W. Barfield and TA Furness, pp. 258-288, Oxford University Press, New York (1995).

Tanriverdi and Jacob, "Interacting With Eye Movements in Virtual Environments," Department of Electrical Engineering and Computer Science, Tufts University, Medford, MA—paper/Proc. ACM CHI 2000 Human Factors in Computing Systems Conference, pp. 265-272, Addison-Wesley/ACM Press (2000).

Partial European Search Report in European Appln. No. 21771699.2, dated Aug. 25, 2023, 19 pages.

* cited by examiner

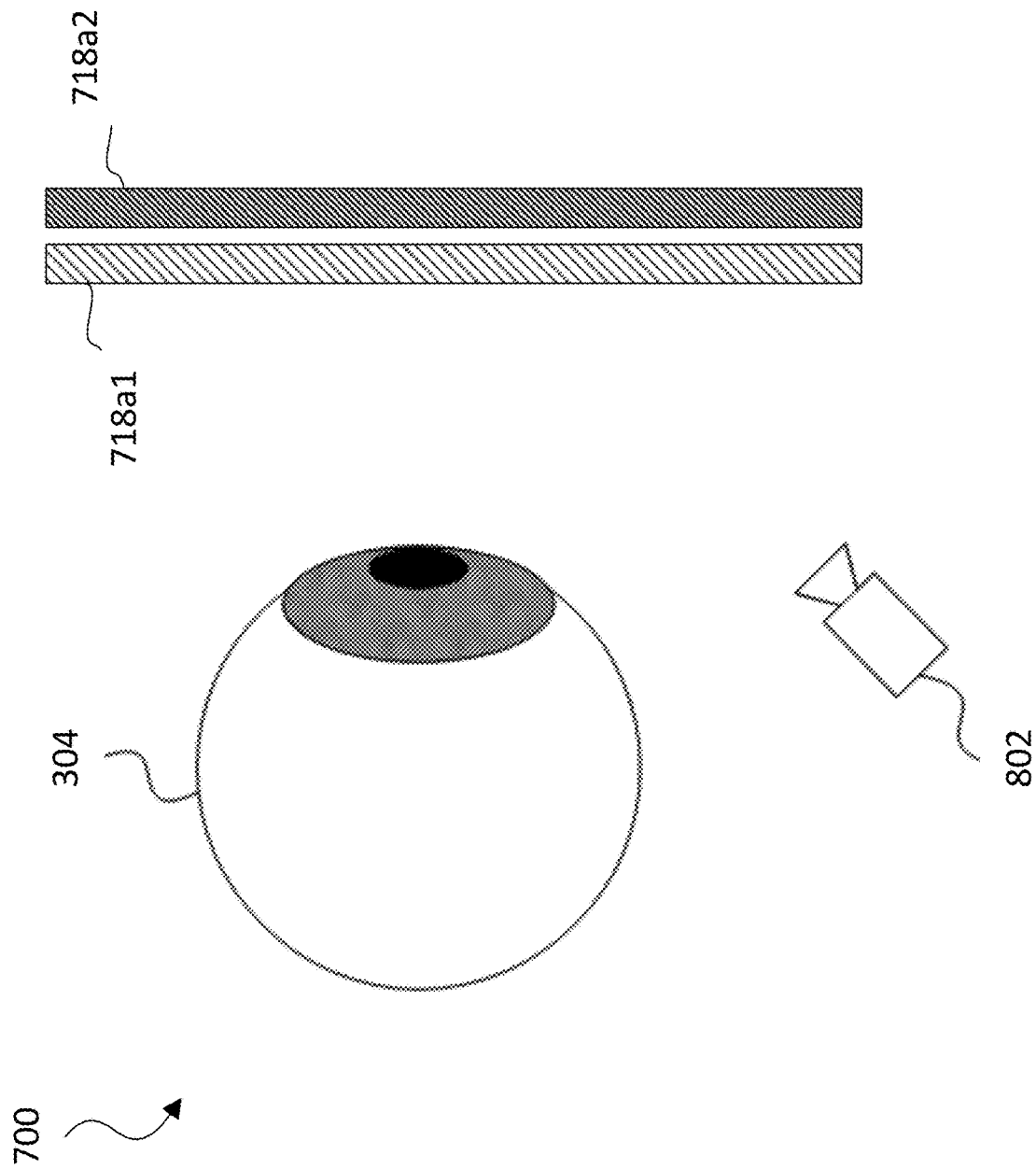

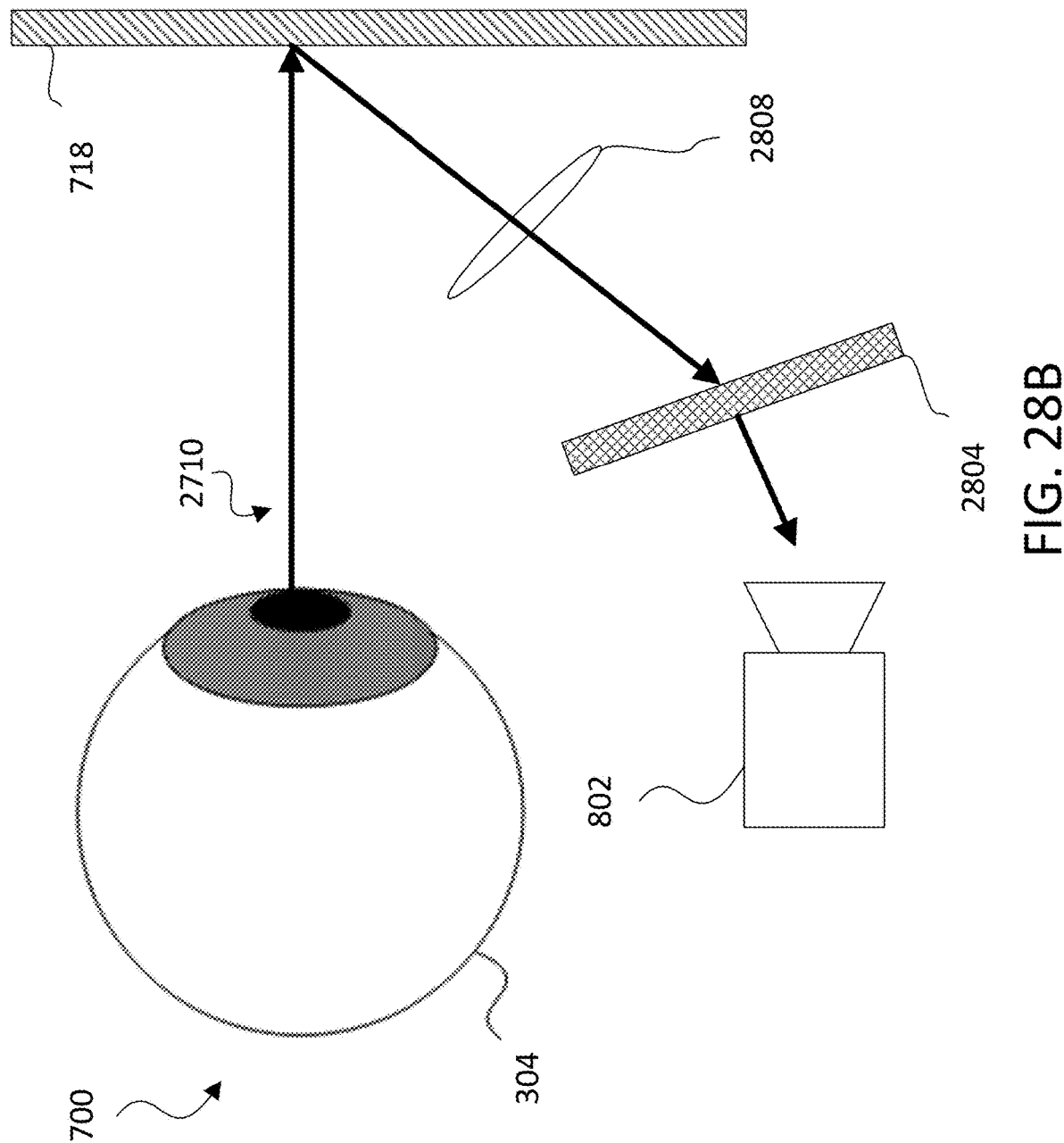

SYSTEMS AND METHODS FOR RETINAL IMAGING AND TRACKING

CROSS-REFERENCE TO RELATED APPLICATIONS

This application is a continuation of U.S. application Ser. No. 17/207,381, filed Mar. 19, 2021, which claims the benefit of U.S. Provisional Application No. 62/992,858, filed Mar. 20, 2020, which are hereby incorporated by reference in their entireties. The disclosures of U.S. patent application Ser. No. 16/138,228, filed on Sep. 21, 2018, entitled "AUGMENTED REALITY DISPLAY WITH WAVEGUIDE CONFIGURED TO CAPTURE IMAGES OF EYE AND/OR ENVIRONMENT"; U.S. patent application Ser. No. 15/271,802, filed on Sep. 21, 2016, entitled "EYE IMAGING WITH AN OFF AXIS IMAGER", now U.S. Patent No. 10,466,478 issued on Nov. 5, 2019; U.S. patent application Ser. No. 15/902,927, filed on Feb. 22, 2018, entitled "VARIABLE-FOCUS VIRTUAL IMAGE DEVICES BASED ON POLARIZATION CONVERSION"; and International Patent Application No. PCT/US2019/053026, filed on Sep. 25, 2019, entitled "EYEWEAR WITH PINHOLE AND SLIT CAMERAS", are each hereby incorporated by reference herein in their entireties.

BACKGROUND

Field

The present disclosure relates to optical devices, including augmented reality imaging and visualization systems.

Description of the Related Art

Modern computing and display technologies have facilitated the development of systems for so called "virtual reality" or "augmented reality" experiences, in which digitally reproduced images or portions thereof are presented to a user in a manner wherein they seem to be, or may be perceived as, real. A virtual reality, or "VR", scenario typically involves the presentation of digital or virtual image information without transparency to other actual real-world visual input; an augmented reality, or "AR", scenario typically involves presentation of digital or virtual image information as an augmentation to visualization of the actual world around the user. A mixed reality, or "MR", scenario is a type of AR scenario and typically involves virtual objects that are integrated into, and responsive to, the natural world. For example, an MR scenario may include AR image content that appears to be blocked by or is otherwise perceived to interact with objects in the real world.

Referring to FIG. 1, an augmented reality scene 10 is depicted. The user of an AR technology sees a real-world park-like setting 20 featuring people, trees, buildings in the background, and a concrete platform 30. The user also perceives that he/she "sees" "virtual content" such as a robot statue 40 standing upon the real-world platform 30, and a flying cartoon-like avatar character 50 which seems to be a personification of a bumble bee. These elements 50, 40 are "virtual" in that they do not exist in the real world. Because the human visual perception system is complex, it is challenging to produce AR technology that facilitates a comfortable, natural-feeling, rich presentation of virtual image elements amongst other virtual or real-world imagery elements.

Systems and methods disclosed herein address various challenges related to AR and VR technology.

Polarizing beam splitters may be used in display systems to direct polarized light to light modulators and then to direct this light to a viewer. There is a continuing demand to reduce the sizes of display systems generally and, as a result, there is also a demand to reduce the sizes of the constituent parts of the display systems, including constituent parts utilizing polarizing beam splitters.

SUMMARY

Various implementations described herein include display systems configured to provide illumination and/or image projection to the eye. Additionally or alternatively, the display systems can image the eye and/or the environment.

In some embodiments, a head mounted display system is configured to project light to an eye of a user to display augmented reality image content in a vision field of said user. The head-mounted display system can include a frame that is configured to be supported on a head of the user. The display system can also include an image projector that is configured to project images into the user's eye to display image content in the vision field of the user. The display system can include a camera, at least one waveguide, at least one coupling optical element that is configured such that light is coupled into said waveguide and guided therein, and at least one out-coupling element. The at least one out-coupling element can be configured to couple light that is guided within said waveguide out of said waveguide and direct said light to said camera. The camera can be disposed in an optical path with respect to said at least one out-coupling optical element to receive at least a portion of the light that is coupled into said waveguide via the coupling element and guided therein and that is coupled out from said waveguide by said out-coupling coupling element such that images may be captured by said camera.

BRIEF DESCRIPTION OF THE DRAWINGS

FIG. 25B schematically shows another example illumination system that includes a plurality of reflective elements where a first reflective element is nearer the eye than a second reflective element.

FIG. 28B shows an example arrangement of an illumination system that include a transmissive diffractive optical element and a focusing optical element.

FIG. 32A illustrates an example of an image of a portion of the retina projected on an image sensor.

FIG. 32B shows an example of calibrated retinal map.

The drawings are provided to illustrate example embodiments and are not intended to limit the scope of the disclosure. Like reference numerals refer to like parts throughout.

DETAILED DESCRIPTION

Figure 1:
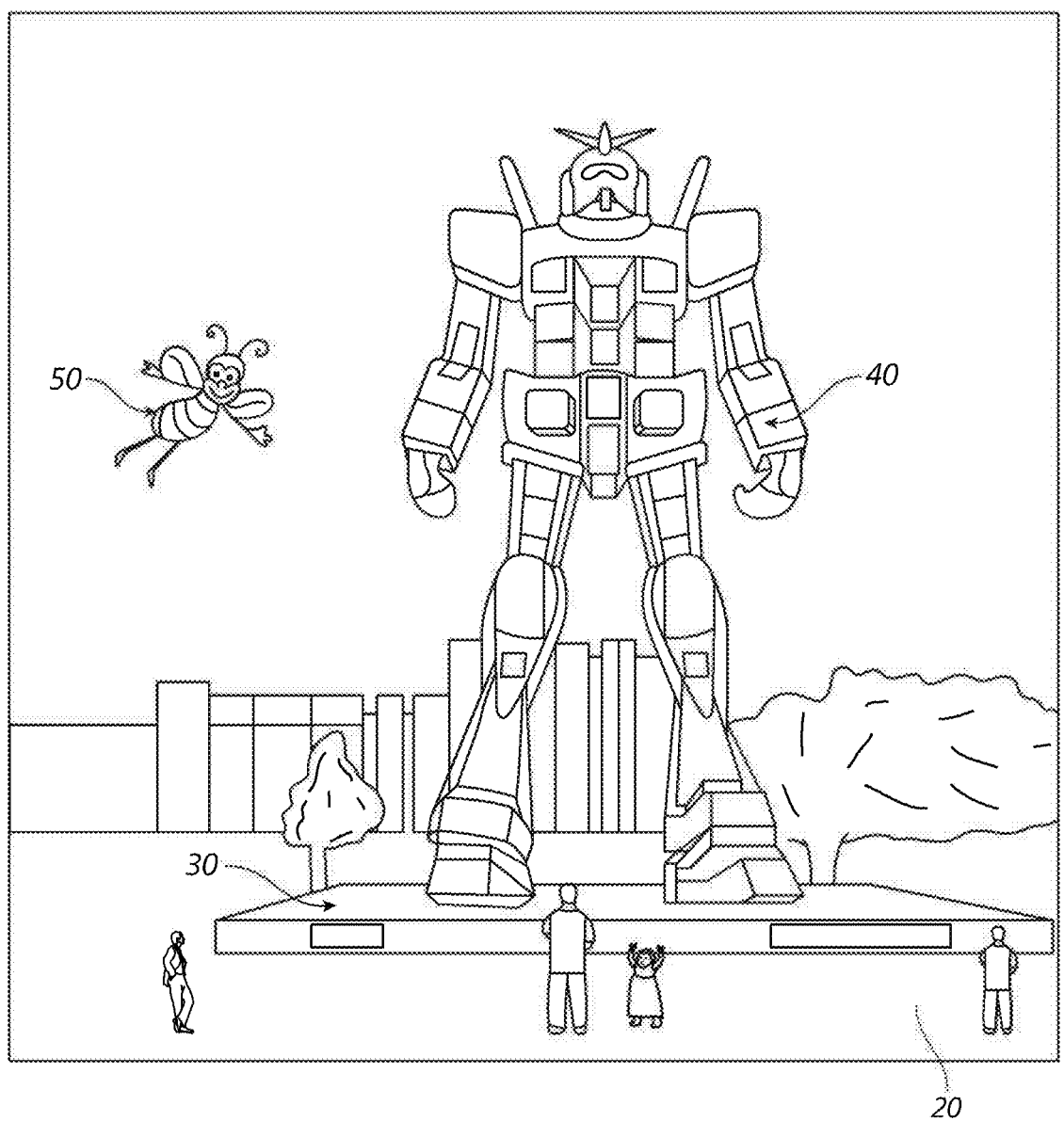
FIG. 1 illustrates a user's view of augmented reality (AR) through an AR device.

Reference will now be made to the figures, in which like reference numerals refer to like parts throughout.

Figure 2:
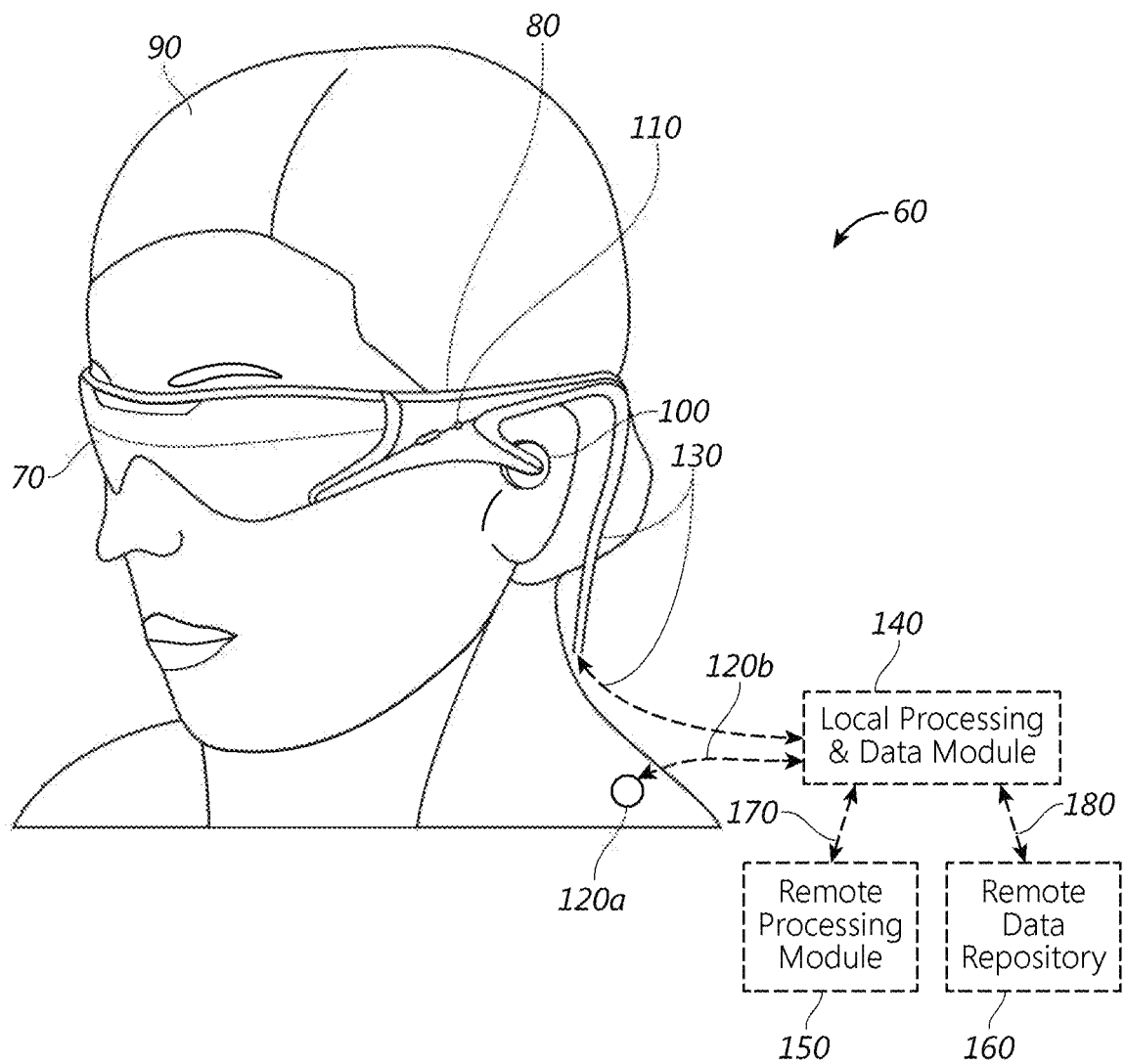
FIG. 2 illustrates an example of wearable display system.

FIG. 2 illustrates an example of wearable display system 60. The display system 60 includes a display 70, and various mechanical and electronic modules and systems to support the functioning of that display 70. The display 70 may be coupled to a frame 80, which is wearable by a display system user or viewer 90 and which is configured to position the display 70 in front of the eyes of the user 90. The display 70 may be considered eyewear in some embodiments. In some embodiments, a speaker 100 is coupled to the frame 80 and configured to be positioned adjacent the ear canal of the user 90 (in some embodiments, another speaker, not shown, may optionally be positioned adjacent the other ear canal of the user to provide stereo/shapeable sound control). The display system may also include one or more microphones 110 or other devices to detect sound. In some embodiments, the microphone is configured to allow the user to provide inputs or commands to the system 60 (e.g., the selection of voice menu commands, natural language questions, etc.), and/or may allow audio communication with other persons (e.g., with other users of similar display systems. The microphone may further be configured as a peripheral sensor to collect audio data (e.g., sounds from the user and/or environment). In some embodiments, the display system may also include a peripheral sensor 120a, which may be separate from the frame 80 and attached to the body of the user 90 (e.g., on the head, torso, an extremity, etc. of the user 90). The peripheral sensor 120a may be configured to acquire data characterizing a physiological state of the user 90 in some embodiments. For example, the sensor 120a may be an electrode.

With continued reference to FIG. 2, the display 70 is operatively coupled by communications link 130, such as by a wired lead or wireless connectivity, to a local data processing module 140 which may be mounted in a variety of configurations, such as fixedly attached to the frame 80, fixedly attached to a helmet or hat worn by the user, embedded in headphones, or otherwise removably attached to the user 90 (e.g., in a backpack-style configuration, in a belt-coupling style configuration). Similarly, the sensor 120a may be operatively coupled by communications link 120b, e.g., a wired lead or wireless connectivity, to the local processor and data module 140. The local processing and data module 140 may comprise a hardware processor, as well as digital memory, such as non-volatile memory (e.g., flash memory or hard disk drives), both of which may be utilized to assist in the processing, caching, and storage of data. The data include data a) captured from sensors (which may be, e.g., operatively coupled to the frame 80 or otherwise attached to the user 90), such as image capture devices (such as cameras), microphones, inertial measurement units, accelerometers, compasses, GPS units, radio devices, gyros, and/or other sensors disclosed herein; and/or b) acquired and/or processed using remote processing module 150 and/or remote data repository 160 (including data relating to virtual content), possibly for passage to the display 70 after such processing or retrieval. The local processing and data module 140 may be operatively coupled by communication links 170, 180, such as via a wired or wireless communication links, to the remote processing module 150 and remote data repository 160 such that these remote modules 150, 160 are operatively coupled to each other and available as resources to the local processing and data module 140. In some embodiments, the local processing and data module 140 may include one or more of the image capture devices, microphones, inertial measurement units, accelerometers, compasses, GPS units, radio devices, and/or gyros. In some other embodiments, one or more of these sensors may be attached to the frame 80, or may be standalone structures that communicate with the local processing and data module 140 by wired or wireless communication pathways.

With continued reference to FIG. 2, in some embodiments, the remote processing module 150 may comprise one or more processors configured to analyze and process data and/or image information. In some embodiments, the remote data repository 160 may comprise a digital data storage facility, which may be available through the internet or other networking configuration in a "cloud" resource configuration. In some embodiments, the remote data repository 160 may include one or more remote servers, which provide information, e.g., information for generating augmented reality content, to the local processing and data module 140 and/or the remote processing module 150. In some embodiments, all data is stored and all computations are performed in the local processing and data module, allowing fully autonomous use from a remote module.

Figure 3:
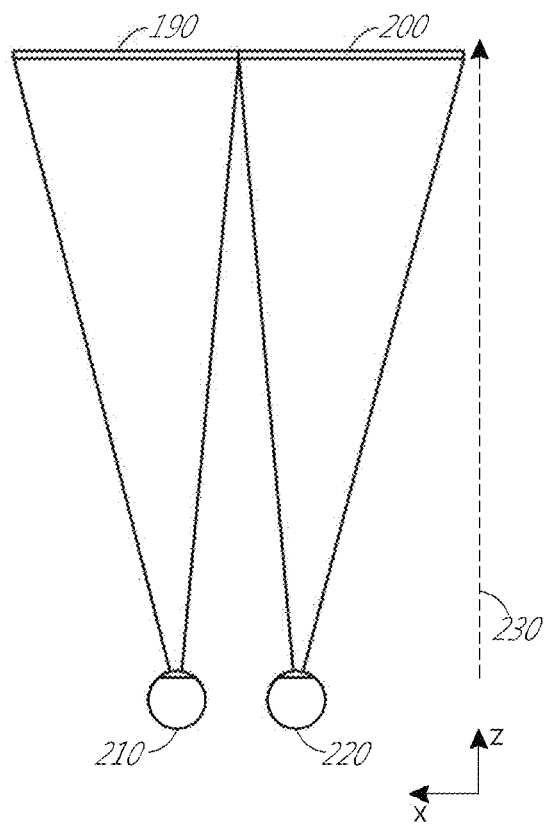
FIG. 3 illustrates a conventional display system for simulating three-dimensional imagery for a user.

With reference now to FIG. 3, the perception of an image as being "three-dimensional" or "3-D" may be achieved by providing slightly different presentations of the image to each eye of the viewer. FIG. 3 illustrates a conventional display system for simulating three-dimensional imagery for a user. Two distinct images 190, 200—one for each eye 210, 220—are outputted to the user. The images 190, 200 are spaced from the eyes 210, 220 by a distance 230 along an optical or z-axis that is parallel to the line of sight of the viewer. The images 190, 200 are flat and the eyes 210, 220 may focus on the images by assuming a single accommodated state. Such 3-D display systems rely on the human visual system to combine the images 190, 200 to provide a perception of depth and/or scale for the combined image.

It will be appreciated, however, that the human visual system is more complicated and providing a realistic perception of depth is more challenging. For example, many viewers of conventional "3-D" display systems find such systems to be uncomfortable or may not perceive a sense of depth at all. Without being limited by theory, it is believed that viewers of an object may perceive the object as being "three-dimensional" due to a combination of vergence and accommodation. Vergence movements (i.e., rotation of the eyes so that the pupils move toward or away from each other to converge the lines of sight of the eyes to fixate upon an object) of the two eyes relative to each other are closely associated with focusing (or "accommodation") of the lenses and pupils of the eyes. Under normal conditions, changing the focus of the lenses of the eyes, or accommodating the eyes, to change focus from one object to another object at a different distance will automatically cause a matching change in vergence to the same distance, under a relationship known as the "accommodation-vergence reflex," as well as pupil dilation or constriction. Likewise, a change in vergence will trigger a matching change in accommodation of lens shape and pupil size, under normal conditions. As noted herein, many stereoscopic or "3-D" display systems display a scene using slightly different presentations (and, so, slightly different images) to each eye such that a three-dimensional perspective is perceived by the human visual system. Such systems are uncomfortable for many viewers, however, since they, among other things, simply provide different presentations of a scene, but with the eyes viewing all the image information at a single accommodated state, and work against the "accommodation-vergence reflex." Display systems that provide a better match between accommodation and vergence may form more realistic and comfortable simulations of three-dimensional imagery.

Figure 4:
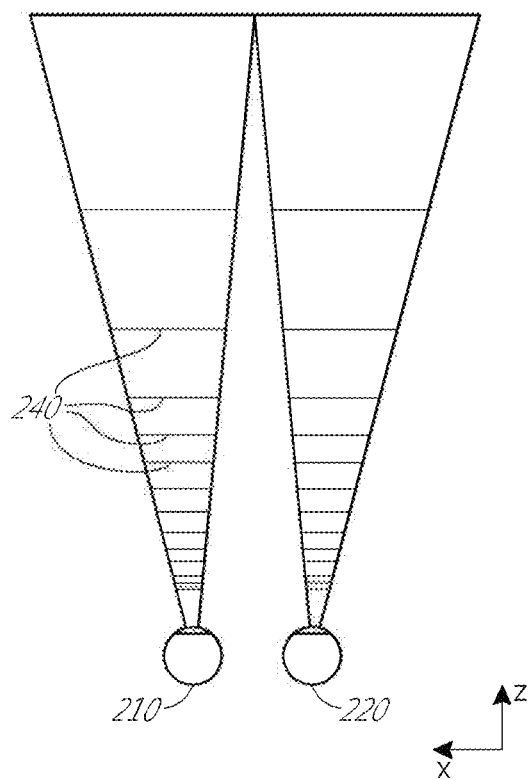
FIG. 4 illustrates aspects of an approach for simulating three-dimensional imagery using multiple depth planes.

FIG. 4 illustrates aspects of an approach for simulating three-dimensional imagery using multiple depth planes. With reference to FIG. 4, objects at various distances from eyes 210, 220 on the z-axis are accommodated by the eyes 210, 220 so that those objects are in focus. The eyes 210, 220 assume particular accommodated states to bring into focus objects at different distances along the z-axis. Consequently, a particular accommodated state may be said to be associated with a particular one of depth planes 240, with has an associated focal distance, such that objects or parts of objects in a particular depth plane are in focus when the eye is in the accommodated state for that depth plane. In some embodiments, three-dimensional imagery may be simulated by providing different presentations of an image for each of the eyes 210, 220, and also by providing different presentations of the image corresponding to each of the depth planes. While shown as being separate for clarity of illustration, it will be appreciated that the fields of view of the eyes 210, 220 may overlap, for example, as distance along the z-axis increases. In addition, while shown as flat for ease of illustration, it will be appreciated that the contours of a depth plane may be curved in physical space, such that all features in a depth plane are in focus with the eye in a particular accommodated state.

Figure 5A:
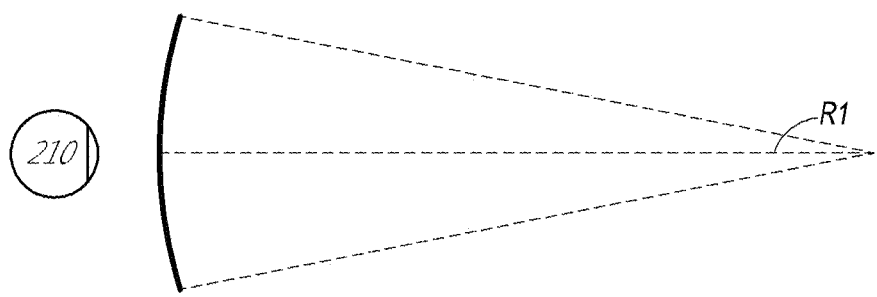
FIGS. 5A-5C illustrate relationships between radius of curvature and focal radius.
Figure 5B:
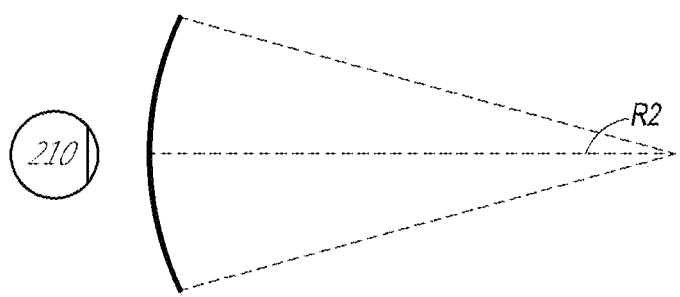
Figure 5C:
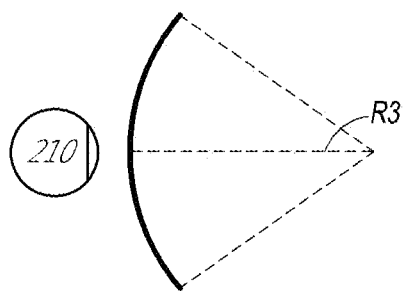

The distance between an object and the eye 210 or 220 may also change the amount of divergence of light from that object, as viewed by that eye. FIGS. 5A-5C illustrate relationships between distance and the divergence of light rays. The distance between the object and the eye 210 is represented by, in order of decreasing distance, R1, R2, and R3. As shown in FIGS. 5A-5C, the light rays become more divergent as distance to the object decreases. As distance increases, the light rays become more collimated. Stated another way, it may be said that the light field produced by a point (the object or a part of the object) has a spherical wavefront curvature, which is a function of how far away the point is from the eye of the user. The curvature increases with decreasing distance between the object and the eye 210. Consequently, at different depth planes, the degree of divergence of light rays is also different, with the degree of divergence increasing with decreasing distance between depth planes and the viewer's eye 210. While only a single eye 210 is illustrated for clarity of illustration in FIGS. 5A-5C and other figures herein, it will be appreciated that the discussions regarding eye 210 may be applied to both eyes 210 and 220 of a viewer.

Without being limited by theory, it is believed that the human eye typically can interpret a finite number of depth planes to provide depth perception. Consequently, a highly believable simulation of perceived depth may be achieved by providing, to the eye, different presentations of an image corresponding to each of these limited number of depth planes. The different presentations may be separately focused by the viewer's eyes, thereby helping to provide the user with depth cues based on the accommodation of the eye required to bring into focus different image features for the scene located on different depth plane and/or based on observing different image features on different depth planes being out of focus.

Figure 6:
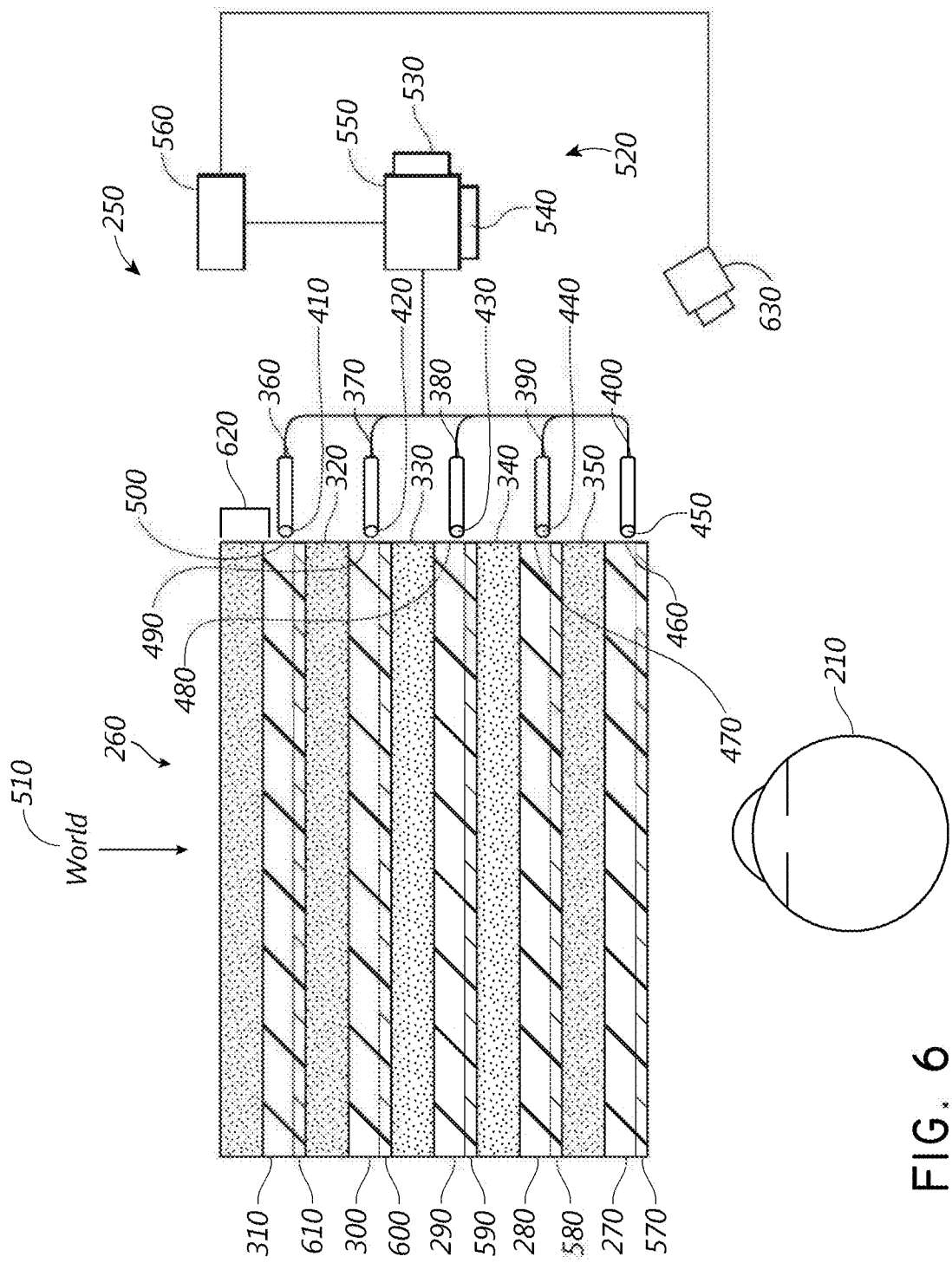
FIG. 6 illustrates an example of a waveguide stack for outputting image information to a user.

FIG. 6 illustrates an example of a waveguide stack for outputting image information to a user. A display system 250 includes a stack of waveguides, or stacked waveguide assembly, 260 that may be utilized to provide three-dimensional perception to the eye/brain using a plurality of waveguides 270, 280, 290, 300, 310. In some embodiments, the display system 250 is the system 60 of FIG. 2, with FIG. 6 schematically showing some parts of that system 60 in greater detail. For example, the waveguide assembly 260 may be part of the display 70 of FIG. 2. It will be appreciated that the display system 250 may be considered a light field display in some embodiments. In addition, the waveguide assembly 260 may also be referred to as an eyepiece.

With continued reference to FIG. 6, the waveguide assembly 260 may also include a plurality of features 320, 330, 340, 350 between the waveguides. In some embodiments, the features 320, 330, 340, 350 may be one or more lenses. The waveguides 270, 280, 290, 300, 310 and/or the plurality of lenses 320, 330, 340, 350 may be configured to send image information to the eye with various levels of wavefront curvature or light ray divergence. Each waveguide level may be associated with a particular depth plane and may be configured to output image information corresponding to that depth plane. Image injection devices 360, 370, 380, 390, 400 may function as a source of light for the waveguides and may be utilized to inject image information into the waveguides 270, 280, 290, 300, 310, each of which may be configured, as described herein, to distribute incoming light across each respective waveguide, for output toward the eye 210. Light exits an output surface 410, 420, 430, 440, 450 of the image injection devices 360, 370, 380, 390, 400 and is injected into a corresponding input surface 460, 470, 480, 490, 500 of the waveguides 270, 280, 290, 300, 310. In some embodiments, the each of the input surfaces 460, 470, 480, 490, 500 may be an edge of a corresponding waveguide, or may be part of a major surface of the corresponding waveguide (that is, one of the waveguide surfaces directly facing the world 510 or the viewer's eye 210). In some embodiments, a single beam of light (e.g. a collimated beam) may be injected into each waveguide to output an entire field of cloned collimated beams that are directed toward the eye 210 at particular angles (and amounts of divergence) corresponding to the depth plane associated with a particular waveguide. In some embodiments, a single one of the image injection devices 360, 370, 380, 390, 400 may be associated with and inject light into a plurality (e.g., three) of the waveguides 270, 280, 290, 300, 310.

In some embodiments, the image injection devices 360, 370, 380, 390, 400 are discrete displays that each produce image information for injection into a corresponding waveguide 270, 280, 290, 300, 310, respectively. In some other embodiments, the image injection devices 360, 370, 380, 390, 400 are the output ends of a single multiplexed display which may, e.g., pipe image information via one or more optical conduits (such as fiber optic cables) to each of the image injection devices 360, 370, 380, 390, 400. It will be appreciated that the image information provided by the image injection devices 360, 370, 380, 390, 400 may include light of different wavelengths, or colors (e.g., different component colors, as discussed herein).

In some embodiments, the light injected into the waveguides 270, 280, 290, 300, 310 is provided by a light projector system 520, which comprises a light module 540, which may include a light emitter, such as a light emitting diode (LED). The light from the light module 540 may be directed to and modified by a light modulator 530, e.g., a spatial light modulator, via a beam splitter 550. The light modulator 530 may be configured to change the perceived intensity of the light injected into the waveguides 270, 280, 290, 300, 310. Examples of spatial light modulators include liquid crystal displays (LCD) including a liquid crystal on silicon (LCOS) displays. It will be appreciated that the image injection devices 360, 370, 380, 390, 400 are illustrated schematically and, in some embodiments, these image injection devices may represent different light paths and locations in a common projection system configured to output light into associated ones of the waveguides 270, 280, 290, 300, 310.

In some embodiments, the display system 250 may be a scanning fiber display comprising one or more scanning fibers configured to project light in various patterns (e.g., raster scan, spiral scan, Lissajous patterns, etc.) into one or more waveguides 270, 280, 290, 300, 310 and ultimately to the eye 210 of the viewer. In some embodiments, the illustrated image injection devices 360, 370, 380, 390, 400 may schematically represent a single scanning fiber or a bundle of scanning fibers configured to inject light into one or a plurality of the waveguides 270, 280, 290, 300, 310. In some other embodiments, the illustrated image injection devices 360, 370, 380, 390, 400 may schematically represent a plurality of scanning fibers or a plurality of bundles of scanning fibers, each of which are configured to inject light into an associated one of the waveguides 270, 280, 290, 300, 310. It will be appreciated that one or more optical fibers may be configured to transmit light from the light module 540 to the one or more waveguides 270, 280, 290, 300, 310. It will be appreciated that one or more intervening optical structures may be provided between the scanning fiber, or fibers, and the one or more waveguides 270, 280, 290, 300, 310 to, e.g., redirect light exiting the scanning fiber into the one or more waveguides 270, 280, 290, 300, 310.

A controller 560 controls the operation of one or more of the stacked waveguide assembly 260, including operation of the image injection devices 360, 370, 380, 390, 400, the light source 540, and the light modulator 530. In some embodiments, the controller 560 is part of the local data processing module 140. The controller 560 includes programming (e.g., instructions in a non-transitory medium) that regulates the timing and provision of image information to the waveguides 270, 280, 290, 300, 310 according to, e.g., any of the various schemes disclosed herein. In some embodiments, the controller may be a single integral device, or a distributed system connected by wired or wireless communication channels. The controller 560 may be part of the processing modules 140 or 150 (FIG. 2) in some embodiments.

With continued reference to FIG. 6, the waveguides 270, 280, 290, 300, 310 may be configured to propagate light within each respective waveguide by total internal reflection (TIR). The waveguides 270, 280, 290, 300, 310 may each be planar or have another shape (e.g., curved), with major top and bottom surfaces and edges extending between those major top and bottom surfaces. In the illustrated configuration, the waveguides 270, 280, 290, 300, 310 may each include out-coupling optical elements 570, 580, 590, 600, 610 that are configured to extract light out of a waveguide by redirecting the light, propagating within each respective waveguide, out of the waveguide to output image information to the eye 210. Extracted light may also be referred to as out-coupled light and the out-coupling optical elements light may also be referred to light extracting optical elements. An extracted beam of light may be outputted by the waveguide at locations at which the light propagating in the waveguide strikes a light extracting optical element. The out-coupling optical elements 570, 580, 590, 600, 610 may, for example, be gratings, including diffractive optical features, as discussed further herein. While illustrated disposed at the bottom major surfaces of the waveguides 270, 280, 290, 300, 310, for ease of description and drawing clarity, in some embodiments, the out-coupling optical elements 570, 580, 590, 600, 610 may be disposed at the top and/or bottom major surfaces, and/or may be disposed directly in the volume of the waveguides 270, 280, 290, 300, 310, as discussed further herein. In some embodiments, the out-coupling optical elements 570, 580, 590, 600, 610 may be formed in a layer of material that is attached to a transparent substrate to form the waveguides 270, 280, 290, 300, 310. In some other embodiments, the waveguides 270, 280, 290, 300, 310 may be a monolithic piece of material and the out-coupling optical elements 570, 580, 590, 600, 610 may be formed on a surface and/or in the interior of that piece of material.

With continued reference to FIG. 6, as discussed herein, each waveguide 270, 280, 290, 300, 310 is configured to output light to form an image corresponding to a particular depth plane. For example, the waveguide 270 nearest the eye may be configured to deliver collimated light (which was injected into such waveguide 270), to the eye 210. The collimated light may be representative of the optical infinity focal plane. The next waveguide up 280 may be configured to send out collimated light which passes through the first lens 350 (e.g., a negative lens) before it can reach the eye 210; such first lens 350 may be configured to create a slight convex wavefront curvature so that the eye/brain interprets light coming from that next waveguide up 280 as coming from a first focal plane closer inward toward the eye 210 from optical infinity. Similarly, the third up waveguide 290 passes its output light through both the first 350 and second 340 lenses before reaching the eye 210; the combined optical power of the first 350 and second 340 lenses may be configured to create another incremental amount of wavefront curvature so that the eye/brain interprets light coming from the third waveguide 290 as coming from a second focal plane that is even closer inward toward the person from optical infinity than was light from the next waveguide up 280.

The other waveguide layers 300, 310 and lenses 330, 320 are similarly configured, with the highest waveguide 310 in the stack sending its output through all of the lenses between it and the eye for an aggregate focal power representative of the closest focal plane to the person. To compensate for the stack of lenses 320, 330, 340, 350 when viewing/interpreting light coming from the world 510 on the other side of the stacked waveguide assembly 260, a compensating lens layer 620 may be disposed at the top of the stack to compensate for the aggregate power of the lens stack 320, 330, 340, 350 below. Such a configuration provides as many perceived focal planes as there are available waveguide/lens pairings. Both the out-coupling optical elements of the waveguides and the focusing aspects of the lenses may be static (i.e., not dynamic or electro-active). In some alternative embodiments, either or both may be dynamic using electro-active features.

In some embodiments, two or more of the waveguides 270, 280, 290, 300, 310 may have the same associated depth plane. For example, multiple waveguides 270, 280, 290, 300, 310 may be configured to output images set to the same depth plane, or multiple subsets of the waveguides 270, 280, 290, 300, 310 may be configured to output images set to the same plurality of depth planes, with one set for each depth plane. This can provide advantages for forming a tiled image to provide an expanded field of view at those depth planes.

With continued reference to FIG. 6, the out-coupling optical elements 570, 580, 590, 600, 610 may be configured to both redirect light out of their respective waveguides and to output this light with the appropriate amount of divergence or collimation for a particular depth plane associated with the waveguide. As a result, waveguides having different associated depth planes may have different configurations of out-coupling optical elements 570, 580, 590, 600, 610, which output light with a different amount of divergence depending on the associated depth plane. In some embodiments, the light extracting optical elements 570, 580, 590, 600, 610 may be volumetric or surface features, which may be configured to output light at specific angles. For example, the light extracting optical elements 570, 580, 590, 600, 610 may be volume holograms, surface holograms, and/or diffraction gratings. In some embodiments, the features 320, 330, 340, 350 may not be lenses; rather, they may simply be spacers (e.g., cladding layers and/or structures for forming air gaps).

In some embodiments, the out-coupling optical elements 570, 580, 590, 600, 610 are diffractive features that form a diffraction pattern, or "diffractive optical element" (also referred to herein as a "DOE"). Preferably, the DOE's have a sufficiently low diffraction efficiency so that only a portion of the light of the beam is deflected away toward the eye 210 with each intersection of the DOE, while the rest continues to move through a waveguide via TIR. The light carrying the image information is thus divided into a number of related exit beams that exit the waveguide at a multiplicity of locations and the result is a fairly uniform pattern of exit emission toward the eye 210 for this particular collimated beam bouncing around within a waveguide.

In some embodiments, one or more DOEs may be switchable between "on" states in which they actively diffract, and "off" states in which they do not significantly diffract. For instance, a switchable DOE may comprise a layer of polymer dispersed liquid crystal, in which microdroplets comprise a diffraction pattern in a host medium, and the refractive index of the microdroplets may be switched to substantially match the refractive index of the host material (in which case the pattern does not appreciably diffract incident light) or the microdroplet may be switched to an index that does not match that of the host medium (in which case the pattern actively diffracts incident light).

In some embodiments, a camera assembly 630 (e.g., a digital camera, including visible light and infrared light cameras) may be provided to capture images of the eye 210 and/or tissue around the eye 210 to, e.g., detect user inputs and/or to monitor the physiological state of the user. As used herein, a camera may be any image capture device. In some embodiments, the camera assembly 630 may include an image capture device and a light source to project light (e.g., infrared light) to the eye, which may then be reflected by the eye and detected by the image capture device. In some embodiments, the camera assembly 630 may be attached to the frame 80 (FIG. 2) and may be in electrical communication with the processing modules 140 and/or 150, which may process image information from the camera assembly 630. In some embodiments, one camera assembly 630 may be utilized for each eye, to separately monitor each eye.

Figure 7:
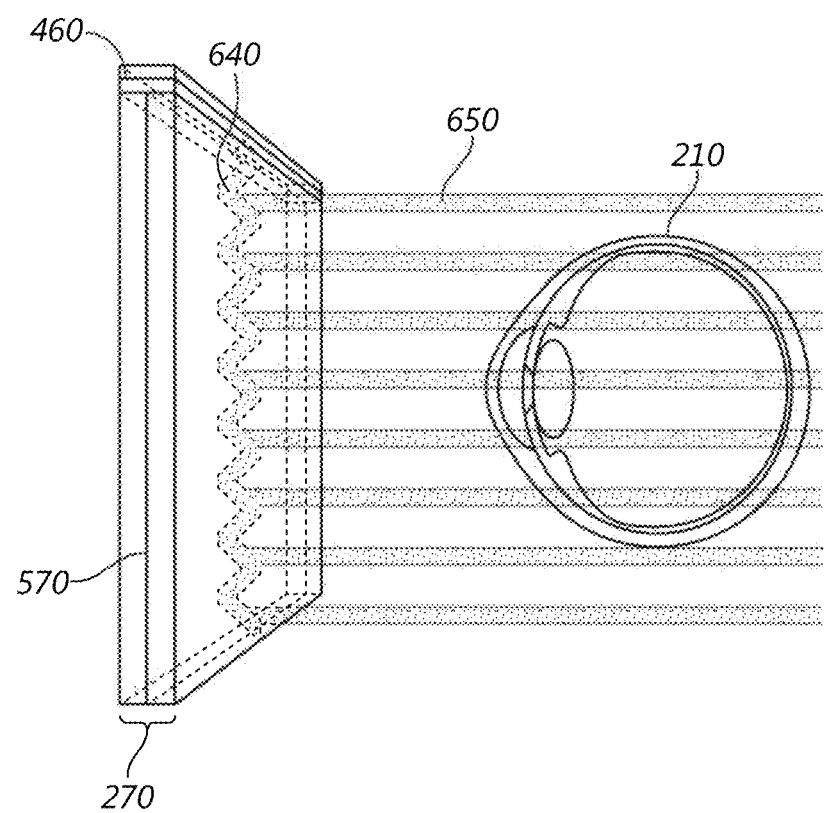
FIG. 7 illustrates an example of exit beams outputted by a waveguide.

With reference now to FIG. 7, an example of exit beams outputted by a waveguide is shown. One waveguide is illustrated, but it will be appreciated that other waveguides in the waveguide assembly 260 (FIG. 6) may function similarly, where the waveguide assembly 260 includes multiple waveguides. Light 640 is injected into the waveguide 270 at the input surface 460 of the waveguide 270 and propagates within the waveguide 270 by TIR. At points where the light 640 impinges on the DOE 570, a portion of the light exits the waveguide as exit beams 650. The exit beams 650 are illustrated as substantially parallel but, as discussed herein, they may also be redirected to propagate to the eye 210 at an angle (e.g., forming divergent exit beams), depending on the depth plane associated with the waveguide 270. It will be appreciated that substantially parallel exit beams may be indicative of a waveguide with out-coupling optical elements that out-couple light to form images that appear to be set on a depth plane at a large distance (e.g., optical infinity) from the eye 210. Other waveguides or other sets of out-coupling optical elements may output an exit beam pattern that is more divergent, which would require the eye 210 to accommodate to a closer distance to bring it into focus on the retina and would be interpreted by the brain as light from a distance closer to the eye 210 than optical infinity.

Figure 8:
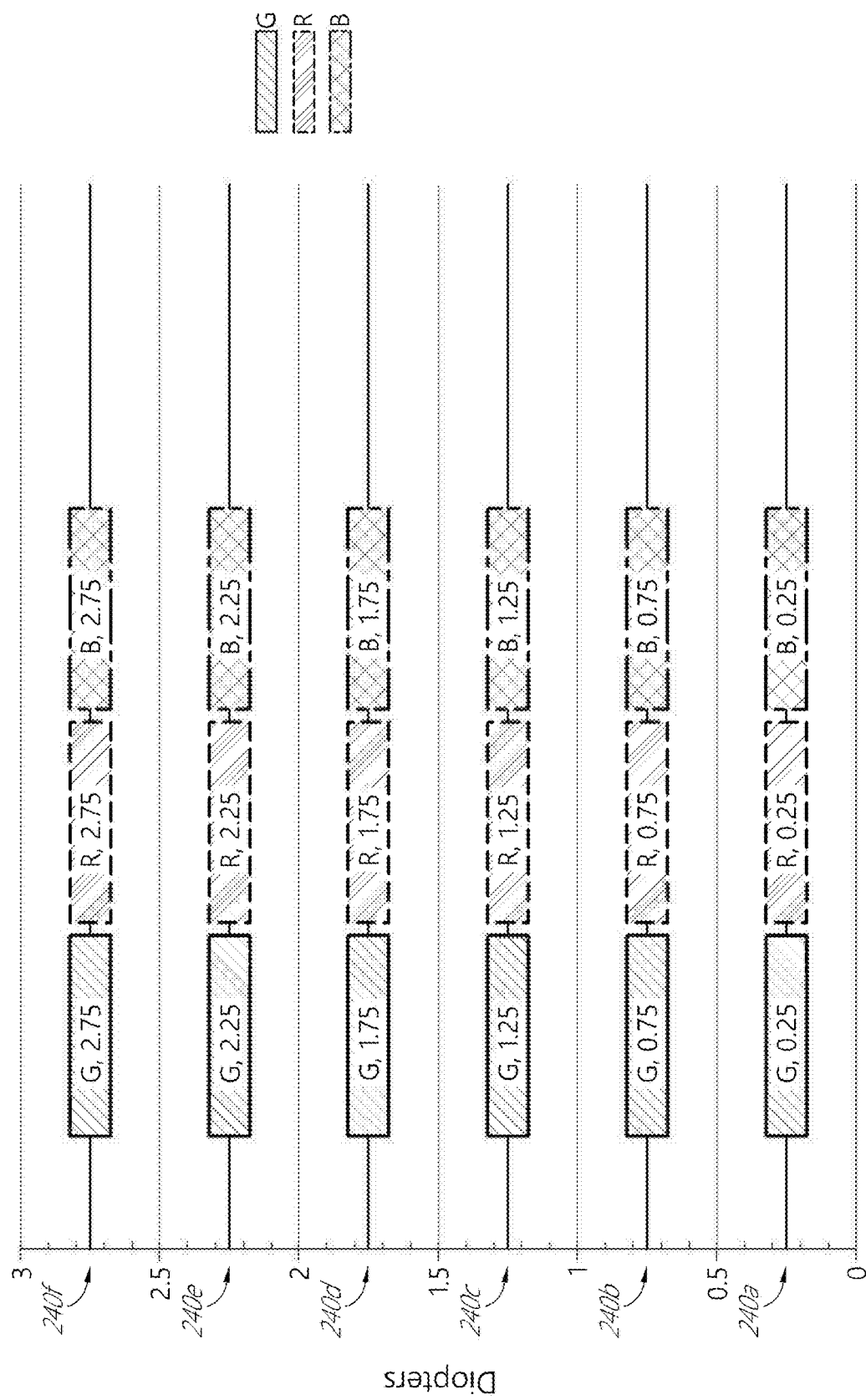
FIG. 8 illustrates an example of a stacked waveguide assembly in which each depth plane includes images formed using multiple different component colors.

In some embodiments, a full color image may be formed at each depth plane by overlaying images in each of the component colors, e.g., three or more component colors. FIG. 8 illustrates an example of a stacked waveguide assembly in which each depth plane includes images formed using multiple different component colors. The illustrated embodiment shows depth planes 240a-240f, although more or fewer depths are also contemplated. Each depth plane may have three or more component color images associated with it, including: a first image of a first color, G; a second image of a second color, R; and a third image of a third color, B. Different depth planes are indicated in the figure by different numbers for diopters (dpt) following the letters G, R, and B. Just as examples, the numbers following each of these letters indicate diopters (1/m), or inverse distance of the depth plane from a viewer, and each box in the figures represents an individual component color image. In some embodiments, to account for differences in the eye's focusing of light of different wavelengths, the exact placement of the depth planes for different component colors may vary. For example, different component color images for a given depth plane may be placed on depth planes corresponding to different distances from the user. Such an arrangement may increase visual acuity and user comfort and/or may decrease chromatic aberrations.

In some embodiments, light of each component color may be outputted by a single dedicated waveguide and, consequently, each depth plane may have multiple waveguides associated with it. In such embodiments, each box in the figures including the letters G, R, or B may be understood to represent an individual waveguide, and three waveguides may be provided per depth plane where three component color images are provided per depth plane. While the waveguides associated with each depth plane are shown adjacent to one another in this drawing for ease of description, it will be appreciated that, in a physical device, the waveguides may all be arranged in a stack with one waveguide per level. In some other embodiments, multiple component colors may be outputted by the same waveguide, such that, e.g., only a single waveguide may be provided per depth plane.

With continued reference to FIG. 8, in some embodiments, G is the color green, R is the color red, and B is the color blue. In some other embodiments, other colors associated with other wavelengths of light, including magenta and cyan, may be used in addition to or may replace one or more of red, green, or blue.

It will be appreciated that references to a given color of light throughout this disclosure will be understood to encompass light of one or more wavelengths within a range of wavelengths of light that are perceived by a viewer as being of that given color. For example, red light may include light of one or more wavelengths in the range of about 620-780 nm, green light may include light of one or more wavelengths in the range of about 492-577 nm, and blue light may include light of one or more wavelengths in the range of about 435-493 nm.

In some embodiments, the light source 540 (FIG. 6) may be configured to emit light of one or more wavelengths outside the visual perception range of the viewer, for example, infrared and/or ultraviolet wavelengths. In addition, the in-coupling, out-coupling, and other light redirecting structures of the waveguides of the display 250 may be configured to direct and emit this light out of the display towards the user's eye 210, e.g., for imaging and/or user stimulation applications.

Figure 9A:
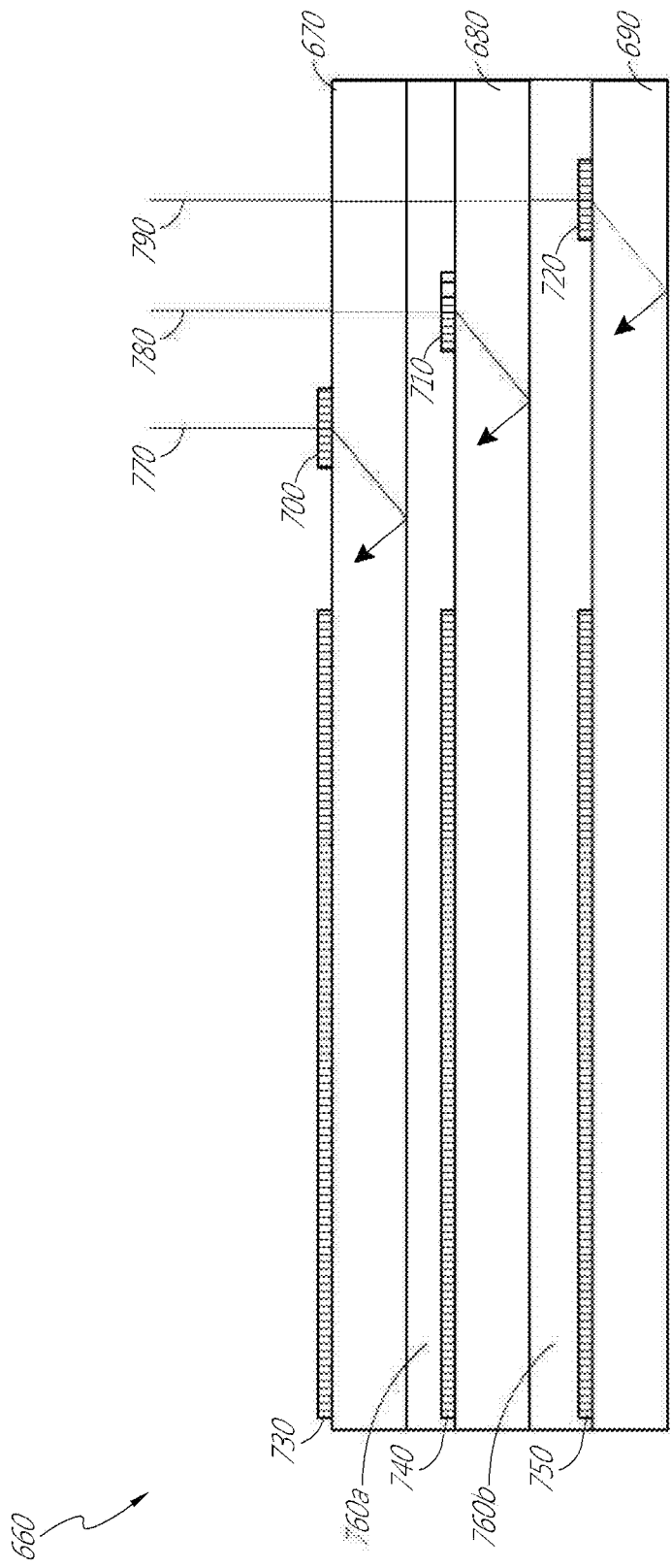
FIG. 9A illustrates a cross-sectional side view of an example of a set of stacked waveguides that each includes an incoupling optical element. As discuss herein, the stack of waveguide may comprise an eyepiece.

With reference now to FIG. 9A, in some embodiments, light impinging on a waveguide may need to be redirected to in-couple that light into the waveguide. An in-coupling optical element may be used to redirect and in-couple the light into its corresponding waveguide. FIG. 9A illustrates a cross-sectional side view of an example of a plurality or set 660 of stacked waveguides that each includes an in-coupling optical element. The waveguides may each be configured to output light of one or more different wavelengths, or one or more different ranges of wavelengths. It will be appreciated that the stack 660 may correspond to the stack 260 (FIG. 6) and the illustrated waveguides of the stack 660 may correspond to part of the plurality of waveguides 270, 280, 290, 300, 310, except that light from one or more of the image injection devices 360, 370, 380, 390, 400 is injected into the waveguides from a position that requires light to be redirected for in-coupling.

The illustrated set 660 of stacked waveguides includes waveguides 670, 680, and 690. Each waveguide includes an associated in-coupling optical element (which may also be referred to as a light input area on the waveguide), with, e.g., in-coupling optical element 700 disposed on a major surface (e.g., an upper major surface) of waveguide 670, in-coupling optical element 710 disposed on a major surface (e.g., an upper major surface) of waveguide 680, and in-coupling optical element 720 disposed on a major surface (e.g., an upper major surface) of waveguide 690. In some embodiments, one or more of the in-coupling optical elements 700, 710, 720 may be disposed on the bottom major surface of the respective waveguide 670, 680, 690 (particularly where the one or more in-coupling optical elements are reflective, deflecting optical elements). As illustrated, the in-coupling optical elements 700, 710, 720 may be disposed on the upper major surface of their respective waveguide 670, 680, 690 (or the top of the next lower waveguide), particularly where those in-coupling optical elements are transmissive, deflecting optical elements. In some embodiments, the in-coupling optical elements 700, 710, 720 may be disposed in the body of the respective waveguide 670, 680, 690. In some embodiments, as discussed herein, the in-coupling optical elements 700, 710, 720 are wavelength selective, such that they selectively redirect one or more wavelengths of light, while transmitting other wavelengths of light. While illustrated on one side or corner of their respective waveguide 670, 680, 690, it will be appreciated that the in-coupling optical elements 700, 710, 720 may be disposed in other areas of their respective waveguide 670, 680, 690 in some embodiments.

As illustrated, the in-coupling optical elements 700, 710, 720 may be laterally offset from one another. In some embodiments, each in-coupling optical element may be offset such that it receives light without that light passing through another in-coupling optical element. For example, each in-coupling optical element 700, 710, 720 may be configured to receive light from a different image injection device 360, 370, 380, 390, and 400 as shown in FIG. 6, and may be separated (e.g., laterally spaced apart) from other in-coupling optical elements 700, 710, 720 such that it substantially does not receive light from the other ones of the in-coupling optical elements 700, 710, 720.

Each waveguide also includes associated light distributing elements, with, e.g., light distributing elements 730 disposed on a major surface (e.g., a top major surface) of waveguide 670, light distributing elements 740 disposed on a major surface (e.g., a top major surface) of waveguide 680, and light distributing elements 750 disposed on a major surface (e.g., a top major surface) of waveguide 690. In some other embodiments, the light distributing elements 730, 740, 750, may be disposed on a bottom major surface of associated waveguides 670, 680, 690, respectively. In some other embodiments, the light distributing elements 730, 740, 750, may be disposed on both top and bottom major surface of associated waveguides 670, 680, 690, respectively; or the light distributing elements 730, 740, 750, may be disposed on different ones of the top and bottom major surfaces in different associated waveguides 670, 680, 690, respectively.

The waveguides 670, 680, 690 may be spaced apart and separated by, e.g., gas, liquid, and/or solid layers of material. For example, as illustrated, layer 760a may separate waveguides 670 and 680; and layer 760b may separate waveguides 680 and 690. In some embodiments, the layers 760a and 760b are formed of low refractive index materials (that is, materials having a lower refractive index than the material forming the immediately adjacent one of waveguides 670, 680, 690). Preferably, the refractive index of the material forming the layers 760a, 760b is 0.05 or more, or 0.10 or less than the refractive index of the material forming the waveguides 670, 680, 690. Advantageously, the lower refractive index layers 760a, 760b may function as cladding layers that facilitate total internal reflection (TIR) of light through the waveguides 670, 680, 690 (e.g., TIR between the top and bottom major surfaces of each waveguide). In some embodiments, the layers 760a, 760b are formed of air. While not illustrated, it will be appreciated that the top and bottom of the illustrated set 660 of waveguides may include immediately neighboring cladding layers.

Preferably, for ease of manufacturing and other considerations, the material forming the waveguides 670, 680, 690 are similar or the same, and the material forming the layers 760a, 760b are similar or the same. In some embodiments, the material forming the waveguides 670, 680, 690 may be different between one or more waveguides, and/or the material forming the layers 760a, 760b may be different, while still holding to the various refractive index relationships noted above.

With continued reference to FIG. 9A, light rays 770, 780, 790 are incident on the set 660 of waveguides. It will be appreciated that the light rays 770, 780, 790 may be injected into the waveguides 670, 680, 690 by one or more image injection devices 360, 370, 380, 390, 400 (FIG. 6).

In some embodiments, the light rays 770, 780, 790 have different properties, e.g., different wavelengths or different ranges of wavelengths, which may correspond to different colors. The in-coupling optical elements 700, 710, 720 each deflect the incident light such that the light propagates through a respective one of the waveguides 670, 680, 690 by TIR. In some embodiments, the incoupling optical elements 700, 710, 720 each selectively deflect one or more particular wavelengths of light, while transmitting other wavelengths to an underlying waveguide and associated incoupling optical element.

For example, in-coupling optical element 700 may be configured to deflect ray 770, which has a first wavelength or range of wavelengths, while transmitting rays 780 and 790, which have different second and third wavelengths or ranges of wavelengths, respectively. The transmitted ray 780 impinges on and is deflected by the in-coupling optical element 710, which is configured to deflect light of a second wavelength or range of wavelengths. The ray 790 is deflected by the in-coupling optical element 720, which is configured to selectively deflect light of third wavelength or range of wavelengths.

With continued reference to FIG. 9A, the deflected light rays 770, 780, 790 are deflected so that they propagate through a corresponding waveguide 670, 680, 690; that is, the in-coupling optical elements 700, 710, 720 of each waveguide deflects light into that corresponding waveguide 670, 680, 690 to in-couple light into that corresponding waveguide. The light rays 770, 780, 790 are deflected at angles that cause the light to propagate through the respective waveguide 670, 680, 690 by TIR. The light rays 770, 780, 790 propagate through the respective waveguide 670, 680, 690 by TIR until impinging on the waveguide's corresponding light distributing elements 730, 740, 750.

Figure 9B:
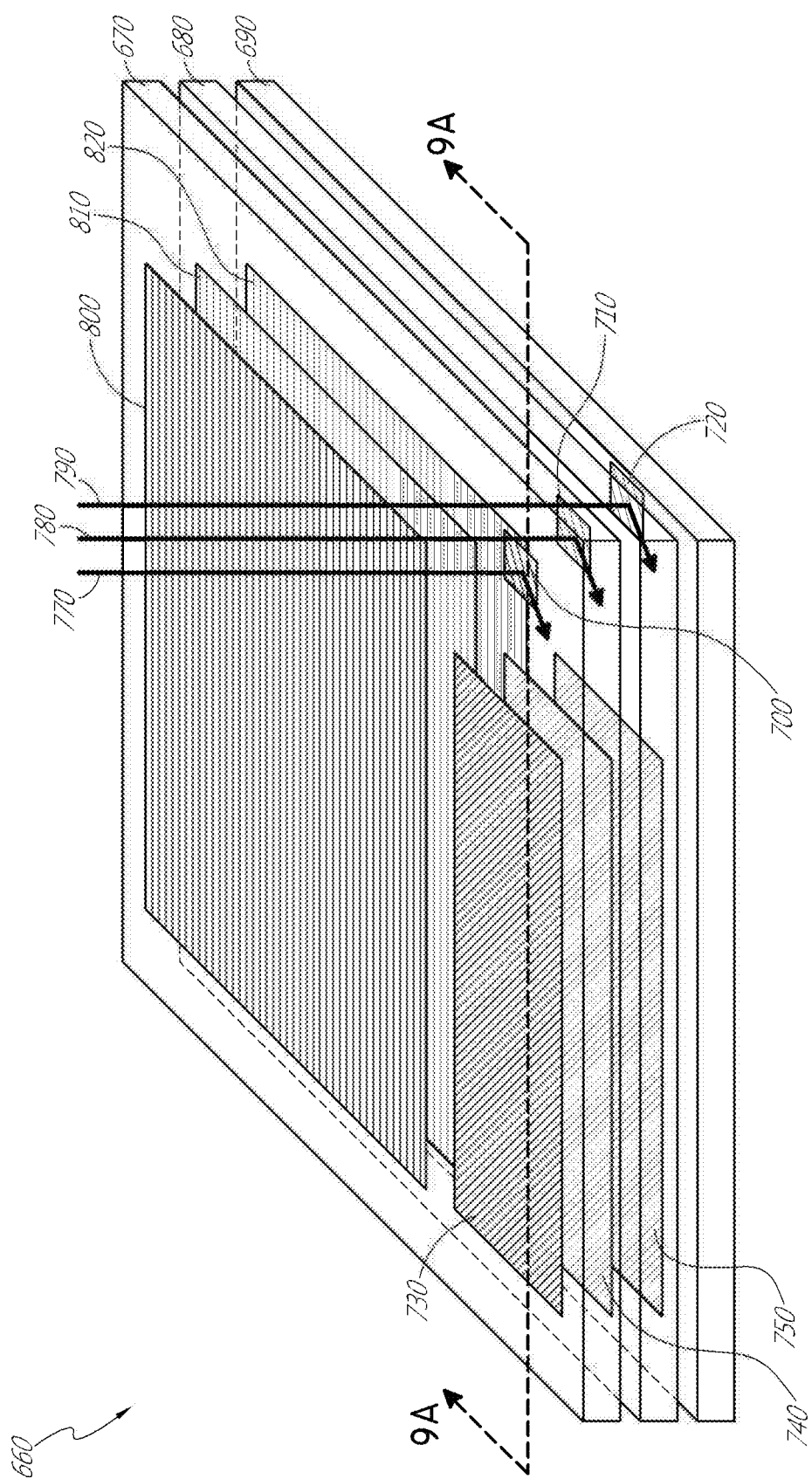
FIG. 9B illustrates a perspective view of an example of the plurality of stacked waveguides of FIG. 9A.

With reference now to FIG. 9B, a perspective view of an example of the plurality of stacked waveguides of FIG. 9A is illustrated. As noted above, the in-coupled light rays 770, 780, 790, are deflected by the in-coupling optical elements 700, 710, 720, respectively, and then propagate by TIR within the waveguides 670, 680, 690, respectively. The light rays 770, 780, 790 then impinge on the light distributing elements 730, 740, 750, respectively. The light distributing elements 730, 740, 750 deflect the light rays 770, 780, 790 so that they propagate towards the out-coupling optical elements 800, 810, 820, respectively.

In some embodiments, the light distributing elements 730, 740, 750 are orthogonal pupil expanders (OPE's). In some embodiments, the OPE's deflect or distribute light to the out-coupling optical elements 800, 810, 820 and, in some embodiments, may also increase the beam or spot size of this light as it propagates to the out-coupling optical elements. In some embodiments, the light distributing elements 730, 740, 750 may be omitted and the in-coupling optical elements 700, 710, 720 may be configured to deflect light directly to the out-coupling optical elements 800, 810, 820. For example, with reference to FIG. 9A, the light distributing elements 730, 740, 750 may be replaced with out-coupling optical elements 800, 810, 820, respectively. In some embodiments, the out-coupling optical elements 800, 810, 820 are exit pupils (EP's) or exit pupil expanders (EPE's) that direct light in a viewer's eye 210 (FIG. 7). It will be appreciated that the OPE's may be configured to increase the dimensions of the eye box in at least one axis and the EPE's may be to increase the eye box in an axis crossing, e.g., orthogonal to, the axis of the OPEs. For example, each OPE may be configured to redirect a portion of the light striking the OPE to an EPE of the same waveguide, while allowing the remaining portion of the light to continue to propagate down the waveguide. Upon impinging on the OPE again, another portion of the remaining light is redirected to the EPE, and the remaining portion of that portion continues to propagate further down the waveguide, and so on. Similarly, upon striking the EPE, a portion of the impinging light is directed out of the waveguide towards the user, and a remaining portion of that light continues to propagate through the waveguide until it strikes the EP again, at which time another portion of the impinging light is directed out of the waveguide, and so on. Consequently, a single beam of incoupled light may be "replicated" each time a portion of that light is redirected by an OPE or EPE, thereby forming a field of cloned beams of light, as shown in FIG. 6. In some embodiments, the OPE and/or EPE may be configured to modify a size of the beams of light.

Accordingly, with reference to FIGS. 9A and 9B, in some embodiments, the set 660 of waveguides includes waveguides 670, 680, 690; in-coupling optical elements 700, 710, 720; light distributing elements (e.g., OPE's) 730, 740, 750; and out-coupling optical elements (e.g., EP's) 800, 810, 820 for each component color. The waveguides 670, 680, 690 may be stacked with an air gap/cladding layer between each one. The in-coupling optical elements 700, 710, 720 redirect or deflect incident light (with different in-coupling optical elements receiving light of different wavelengths) into its waveguide. The light then propagates at an angle which will result in TIR within the respective waveguide 670, 680, 690. In the example shown, light ray 770 (e.g., blue light) is deflected by the first in-coupling optical element 700, and then continues to bounce down the waveguide, interacting with the light distributing element (e.g., OPE's) 730 and then the out-coupling optical element (e.g., EPs) 800, in a manner described earlier. The light rays 780 and 790 (e.g., green and red light, respectively) will pass through the waveguide 670, with light ray 780 impinging on and being deflected by in-coupling optical element 710. The light ray 780 then bounces down the waveguide 680 via TIR, proceeding on to its light distributing element (e.g., OPEs) 740 and then the out-coupling optical element (e.g., EP's) 810. Finally, light ray 790 (e.g., red light) passes through the waveguide 690 to impinge on the light in-coupling optical elements 720 of the waveguide 690. The light in-coupling optical elements 720 deflect the light ray 790 such that the light ray propagates to light distributing element (e.g., OPEs) 750 by TIR, and then to the out-coupling optical element (e.g., EPs) 820 by TIR. The out-coupling optical element 820 then finally out-couples the light ray 790 to the viewer, who also receives the out-coupled light from the other waveguides 670, 680.

Figure 9C:
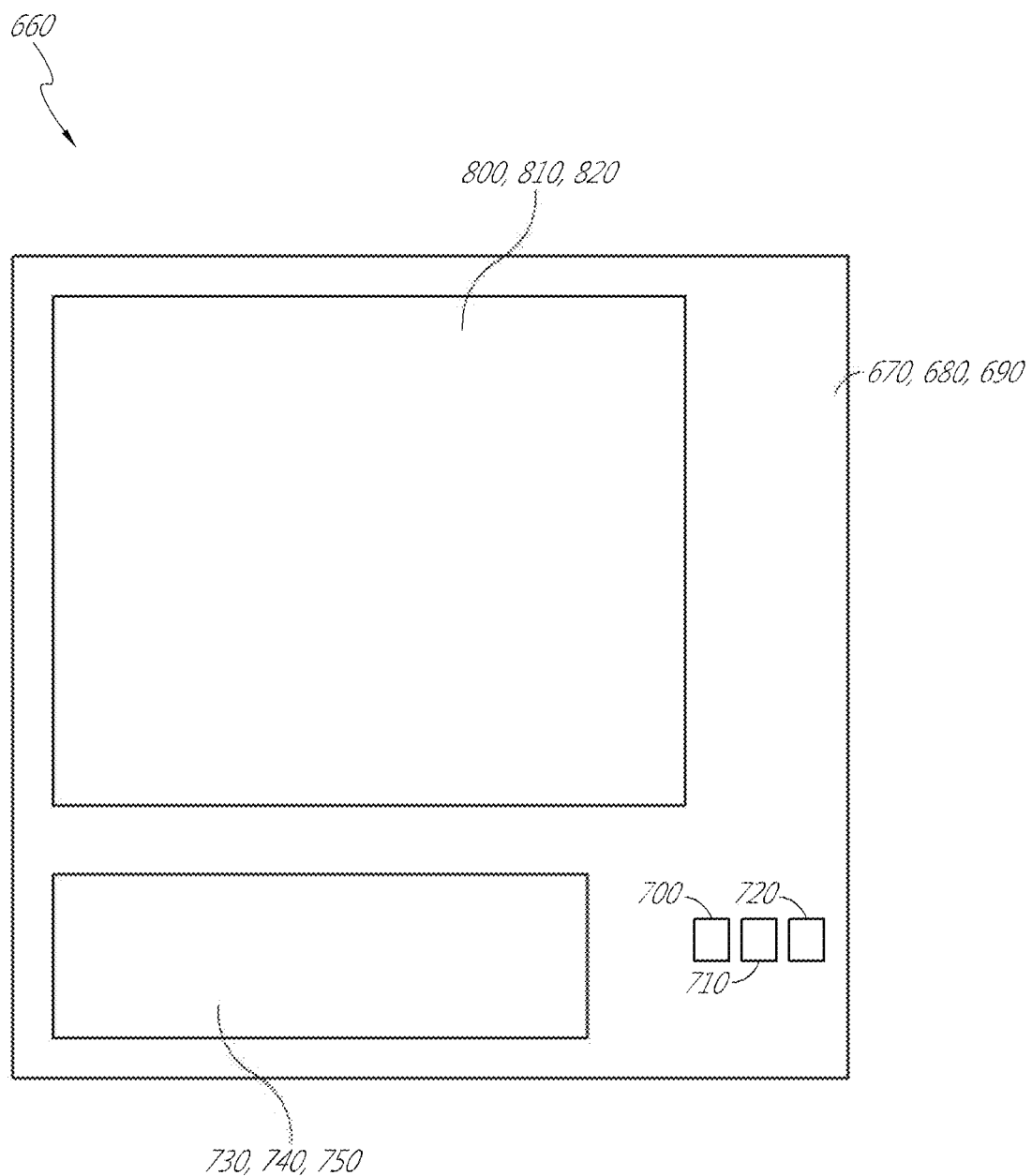
FIG. 9C illustrates a top-down plan view of an example of the plurality of stacked waveguides of FIGS. 9A and 9B.

FIG. 9C illustrates a top-down plan view of an example of the plurality of stacked waveguides of FIGS. 9A and 9B. As illustrated, the waveguides 670, 680, 690, along with each waveguide's associated light distributing element 730, 740, 750 and associated out-coupling optical element 800, 810, 820, may be vertically aligned. However, as discussed herein, the in-coupling optical elements 700, 710, 720 are not vertically aligned; rather, the in-coupling optical elements are preferably non-overlapping (e.g., laterally spaced apart as seen in the top-down view). As discussed further herein, this nonoverlapping spatial arrangement facilitates the injection of light from different resources into different waveguides on a one-to-one basis, thereby allowing a specific light source to be uniquely coupled to a specific waveguide. In some embodiments, arrangements including nonoverlapping spatially-separated in-coupling optical elements may be referred to as a shifted pupil system, and the in-coupling optical elements within these arrangements may correspond to sub pupils.

Eye Imaging and Environment Imaging

As discussed above, head mounted displays can be used to provide image content to a user integrated with, in conjunction with, and/or superimposed over the view of the world in front of the wearer. Such head mounted display systems can be configured to project light into an eye of a user to form augmented reality image content as well as to transmit light from an environment in front of the user to the user. A head mounted display system may include one or more cameras for imaging the environment and/or the user's eye. Outward facing cameras may be used for directly imaging the environment, for example, to determine where to place augmented reality image content with respect to objects in the environment. For example, imaging the environment may provide the location of a table such that the head mounted display may render an image of person standing next to the table instead of on the table or in the table. Inward-facing cameras may be used for directly imaging the eye such as for eye tracking. Disclosed herein are examples of head-mounted display systems and/or imaging systems that can be configured also to image the eye and/or the environment. In some designs, the systems do not require inward and/or outward facing cameras to directly image the eye and/or environment, respectively. Such systems may employ one or more cameras that are configured to receive light from the eye/environment via the eyepiece such as one or more waveguides in the eyepiece that are in optical communication with the one or more cameras. With the light collected by the waveguide(s), the one or more cameras can generate images of the eye and/or the environment in front of the user. Using the waveguide to collect the light for imaging the eye and/or environment may potentially reduce the form factor of the head mounted display, making the head mounted display possibly more compact and/or aesthetically desirable.

Figure 10:
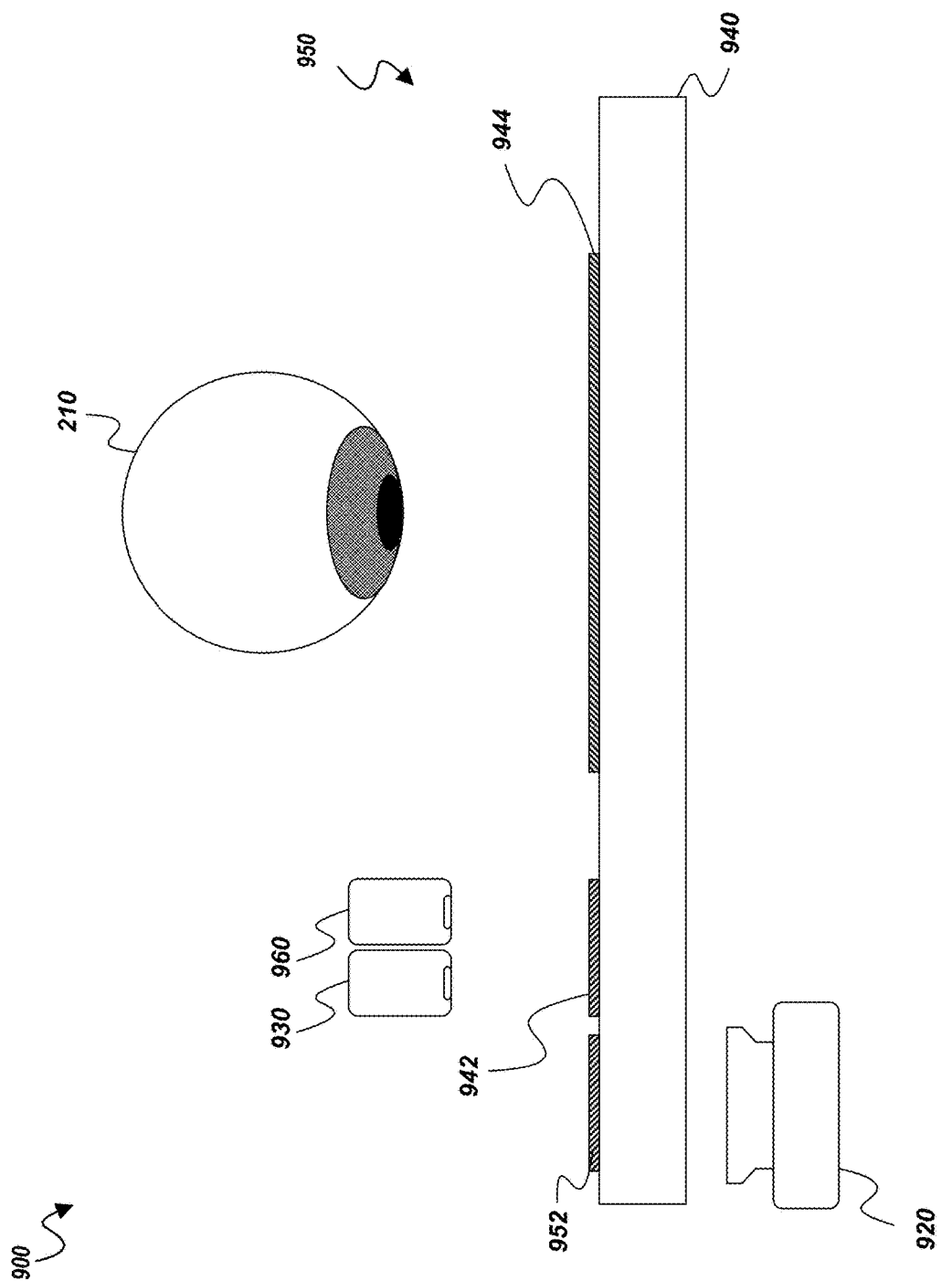
FIG. 10 schematically illustrates a cross-sectional side view of an example imaging system comprising an eyepiece, an image projector, a light source for illuminating the eye, and a camera for capturing an image of the eye.

FIG. 10 illustrates an example imaging system 900 configured to image the eye that is integrated with an eyepiece 950 that can be used on in head mounted display. The eyepiece 950, which can be disposed in front of the user's eye 210 can be used to both inject image content into the eye as well as image the eye. FIG. 10 shows one eyepiece 950 in front of one eye 210. Various head mounted display systems such as shown in FIG. 2, may include a pair of eyepieces 950 and associated components disposed in front of respective left and right eyes 210. A single waveguide 940 is shown in FIG. 10, but the waveguide 940 may include one, two, three, four, six, seven, eight, or more waveguides (e.g., one or more stacks of waveguides).

The imaging system 900 can include a light source or illumination source 960 illuminating the eye to facilitate image capture, the eyepiece 950 comprising a waveguide 940 configured to propagate light therein, and/or an imaging device 920 such as a camera for image capture. An image projector 930 for producing an image that can be injected into the eye via the eyepiece 950 is also shown. The eyepiece 950 may include one or more waveguides 940 configured to transport light from the illumination source 960 and/or image projector 930 to the eye and to transport light from the eye to the camera 920. The eyepiece 950 may further comprise one or more coupling optical elements 944 for coupling light out of the waveguide 940 and to the eye for illuminating the eye and for image injection and/or from the eye and into the waveguide for image capture. The eyepiece 950 may additionally comprise one or more incoupling optical elements 942 for coupling light from the illumination source 960 and/or image projector 930 into the waveguides 940 as well as one or more outcoupling optical elements 952 for coupling light from the waveguide out to the camera 920.

The eyepiece 950 may be disposed on a frame wearable on the head. The eyepiece 950 may be disposed in front of the eye 210. The eyepiece 950 may have a medial or nasal side closer to the nose of the wearer and an opposite lateral or temporal side closer to the temples and farther from the nose of the wearer. In FIG. 10, the coupling optical element 944 is medial or nasal with respect to the incoupling 942 and outcoupling 952 optical elements (which are lateral or temporal to the coupling optical elements 944). The illumination source 960 is also more medial or nasal with respect to the image projector 930 (or the image projector is more lateral or temporal than the illumination source.) The relative positions can be different, however. For example, the illumination source 960 may be more lateral or temporal than the image projector 930 in some designs.

The waveguide 940 may comprise a sheet or layer having two major surfaces (a forward and a rearward surface), having the largest surface areas, disposed opposite one another. The forward surface may be farther from the user's eye 210 (closer to the environment in front of the wearer) and the rearward closer to the user's eye (and farther from the environment in front of the wearer) when the user wears the head mounted display. The waveguide 940 may comprise a transparent material with an index of refraction greater than 1.0 (e.g., glass, plastic) such that light may be guided therein by total internal reflection between the major surfaces. Elements with the same numbers may have the same functionality for one or more of the embodiments described herein.

A coupling optical element 944 for coupling light to the eye 210 from waveguide 940 and/or from the waveguide to the eye may be disposed on or in the waveguide 940. As shown in FIG. 10, the coupling optical element 944 may be disposed in an optical path between the user's eye 210 and the waveguide 940 such that light coupled from the waveguide 940 via the coupling optical element 944 may be incident on the user's eye 210 (for example to illuminate the eye and/or for image injection). The coupling optical element 944 may comprise a plurality of turning features configured to turn light guided within the waveguide out of the waveguide or turn light incident on the coupling optical element 944 at an angle into the waveguide to be guided therein by total internal reflection. The coupling optical element 944 and turning features may be in physical engagement with the waveguide 940. For example, the coupling optical element 944 may comprise a holographic or diffractive optical element (e.g., surface relief grating) patterned (e.g., etched) in or on the waveguide 940. The coupling optical element 944 may comprise a layer disposed on the waveguide 940 or may be formed in the waveguide 940. For example, a volume holographic or other diffractive optical element may be formed by changing the index of refraction of material comprising the waveguide or a layer disposed thereon. Accordingly, the coupling optical element 944 may be disposed in the volume of the waveguide 940 or as a layer disposed thereon.

Depending on the design, the coupling optical element 944 may be transmissive or reflective and may operate in transmission or reflection. For example, the coupling optical element 944 may include a transmissive or reflective diffractive optical element (e.g., grating) or holographical optical element that operates in transmission or reflection respectively, e.g., turning light via that is transmitted therethrough or that is reflected therefrom. The coupling optical element 944 can include a polarization optical element, such as a polarization selective turning element (e.g., polarizer). The polarization selective turning element may include one or more polarization gratings, diffractive optical elements, and/or holographic optical elements and may comprise liquid crystal structures such as liquid crystal polarization gratings. The coupling optical element 944 may be configured to direct light from the image projector 930 and/or light source 960 guided within the waveguide 940 by total internal reflection (TIR) to the user's eye 210 at an angle less than (e.g., more normal) than the critical angle so as to be ejected out of the waveguide to the eye. Additionally or in the alternative, the coupling optical element 944 may be configured to couple light from the eye 210 into the waveguide 940 at an angle greater (e.g., less normal) than the critical angle so as to be guided therein by total internal reflection to the camera 920.

As shown in FIG. 10, an incoupling optical element 942 for coupling light from the illumination source 960 and/or the image projector 930 into the waveguide 940 may be disposed on or in the waveguide 940. The incoupling optical element 942 may be disposed in an optical path between the light source 960 and the waveguide 940 such that light coupled from the light source 960 via the incoupling optical element 942 is guided within the waveguide 940. The incoupling optical element 942 may comprise, for example, a plurality of turning features configured to turn light incident thereon at an angle into the waveguide to be guided therein by total internal reflection. The incoupling optical element 942 may comprise liquid crystal structures such as liquid crystal polarization gratings. Additionally or alternatively, the incoupling optical element 942 may include a blazed grating. The incoupling optical element 942 may comprise a layer disposed on the waveguide 940 or may be formed on or in the waveguide 940 (e.g., patterned) or may be otherwise manufactured therein. For example, a surface holographic or diffractive optical element (e.g., surface relief grating) may be fabricated by patterning (e.g., etching) a surface of the waveguide or a layer thereon. A volume holographic or diffractive optical element may also be formed by changing the index of refraction of material comprising the waveguide or a layer disposed thereon. Accordingly, the incoupling optical element 942 may be disposed in the volume of the waveguide 940 or a layer disposed thereon. Depending on the design, the incoupling optical element 942 may be transmissive or reflective and may operate in transmission or reflection. For example, the incoupling optical element 942 may include a transmissive or reflective diffractive optical element (e.g., grating) or holographical optical element that operates in transmission or reflection, respectively, e.g., turning light that is transmitted therethrough or that is reflected therefrom.

The incoupling optical element 942 may comprise a reflective optical element (e.g., mirror). For example, the incoupling optical element 942 may comprise an off-axis reflector. Additionally or alternatively, the incoupling optical element 942 and/or coupling optical element 944 can include a polarization optical element, such as a polarization selective turning element (e.g., polarizer). The polarization selective turning element may include one or more polarization gratings, diffractive optical elements, and/or holographic optical elements and may comprise liquid crystal structures such as liquid crystal polarization gratings. For example, one or both of the incoupling optical element 942 and/or the coupling optical element 944 can include liquid crystal polarization gratings (LCPGs). LCPGs can provide high efficiency diffraction potentially at broad wavelengths. Accordingly, LCPGs may be useful for incoupling optical elements 942 and/or the coupling optical element 944. The LCPG may be polarization dependent. The LCPG or other type of liquid crystal grating, diffractive optical element, or optical element may include a pattern or arrangement of molecules of liquid crystal configured to provide one or more functions such as turn light into a waveguide or out of a waveguide. Accordingly, incoupling optical element 942 and/or the coupling optical element 944 may comprise polarization gratings. Additionally or alternatively, incoupling optical element 942 and/or the coupling optical element 944 can comprises liquid crystal and thus in some implementations one or both may be liquid crystal gratings or liquid crystal diffractive optical elements. Additionally or alternatively, one or both of the incoupling optical element 942 and/or the coupling optical element 944 can include a blazed grating. In some designs, the incoupling optical element 942 comprises a liquid crystal reflector, such as a cholesteric liquid crystal reflective lens (e.g., reflective liquid crystal diffraction lens, Bragg-reflective structure, reflective liquid crystal diffraction grating, etc.). Some nonlimiting examples of liquid crystal gratings, liquid crystal polarization gratings and other liquid crystal optical elements are discussed in the following published applications, each of which is hereby incorporated by reference herein in its entirety and for all purposes: U.S. Publication No. 2018/0143438, titled "MULTILAYER LIQUID CRYSTAL DIFFRACTIVE GRATINGS FOR REDIRECTING LIGHT OF WIDE INCIDENT ANGLE RANGES," filed on Nov. 16, 2017; U.S. Publication No. 2018/0143485, titled "SPATIALLY VARIABLE LIQUID CRYSTAL DIFFRACTION GRATINGS," filed on Nov. 16, 2017; U.S. Publication No. 2018/0143509, titled "WAVEGUIDE LIGHT MULTIPLEXER USING CROSSED GRATINGS," filed on Nov. 16, 2017; U.S. Publication No. 2018/0239147, titled "DISPLAY SYSTEM WITH VARIABLE POWER REFLECTOR," filed on Feb. 22, 2018; U.S. Publication No. 2018/0239177, titled "VARIABLE-FOCUS VIRTUAL IMAGE DEVICES BASED ON POLARIZATION CONVERSION," filed on Feb. 22, 2018; and U.S. Publication No. 2018/0164627, titled "DIFFRACTIVE DEVICES BASED ON CHOLESTERIC LIQUID CRYSTAL," filed on Dec. 7, 2017. The designs of the incoupling optical element 942 and/or the coupling optical element 944, however, are not limited to these and may include other types of optical elements, diffractive optical element, liquid crystal optical element, liquid crystal gratings and liquid crystal polarization gratings. Further information on examples of cholesteric liquid crystal structures such as reflectors may also be found below in in the section titled "Cholesteric Liquid Crystal Mirror." As discussed above, other liquid crystal optical elements as well as other non-liquid crystal optical elements may be used. Accordingly, many types of coupling optical elements (e.g. incoupling optical element 942 and/or the coupling optical element 944), diffractive optical element, gratings, polarization gratings, etc., may be used, both those described herein as well as other types of gratings, diffractive optical elements, liquid crystal elements, and optical elements generally. In various implementations, the incoupling optical element 942 may be configured to couple light from the image projector 930 and/or the light source 960 into the waveguide at an angle greater than the critical angle so as to be guided within the waveguide 940 by total internal reflection to the eye to the user's eye 210.

The waveguide 940 may comprise one or more waveguides. In some implementations, the one or more waveguides 940 comprises a stack of waveguides. In some designs, for example, different waveguides of the stack of waveguides are configured to output light with different wavefront divergence as if projected from different distances from the user's eye. For example, a first waveguide or group of waveguides may be configured to output light that is collimated or has a first divergence as if projected from a first depth, and a second waveguide or group of waveguides may be configured to output light that is diverging (not collimated) or is at a second divergence (greater than the first divergence) as if projected from a second depth closer than the first depth. In some designs, the different waveguides may be configured to output light having different associated colors. For example, a first waveguide may be configured to output red light, a second waveguide may be configured to output green light, and a third waveguide may be configured to output blue light. A fourth waveguide may be configured to output and/or input infrared light.

The outcoupling optical element 952 for coupling light from the waveguide 940 to the camera 920 such as shown in FIG. 10 may comprise, for example, a plurality of turning features configured to turn light incident thereon at an angle such that light is not guided within the waveguide and is turned out of the waveguide to the camera. The outcoupling optical element 952 may be disposed within an interior of the waveguide 940 or may be patterned (e.g., etched) in or on a surface (e.g., major surface) of the waveguide 940. For example, a surface holographic or diffractive optical element (e.g., surface relief grating) may be fabricated by patterning (e.g., etching) a surface of the waveguide or a layer thereon. A volume holographic or diffractive optical element may also be formed by changing the index of refraction of material comprising the waveguide or a layer disposed thereon. Depending on the design, the outcoupling optical element 952 may be transmissive or reflective and may operate in transmission or reflection. For example, the outcoupling optical element 952 may include a transmissive or reflective diffractive optical element (e.g., grating) or holographical optical element that operates in transmission or reflection, respectively, e.g., turning light that is transmitted therethrough or that is reflected therefrom.

The outcoupling optical element 942 may comprise a reflective optical element (e.g., mirror). For example, the outcoupling optical element 952 may comprise an off-axis reflector. In some designs, the outcoupling optical element 952 can include a polarization optical element, such as a polarization selective turning element (e.g., polarizer). Accordingly, the polarization selective turning element may include one or more polarization gratings, diffractive optical elements, and/or holographic optical elements and may comprise liquid crystal structures such as liquid crystal polarization gratings. In some implementations, for example, the outcoupling optical element 952 can include liquid crystal polarization gratings (LCPGs). LCPGs can provide high efficiency diffraction potentially at broad wavelengths. Likewise, LCPGs may be useful for outcoupling optical element 952. The LCPG may be polarization dependent. The LCPG or other types of liquid crystal gratings may include a pattern or arrangement of molecules of liquid crystal configured to provide one or more functions such as turn light into a waveguide or out of a waveguide. Accordingly, outcoupling optical element 952 may comprise polarization gratings. Additionally or alternatively, outcoupling optical element 952 can comprises liquid crystal and thus in some implementations may be liquid crystal gratings or other liquid crystal optical element such as liquid crystal diffractive optical elements. Additionally or alternatively, the outcoupling optical element 952 can include a blazed grating. In some designs, the outcoupling optical element 952 comprises a liquid crystal reflector, such as a cholesteric liquid crystal reflective lens (e.g., reflective liquid crystal diffraction lens, Bragg-reflective structure, reflective liquid crystal diffraction grating, etc.). Some nonlimiting examples of liquid crystal gratings, liquid crystal polarization gratings and other liquid crystal optical elements are discussed in the following published applications, each of which is hereby incorporated by reference herein in its entirety and for all purposes: U.S. Publication No. 2018/0143438, titled "MULTILAYER LIQUID CRYSTAL DIFFRACTIVE GRATINGS FOR REDIRECTING LIGHT OF WIDE INCIDENT ANGLE RANGES," filed on Nov. 16, 2017; U.S. Publication No. 2018/0143485, titled "SPATIALLY VARIABLE LIQUID CRYSTAL DIFFRACTION GRATINGS," filed on Nov. 16, 2017; U.S. Publication No. 2018/0143509, titled "WAVEGUIDE LIGHT MULTIPLEXER USING CROSSED GRATINGS," filed on Nov. 16, 2017; U.S. Publication No. 2018/0239147, titled "DISPLAY SYSTEM WITH VARIABLE POWER REFLECTOR," filed on Feb. 22, 2018; U.S. Publication No. 2018/0239177, titled "VARIABLE-FOCUS VIRTUAL IMAGE DEVICES BASED ON POLARIZATION CONVERSION," filed on Feb. 22, 2018; and U.S. Publication No. 2018/0164627, titled "DIFFRACTIVE DEVICES BASED ON CHOLESTERIC LIQUID CRYSTAL," filed on Dec. 7, 2017. The designs of the outcoupling optical element 952, however, are not limited to these and may include other types of optical elements, diffractive optical element, liquid crystal optical element, liquid crystal gratings and liquid crystal polarization gratings. Further information on examples of cholesteric liquid crystal structures such as reflectors may also be found below in the section titled "Cholesteric Liquid Crystal Mirror." As discussed above, other liquid crystal optical elements as well as other non-liquid crystal optical elements may be used. Accordingly, many types of coupling optical elements (e.g. outcoupling optical element 952), diffractive optical element, gratings, polarization gratings, etc., may be used, both those described herein as well as other types of gratings, diffractive optical elements, liquid crystal elements, or optical elements generally. As referred to above, the outcoupling optical element 952 may be configured to redirected light guided within the waveguide 940 at an angle less than the critical angle so as not to be guided within the waveguide by total internal reflection but to be ejected out to the camera 920.

In various designs, the coupling optical element 944 may be transparent in the visible spectrum such that the user can see through the coupling optical element 944 and the eyepiece 950 to the environment in front of the user. The incoupling optical element 942 may also turn light in the visible spectrum, for example, if the incoupling optical element is used to receive light from the image projector 930 and/or if the illumination source 960 is configured to output visible light to illuminate the eye 210 with visible light. In some embodiments, the incoupling optical element 942 is configured to turn infrared light, for example, if the illumination source 960 is configured to output infrared light to illuminate the eye 210 with infrared light. In some designs such as shown in FIG. 10, the incoupling optical element 942 may be more medial or nasal than the outcoupling optical element 952. However, in other designs the incoupling optical element 942 may be more lateral or temporal than the outcoupling optical element 952. In certain implementations such as shown in FIG. 10, the outcoupling optical element 952 may be adjacent the incoupling optical element 942 although non-adjacent positioning is possible.

The illumination source 960 may be disposed on the same side of the eyepiece 950 as the eye 210 (e.g., rearward or proximal side), as shown in FIG. 10. (Proximal may refer to the side closest to the eye 210.) Alternatively, the illumination source 960 may be disposed on the side opposite the eye 210 (e.g., forward or distal side). The illumination source 960 may be configured to direct light into at least one of the major surfaces of the waveguide 940 via the incoupling optical element 942. The light source 960 may be configured to emit invisible light (e.g., infrared). The light source 960 may include one or more LEDs. The LEDs may comprise infrared LEDs. The light source 960 may be configured to emit coherent light. In some designs, the light source 960 comprises a laser (e.g., infrared laser). In some designs, the light source 960 emits pulsed light. For example, the camera 920 can be configured to capture an image periodically. Accordingly, the illumination source 960 can be pulsed to coincide with the period during which the camera obtains images. The intensity output from the illumination source 960 can be reduced when the camera is not obtaining an image. By concentrating the total energy of the illumination on a short time increased signal to noise can be obtained while not exposing the eye 210 to unsafe intensity levels. In some cases, for example, the camera 920 captures one image every 30 milliseconds and the exposure time of the camera is few milliseconds. The illumination source 960 can be configured to output pulses having similar period and duration to match that of the camera 920.

In some implementations, different light sources having different wavelengths are alternately pulsed to provide different wavelength illumination at different times as discussed below.

The incoupling optical element 942 may be in direct optical communication with the illumination source 960 and/or image projector 930, for example, so as to guide light from said image projector 930 and/or light source 960 therein. For example, light emitted by the light source 960 may be incident on the incoupling optical element 942 before optically interacting with either the coupling optical element 944 and/or outcoupling optical element 952.

As shown in FIGS. 11A-11E, light 902 projected from the image projector 930 may form an image on the retina. The image projector 930 may include a light source, a modulator, and/or projection optics. The light source for the image projector 930 may comprise one or more LEDs, lasers or other light sources and may comprises one or more visible light sources. The modulator may comprise a spatial light modulator such as a liquid crystal spatial light modulator. Such a spatial light modulator may be configured, for example, to modulate the intensity of light at different spatial locations. The projection optics may comprise one or more lenses. Other types of image projectors 930 capable of projecting and/or forming images may be employed. For example, the image projector 930 may comprise a scanning optical fiber.

The image projector 930 and the incoupling optical element 942 may be in direct optical communication with each other. The image projector 930 may, for example, be aligned with the incoupling optical element 942 into which light from the image projector 930 is directed. In some cases, image projector 930 is disposed adjacent the corresponding incoupling optical element 942 and/or the waveguide 940. The image projector 930 may also be disposed in an optical path that includes the incoupling optical element 942, the coupling optical element 944, and the eye 210.

The image projector 930 may be a separate element than the illumination source 960, as shown in FIG. 10 as well as in FIGS. 11A-11E. However, in some cases the image projector 930 may be used as the illumination source. For example, in addition to injecting images into the eye 210, the image projector 930 may be used to direct visible and/or infrared light into the eye to illuminate the eye for image capture. Alternatively, however, one or more separate light sources 960 may be used to illuminate the eye 210 for image capture.

The light emitted by the illumination source 960 may comprise a particular wavelength range of light such as, for example, invisible light. The illumination source 960 may be configured to project invisible (e.g., infrared) light onto/into the eye 210 for imaging one or more parts (e.g., cornea, retina) of the eye 210. In certain example implementations, the light source 960 may be configured to emit light in the range of between about 850 nm and 940 nm. The light source 960 may be configured to emit light extending over a wavelength range of at least about 20 nm. Other ranges are also possible. The wavelength range emitted may be 5 nm, 10 nm, 15 nm, 50 nm, 75 nm, 100 nm, 150 nm, 200 nm, or any range between any of these values. The light source 960 may be configured to emit light across a broad band of wavelengths, such as any range within the infrared spectrum.

The imaging device 920, which may comprise a camera, may comprise a detector array and possibly imaging optics. The detector array may comprise, for example, a CCD or CMOS detector array and the imaging optics may comprise one or more lenses. The one or more lenses may have positive optical power and an associated focal length. In certain designs, the camera 920 is focused at infinity. For example, the optics may have a focal length, f, and detector array may be disposed a distance away from the optics corresponding to the focal length such that objects at a large distance are imaged onto the detector array. Similarly, light from the eye or objects in the environment that is collimated will be focus on the detector array to form an image of the eye or object thereon.

The imaging device 920 may be disposed on the opposite side of the waveguide 940 as the illumination source 960 and/or the eye 210. In some designs, the imaging device 920 may be disposed on the same side of the waveguide 940 as the light source 960 and/or eye 210. As shown in FIG. 10, the imaging device 920 may be disposed near a lateral or temporal edge of the eyepiece 950 although other locations are possible.

Figure 11A:
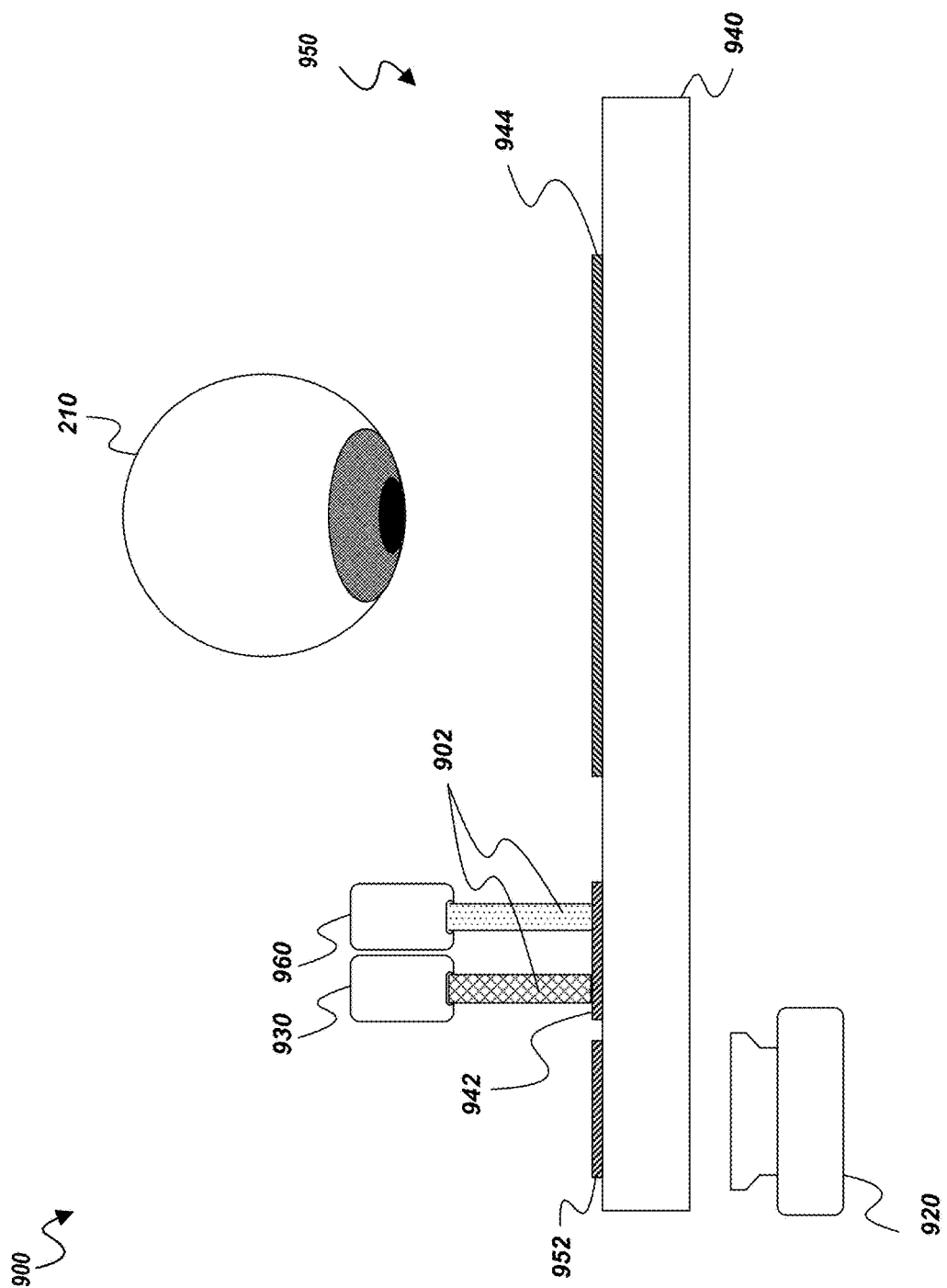
FIG. 11A schematically illustrates the light source for illuminating the eye and the image projector for injecting images in the eye both emitting light toward an incoupling optical element on a waveguide of the eyepiece.
Figure 11B:
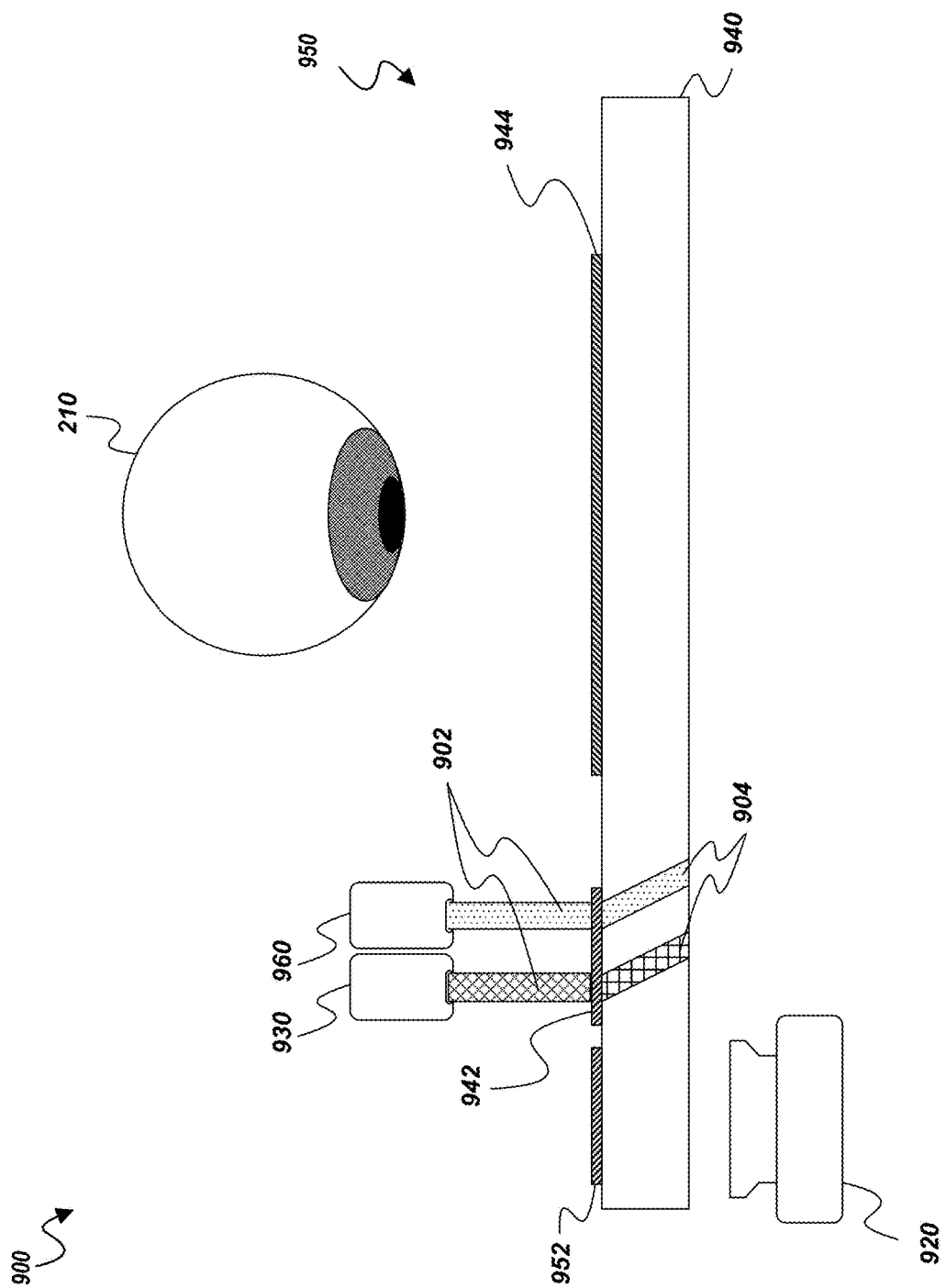
FIG. 11B schematically illustrates projected light from the light source and from the image projector coupled into the waveguide.
Figure 11C:
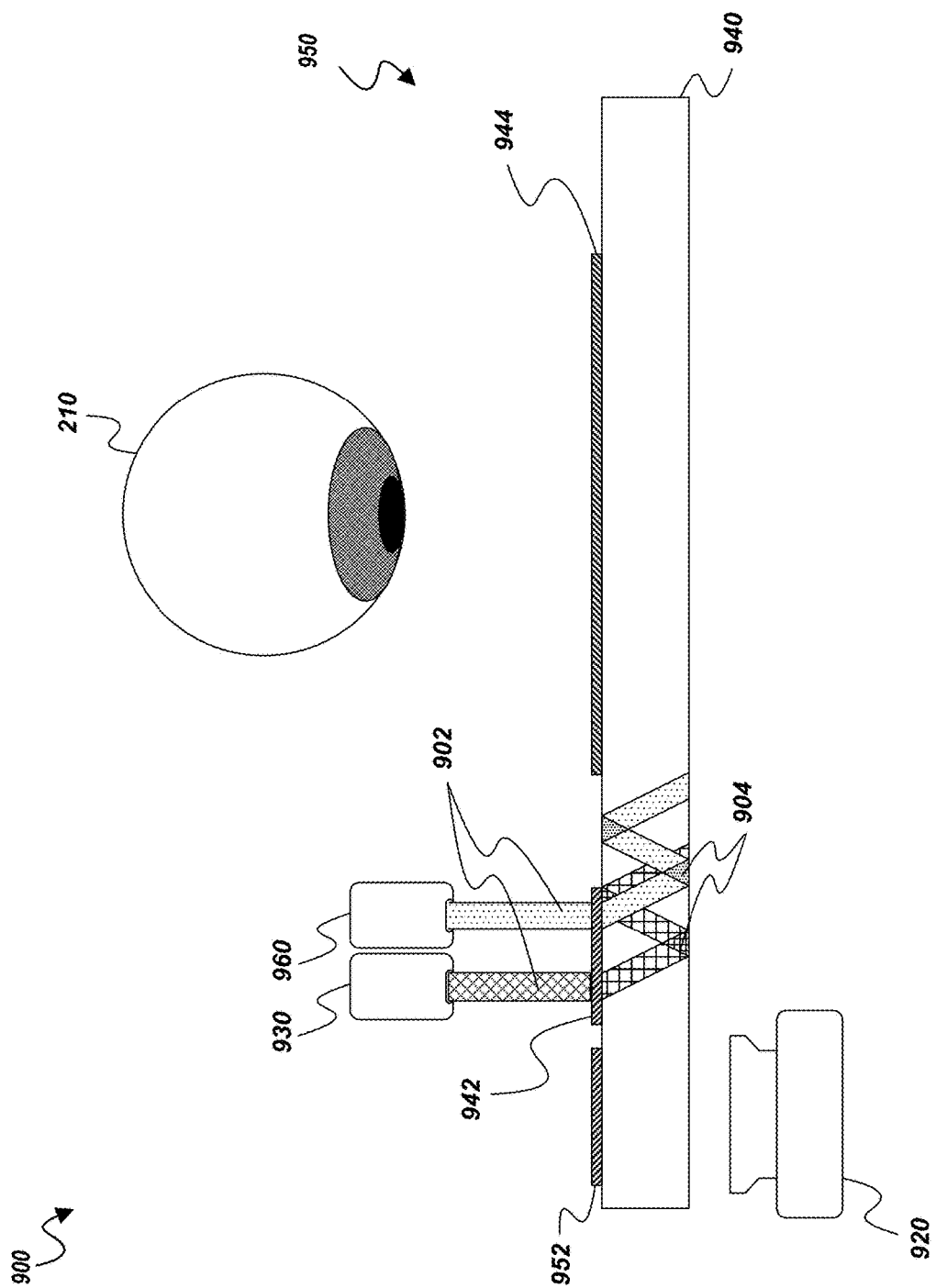
FIG. 11C schematically illustrates how incoupled light may propagate through a waveguide by total internal reflection.

FIGS. 11A-11E illustrate the operation of the example imaging system 900 of FIG. 10. FIG. 11A shows the illumination source 960 emitting light 902 toward the incoupling optical element 942 on the waveguide 940. As shown, the light 902 can be directed generally at normal incidence to the eyepiece 950 although other angles are possible. In some designs, the light source 960 is configured to emit collimated light into the eyepiece 950. As shown in FIG. 11B, the illumination light 902 can be coupled into the waveguide 940 via the incoupling optical element 942. In some designs where the incoupling optical element 942 comprises a diffractive optical element (e.g., grating, holographic element) the light incident thereon is diffracted at an angle greater than the critical angle of the waveguide to cause the incoupled light 904 to be guided within the eyepiece 950 by total internal reflection (TIR). In some designs, the incoupling optical element 942 may be configured to direct light toward the coupling optical element 944. The incoupling optical element 942 may be polarization selective. For example, the incoupling optical element 942 can include a polarization selective turning element such a polarization grating like a liquid crystal polarization grating. FIG. 11C shows how the incoupled light 904 propagating through the waveguide 940 by TIR.

Figure 11D:
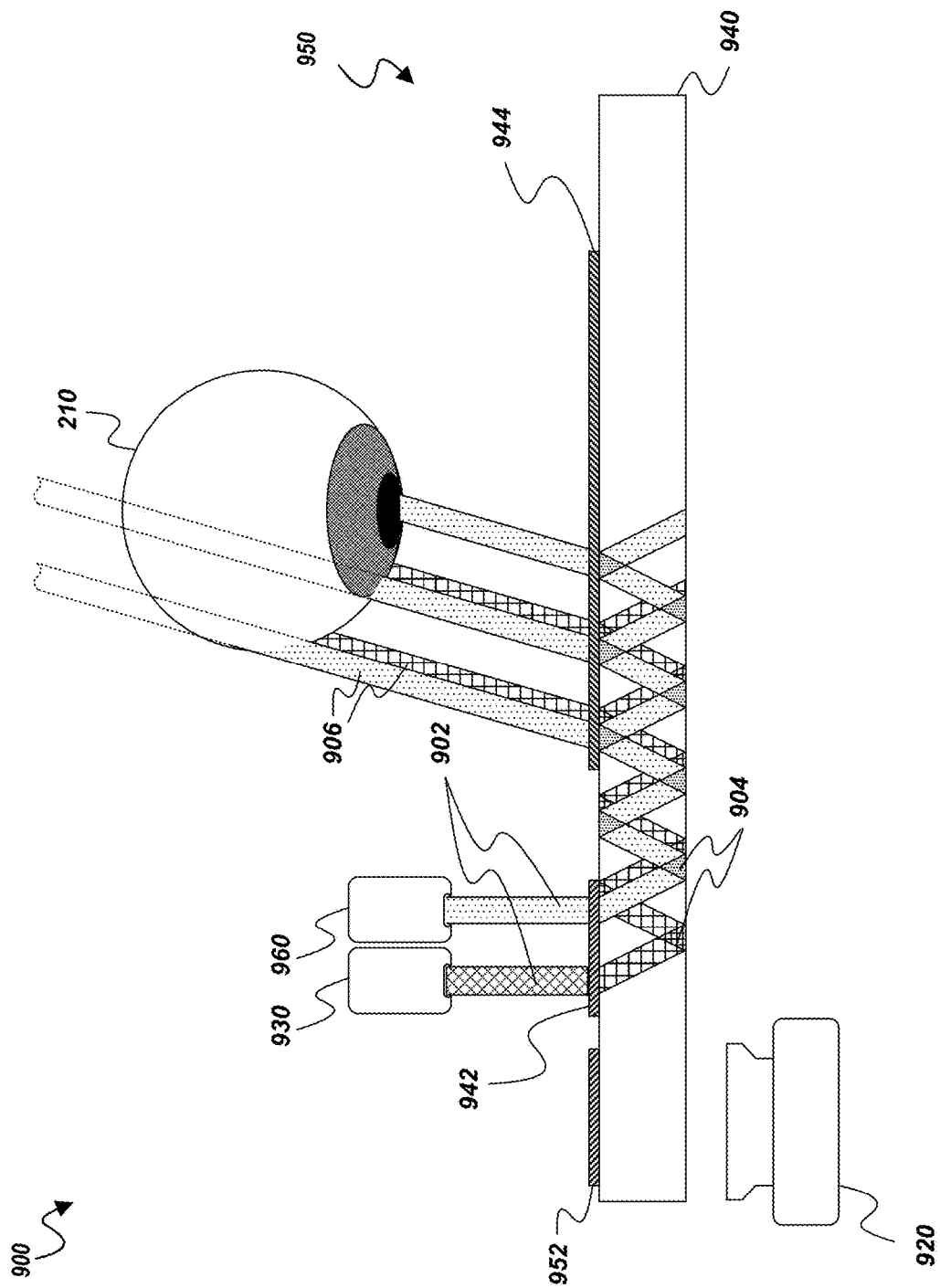
FIG. 11D schematically illustrates light from the light source and from the image projector coupled out of the eyepiece.

FIG. 11D illustrates an example imaging system 900 coupling light out of the eyepiece 950. As the incoupled light 904 propagates through the waveguide 940, some of the light may be incident on the coupling optical element 944. The coupling optical element 944 can be configured to couple the incoupled light 904 out of the eyepiece 950 and toward the user's eye 210. The coupling optical element 944 may be configured to couple the light as collimated light toward the eye 210. The coupling optical element 944 may be tuned to light of a particular wavelength range. For example, the coupling optical element 944 may be configured to couple infrared light (e.g., between about 700 nm and 15000 nm) out of the waveguide 940. In some designs, the coupling optical element 944 can be configured to couple multiple wavelengths of light out of the eyepiece 950. For example, the coupling optical element 944 may be tuned for both infrared and visible light. The coupling optical element 944 can also be configured to couple light into the waveguide 940, as described more fully below.

The coupling optical element 944 can be configured to increase one or more dimensions of an eyebox for a user. For example, the one or more dimensions may be measured along a first axis (e.g., x axis). The eyepiece 950 may further include an orthogonal pupil expander (OPE). The OPE may have at least one light redirecting element disposed on or in the waveguide (e.g., on one of the major surfaces) or the OPE may be disposed within the waveguide 940. The OPE may include features similar or identical to those described above for light distributing elements 730, 740, 750 above. In some implementations, the light redirecting element may comprise a diffractive optical element. The OPE may be configured to increase a dimension of the eyebox along a second axis (e.g., y axis) orthogonal to the first axis.

FIG. 11D shows some of the light exiting the eyepiece 950 toward the user's eye 210. In some designs, the coupling optical element 944 is configured such that incoupled light 904 that is incident on the coupling optical element 944 at various portions of the coupling optical element 944 along the first axis (e.g., parallel to the x-axis) exits the eyepiece 950 at each portion of the coupling optical element 944 along the first axis. This may provide a user with a light for projecting images or illuminating the eye for different eye positions or locations.

Figure 11E:
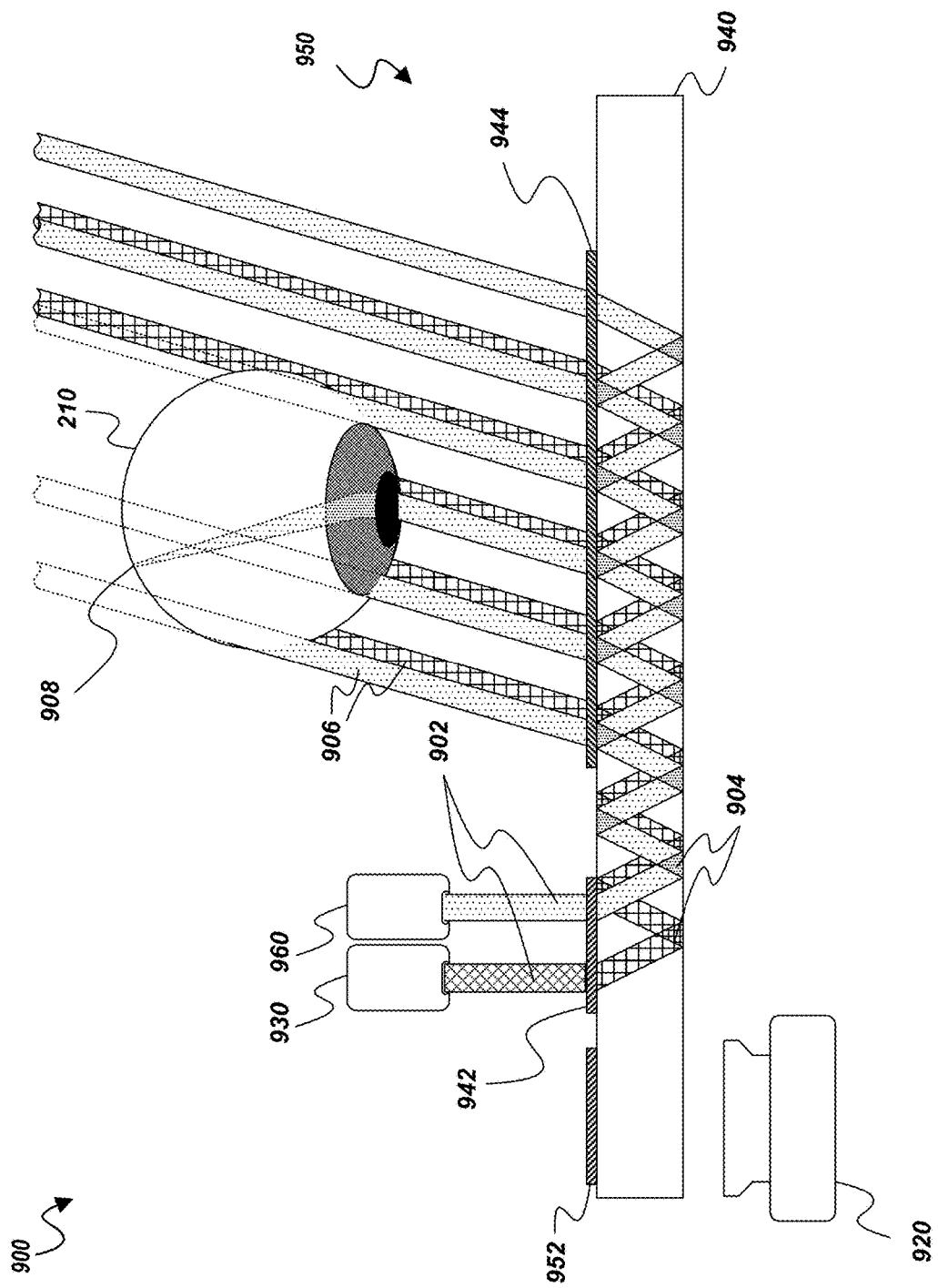
FIG. 11E schematically illustrates the waveguide and coupling optical element configured to propagate incoupled light at least along a full dimension (e.g., along the x-direction) of the coupling optical element. Light entering the eye is shown from an extended source (e.g., the imaging light will capture a region of the retina).

As shown in FIGS. 11D-11E, the coupling optical element 944 may be configured to couple the incoupled light 904 out of the eyepiece 950 as collimated light. This light may also be directed in general near normal relative to a major surface of the eyepiece 950 and/or waveguide 940. The collimated light may be directed into the eye and focus by the eye (e.g., the cornea and natural lens of the eye) onto the retina. This light 908 incident on the retina may be provide illumination for imaging the retina and/or providing image content to the eye. Some of this light 908, for example, may be reflected or scatter off the retina, exiting the eye and providing for images of the retina to be captured. The light source 960 may be an extended light source such that the light will illuminate a region of the retina.

Figure 12A:
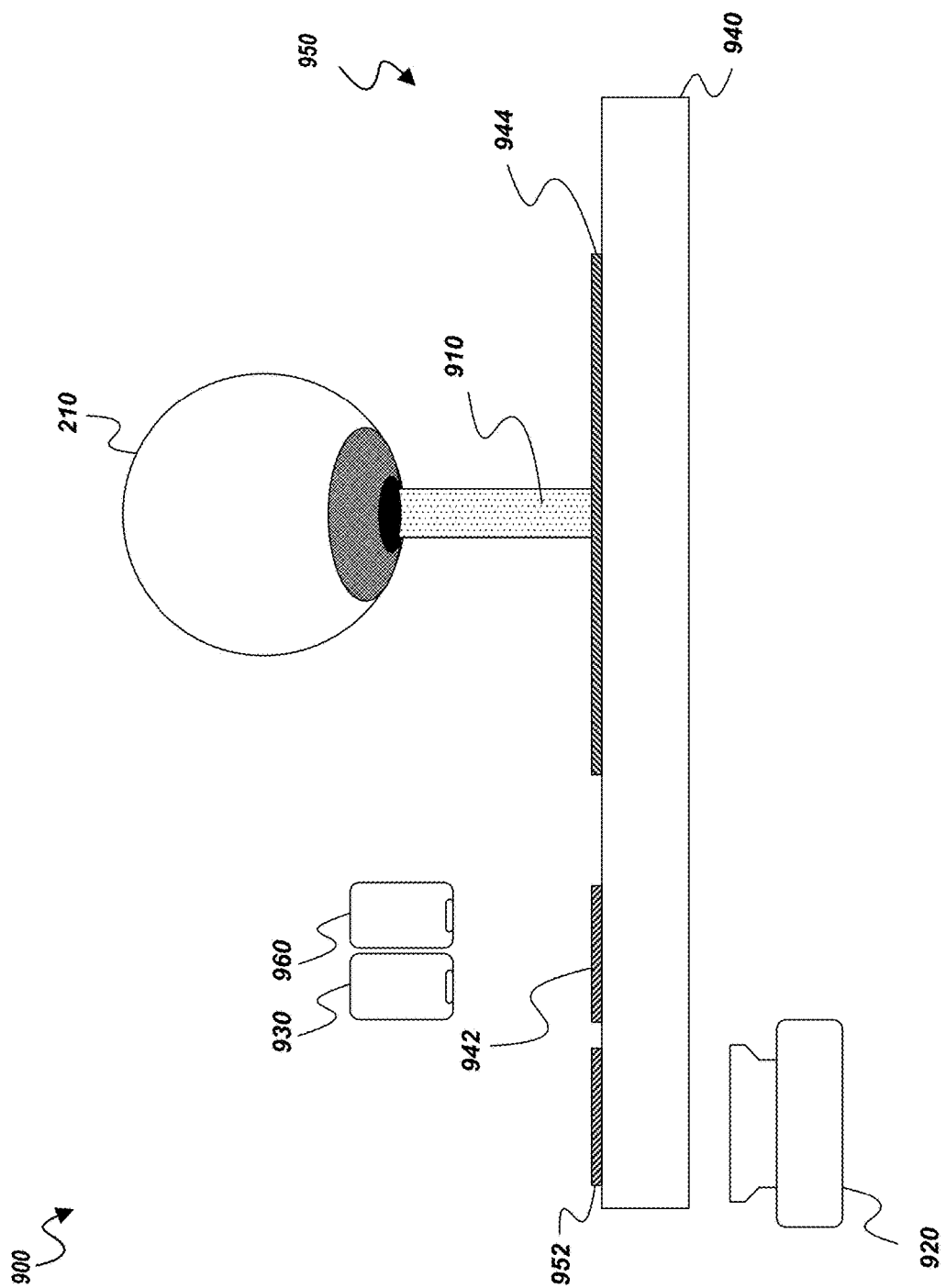
FIG. 12A is a cross-sectional view that schematically shows light reflected from the retina exiting the eye and incident on the eyepiece.

FIGS. 12A-12E illustrate how the imaging system 900 of FIGS. 11A-11E may additionally or alternatively be used for image collection of the eye 210. FIG. 12A shows light 910 reflected from the retina exiting the eye 210. As shown, the light 910 scattered or reflected from the retina that passes through the natural lens of the eye, the pupil in the eye and the cornea from may be collimated. This light may also be incident on the eyepiece 950 at normal incidence (e.g., at a right angle to a major surface of the waveguide 940 and/or coupling optical element 944). The coupling optical element 944 may be configured to couple the light 910 reflected from the retina into the waveguide 940.

Figure 12B:
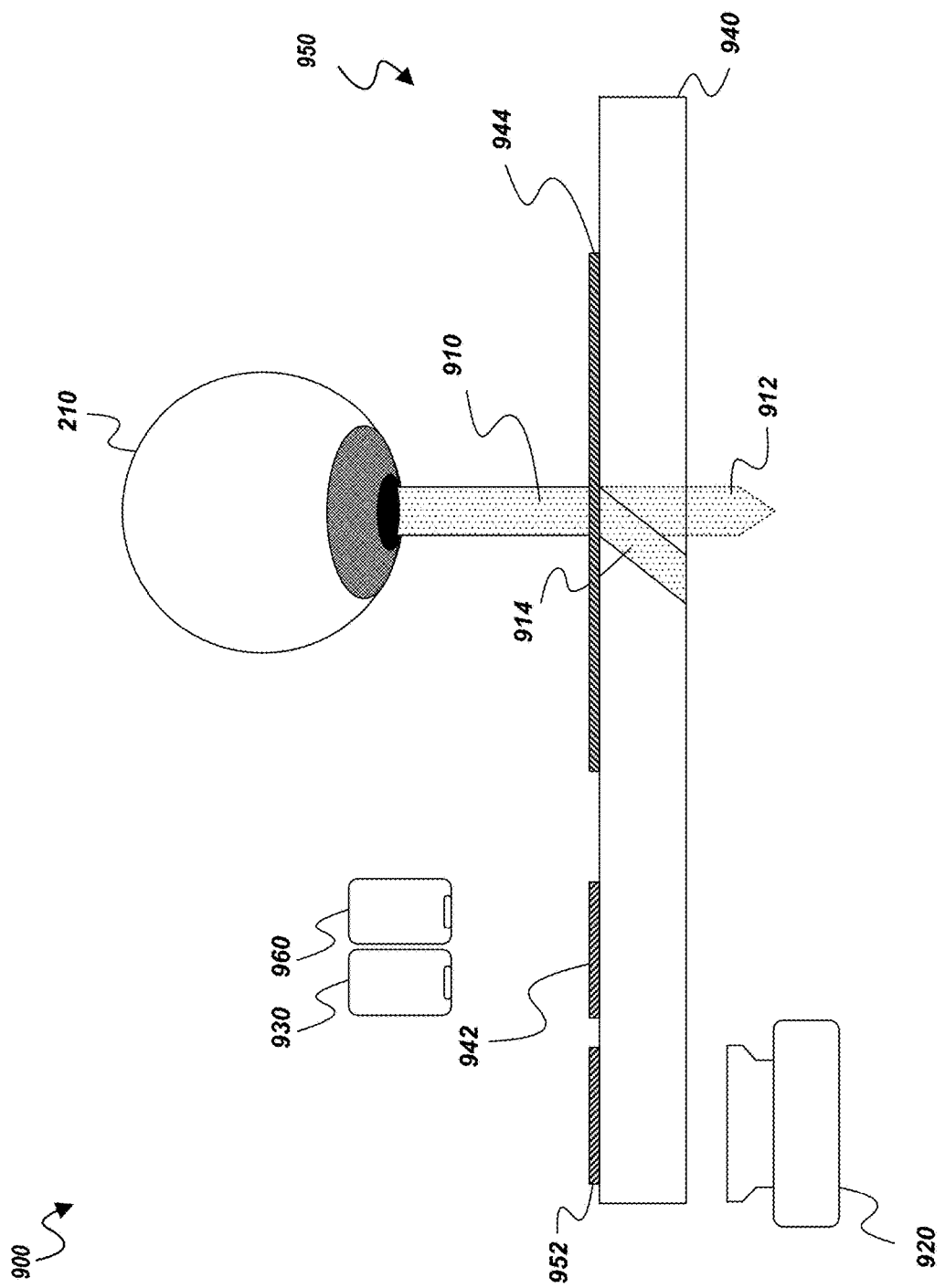
FIG. 12B schematically illustrates the example light coupled into the waveguide of the eyepiece.

FIG. 12B illustrates an example imaging system 900 as it couples light into the eyepiece 950. The coupling optical element 944 may include a turning feature such as a diffractive optical element, or other structures that redirect the light at an angle greater than the critical angle so as to be guided within the waveguide 940. The coupling optical element 944 may be configured to direct the incoupled light 914 generally toward the light source 960 and/or the imaging device 920. The coupling optical element 944 can be configured to couple less than a fraction of this light propagating toward the camera 920 back out of the waveguide 940. For example, a partially reflective element (e.g., semi-transparent mirror) may be disposed on or in the waveguide 940 such that a portion of the incoupled light 914 continues to propagate within the waveguide 940 by total internal reflection while reducing leakage of the incoupled light 914 out of the waveguide 940 along portions of the waveguide 940 where the coupling optical element 944 is disposed. The portion of light that does not leak out may be any fraction between 0 and 1. For example, the portion may be 0.90, where 90% of the light rays propagating through the waveguide 940 along the coupling optical element 944 are maintained within the waveguide 940 at each reflection of the light rays. Other portions are possible (e.g., 0.10, 0.20, 0.30, 0.40, 0.50, 0.60, 0.70, 0.80, or any range between any of these values). Such partially reflective element(s) can similarly be used in implementations described below.

Figure 12C:
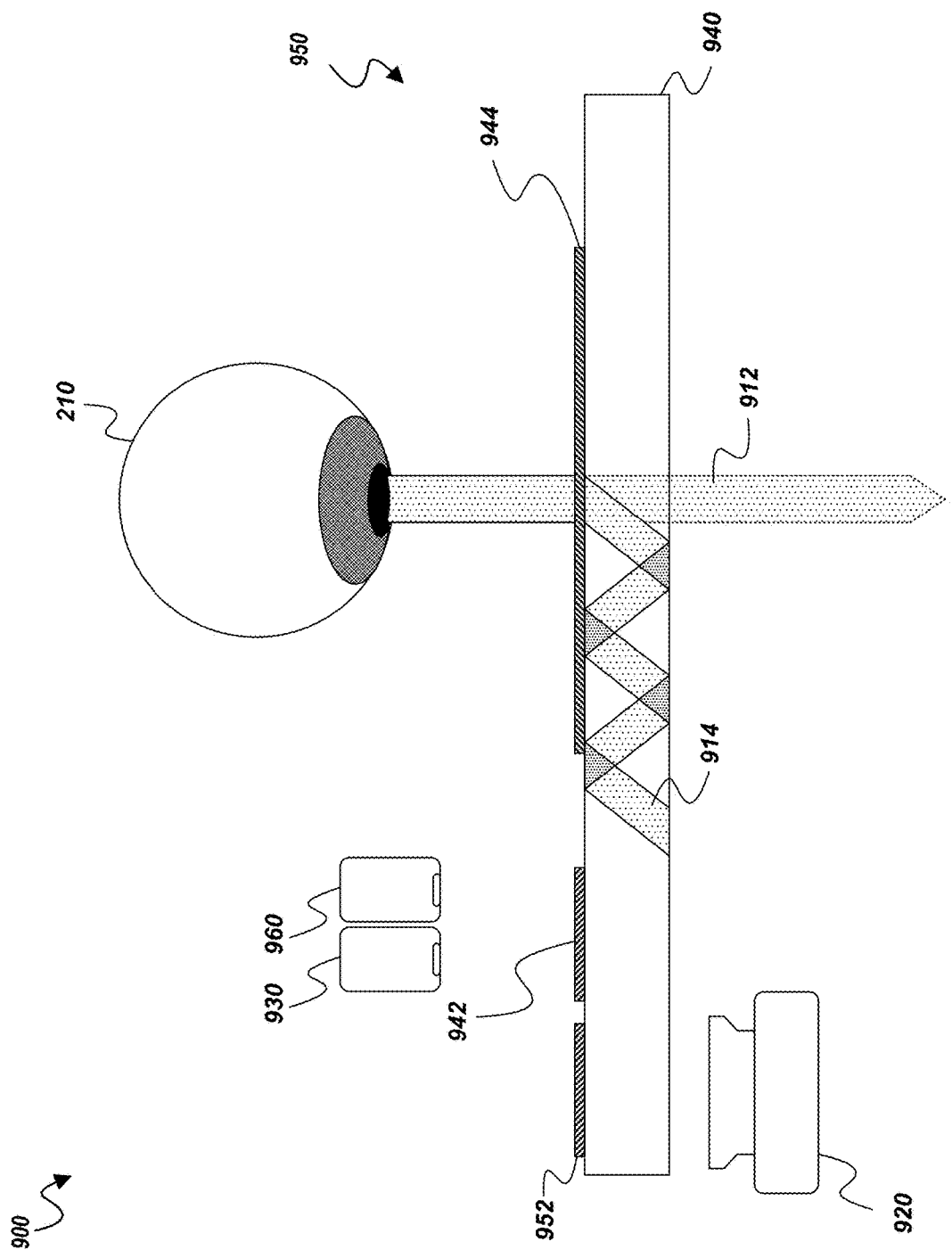
FIG. 12C schematically illustrates collimated incoupled light from the eye propagating through a waveguide toward an imaging device.
Figure 12D:
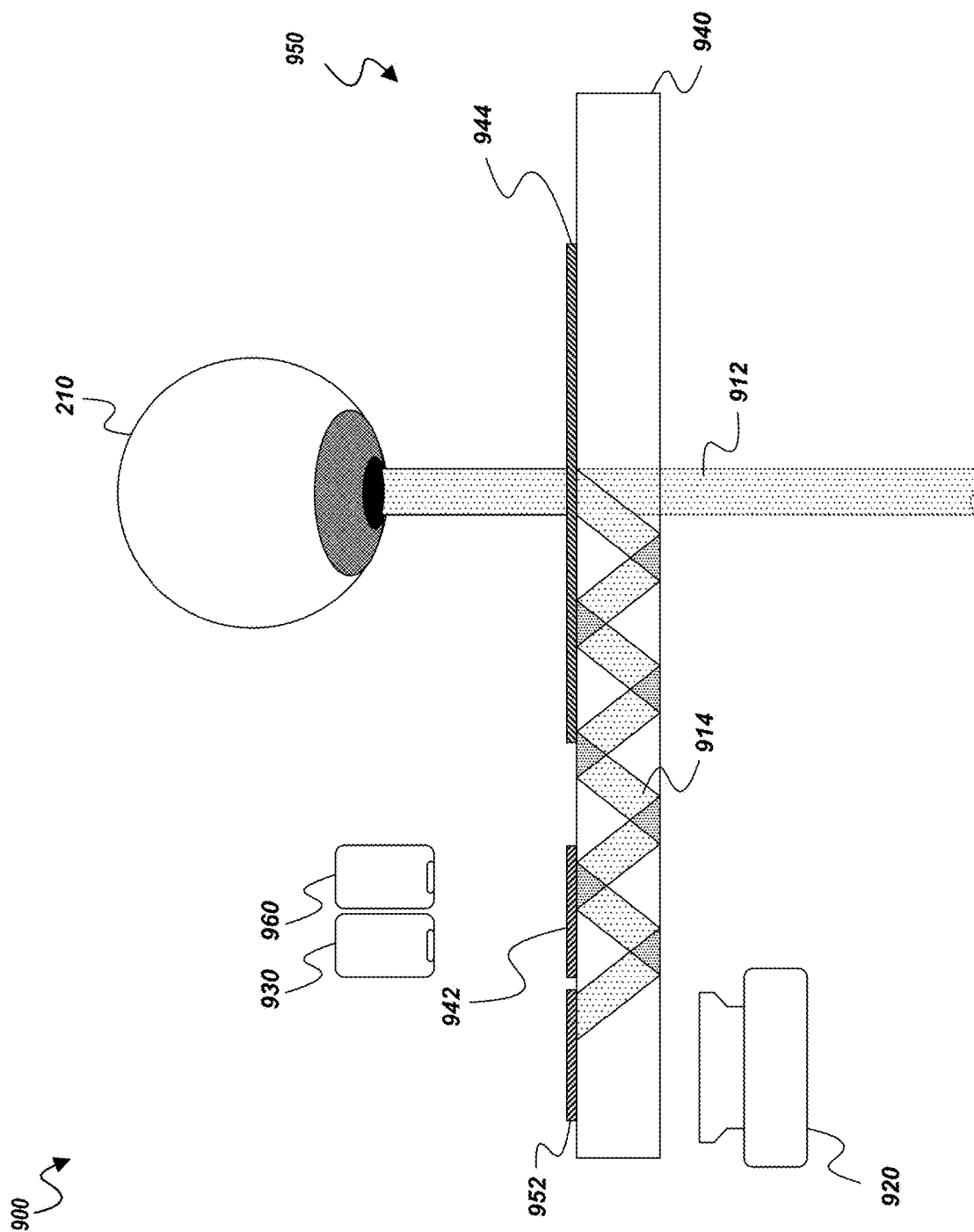
FIG. 12D schematically shows incoupled light from the eye propagating to the one or more outcoupling optical elements.

As shown in FIG. 12C, collimated incoupled light 914 may continue to propagate through the waveguide 940 toward the imaging device 920. FIG. 12D shows how some of the incoupled light 914 can continue to propagate until it is incident on one or more outcoupling optical elements 952. In order to reduce the amount of leakage of incoupled light 914 out of the incoupling optical element 942, the incoupling optical element 942 can be configured to couple little of this light propagating toward the camera 920 back out of the waveguide. For example, a partially reflective element (e.g., semi-transparent mirror) may be disposed on or in the waveguide 940 such that the a portion of the incoupled light 914 continues to propagate within the waveguide 940 by total internal reflection while reducing leakage of the incoupled light 914 out of the waveguide 940 along portions of the waveguide 940 where the incoupling optical element 942 is disposed. The portion of light that does not leak out may be any fraction between 0 and 1. For example, the portion may be 0.90, where 90% of the light rays propagating through the waveguide 940 along the coupling optical element 944 are maintained within the waveguide 940 at each reflection of the light rays. Other portion may be possible (e.g., 0.10, 0.20, 0.30, 0.40, 0.50, 0.60, 0.70, 0.80, or any range between any of these values). Such partially reflective element(s) can similarly be used in implementations described below.

Figure 12E:
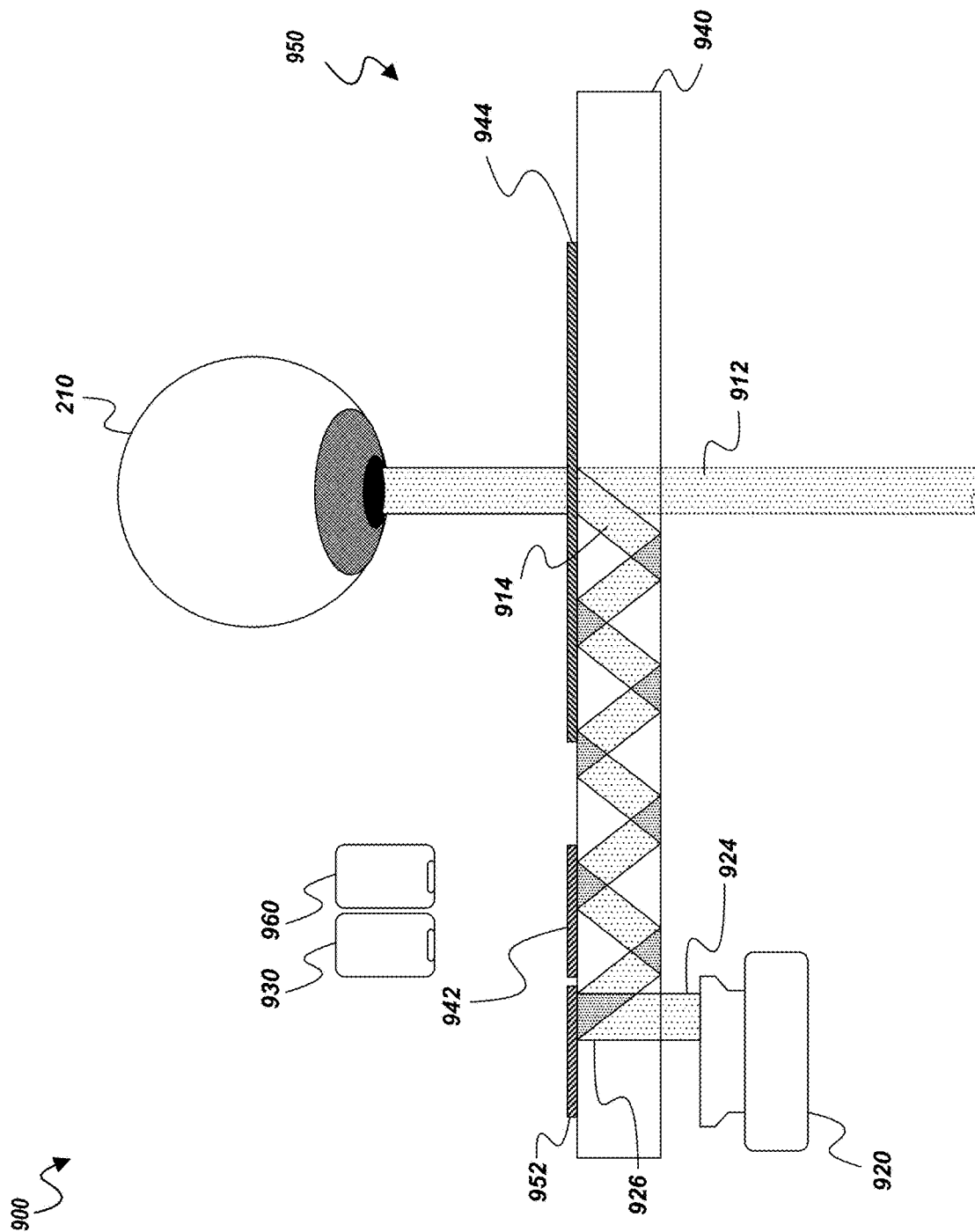
FIG. 12E schematically illustrates light from the eye coupled out of the waveguide by the outcoupling optical element and directed to the camera so that an image of the eye (e.g., the retina) can be captured by the camera.

As shown in FIG. 12E, the outcoupling optical element 952 can be configured to couple light guided within the waveguide 940 out of the waveguide 940 and to the imaging device 920. As a result, light propagating in the waveguide 940 that is incident on the outcoupling element 952 may be redirected so as to be ejected out of the waveguide 940, for example, out of a major surface of the waveguide 940 (e.g., the forward or rearward side of the waveguide 940) and directed on the imaging device 920. The outcoupling optical element 952 may be configured to direct the light 926 to exit the waveguide 940 perpendicular (e.g., normal) to the major surface of waveguide 940. In some designs, the outcoupling optical element 952 is configured to direct collimated light 924 onto the imaging device 920 at normal incidence to a light sensitive portion of the imaging device 920. As discussed above, the camera 920 may be infinity focused, for example, the imaging optics may be configured to focus collimated light onto the detector array.

Accordingly, the waveguide 940 may be configured to guide light coupled from the user's eye 210 into the waveguide 940 to be received by the imaging device 920 (e.g., camera) so as to capture an image of at least a portion of the eye 210 of the user. The same waveguide 940 may be configured to guide light coupled from the image projector 930 such that light from the image projector 930 can be directed to the user's eye 210 such that the image from the image projector 930 is in the vision field of the user. In some implementations, the same waveguide is configured to guide light coupled from the illumination source 960 such that light from the illumination source can be directed to the user's eye 210 to illuminate the eye such that an image of the eye can be captured by the camera 920.

In some implementations, the same coupling optical element 944 can be configured to (i) couple light from the user's eye 210 into the waveguide 940 to be received by the imaging device 920 and (ii) couple light from the image projector 930 out from the waveguide 940 to the user's eye 210 to project image content into the user's vision field. In some implementations, the same coupling optical element 944 can be configured to couple light from the illumination source 960 out of the waveguide to the user's eye 210 such that light from the illumination source can illuminate the eye.

In other designs, different waveguides can be used and/or different coupling optical elements 944 can be used. In some designs for example, a first waveguide 940 may be configured to guide light coupled from the user's eye 210 to be received by the camera 920 so as to capture an image of at least a portion of the eye 210 of the user and a second waveguide may be configured to guide light coupled from the image projector 930 such that light from the image projector 930 can be directed to the user's eye 210. The first and second waveguides may be stacked on top of one another. Another waveguide may in addition or in the alternative be configured to guide light coupled from the illumination source 960 such that light from the illumination source can be directed to the user's eye 210 to illuminate the eye.

Also, in some implementations, a first coupling optical element 944 can be configured to (i) couple light from the user's eye 210 into the waveguide 940 to be received by the imaging device 920 and (ii) couple light from the image projector 930 out from the waveguide 940 to the user's eye 210 to project image content into the user's vision field. Another coupling optical element may in addition or in the alternative be configured to coupled light from the illumination source 960 out of the waveguide to the user's eye 210 such that light from the illumination source can illuminate the eye.

In some designs, the coupling optical element 944 can include a plurality of diffractive optical elements (DOEs). For example, a first DOE can be configured to couple light from the user's eye 210 into the waveguide 940 to be received by the imaging device 920. A second DOE can be configured to couple light from the image projector 930 out of the waveguide 940 to the user's eye 210 to project image content into the user's vision field. Optionally, a third DOE can be configured to couple light from the light source 960 out of the waveguide 940 to the user's eye 210 to illuminate the eye. The first and second (and possibly third) DOEs can be stacked, e.g., in some implementations such that light from the environment in front of the user passes through the first DOE and is then incident on the second DOE and then incident on the third DOE and incident on the user's eye. The order, however, may be different.

In some designs, the first and second DOEs are integrated in a single element or volume of the waveguide 940. In some implementations, for example, both the first and second DOEs are superimposed on each other (e.g., occupy the same or approximately the same volume) within the waveguide 2102. For example, the first and second DOE may be recorded in the same medium.

Figure 13A:
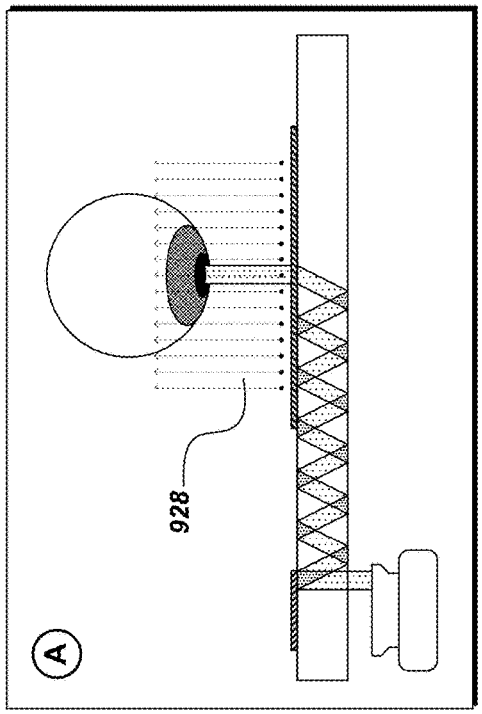
FIG. 13A schematically illustrates how the imaging system can image various portions of the eye, for example, of the retina, which can enable the orientation of the eye to be determined and the eye position tracked.
Figure 13A:
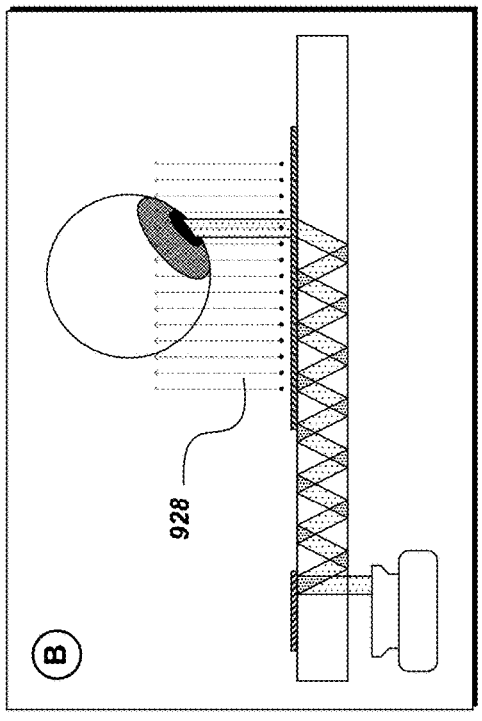
Figure 13A:
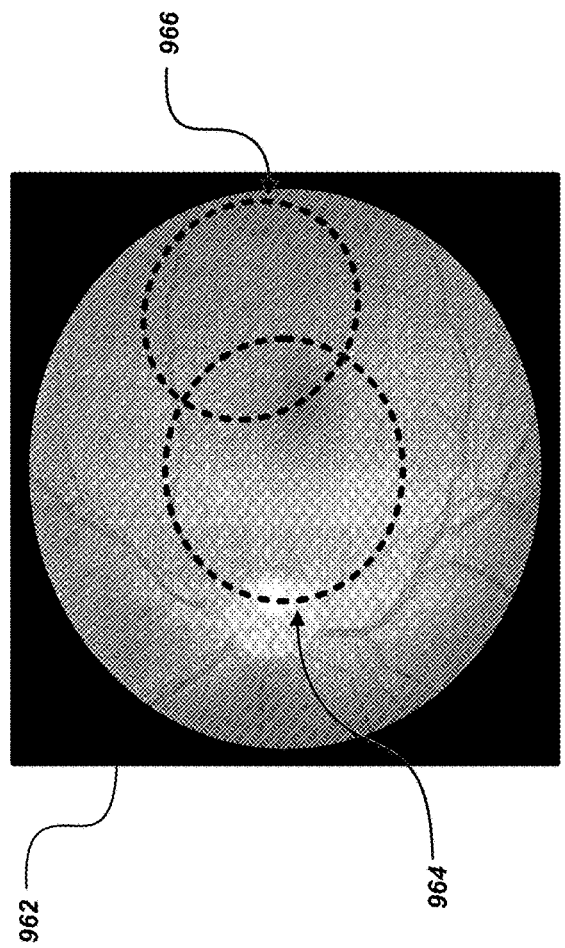

As described above, image capture of the eye, e.g., of the retina, can facilitate eye tracking. FIG. 13A, for example, illustrates the imaging system 900 configured to image various portions of the eye 210 (e.g., retina), for example, at different times when the eye is in different positions. Stages A and B may refer to images of the eye 210 during different orientations of the eye. FIG. 13A shows imaging of the eye 210 and the results thereof during both stage A and stage B imaging.

In some implementations, the light emission 928 (e.g., from an illumination source 960 such as described above or from one or more illuminations sources configured and/or located differently) can be used to obtain one or more images of the retina 962, as shown by FIG. 13A. The image of the retina 962 may comprise one or more regions 964, 966 that are imaged during different orientations of the eye 210. FIG. 13A shows two regions 964, 966 of the image of the retina 962. For example, the region 964 of retina imaged in stage A may be imaged while the eye 210 is directed at an angle normal to the waveguide 940. The image data for the region 966 of retina imaged in stage B may be obtained while the eye 210 is oriented at an acute angle with the waveguide 940. Using one or more orientations of the eye 210 during one or more stages of imaging, a composite image or map of the retina 962 may be obtained. Processing electronics or a processor, such as data module 140 (see FIG. 2), may be used to find overlapping image data between two neighboring regions. Using the overlapping regional image data, a composite image or of the retina 962 can be determined. A larger size (e.g., full-size) composite image or map of the user's retina can be stored.

As described herein, the head mounted display can be used to map a user's eye retina based on the direction that user's eye is directed. To provide a realistic and intuitive interaction with objects in the user's environment using eye gaze and/or to identify a wearer of the head mounted display device, the head mounted display system can use retinal mapping to incorporate a uniqueness of a user's eye features and other conditions that may have some effect on eye measurements. For example, the images may be identified based on positions of blood vessels in the corresponding retinal image.

Retinal mapping can involve a process for enabling a computing device to learn how to associate a user's eye gaze (e.g., as identified in retinal images) with gaze points in a 2D or 3D space. An eye gaze may be associated with a single point in the 2D or 3D space. An eye gaze can also be associated with multiple points in the space, which can describe a movement of a virtual object (e.g., a series of points, a location of a moving image).

The head mounted display system can determine a user's eye gaze based on retinal images. The head mounted display system can obtain retinal images using sensors (e.g., eye cameras such as the imaging device 920). The head mounted display system can image one or both eyes of the user while the user changes his or her eye gazes (such as, e.g., when the user is looking around to follow a moving or shifting calibration target or fixation target). To map a user's retina, the head mounted display system can present a virtual target, e.g., a fixation target, for the user to look at. The virtual target may be associated with one or more known points of gaze in the 2D or 3D space. While the user is looking at the target, the head mounted display system can acquire retinal image(s) and associate the image(s) with gaze point(s). The head mounted display system can calculate and/or generate a mapping matrix based on the associations of respective retinal images and points of gaze associated with the target.

The retinal mapping result can reflect uniqueness in each person's eyes. For example, the head mounted display system can generate a mapping matrix customized to one or both eyes of a specific individual. For example, the users may have different amounts of eye movements or eye gazes in response to a specific target. Additionally or alternatively, the user may have a different position, size, shape, and/or orientation of blood vessels in the retina. As a result, by generating a calibration result specific to an individual user, the head mounted display system may allow more accurate user interactions with eye gazes and/or may allow for identification a particular user.

Accordingly, when a user puts on the head mounted display device, the system can detect whether the user is a previous user or a new user. A confusion matrix can be calculated where a score for a particular eye gaze image stored in the system memory is compared to a corresponding image of the current user. The confusion matrix can include a comparison score for a plurality of eye gazes and associated retinal images. Based on the comparison scores, the system may be able to make a determination with regard to an identity of the user (e.g., whether the user is the same as the individual for which the stored retinal images or composite map are associated) and/or a confidence level for the determination. The confidence level may, for example, include an identity coefficient. Stored images, for example, a composite image or map, may be compared with later obtained images referred to as instantaneous or real-time images obtained for a current user. The system may provide an alert if the system detects that the user is a new user or may take other action.

The system may apply filtering such as digital filtering or image processing to the images of the retina captured by the camera. Such filtering or imaging processing, may for example, enhance features that may be used for identification, stitching, assembling a composite images, eye tracking, etc. Such filtering or image processing may comprise edge enhancement. Such a filter may comprise, for example, a Frangi filter although other types of filters may be used. Such a filter or processing (e.g., edge enhancement or a Frangi filter) can be used to enhance and/or detect images features such as vessels or tubular structures or fibers in retinal images.

Figure 13B:
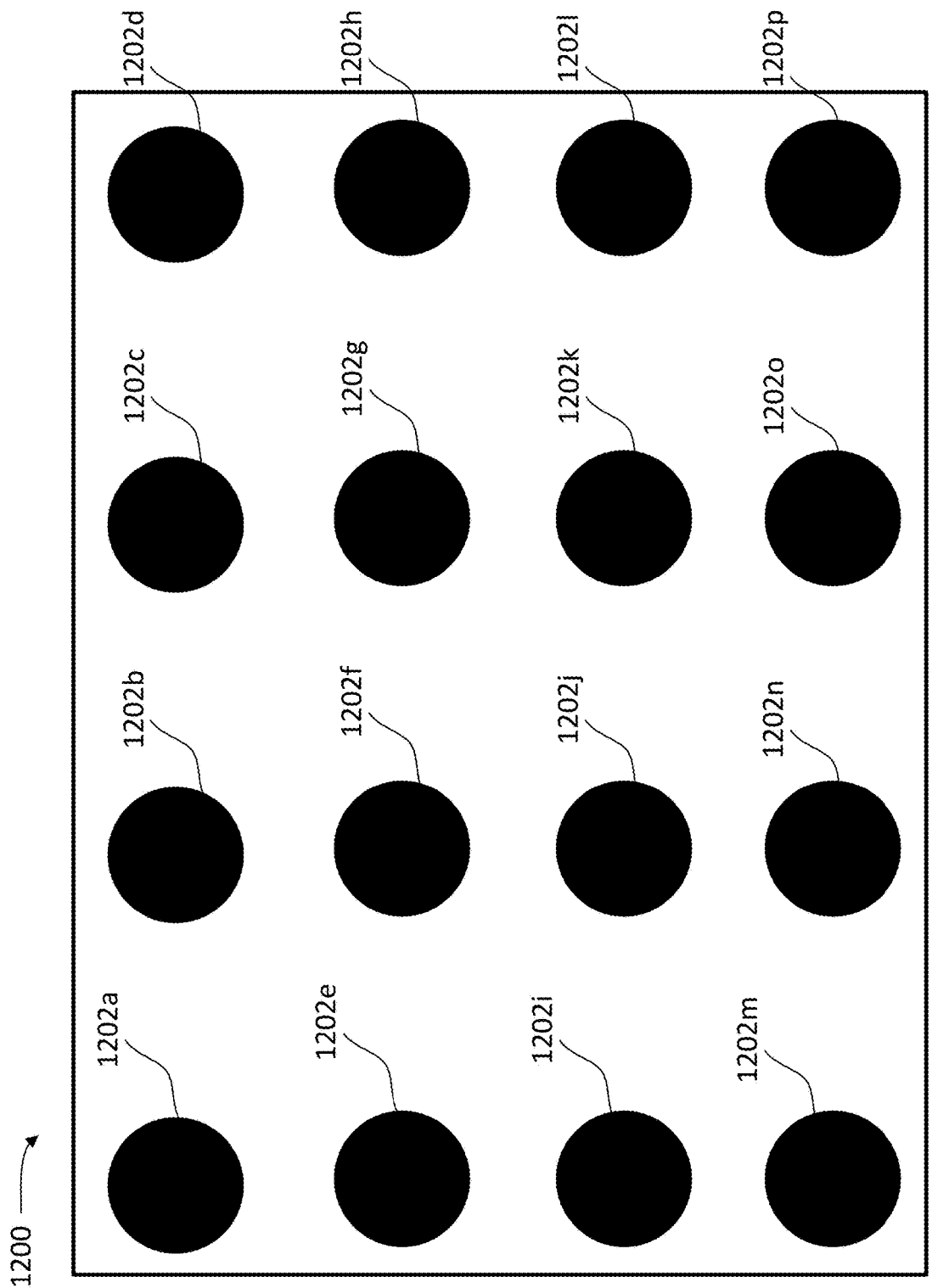
FIG. 13B illustrates a pattern of sequentially displayed fixation targets used to cause the eye to be directed in a variety of different directions during which the retina is imaged. The resultant images correspond to non-identical portions of the retina. For example, when the eye is directed in various directions to view differently located fixation targets on the display, images captured by the camera include different portions of the retina. These images can be assembled to form a larger map or composite image of the retina.

FIG. 13B illustrates a pattern of sequentially displayed fixation targets that can be used in the retinal mapping process. These virtual targets on which a user's eye will direct their gaze can cause the eye's gaze to be redirected to a variety of different directions during which the retina can be imaged. The resultant images associated with the different gaze directions correspond to non-identical portions of the retina. As discussed above, when the eye is gazing in different directions to view differently located fixation targets on the display, images captured by the camera include different portions of the retina. These images can be assembled to form a larger map or composite image of the retina.

FIG. 13B shows a virtual target at sixteen different location in a user's field of view (FOV) 1200. In various implementations, the virtual target would be presented at a given location at a given time. One or more retinal images would be obtained during a time when the virtual target is presented at that particular location to a user. This image or these images may be associated with that target position and/or a corresponding gaze direction. Greater or fewer target locations may be used. In the example shown in FIG.

13B, the sixteen targets locations 1202a-1202p are shown. More or less target locations may be used. The target locations may also be different. The order at which the targets are presented at the different locations may vary. For example, the target may move in a raster pattern from the left to the right side of the field of view of the user, back to from the right to the left, and again from the left to the right, lowering the position of the target in the field of view with each lateral pass across the field of view. However, other patterns and approaches are possible. Likewise, the target can be rendered identically or differently at the different locations. For example, the target rendered may be different sizes, shapes, colors, etc. The targets can be rendered sequentially to a user during the eye tracking calibration process. For example, as discussed above the head mounted display system may render target in a serpentine pattern. For example, the target 1202a may be followed by 1202b, then 1202c, then 1202d, then 1202h, then 1202g, and so forth. Other patterns are possible. For example, the target could be displayed in more random or non-sequential patterns. In some embodiments, a single target is displayed to the user, and the target moves around the user's field of view (for example, passing or temporarily stopping at the positions 1202a-1202p during the target's movement). The head mounted display system can acquire an image of the user's retina(s) while the user is looking at these targets. For example, the head mounted display system can acquire a first image when the user is looking at the target at the first location 1202a while acquiring a second image when the user is looking at the target at a second location 1202b, and a third image when the user is looking at the target at a third location 1202c, and so forth. The wearable system can associate the first image to the first position 1202a and associate the second image with the second position 1202b, and the third image with the third position 1202c, and so forth. Neighboring images may be stitched together in a database to create a full or partial retinal map. For example, two image can be stitched together in appropriate registration using features or portions of the feature (e.g., blood vessels or portions thereof) that are common to the multiple images. In various implementations, adjacent target positions would produce overlapping images that can be registered and stitched together. For example, target position 1202a and target position 1202b as well as target position 1202b and target position 1202c may produce overlapping and adjacent retinal images that can be stitched with each other. Accordingly, a number of different retinal images may be obtained with different eye gazes so as to assemble a larger image (e.g., a composite image or map) of the retina.

As discussed above, eye tracking can be performed using the composite retinal image or map. For example, after the target is no longer displayed, the user may move their eye gaze about as the user looks at different real objects in front of the user and head mounted display or augmented reality (virtual) image content displayed by the head mounted display. One or more retinal images may be obtained at these times. The term "instantaneous" or "real-time" images may be used herein to describe these images obtained subsequent to calibration that can be used for eye tracking (or other purpose such as obtaining biometric data). These "instantaneous" or "real-time" images likely correspond to a portion of the composite retinal image or map. The system may be configured to sufficiently match this "instantaneous" or "real-time" retinal image with a portion of the composite retinal image or retinal map. Such matching may be based on features or portions of features (blood vessels or portions thereof) that are common to both the "instantaneous" or "real-time" retinal image and the portion of the composite retinal image or map. Based on the location the portion of the composite retinal image or map to which this "instantaneous" or "real-time" retinal image coincides, a gaze direction may be deduced. Different gaze directions will result in retinal images that correspond to different portions of the retinal map. Accordingly, identifying the location of the "instantaneous" or "real-time" retinal image on the composite retinal image or map will provide information as to the direction of the user's gaze. Eye tracking, for example, tracking the movement of the eye and the change in eye gaze may be performed using such or similar methods. As discussed above, edge enhancement, edge detection, or other digital filtering and/or processing may be used to enhance and/or correlate features of different images with the composite retinal image or retinal map.

In various implementations after completion of the initial calibration process where the virtual target or fixation target is displayed (e.g., at a plurality of locations) to assemble a composite retinal image or map, the composite retinal image or map can still be refined. For example, as additional retinal images are obtained, the composite retinal image or map can be further refined or improved using the additional images. Accordingly as additional "instantaneous" or "real-time" retinal images are obtained, for example for the purpose of providing eye tracking, the composite retinal image or map can be further refined or improved using the "instantaneous" or "real-time". As a user continues to look at various positions in the display (with or without aid of a calibration target), the retinal composite image or map may be further refined using additional images are acquired subsequent to the initial calibration where the virtual target or fixation target was displayed. The quality of the composite retinal image or map may therefore be increased.

Additional non-limiting examples of how eye tracking may be accomplished and/or a composite retinal image or map may be produced and retinal images used are described in U.S. Publication No. 2017/0205875, titled "EYE IMAGE COLLECTION," filed on Jan. 17, 2017, the disclosure of which is hereby incorporated herein by reference in its entirety.

Accordingly, as discussed above larger portions of the retina may be recorded and mapped by obtaining retinal images and/or other images of the eye using imaging systems such as described herein and such images may facilitate eye tracking. For example, an image of the eye 210 shown in FIG. 13A may be captured when the eye is in an arbitrary position. The processing electronics or a processor (such as the same or different one described above as forming the composite image) may then compare captured images of the user's retina in real time to the stored composite or larger size (e.g., full-size) image of the user's retina to track eye movement. A given image of the user's retina captured in real time may show a specific portion of the user's retina. As described above, by comparing such a captured image to the stored image of the user's mapping a larger portion of the user's retina, the system can determine which portion of the user's retina is shown in the captured image, and can thereby determine the position/orientation of the eye that would produce such an image. See for example FIG. 13A, which shows two different images of portions of the retina that are produced when the eye is in two different positions and/or orientations. Accordingly, the position and/or orientation of the eye may be determined by capturing different images of the retina and determining which portion of the retina is visible. Such determination may be performed even if a composite image is not formed but rather multiple images of the retina for different eye positions/orientations are recorded and stored in a database. When a future image of the retina is obtained, that image may be compared to images in the database of stored images to determine which image in the database resembles the image of the eye recently obtained. Matching the recent image to one or more of the images in the database having associated positions and/or orientations associated with them can enable determination of the orientation and/or position of the more recent image. Other approaches to eye tracking may be used based on the images captured using the designs described herein.

As described herein, the retinal images may be employed for other purposes as well. For example, the retinal images may be used to verify that the user is the same user for which the composite retinal image or map was obtained. An image of the retina that is obtained when a user is wearing the head mounted display system (e.g., during the calibration process and/or during later use) may be compared with a previously obtained composite retinal image or map (e.g., created a prior day or when the head mounted display was previously booted up) that is stored. If the recently obtained retinal image does not match a portion of the composite retinal image or map sufficiently enough, a conclusion may be made that the current user is different than the previous user (e.g., for which the composite virtual image or map was created). Such methods may be used for security, e.g., to verify that the current user of the head mounted display device is the owner or typical user of the device. Accordingly, biometric data obtained via retinal imaging may be used for security purposes.

The retinal imaging may be used as well to collect biometric data for monitoring the user's health. Medically related data may be obtained from the retinal images. Such medical data may be useful for monitoring the health of the user.

Although various applications of eye imaging, such as eye tracking, collection of biometric data for heath monitoring and for security are discussed herein in the context of retinal imaging, imaging other parts of the user, for example, of the user's eye may be employed for these and other purposes.

Figure 14A:
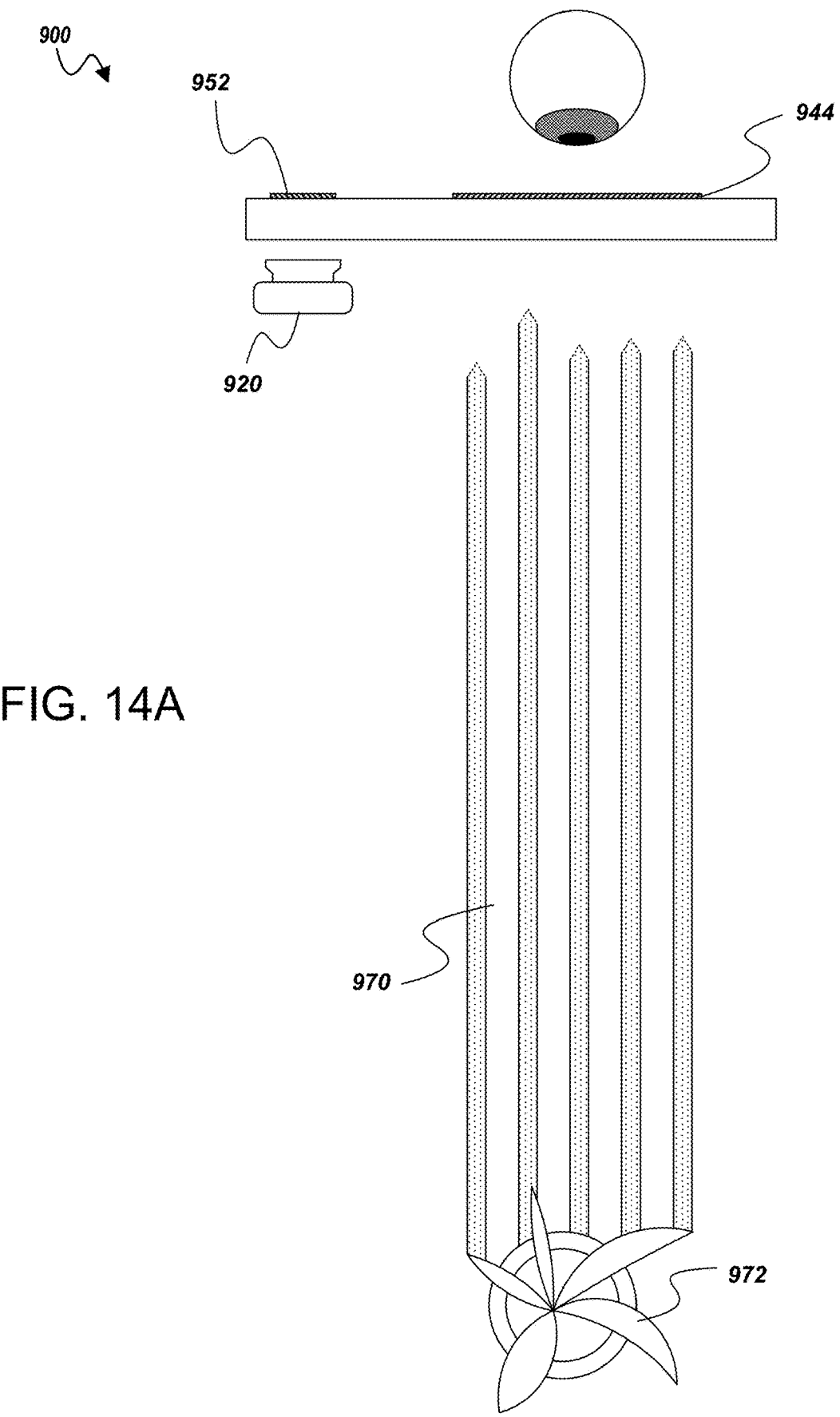
FIG. 14A schematically illustrates a cross-sectional view of an imaging system comprising an eyepiece and a camera for collecting light from the environment forward the eyepiece. Light from the environment is shown reflected off or emitted from one or more physical objects in the environment. Collection of light from objects in the environment in front of the eyepiece can enable images of the environment to be captured.
Figure 14B:
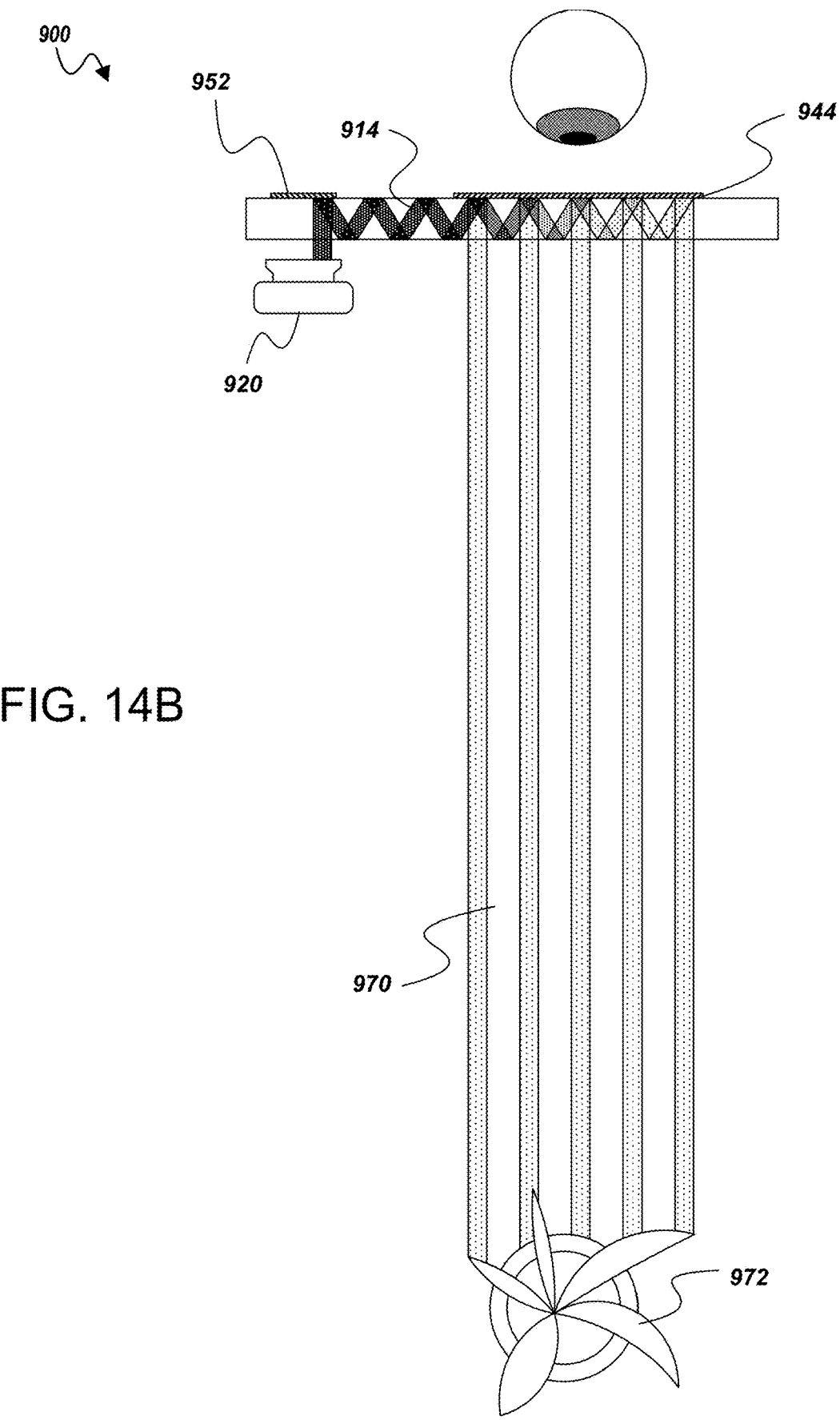
FIG. 14B schematically illustrates light from the environment being coupled by the coupling optical element into a waveguide of the eyepiece.

Although the eyepiece 950 is described above as capable of being utilized to facilitate imaging of the eye, the eyepiece can also be used to image the world in front of the user. FIGS. 14A-14B, for example, illustrate an example imaging system 900 that can be used to image a portion of an environment in front of the user and/or objects in the portion of the environment. The imaging system 900 used may be a similar system as described for FIGS. 11A-11E and/or for FIGS. 12A-12E except that light is collected by the eyepiece 950 from the environment forward the eyepiece and the user. FIG. 14A, for example, illustrates light 970 from the environment that is reflected off and/or emitted by one or more physical objects 972 in the environment forward the user and eyepiece 950. As shown, the light 970 from the environment may be approximately collimated (e.g., at infinity), for example because the physical object 972 in the environment may be located at a sufficiently large distance from the imaging system 900 for the light rays reaching the imaging system 900 to be collimated or approximately collimated. In some implementations, the imaging system 900 may be configured to image the environment and/or objects in the environment without the use of any optical elements having optical power (e.g., lenses, mirrors) in the imaging system 900.

The imaging system 900 shown in FIGS. 14A and 14B is similar to the imaging systems described above. The imaging system includes the eyepiece 950 comprising one or more waveguides 940 including the coupling optical element 944 configured to direct light from an image projector 930 (not shown) into the eye 210 to form images therein. The one or more waveguides may include a plurality of waveguides (e.g., a stack of waveguides) configured to incouple/outcouple a plurality of corresponding colors/wavelengths. Each waveguide in a stack of waveguides may be configured to direct light of a particular color (e.g., red, green, blue). For example, a distalmost waveguide (e.g., stack of waveguides) may be configured for visible light (e.g., red, blue, green) such that the waveguide is configured to incouple and outcouple the same wavelength(s) of visible light. Additionally or alternatively, a waveguide configured to incouple and outcouple invisible (e.g., infrared) light may be disposed proximal the eye 210. Such a plurality of waveguides corresponding to the waveguide 940 may be used in any other implementation described herein. The imaging system 900 may also include the imaging device (e.g., camera) 920 and outcoupling optical element 952 configured to turn light reflected from the eye 210 that is propagated within the waveguide 940 to the camera. In FIGS. 14A and 14B, the illumination source 960 is excluded since an illumination source may not be needed to image the environment in front of the user. However, an illumination source (e.g., the light source 960 described above) may be used in certain designs.

The eyepiece 950, waveguide 940, coupling optical element 944, outcoupling optical element 952 and camera 920 may be the same or similar to that describe above. For example, the coupling optical element 944 may be in physical engagement with the waveguide 940. For example, the coupling optical element 944 and/or outcoupling optical element 952 may be disposed in an optical path between the environment in front of the eyepiece 950 and camera 920 such that light from the environment is coupled into the waveguide 940 via the coupling optical element 944 and coupled out of the waveguide via the outcoupling optical element to be incident on the camera 210 (for example to form an image of at least a portion of the environment). The coupling optical element 944 may comprise a plurality of turning features configured to turn light guided within the waveguide out of the waveguide or turn light incident on the coupling optical element 944 at an angle into the waveguide to be guided therein by total internal reflection. The outcoupling optical element 952 may comprise a plurality of turning features configured to turn light (from the environment) that is guided within the waveguide at an angle such that the light is not guided in the waveguide by total internal reflection but is direct out toward the camera. The coupling optical element 944, outcoupling optical element 952 and the turning features associated with each may be in physical engagement with the waveguide 940. For example, the coupling optical element 944 and/or outcoupling optical element 952 may comprise one or more holographic or diffractive optical elements (e.g., surface relief gratings) patterned (e.g., etched) in or on the waveguide 940. The coupling optical element 944 and/or outcoupling optical element 952 may comprise a layer disposed on the waveguide 940 or may be formed be in the waveguide 940. For example, a volume holographic or diffractive optical element may be formed by changing the index of refraction of material comprising the waveguide or a layer disposed thereon. Accordingly, the coupling optical element 944 and/or outcoupling optical element 952 may be disposed in the volume of the waveguide 940 or a layer disposed thereon. Depending on the design, the coupling optical element 944 and/or outcoupling optical element 952 may be transmissive or reflective and may operate in transmission or reflection. For example, the coupling optical element 944 and/or outcoupling optical element 952 may include a transmissive or reflective diffractive optical element (e.g., grating) or holographical optical element that operates in transmission or reflection respectively, e.g., turning light via that is transmitted therethrough or that is reflected therefrom. The coupling optical element 944 and/or outcoupling optical element 952 can include a polarization optical element, such as a polarization selective turning element (e.g., polarizer). The polarization selective turning element may include one or more polarization gratings, diffractive optical elements, and/or holographic optical elements and may comprise liquid crystal structures such as liquid crystal polarization gratings. In some implementations, the reflective optical element may include a reflector (e.g., mirror). Other elements, such as for example the waveguide 940 may be similar to that described above as well.

FIG. 14B illustrates the operation of the imaging system 900 shown in FIG. 14A. Light 970 from the environment is coupled by the coupling optical element 944 into the waveguide 940. The coupling optical element 944 may be configured to turn collimated light at an angle that is greater than the critical angle of the waveguide 940 such that at least a portion of this collimated light is guided within the waveguide by total internal reflection toward the camera 920. The outcoupling optical element 952 can be configured to receive at least a portion of the light from the environment in front of the user that is coupled into the waveguide 940 via the coupling optical element 944 and guided therein. The outcoupling optical element 952 may be configured to couple the incoupled light out from the waveguide 940 to the camera 920 such that images of the environment may be captured by the camera 920. The images of the environment may be passed to processing electronics, (e.g., one or more processors), such as data module 140 (see FIG. 2). The data module 140 may be configured to reproduce a modified image of the environment in an augmented reality context. The processing electronics may be in communication with the camera 920 via a wired or wireless electronic signal. Additionally or alternatively, the processing electronics may communicate with the camera 920 using one or more remote receivers. The processing electronics may reside remotely (e.g., cloud computing devices, remote server, etc.).

This imaging system 900 may therefore be used for directly imaging the environment, which may be useful for a variety of reasons. For example, imaging the environment can be used to determine where to place augmented reality image content with respect to objects in the environment. For example, imaging the environment may provide the location of a table such that the head mounted display may render an image of person standing next to the table instead of on the table or in the table. The imaging system 900 described for imaging the environment may also be used to image the eye 210, such as is described for FIGS. 10, 11A-11E, and/or 12A-12E.

Figure 14C:
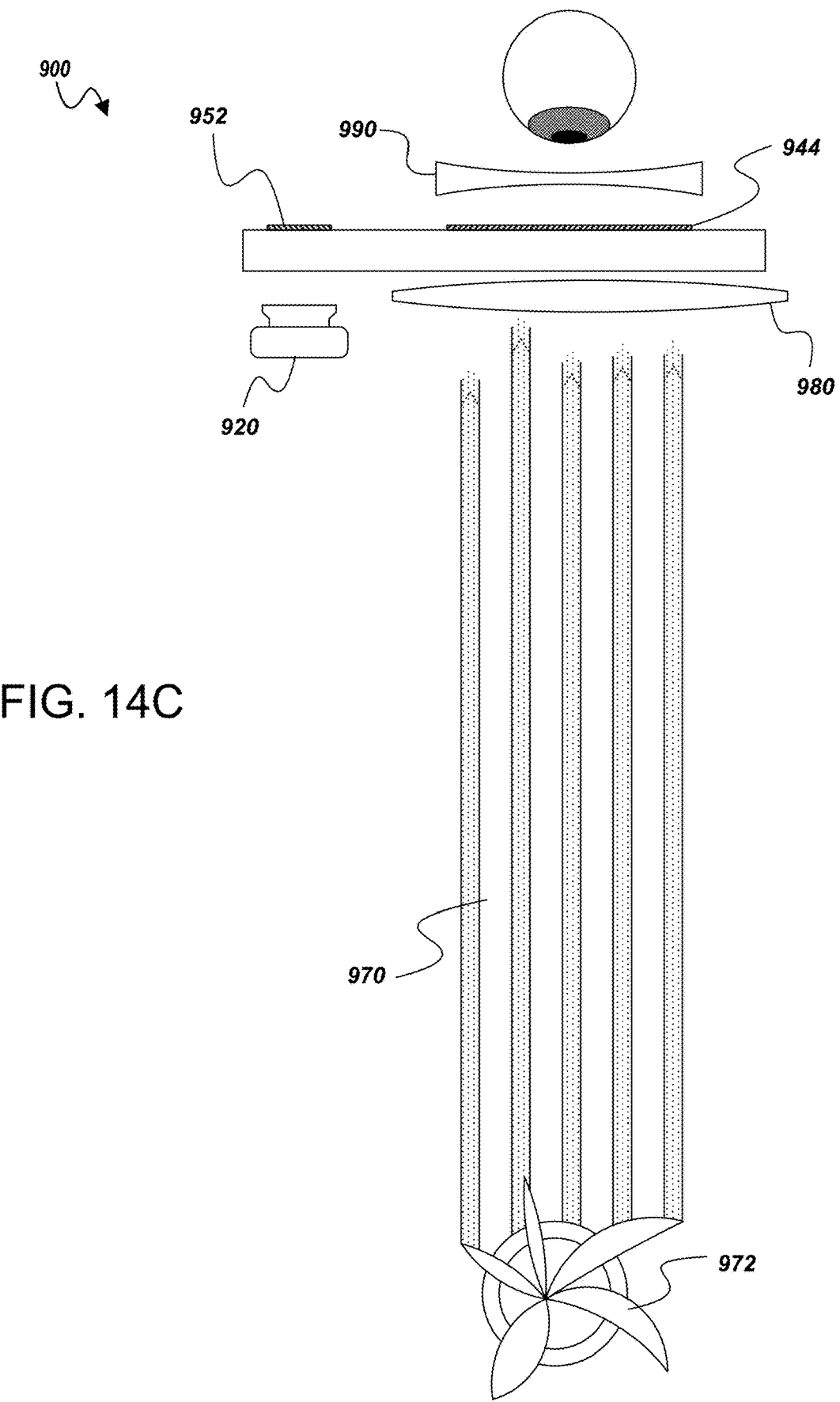
FIG. 14C schematically illustrates an imaging system for collecting light from the environment using a powered optical element, such as a refractive optical element (e.g., lens such as a wide field of view lens), forward the eyepiece.

It may be desirable to image a wide view of the environment using the imaging system 900. FIG. 14C schematically illustrates an imaging system 900 for collecting light from the environment using a powered optical element or lens such as refractive optical element 980 (e.g., a wide field of view lens) forward the eyepiece. The refractive optical element 980 may have a positive optical power. The refractive optical element 980 (e.g., positive lens) converges collimated light 970 from the environment toward the waveguide 940. Other types of lenses than the lens shown in FIG. 14C may be employed. Light that is transmitted (not shown) may pass through a powered optical element or lens such as refractive optical element 990 (e.g., negative lens) that is configured for a negative power equal and opposite of the refractive optical element 980. The negative lens 990 may have a similar or the same optical power as the positive lens 980 to offset or counter the optical power of the positive lens or a portion thereof. In this way, light from the environment (e.g., distal of the waveguide 940) may pass through the negative lens 990, the eyepiece 950, and the positive lens 980 with substantially no net change in optical power introduced by these two lenses to the eye. The negative lens 990 may be configured to offset or counter the optical power of the positive lens 980 such that a user's will not experience the power of the positive lens when viewing the environment in front of the eyepiece 950. The negative lens 990 will also counter the effect of the positive lens 980 to invert images of object in the environment in front of the wearer. Some light 970 from the environment may be incoupled into the waveguide 940 by the coupling optical element 944, in spite of some of the rays of light being convergent. The incoupled light incident on the outcoupling optical element 952 may be ejected out of the waveguide 940.

Implementations (e.g., those described by FIGS. 14A-14C) may be used outside an augmented reality context. For example, it is intended that an imaging system 900 configured to image the environment be implemented within a wearable device, such as, for example, eyeglasses (including unpowered glasses) or bifocals. Such an imaging system 900 may not require an image projector 930 and/or light source 960. Additionally or alternatively, such an imaging system 900 may not require an incoupling optical element configured for a corresponding image projector 930 and/or light source 960.

It may be advantageous to implement such an imaging system 900 for imaging the environment on a viewing screen (e.g., television screen, computer screen), such as a handheld device (e.g., cell phone, tablet). The imaging system 900 could improve video chat capabilities. For example, a viewer who is seeing a chat partner look into the screen may appear to be looking directly at the viewer. This would be possible since the light rays captured by the imaging system 900 would be captured in the same region where the user is looking (e.g., as opposed to viewing a screen but having the light rays captured by a separate outward-facing camera positioned at a different location).

In implementations where the imaging system 900 of FIG. 14C is also used to image the eye 210, a light source 960 and/or image projector 930 may be configured to inject light into the waveguide 940. Because the light reflected from the eye that is incoupled into the waveguide will pass through the refractive optical element 990 (e.g., negative lens), a positive powered refractive optical element may be disposed between the light source 960 and/or image projector 930 and between the waveguide 940. The positive lens can be configured to offset or counter any optical power provided by the refractive optical element 990 before the incoupled light from the light source and/or light projector is incident on the eye 210. Other types of lenses than shown in FIG. 14C may be uses as the optical element 990. Alternatively or additionally, processing electronics in communication with the light source and/or image projector can be configured to alter an image sufficient to present to the user an undistorted image after the light has passed through the refractive optical element 990. Corresponding incoupling optical element, outcoupling optical element, and/or coupling optical element may be configured to operate on non-collimated light (e.g., divergent, convergent light) in some designs.

In various implementations, the same waveguide 940 may be used to (i) propagate light from the environment in front of the eyepiece 950 and the user to the camera 940 and (ii) to propagate light from the image projector 930 to the eye 210 to form image content therein. Using the same waveguide 940 may simplify the system and/or the eyepiece and may make the system and/or eyepiece more compact possibly providing a reduced form factor. Reducing the thickness of the eyepiece 950 by reducing the number of waveguide 940 may be advantageous for other reasons as well. Lower cost and a more simplified manufacturing process may be some such advantages.

Also in various designs, the same or different imaging system may be used in the same head mounted display to image the eye by propagating light from the eye via a waveguide in the eyepiece 950 to the camera 940 such as, for example, described above. Such systems may also use the eyepiece to transfer light from an illumination source to the eye 210 to illuminate the eye. In some designs, the eyepiece may additionally be used to propagate light from the image projector 930 to the eye 210 to form image content therein. Using the eyepiece to assist in imaging the environment and image the eye (and possibly to illuminate the eye) may simplify the system and/or may make the system more compact possibly providing a reduced form factor.

Moreover, in some implementations, the same waveguide 940 may be used to (i) propagate light from the environment in front of the eyepiece 950 to the camera 940 and (ii) to propagate light from the eye 210 to the camera to capture images of the eye. The same waveguide may be used to propagate light from the image projector 930 to the eye 210 to form image content therein and/or to propagate light from the illumination source 960 to the eye 210 to illuminate the eye for image capture. Using the same waveguide 940 may simplify the system and/or the eyepiece and may make the system and/or eyepiece more compact possibly providing a reduced form factor. Reducing the thickness of the eyepiece 950 by reducing the number of waveguide 940 may be advantage for other reasons as well. Lower cost and a more simplified manufacturing process may be some such advantages.

Similarly, in addition to coupling light from the environment into the waveguide 940, the same coupling optical element 944 may be configured to direct light from the image projector 930 to the eye 210 to form image content therein and/or light from the eye into the waveguide 940 to be guided therein to the camera 920. Additionally or in the alternative, the same coupling optical element 944 may be configured to couple light from the illumination source 960 guided within the waveguide 940 out of the waveguide to the user's eye 210.

As discussed above, one or more of the coupling optical element 944, the in-coupling optical element 942, or the out-coupling optical element 952 may comprises polarization selective coupling elements. Accordingly, in various designs, light input into eyepiece 950 or waveguide 940 is polarized so as to acted on appropriately by the polarization selective turning elements.

Accordingly, in some embodiments the illumination source 960 comprises a polarized light source of suitable polarization to be acted on properly by the polarization selective coupling/turning elements.

Figure 15A:
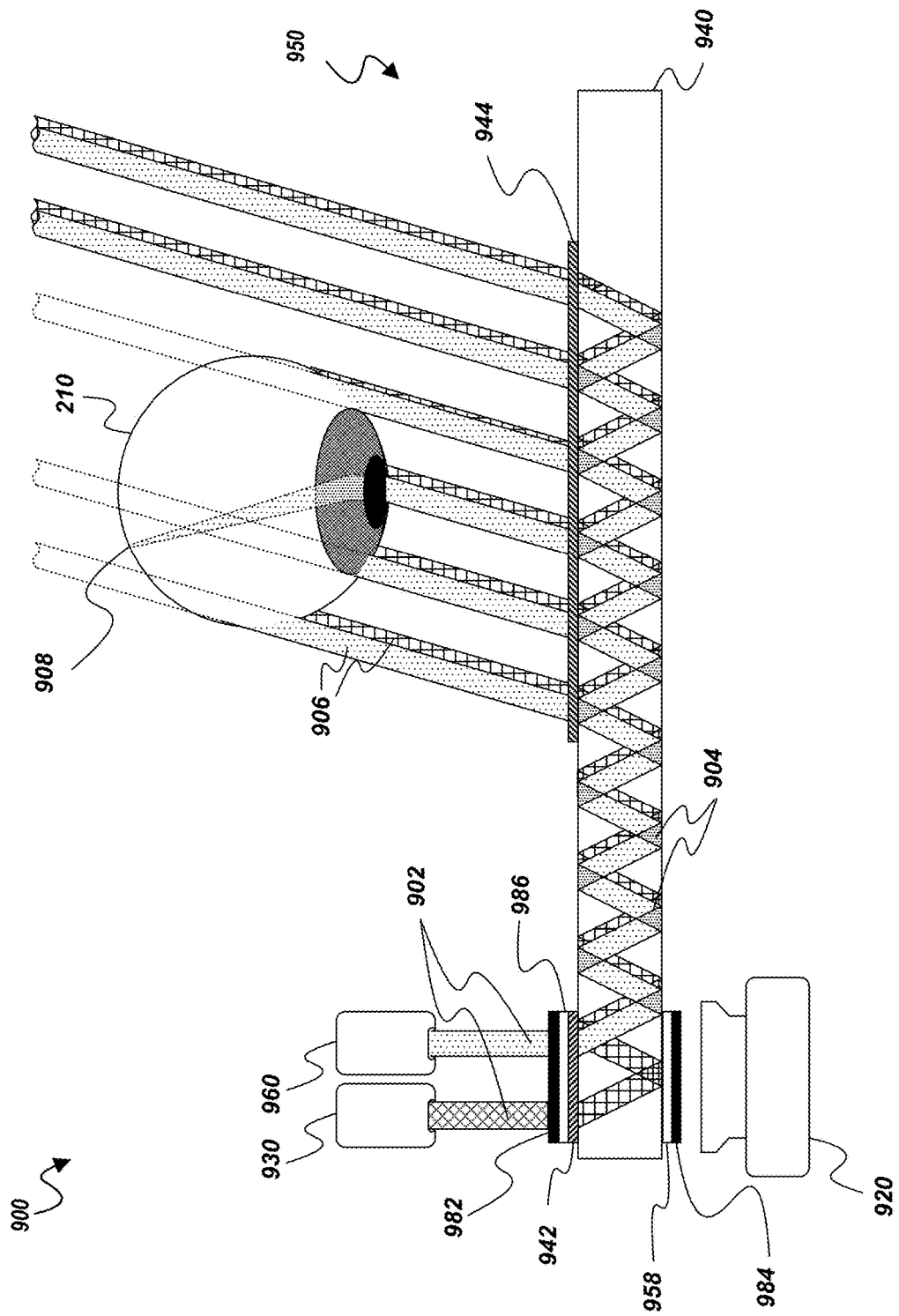
FIG. 15A schematically illustrates an example imaging system comprising a polarization selective incoupling optical element for receiving light a illumination source and coupling the light into a waveguide in an eyepiece. The eyepiece further includes a polarization selective light coupling element for coupling light out of the waveguide. A polarizer may be used to polarize the light from the illumination source and a half wave retarder may be used to rotate the orientation of the linearly polarized light so as to be turned into the waveguide by the polarization selective incoupling optical element.
Figure 15B:
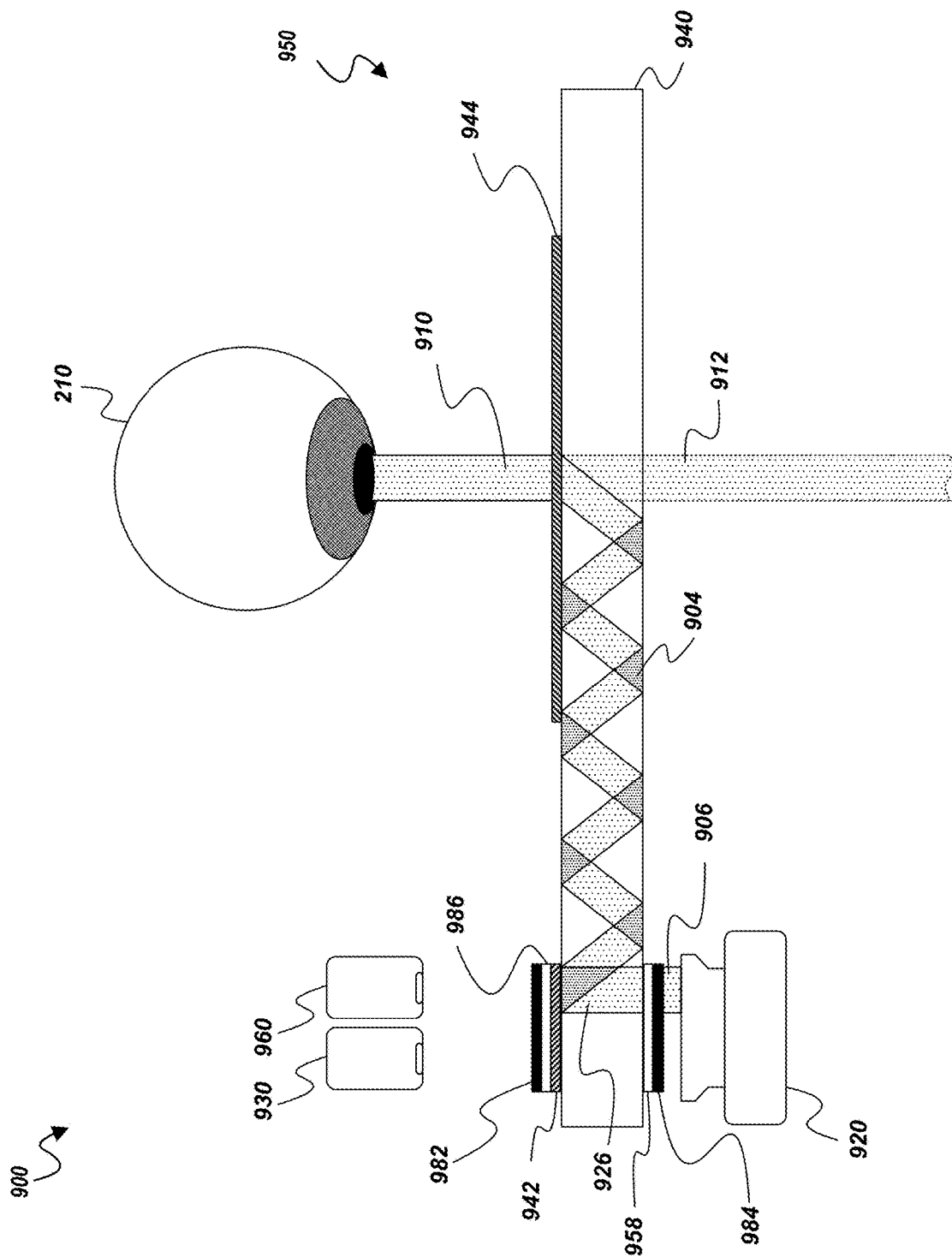
FIG. 15B schematically illustrates light from the eye (e.g., from the retina illuminated with infrared light from the illumination source) being coupled back into the waveguide and directed to a camera for image capture.

One or more polarization specific optical filters and polarization modifying elements may be included in various imaging systems 900, such as those where the image projector 930 and/or light source 960 are disposed directly opposite each other through the waveguide 940. The polarization sensitive elements may be helpful in reducing direction light emission into the imaging device 920 and/or to reduce saturation of the imaging device 920, for example, in configurations where these elements are aligned on opposite sides of the waveguide 940 at the same lateral position. FIGS. 15A-15B show such a configuration. The light source 960 such as shown in FIG. 15A can be configured to direct light through a polarization specific optical filter 982 such as a polarizer (e.g., a linear polarizer) and/or through a polarization modifying element 986 configured to alter a polarization state of incident light, such as a polarization rotator. A retarder such as a half wave retarder may, for example, rotate linear polarization. Accordingly, an appropriately oriented half wave retarder or half wave plate may rotate s-polarized light to p-polarized light or vice versa. Accordingly, in various implementations, the polarization specific optical filter 982 and/or a polarization modifying element 986 are disposed in an optical path between the light source 960 and the in-coupling optical element 942 so as to provide the properly oriented polarization to the in-coupling optical element. In some implementations, the imaging system 900 does not include polarization modifying elements but includes properly oriented polarization optical filters, such as polarizers.

The light emitted by the light source 960 may pass through an arrangement of optical elements in a particular order. For example, as shown in FIG. 15A, the light may pass first from the light source 960 through the polarization specific optical filter 982 (e.g., polarizer) and then through the polarization modifying element 986 (e.g. rotator). After the light has passed through the polarization modifying element 986, the light may be incident on an incoupling optical element 942, which may direct the light into the waveguide 940 to be guided therein.

For example, the light source 960 may be configured to emit light of a mixed polarization (e.g., s-polarization and p-polarization). The polarization specific optical filter 982 may be configured to transmit only light of a first polarization state (e.g., p-polarization). As the light continues, the polarization modifying element 986 may be configured to change the polarization state of the light (e.g., from p-polarized to s-polarized). The incoupling optical element may be configured to turn s-polarized light into an angle that is greater than the critical angle of the waveguide such that the s-polarized light is guided within the waveguide. The incoupled light 904 may be substantially polarized in the second polarization (s-polarization) as it propagates through the waveguide 940. The coupling optical element 944 may be configured to turn light only of the second polarization state (s-polarization). The coupling optical element 944 may be configured to couple the incoupled light 904 out of the waveguide 940 and to the eye 210 to provide illumination for image capture.

In order to prevent direct illumination (e.g., saturation) of the imaging device 920, a polarization modifying element 958 and/or a polarization specific optical filter 984 may be disposed in or on the waveguide 940 such that only light of a certain polarization state (e.g., p-polarized) can pass through the polarization specific optical filter 984 and to the imaging device 920. The polarization modifying element 958 (e.g., half waveplate) may be configured to change the state of the polarization (e.g., from s-polarized to p-polarized). The polarization specific optical filter 984 may be configured to transmit only light of a certain polarization (e.g., p-polarized light) therethrough. In this way, light passing through the polarization specific optical filter 982 will not be configured to transmit directly through the polarization specific optical filter 984. In any of the implementations above (e.g., where the image projector 930 and/or the light source 960 are on the same optical axis as shown in FIG. 15A), such as in FIGS. 10, 11A-11E, and 12A-12E, the configuration of the polarization specific optical filter 982, the polarization modifying element 986, the incoupling optical element 942, the polarization modifying element 958, and/or the polarization specific optical filter 984 may be implemented according to the design of FIG. 15A. The polarization specific optical filter 984 may be a transmissive-reflective polarizer (e.g., a polarizer beam splitter) configured to transmit light of a first polarization and to redirect or reflect light of a second polarization different from the first.

A partially reflective element (e.g., semi-transparent mirror) may be included to turn the incoupled light 904 to the imaging device 920. The partially reflective element may be disposed between the incoupling optical element 942 and the polarization modifying element 986 such that a portion of the incoupled light 914 is reflected toward the imaging device 920 while reducing leakage of the incoupled light 914 out of the waveguide 940. The portion of light that does not leak out may be any fraction between 0 and 1. For example, the portion may be 0.90, where 90% of the light rays propagating through the waveguide 940 along the coupling optical element 944 are maintained within the waveguide 940 at each reflection of the light rays. Other portions are possible (e.g., 0.10, 0.20, 0.30, 0.40, 0.50, 0.60, 0.70, 0.80, or any value in a range between these values).

FIG. 15B illustrates propagation of light reflected or scatter off the retina. Some of the light 910 reflected from the retina that is incident on the coupling optical element 944 having the second polarization (s-polarization) is turned by the coupling optical element 944 at angle greater than the critical angle of the waveguide 940 and thus may be guided therein. Some of the light may not be coupled into the waveguide 940 and will transmit therethrough as non-incoupled light 912. The incoupled light 904 may propagate through the waveguide 940 toward the camera.

Other implementations may benefit from use of polarization selective elements proximal the light source and camera. For example, various systems can be configured to provide illumination having a first polarization and capture images with the camera using light having a different polarization. For example, such a configuration may be used to reduce unwanted reflections, such as from the cornea when imaging the retina. Reflection from the cornea will be specular. Accordingly, if light of a first polarization is incident on the cornea, the light reflected from the cornea will retain that first polarization. In contrast, the retina is diffuse. If light of a first polarization is incident on the retina, the light reflected from the retina does not retain solely the first polarization. The diffuse reflection more likely results in unpolarized light. Accordingly, a second polarization, different from the first polarization will be present in the reflected light. Likewise by illuminating with a first polarization and imaging with a second different polarization, the retina can be image with reduced glare from the cornea.

Accordingly, in various implementations, the polarization specific optical filters 982, 984 may be used together to reduce unwanted reflected light from the eye 210 (e.g., from the cornea). For example, unwanted light, glare, or glint may be reflected off the cornea that may saturate an image captured by the imaging device 920. Light reflected from the cornea may be specular and maintain its polarization. By contrast, light reflected off the retina may be more diffusely reflected and may be less homogenously polarized. Likewise, a combination of polarizers may be used to remove some or most of the unwanted reflected light. Initially polarized light can be used for illuminating the eye 210. In some designs, a polarized illumination source (e.g., the light source 960) may be used. Additionally or alternatively, a first polarizer (e.g., the polarization specific optical filter 982) may be positioned at the beginning of the optical path of the illumination source to provide initial polarization of the light. A second polarizer (e.g., the polarization specific optical filter 984) may be positioned at the optical path before the light enters the imaging device 920. The second polarizer may be rotated at 90° from the first polarizer (e.g. the polarizers 982, 984 may be "crossed"). As a result, the eye will be illuminated with the first polarization with some light of the first polarization reflected from the cornea. This light will not pass through the polarizer 984 proximal the camera. However, light reflected from the retina will include the second polarization. Likewise light diffusely reflected from the retina will pass through the polarize 984 proximal the camera and will enable an image of the retina to be captured by the camera. Thus, in such as configuration unwanted light received from the eye (e.g., from cornea) may be entering the imaging device 920 may be reduced or eliminated. Other configurations are possible. For example, a polarization selective incoupling optical element 942 for coupling light from the light source 960 into the waveguide 940 and a polarization selective outcoupling optical element for coupling light out of the waveguide to the camera 920 may be employed having different polarization selectivity properties. For example, the polarization selective incoupling optical element may selectively turn light from the illumination source having a first polarization into the waveguide while the outcoupling optical element may selectively turn light of a second different polarization out of the waveguide to the camera. The effect may again be to reduce or remove unwanted light received from the eye (e.g., from cornea) before entering the imaging device 920.

Figure 16:
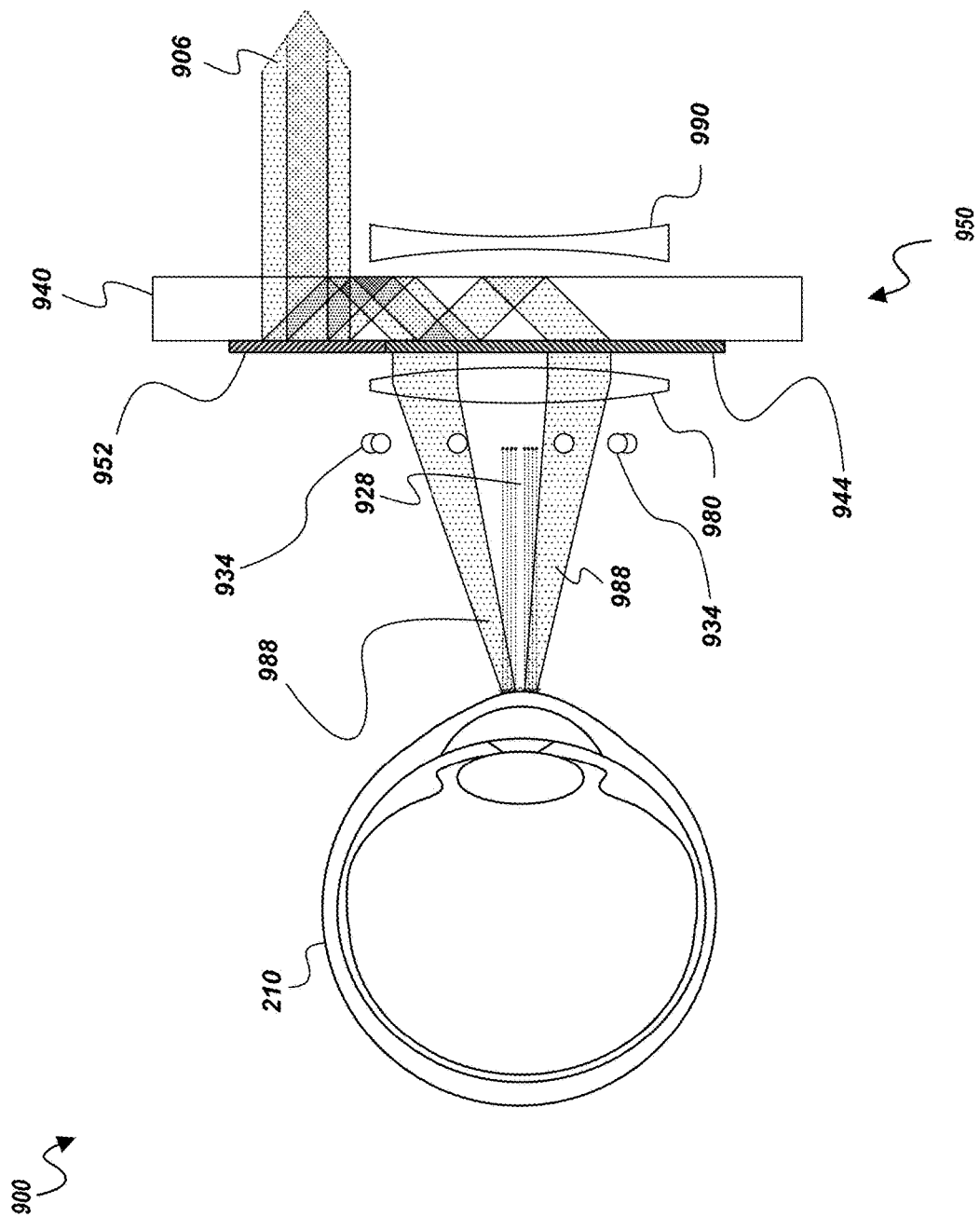
FIG. 16 schematically illustrates an imaging system configured for imaging an anterior portion (e.g., cornea) of an eye. The imaging system comprises an eyepiece such as described above. The imaging system further includes a positive lens for collimating light collect from the anterior portion of the eye for coupling via an optical coupling element into a waveguide and propagation to a camera for image capture. The system further comprises a negative lens to offset the positive power introduced by the positive lens and to prevent inversion of images of the environment in front of the eyepiece that would otherwise be caused by the positive lens.

Various imaging systems 900 are discussed herein that are capable of using the eyepiece 950 to collect light to image the retina. The imaging systems 900, however, can be configured to image other portions of the eye such as anterior portions of the eye. FIG. 16 illustrates how an imaging system 900 can be used for imaging an anterior portion (e.g., cornea) of an eye 210. The imaging system 900 may include one or more elements of the example imaging systems 900 described above. In addition, an example imaging system 900 may include one or more powered optical elements or lenses such as powered refractive optical elements 980, 990 having optical power. For example, a positive power lens or positive lens 980 may be disposed on a proximal side (e.g., closer to the eye 210) of the eyepiece 950 between the eye 210 and the eyepiece. A negative power lens or negative lens 990 may be disposed on a distal side of the eyepiece 950, between the eyepiece and the environment forward the user. One or both of the lenses 980, 990 may be variable focus elements (e.g., varifocal lenses) and/or may include a liquid crystal element. In some designs, one or both of the lenses 980, 990 includes a Fresnel lens. The lenses 980, 990 may incorporate liquid crystals to produce Fresnel lens functionality. Such functionality may allow for variable focus of one or both of the lenses 980, 990. In some designs, one or more of the lenses 980, 990 may be integrated with and/or manufactured (e.g., formed) on or into the eyepiece 950.

In various embodiments, the coupling optical element 944 is configured to turn collimated light reflected from the eye 210 into the light guide to be guided therein. Accordingly, the positive lens 980 may be configured to collimate light reflected from the eye 210, such as an anterior portion of the eye (e.g., the cornea). The positive lens 980 therefore may have a focal length that is equal or substantially equal to the distance of the lens to the portion of the eye 210 to be imaged, e.g., the cornea.

The negative lens 990 may have a similar or the same optical power as the positive lens 980 to offset or counter the optical power of the positive lens. In this way, light from the environment (e.g., distal of the waveguide 940) may pass through the negative lens 990, the eyepiece 950, and the positive lens 980 with substantially no net change in optical power introduced by these two lenses. Thus, the negative lens 990 may be configured to offset or cancel out the optical power of the positive lens 980 such that a user will not experience the power of the positive lens when viewing the environment in front of the eyepiece 950. The negative lens 990 will also counter the effect of the positive lens 980 to invert images of object in the environment in front of the wearer.

FIG. 16 illustrates light 928 that is incident on the cornea scattering therefrom. The imaging system 900 may be configured to capture this light 988 reflected from the cornea. For example, the positive lens 980 may collect a portion of the light 988 scattered from the cornea and collimate this light 988. This light 988, collimated by the positive lens 980, is incident on the coupling optical element 944, which is configured to turn collimated light into the waveguide 940 at an angle larger than the critical angle of the waveguide such that the light is guided therein by TIR. The coupling optical element 944, the outcoupling optical element 952, and/or the waveguide 940 may be as described above. Resultant outcoupled light 906 may be directed by the outcoupling optical element 952 out of the waveguide 940 to the camera (not shown).

FIG. 16 shows light 928, such as collimated light, which may be from the eyepiece 950 such as describe above. An illumination source 960 may couple light into the waveguide 940 and the coupling element 944 may couple this light from the illumination source 960 out of the waveguide. The coupling element 944 may be configured to couple light out of the waveguide 940 as collimated light. This light illuminates the anterior portion of the eye (e.g., the cornea) and scatters therefrom. As discussed above, this scattered light 988 can be collected by the positive lens 980 and the imaging system 900 to form an image of the anterior portion of the eye 210. Also as discussed above, this illumination 928 directed onto the eye 210 may be invisible (e.g., infrared) light.

FIG. 16 also shows an alternative arrangement for illuminating the eye 210. In some designs, one or more light sources 934 such as LEDs or emitters may be disposed with respect to the eye 210 to direct light thereon without being guided by TIR through the waveguide 940 and directed onto the eye 210. In some implementations, the eyepiece 950 or waveguide 940 is not in an optical path between the one or more light source 934 and the eye 210. In some designs, a plurality of such light sources 934 may be arranged in a pattern (e.g., circular or ring-like pattern) near and/or around the eye. In some designs, the pattern of light sources 934 may define an illumination axis parallel (e.g., coaxial) with the optical axis of the one or more lenses 980, 990. The one or more light sources 934 may be similar to the one or more light sources 960 described above and may, for example, be pulsed. Similarly, the one or more light sources 934 may comprise infrared light sources such as infrared LEDs or another type of invisible light. Alternatively, the one or more light sources may comprise visible light sources that emit visible light. Or the one or more light sources may emit both visible and invisible (e.g., infrared) light.

Figure 17:
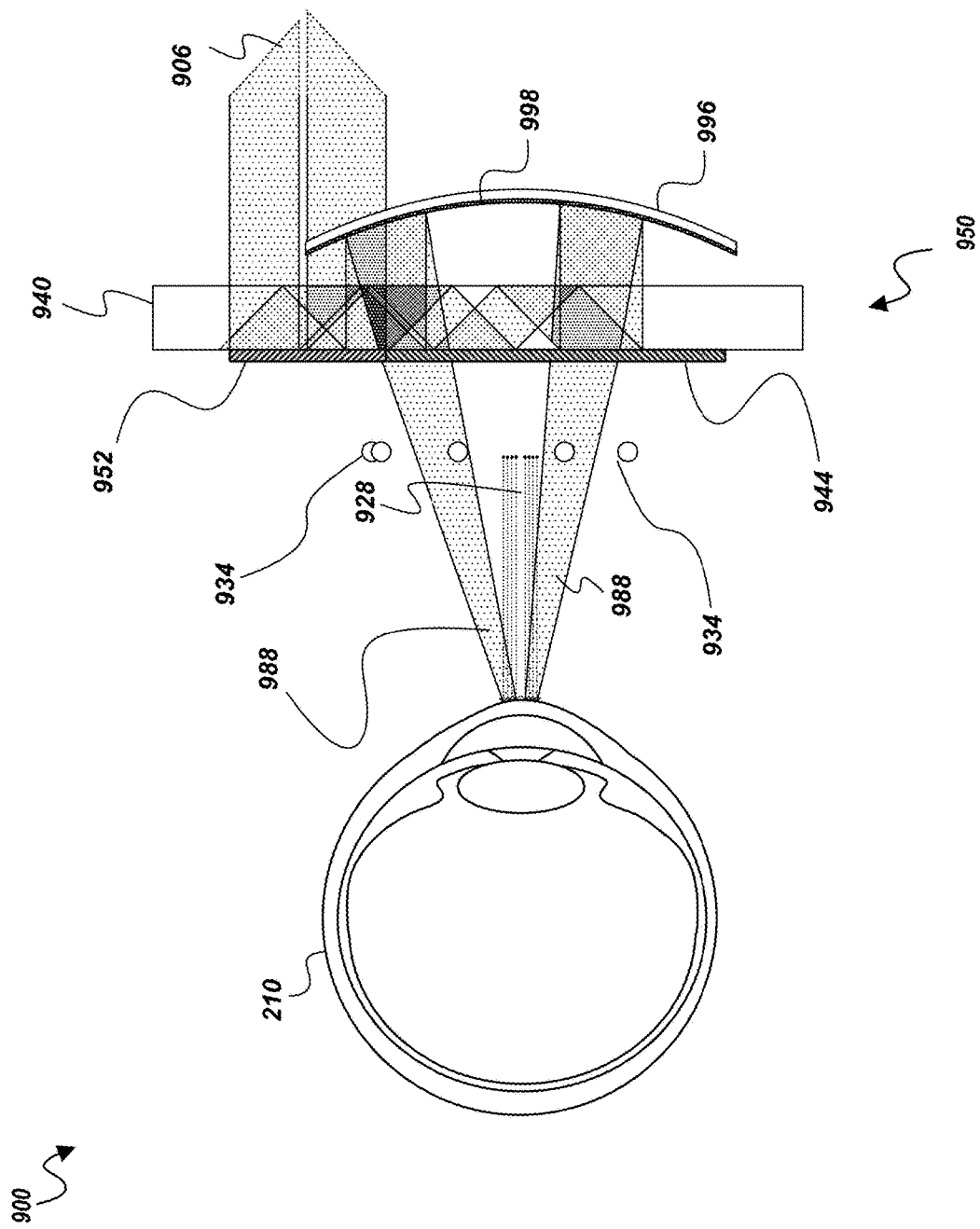
FIG. 17 schematically illustrates another example imaging system configured for imaging an anterior portion (e.g., cornea) of an eye. The imaging system comprises a curved wavelength selective reflector that collimates light from the anterior portion of the eye for coupling via an optical coupling element into a waveguide and propagation to a camera for image capture. The wavelength selective reflector may operate in reflection for infrared light reflected from the eye and in transmission for visible light from the environment in front of the user.

FIG. 17 illustrates another example imaging system 900 configured to image a portion of the eye 210 such as an anterior portion of the eye (e.g., cornea). The imaging system 900 shown in FIG. 17 employs a reflective optical element 996 configured to collimate the light from the eye, in contrast to the transmissive optical element (lens) 980 shown in FIG. 16. A reflective optical element will have less aberration than a transmissive optical element as chromatic aberration is not generally applicable to reflective optical elements such as the reflector 996 shown in FIG. 17. Accordingly, by using a reflective surface in collecting light from the eye 210, less (e.g., chromatic) aberration is introduced in the image captured of the eye.

FIG. 17 illustrates, for example, an imaging system 900 that includes a curved transmissive optical element 996 having a wavelength dependent reflective coating 998. The curved transmissive optical element 996 may be disposed distal the waveguide 940 (on the environment side of the eyepiece 950). Accordingly, the curved transmissive optical element 996 may be disposed between the environment forward the wearer and the waveguide 940 and/or the coupling optical element 944. Similarly, the waveguide 940 and/or the coupling optical element 944 may be disposed between the curved transmissive optical element 996 and the eye 210.

The wavelength dependent reflective coating 998 may be configured to reflect light of a certain wavelength or range of wavelengths. In some implementations, for example, the wavelength dependent reflective coating 998 may be configured to reflect invisible light (e.g., infrared light) within a certain range of wavelength, while the wavelength dependent reflective coating 998 may be configured to transmit visible light. The wavelength dependent reflective coating 998 may be disposed on a surface of the curved transmissive optical element 996, in some cases.

As discussed above, in various designs, the coupling optical element 944 is configured to turn collimated light reflected from the eye 210 into the waveguide 940 to be guided therein. Accordingly, the reflective optical element 996 may be configured to collimate light reflected from the eye 210, such as an anterior portion of the eye (e.g., the cornea). The curved reflective optical element 996 may therefore have a positive optical power for light that is incident on the proximal side thereof that is reflected from wavelength dependent reflective coating 998. In particular, in various designs, the reflective optical element 994 may have a focal length that is equal or substantially equal to the distance from the reflective optical element 996 to the portion of the eye 210 to be imaged, e.g., the cornea, iris, etc. Example values of focal lengths may be, for example, 2 cm to 8 cm. In some implementations, the focal length is between 4 cm and 6 cm. In some designs, the focal length is about 5 cm. The focal length may be in any range formed by any of these values or may be outside such ranges in different designs.

In various implementations, the reflective optical element 996 is disposed on the distal side of the eyepiece 950 forward the eyepiece. Accordingly, the reflective optical element 996 is disposed between the eyepiece 950 and the environment forward the user. Similarly, the eyepiece 950 is disposed between the reflective optical element 996 and the eye 210.

The curved transmissive optical element 996 may have a curved reflective surface having a curvature of any shape. In some implementations, the surface is rotationally symmetric. In some implementations, the surface may be spherical or aspheric (e.g., parabolic). Non-rotationally symmetric shapes are also possible. In various designs, however, the reflective surface has positive optical power. The reflective optical element 996 may comprise, for example, a concave mirror at least for some wavelengths and/or polarizations.

The curved transmissive optical element 996 may be configured to have negligible power in transmission. Likewise, the curved transmissive optical element 996 may be configured to transmit light without introducing convergence or divergence. In one example, the curved transmissive optical element 996 may have a curvature of an inner radius substantially the same as a curvature of an outer radius. A thin optical element 996 may reduce optical aberration, for example, for light transmitted therethrough, may be lighter and/or may be more compact.

In various designs, the reflective optical element 996 comprises material transmissive to visible light such that the user can see the environment in front of wearer. In some cases, to enhance transmission, the curved transmissive optical element 996 may be coated on an outer surface (e.g., the distal surface) with an anti-reflective coating. The anti-reflective coating may be configured to reduce reflection of, for example, of visible light such as red, green, and/or blue light. The reflective optical element 996, however, may be configured to reflect a portion of the light scattered from the eye 210 to form an image of the eye. Accordingly, the reflective optical element 996 may operate on different light differently. For example, the reflective optical element 996 may operate on different wavelengths differently. The reflective optical element 996 may be configured to reflect infrared light and transmit visible light.

As discussed above, one or more light sources 934 may be configured to illuminate the eye 210 with infrared light. Resultant light 988 reflected from the eye 210 (e.g., cornea) may be diverge, as schematically illustrated in FIG. 17. The curved transmissive optical element 996 may be disposed to receive this light 988 reflected from the eye (e.g., cornea, iris). The wavelength dependent reflective coating 998 may be configured to reflect the light 988 reflected from the eye because the wavelength illumination used to illuminate the eye is the same wavelength that is reflected by the reflective coating on the curved transmissive optical element 996 (e.g., 850 nm). For example the eye may be illuminated with infrared light (e.g., 850 nm) and the curved transmissive optical element 996 may be configured to reflect infrared light (e.g., 850 nm) and to pass visible light. The shape of the curved transmissive optical element 996 may also be configured to collimate the light 988 reflected from the eye and to reflect the light to the coupling optical element 944, which turns the collimated light into the waveguide 940 to be guided therein by TIR.

In FIG. 17, as in some other designs, one or more light sources 934 such as LEDs or emitters may be disposed with respect to the eye 210 to direct light thereon without being guided by TIR through the waveguide 940 and directed onto the eye 210. In some implementations, the eyepiece 950 or waveguide 940 is not in an optical path between the one or more light source 934 and the eye 210. In some designs, a plurality of such light sources 934 may be arranged in a pattern (e.g., circular or ring-like pattern) near and/or around the eye. In some designs, the pattern of light sources 934 may define an illumination axis parallel (e.g., coaxial) with the optical axis of the one or more lenses 980, 990. The one or more light sources 934 may be similar to the one or more light sources 960 described above and may, for example, be pulsed. Similarly, the one or more light sources 934 may comprise infrared light sources such as infrared LEDs or another type of invisible light. Other types of light sources, however, can be used.

Figure 18:
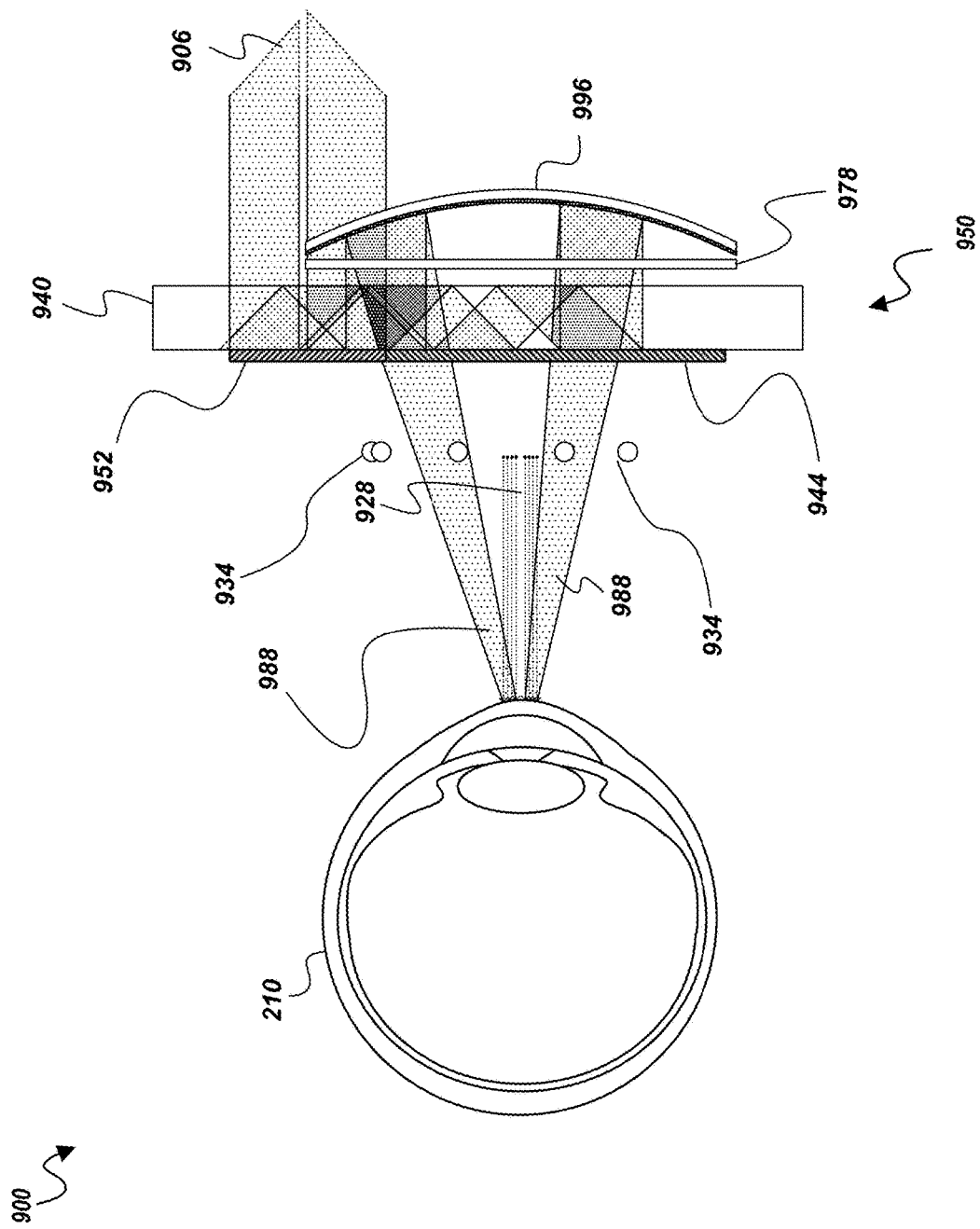
FIG. 18 schematically illustrates an example imaging system that also includes a curved wavelength selective reflector that collimates light from the anterior portion of the eye for coupling via an optical coupling element into a waveguide and propagation to a camera for image capture. Polarization selectivity may be employed to assist in controlling the path of the light reflected from the eye. Illumination of the eye is provided via the waveguide instead of a plurality of light source between the waveguide and the eye as shown in FIG. 18.

FIG. 18 illustrates another example imaging system 900 configured to image a portion of the eye 210 such as an anterior portion of the eye (e.g., cornea). In the implementation shown in FIG. 18, polarization selectivity is employed to assist in controlling the path of the light reflected from the eye. In particular, in various designs, the coupling optical element 944 is polarization selective. Light, for example, having a first polarization is transmitted through the coupling optical element 944 while light of a second different polarization is turned by the coupling optical element 944 into the waveguide 940 to be coupled therein by TIR. Accordingly, in various implementations the eye 210 is illuminated with polarized light or a polarizer (not shown) is disposed between the eye and the waveguide 940 such that the light from the eye incident on the waveguide is polarized. For example, the emitters 934 may emit polarized light or a polarizer may be disposed in front of the emitters 934 such that the eye 210 is illuminated with polarized light. Accordingly, in various designs, the polarization of the polarized light incident and/or reflected from the eye 210 that is received by the optical coupling element 944 may the first polarization such that said light is directed to the reflector 996.

Likewise, in various implementations, the coupling optical element 944 (and/or an outcoupling optical element 952) is configured to transmit light of a first polarization state such as a first linear, circular, or elliptical polarization state (e.g., p-polarization, left handed circular or elliptical polarization, etc.) and turn light of a second polarization state such as a second linear, circular, or elliptical (e.g., s-polarization, right handed circular or elliptical polarization, etc.) into and/or out of the waveguide, respectively. In some implementations, the eye illuminators 934 may emit only or primarily the first polarization (e.g., p polarization) or further include a polarization modifying element (e.g., polarizer) that is configured to transmit only light of the first polarization state (e.g., p-polarization). Additionally, the coupling optical element 944 and/or outcoupling optical element 952 may be configured to turn light of a second polarization (e.g., s-polarization) into and/or out of the waveguide, respectively.

Similar to the imaging system 900 shown in FIG. 17, an imaging system 900 the curved reflector 998 shown in FIG. 17 comprises a curved transmissive optical element 996 having a wavelength dependent reflective coating 998. The wavelength dependent reflective coating 998 may be configured to reflect light of a certain wavelength or range of wavelengths. In some implementations, for example, the wavelength dependent reflective coating 998 may be configured to reflect invisible light (e.g., infrared light) within a certain range of wavelength, while the wavelength dependent reflective coating 998 may be configured to transmit visible light. The wavelength dependent reflective coating 998 may be disposed on a surface of the curved transmissive optical element 996, in some cases.

In various implementations, the curved transmissive optical element 996 is disposed on the distal side of the eyepiece 950 forward the eyepiece. Accordingly, the reflective optical element 996 is disposed between the eyepiece 950 and the environment forward the user. Similarly, the eyepiece 950 is disposed between the reflective optical element 996 and the eye 210.

Accordingly, light having the first polarization (e.g., p-polarization) from the eye 210 is incident on the coupling optical element 944 and passes therethrough to the curved transmissive optical element 996. The imaging system 900 further included a polarization modifying optical element 978, such as a retarder (e.g., a quarter-wave retarder). This retarder 978 is transmissive and imparts a quarter wave of retardance on the light transmitted therethrough. This light is incident on and reflected from the curved transmissive optical element 996. The wavelength dependent reflective coating 998 may be configured to reflect the wavelength of light reflected from the eye. Consequently, this light is reflected from the curved surface of the curved transmissive optical element 996 and is collimated. This collimated light passes again through the retarder 978, thereby imparting another quarter wave of retardance on the light transmitted therethrough. The retardance introduced on these two passes through the retarder (e.g., a full wave of retardance) causes the polarization to rotate. Accordingly, the first polarization (e.g., p-polarization) transmitted through the polarization selective coupling optical element 944 on the first pass, is transformed into the second polarization (s-polarization) and is turned into the waveguide 940 to be guided to the camera 920 by TIR. As discussed above, in various designs, the coupling optical element 944 is configured to turn collimated light reflected from the eye 210 into the waveguide 940 to be guided therein. Accordingly, the reflective optical element 996 may be configured to collimate light reflected from the eye 210, such as an anterior portion of the eye (e.g., the cornea). The curved reflective optical element 996 may therefore have a positive optical power. In particular, in various designs, the reflective optical element 994 may have a focal length that is equal or substantially equal to the distance from the reflective optical element 996 to the portion of the eye 210 to be imaged, e.g., the cornea, iris, etc. Example values of focal lengths may be for example, 2 cm to 8 cm. In some implementations, the focal length is between 4 cm and 6 cm. In some designs, the focal length is about 5 cm.

In various designs, the reflective optical element 996 may comprise a curved surface that is configured to reflect light. The curved surface may be spherical or rotationally symmetric in certain cases. The reflective optical element 996 may comprise, for example, a concave mirror at least for some wavelengths and/or polarizations.

In various designs, the reflective optical element 996 comprises material transmissive to visible light such that the user can see the environment in front of wearer. The wavelength dependent reflective coating 998 disposed on a surface of the curved transmissive optical element 996 may therefore be transmissive to visible light or at least certain wavelength of visible light. The curved transmissive optical element 996 may also be coated on an outer surface (e.g., the distal surface) with an anti-reflective coating. The anti-reflective coating may be configured to reduce reflection of red, green, and/or blue light. The reflective optical element 994, however, may be configured to reflect a portion of the light scattered from the eye 210 to form an image of the eye. Accordingly, the reflective optical element 996 may operate on different light differently. For example, the reflective optical element 996 may operate on different polarization states (and/or wavelengths) of light differently. The reflective optical element 996 may be configured to transmit visible light and reflect infrared light.

As shown in FIG. 17, the one or more light sources 934 such as LEDs or emitters in FIG. 18 may be disposed with respect to the eye 210 to direct light thereon without being guided by TIR through the waveguide 940 and directed onto the eye 210. Accordingly, n some implementations, the eyepiece 950 or waveguide 940 is not in an optical path between the one or more light sources 934 and the eye 210. In some designs, a plurality of such light sources 934 may be arranged in a pattern (e.g., circular or ring-like pattern) near and/or around the eye. The one or more light sources 934 may be similar to the one or more light sources 960 described above and may, for example, be pulsed. Similarly, the one or more light sources 934 may comprise infrared light sources such as infrared LEDs or another type of invisible light. In particular, in various implementations the light sources 934 may emit light that is reflected by the wavelength dependent reflective coating 998 and/or the curved transmissive optical element 996. Other types of light sources, however, can be used.

Although the polarization selective coupling optical element 944 is configured to be polarization selective depending on the type of linear polarization incident thereon, other polarization selective coupling optical elements may be polarization selective to other types of polarization states such as different types of circular or elliptical polarization. The polarization selective coupling optical element 944 may, for example, be configured such that the first polarization, such as a first circular or elliptical polarization (e.g., left handed polarization or LHP-polarization), is transmitted through the polarization selective coupling optical element 944 and the second polarization, such as second circular or elliptical polarization (e.g., right handed polarization or RHP), is turned into the light guide, or vice versa. Such a polarization selective coupling optical element 944 may comprise liquid crystal such as cholesteric liquid crystal. Examples of some liquid crystal optical elements are discussed below in the section titled "Cholesteric Liquid Crystal Mirror," in U.S. Publication No. 2018/0164627, titled "DIFFRACTIVE DEVICES BASED ON CHOLESTERIC LIQUID CRYSTAL," filed on Dec. 7, 2017; in U.S. Publication No. 2018/0239147, titled "DISPLAY SYSTEM WITH VARIABLE POWER REFLECTOR," filed on Feb. 22, 2018; in U.S. Publication No. 2018/0239177, titled "VARIABLE-FOCUS VIRTUAL IMAGE DEVICES BASED ON POLARIZATION CONVERSION," filed on Feb. 22, 2018; each of which is hereby incorporated by reference in its entirety and for all purposes.

A polarization modification element or retarder such as a circular polarizer may be disposed between the eye and the polarization selective coupling optical element 944 to convert the light reflected from the eye to the first polarization (e.g., LHP). The LHP light will pass through the polarization selective coupling optical element 944, reflect from the reflector 998, change polarization into RHP and be turned by the polarization selective coupling optical element 944 into the waveguide to the camera.

In some implementations, the reflector 996 may be polarization selective in its reflectivity such that only light of a certain polarization state is reflected and/or that light of a different polarization state is transmitted. Such an optical element may comprise liquid crystal such as cholesteric liquid crystal. Examples of such optical elements are discussed below in the section titled "Cholesteric Liquid Crystal Mirror," in U.S. Publication No. 2018/0164627, titled "DIFFRACTIVE DEVICES BASED ON CHOLESTERIC LIQUID CRYSTAL," filed on Dec. 7, 2017; in U.S. Publication No. 2018/0239147, titled "DISPLAY SYSTEM WITH VARIABLE POWER REFLECTOR," filed on Feb. 22, 2018; in U.S. Publication No. 2018/0239177, titled "VARIABLE-FOCUS VIRTUAL IMAGE DEVICES BASED ON POLARIZATION CONVERSION," filed on Feb. 22, 2018; each of which is hereby incorporated by reference in its entirety and for all purposes. Such optical elements may reflect light of a first polarization state such as a first circular or elliptical polarization state (left handed circular or elliptical polarization) and transmit light of a second polarization state such as a second circular or elliptical polarization state (e.g. right handed circular or elliptical polarization) or vice versa. In some embodiments, the liquid crystal is disposed on a curved surface of the reflector 996 such that in reflection, the reflector has optical power such as positive optical power. In various other implementations, the liquid crystal optical element may be flat or planar. For example, the liquid crystal may be disposed on a flat or planar substrate or layer. Despite being flat, optical power may be included in the liquid crystal optical element. Such an element may be referred to as a cholesteric liquid crystal reflective lens. Accordingly, light from the eye may be collimated and reflected to the coupling optical element 998. The reflector, for example, may reflect light of a first polarization state (e.g., left handed circular or elliptical) and transmit light of a second polarization (e.g., right handed circular or elliptical polarization). Accordingly, the eye 210 is illuminated with left handed circular polarized light or the light reflected from the eye is transmitted through a polarizer (e.g., a circular or elliptical polarizer) that transmits light having the first polarization (e.g., left handed circular or elliptical polarized light). The coupling optical element 944 may also be polarization selective and may transmit LHP light and turn RHP light into the waveguide. The LHP light from the eye passes through the coupling optical element 944. This transmitted LHP light also is incident on the wavelength-selective liquid crystal reflector 996 and reflected therefrom. In certain designs, the wavelength-selective liquid crystal reflector 996 transforms the first polarization state (e.g. LHP) into the second polarization state (e.g. RHP) upon reflection. This light of the second polarization state (e.g., RHP light) is directed to the coupling optical element 944, which turns light of the second polarization state (RHP) into the waveguide 940 to the camera 920.

In some designs, the coupling optical element 944 does not comprise a liquid crystal grating but instead comprises, for example a surface relief diffraction grating or holographic grating. As discussed above, these coupling optical element 944 that do not comprise cholesteric liquid crystal may also comprise a volume diffractive or holographic optical elements or grating.

Accordingly, light scattered from the eye, is reflected by the reflective optical element 996 back to the waveguide 940 for coupling into the waveguide by the coupling element 944. In contrast, however, a portion of the unpolarized light from the environment in front of the wearer corresponding to the second polarization state (e.g., RHP) would be transmitted through the reflective optical element 996. Thus, the wearer could see objects through the reflective optical element 996.

In various designs, however, the reflective optical element 996 would have negligible power in transmission. For example, the reflective optical element 996 may have curved surfaces on both sides of the optical element having the same curvature such that the aggregate power of the optical element for light transmitted therethrough would be negligible.

As discussed above, in various implementations, the reflective optical element 996 comprises a cholesteric liquid crystal reflective lens, a cholesteric liquid crystal reflective element such as discussed below in the section titled "Cholesteric Liquid Crystal Mirror," in U.S. Publication No. 2018/0164627, titled "DIFFRACTIVE DEVICES BASED ON CHOLESTERIC LIQUID CRYSTAL," filed on Dec. 7, 2017; in U.S. Publication No. 2018/0239147, titled "DISPLAY SYSTEM WITH VARIABLE POWER REFLECTOR," filed on Feb. 22, 2018; in U.S. Publication No. 2018/0239177, titled "VARIABLE-FOCUS VIRTUAL IMAGE DEVICES BASED ON POLARIZATION CONVERSION," filed on Feb. 22, 2018; each of which is hereby incorporated by reference in its entirety and for all purposes. Such optical element may operate on a particular wavelength or wavelength range. Accordingly, light such as infrared light reflected from the eye may be acted on by the cholesteric liquid crystal reflective element. However, light not in that wavelength range such as visible light from the environment may be passed through the cholesteric liquid crystal reflective element without being operated on by the cholesteric liquid crystal reflective element. Accordingly, the cholesteric liquid crystal reflective element may have negligible power for this visible light from the environment passing therethrough As discussed above, in certain implementations, the illumination source 960 couples light into the waveguide 940 that is turned out of the waveguide to illuminate the eye 210. In such embodiments, the coupling optical element 944 may be polarization selective. For example, the coupling optical element 944 may transmit a first polarization (p-polarization) and transmit a second polarization (s-polarization).

Accordingly, if light from the illumination source 906 propagates through the waveguide 940 and is turned by the coupling optical element 944, this illumination will be s-polarization. A polarization modifying optical element (e.g., a quarter wave retarder) may be disposed between the waveguide 940 and the eye 210 so as to cause rotation of the polarized light reflected from the eye. Light from the light source 960 that is reflected from the eye 210 will pass twice through the quarter wave retarder and as a result the s-polarized light ejected from the waveguide by the coupling element 944 to illuminate the eye will be transformed into p-polarized light.

This p-polarized light will be transmitted through the coupling optical element 944 and the waveguide and be incident on the reflective optical element 996.

The imaging system 900 may further comprise a second polarization modifying element 978 which may comprise, for example, a retarder or waveplate as discussed above. This retarder may comprise for example a quarter wave retarder. The second polarization modifying element 978 may be disposed distal of the waveguide 940, between the waveguide and the reflector 996. The second polarization modifying element 978 may also be disposed between the coupling element light 944 and the reflector 996. Light (p-polarized) from the eye 210 that is transmitted through the coupling element light 944 passes through second polarization modifying element 978 is transformed into circular polarization. If the reflector 996 reflects circular polarized light, this light will be reflected back to the waveguide 940 after passing again through the polarization modifying element 978. Two passes through this polarization modifying element (e.g., quarter wave retarder) 978 will cause the light to be transformed into s-polarized light, which will be turned by the coupling element 944 into the waveguide to be guide therein to the camera (not shown).

As illustrated in FIG. 18, the light 988 reflected from the eye 210 is diverging. This light is incident on the reflector 996, which is curved or otherwise has positive optical power, and may be collimated thereby. The coupling optical element 944, which is configured to turn collimated into the waveguide 940, will therefore direct this collimated light from the curved reflective optical element 996 toward the imaging device 920 (not shown). Accordingly, the light reflected from the eye 210 that is collimated by the curved reflective optical element 996 is coupled into the waveguide 940 and guided therein toward the outcoupling optical element 952. The outcoupling optical element 952 may be configured to direct the light out of the eyepiece 950 to the camera (not shown).

A wide variety of variations are possible in the configurations of the imaging system. Different types of reflectors 996 and coupling elements 944 may be employed. The reflectors 996 and coupling elements 944 may, for example, be configured to operate on linear polarized light or circular or elliptical polarized light. As discussed, the reflectors 996 have optical power. The reflectors 996 and coupling elements 944 may comprise cholesteric liquid crystal grating reflectors and/or lenses with our without optical power. Polarization modifying elements 978 such as retarders may be included between the coupling elements 944 and the reflector and/or between the coupling elements 944 and the eye. In some embodiments, a polarizer such as a circular polarizer or a linear polarizer may be disposed between the eye and the coupling elements 944. If for example unpolarized light is reflected from the eye, a polarizer (e.g., circular polarizer or linear polarizer) may be disposed between the eye and the coupling elements 944. In some such cases the coupling elements 944 are polarization selective.

In configurations such as shown in FIGS. 17 and 18, where light reflected from the eye passes through the waveguide 940 to the curved reflective optical element 996 to be collimated and redirected back to the waveguide, background noise is introduced. This background noise results from light passing initially from the eye through the coupling optical element 944. As discussed above, the coupling optical element 944 may be configured to turn collimated light into the waveguide 940 to be guided therein to the camera 920 where an image is formed. The coupling optical element 944 will, however, turn some non-collimated light incident thereon. Accordingly, on the initial pass through the coupling optical element 944 and the waveguide 940 to the curved reflective optical element 996, some of the non-collimated (diverging) light reflected from the eye will be coupled by the coupling optical element 944 into the waveguide and contribute background noise to image of the eye formed at by the camera 920. This noise will be superimposed on the image formed by the collimated light retro-reflected by the curved reflective optical element 996 that is coupled by the coupling optical element 944 into the waveguide to be guided therein to the camera 920.

In certain designs, this noise can be subtracted out from the image. The process for subtracting out the noise from the signal may involve (a) measuring the amount of light coupled by the coupling optical element 944 on the initial pass through the coupling optical element 944 to the curved reflective optical element 996 that is turned and reaches the camera 920 (referred to as N) and (b) measuring the total signal at the camera 920 when light passes through coupling optical element 944 and the waveguide 940 to the curved reflective optical element 996, is collimated, and reflected back to the coupling optical element and turned to the camera. This total signal will also include some noise, N, as the uncollimated light reflected from the eye will have passed through the coupling optical element 944 to get to the curved reflective optical element 996 and thus some of uncollimated light will be turned by the coupling optical element 944 to the camera 920. If the noise, N, can be measured separately from the total signal, T, that includes the noise superimposed over the image of the eye, the noise, N, can be subtracted out from the total signal, T, as represented by the formula below:

$$I = T - N$$

where I represents the image with the noise component, N, removed.

Figure 19:
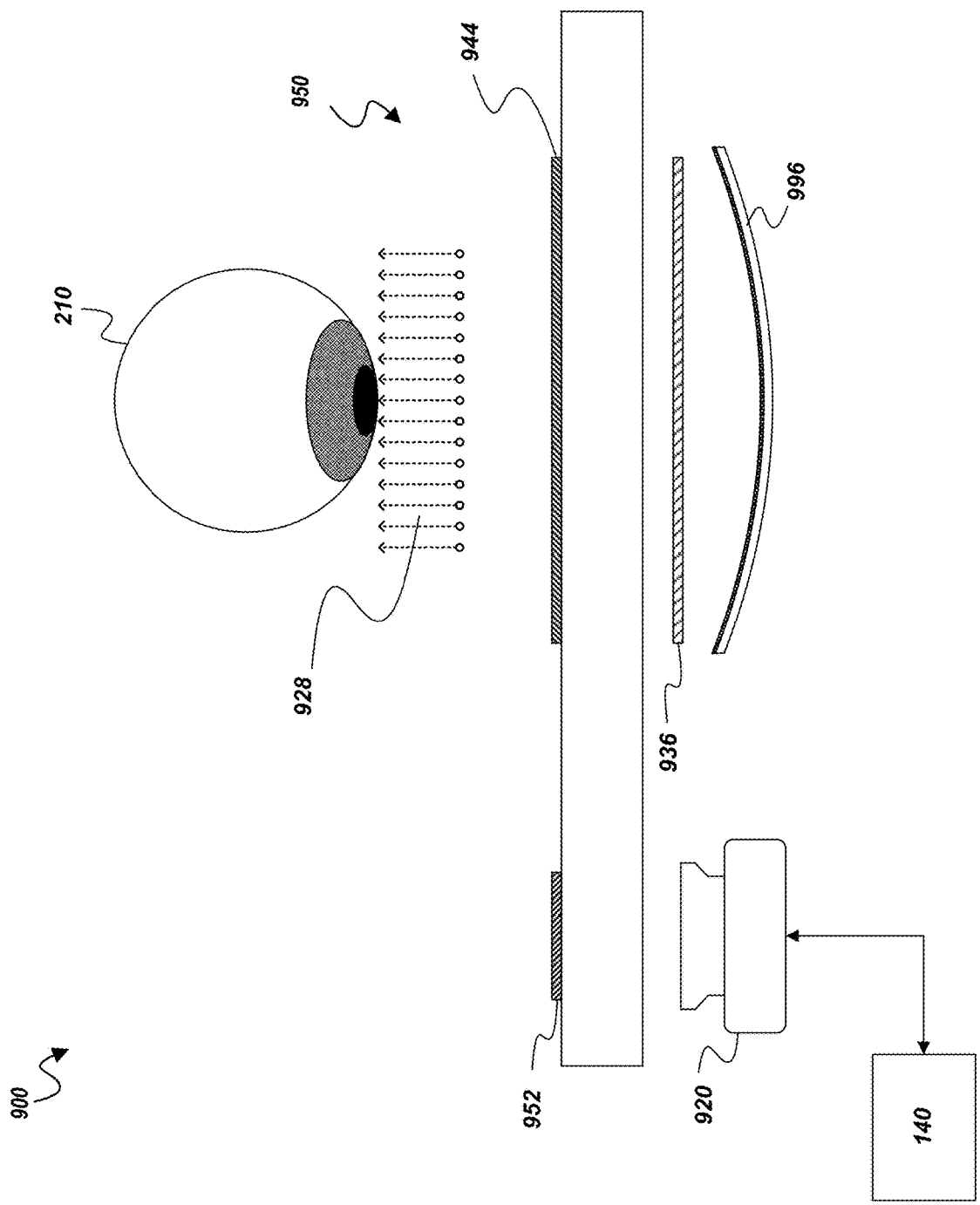
FIG. 19 schematically illustrates an imaging system that includes a shutter to assist in a procedure for subtracting out noise.

The two measurements (a) and (b) above can be obtained in various ways. For example, as shown in FIG. 19, a shutter 936 can be disposed between the curved reflective optical element 996 and the waveguide 940 and coupling optical element 944. This shutter 936 may be configured to block light when the shutter is in a first state and to transmit light when the shutter is in a second state. This shutter 936 may comprise, for example, a liquid crystal shutter.

Accordingly, the noise component N can be measured when the shutter 936 is in the first state where light reflected from the eye 210 is incident on the coupling optical element 944, passes therethrough toward the curved reflective optical element 996, however, is prevented from reaching the curved reflective optical element by the closed shutter. As discussed above, some of the light reflected from the eye 210, although mainly uncollimated, does couple into the coupling optical element 944 and is turned into the waveguide and guided therein to the camera 920. As referenced above, this light does not contribute to formation of an image, but will be background noise. The camera 920 may record this noise, N, when the shutter 936 is closed.

The total signal, T, including both the noise, N, and the image, can be measured when the shutter 936 is in the second state where the shutter is open. Light reflected from the eye 210 is again incident on the coupling optical element 944. Some of this light reflected from the eye 210, although mainly uncollimated, couples into the coupling optical element 944 and is turned into the waveguide and guided therein to the camera 920. Most of this light reflected from the eye 210, however, passes through the coupling optical element 944, through the open shutter 936 and to the curved reflective optical element 996. The curved reflective optical element 996 collimates and reflects at least a portion of this light back to the coupling optical element 944, which turns this collimated light into the waveguide 920 to be guided to the camera 920 to form an image of the eye 210. The camera 920 can capture this image of the eye 210.

Processing electronics (such as processing electronics 140) in communication with the camera 920 can receive the noise component, N, measured when the shutter 936 was in the first closed state as well as the total signal, T, measured when the shutter was in the second open state and can subtract the two (T-N). In this manner, the noise, N, contributed by the non-collimated light reflected from the eye 210 that is coupled into the coupling optical element 944 on the initial pass therethrough, can be subtracted from the total image signal, T. The processing electronics may be in communication with the camera 920 via a wired electronic signal. Additionally or alternatively, the processing electronics may communicate with the camera 920 using one or more remote receivers. The processing electronics may reside remotely (e.g., cloud computing devices, remote server, etc.).

Other ways may be employed to perform the measurement of (a) and (b) to obtain N and T and subtract N from T. For example, if the curved reflective optical element 996 is wavelength selective such as shown in FIG. 18, the eye can be illuminated with light of different wavelength at different times. For example, to perform the measurement (a) and quantify the noise, N, the eye can be illuminated with a wavelength that is not reflected by the curved reflective optical element 996. However, to perform the measurement (b) and quantify the total signal, T, the eye can be illuminated with a wavelength that is reflected by the curved reflective optical element 996. The noise, N, can then be subtracted from the total T, as discussed above (e.g., T−N).

Figure 20A:
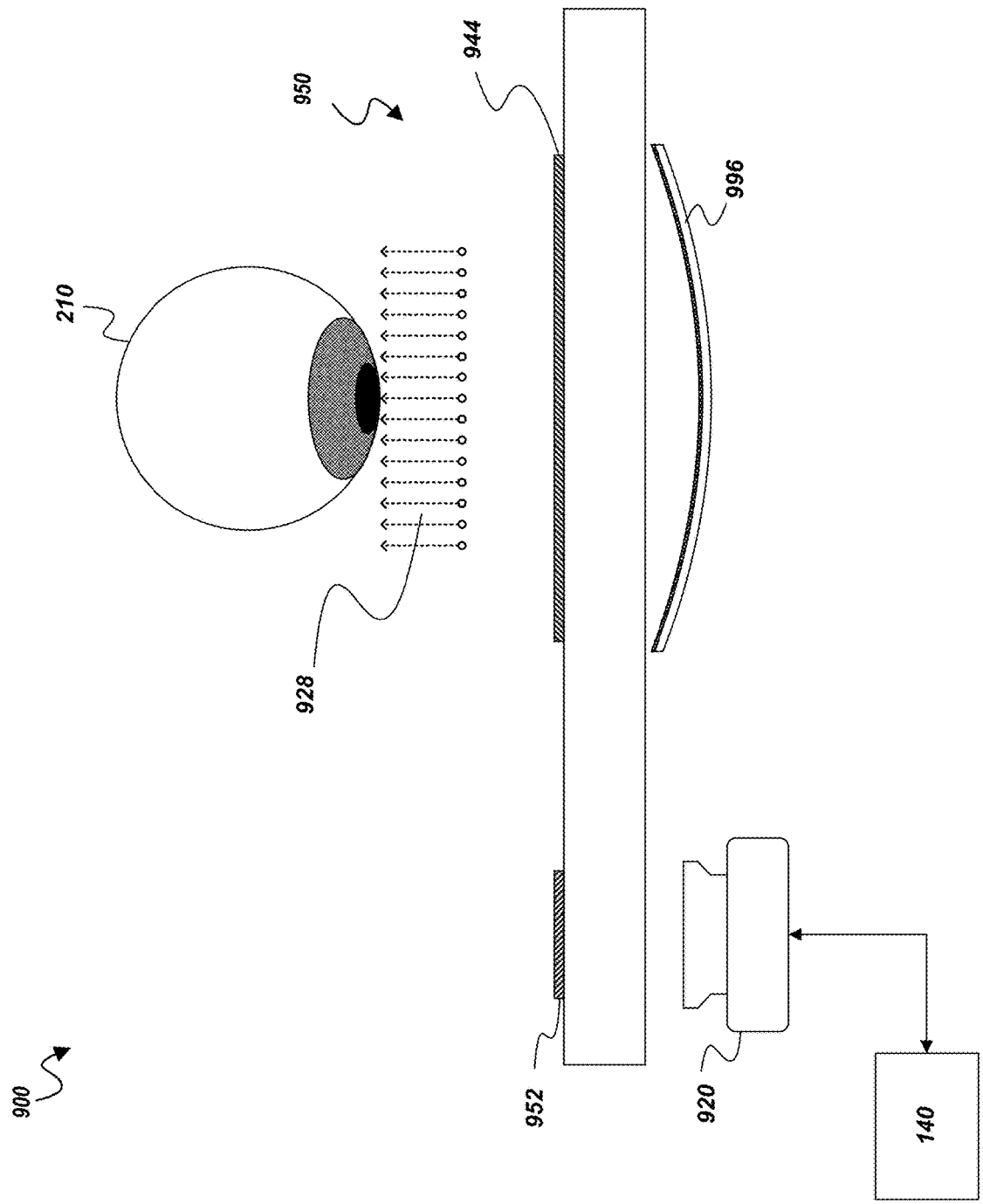
FIGS. 20A-20E schematically illustrate an alternative procedure for subtracting out noise using wavelength modulation in conjunction with a curved wavelength selective reflector.
Figure 20B:
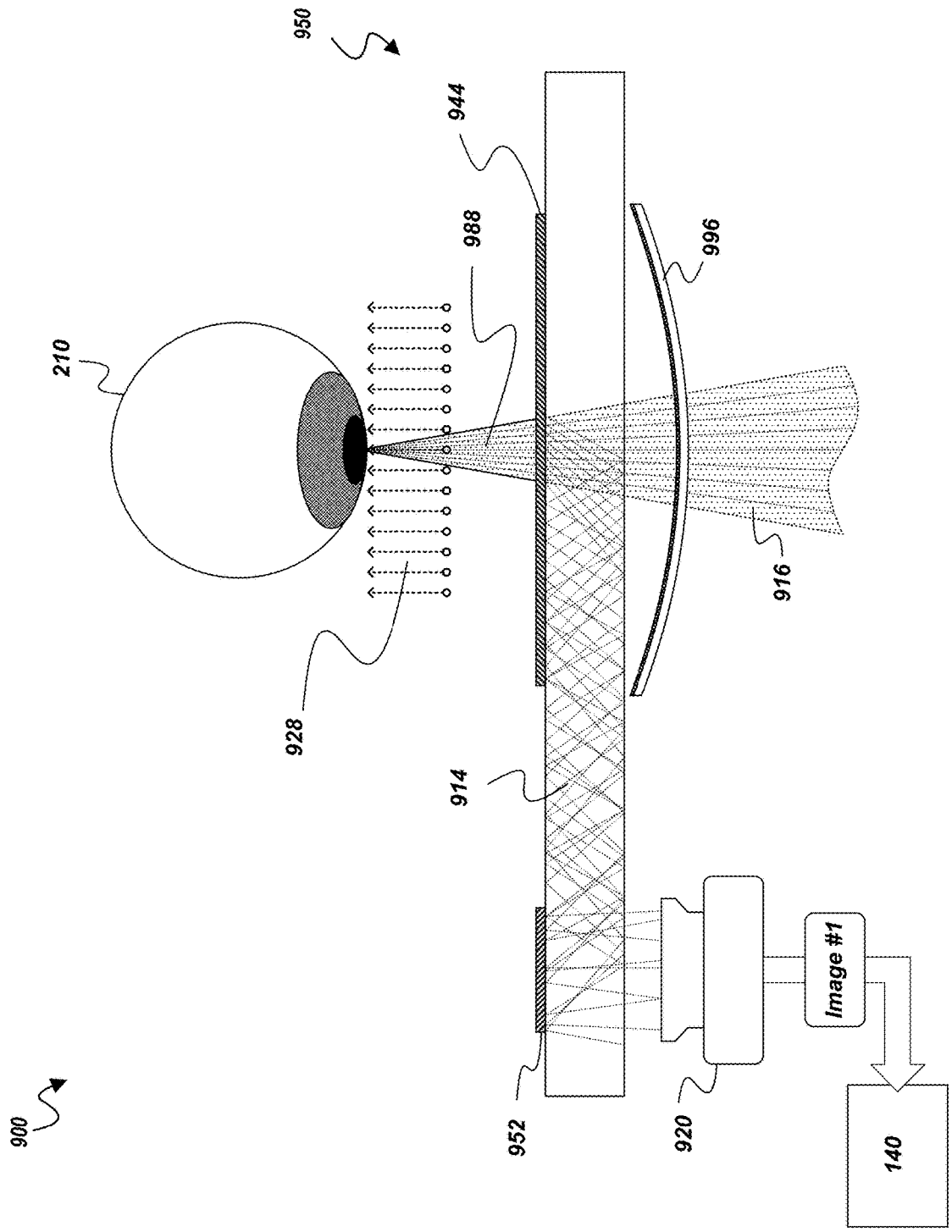
Figure 20C:
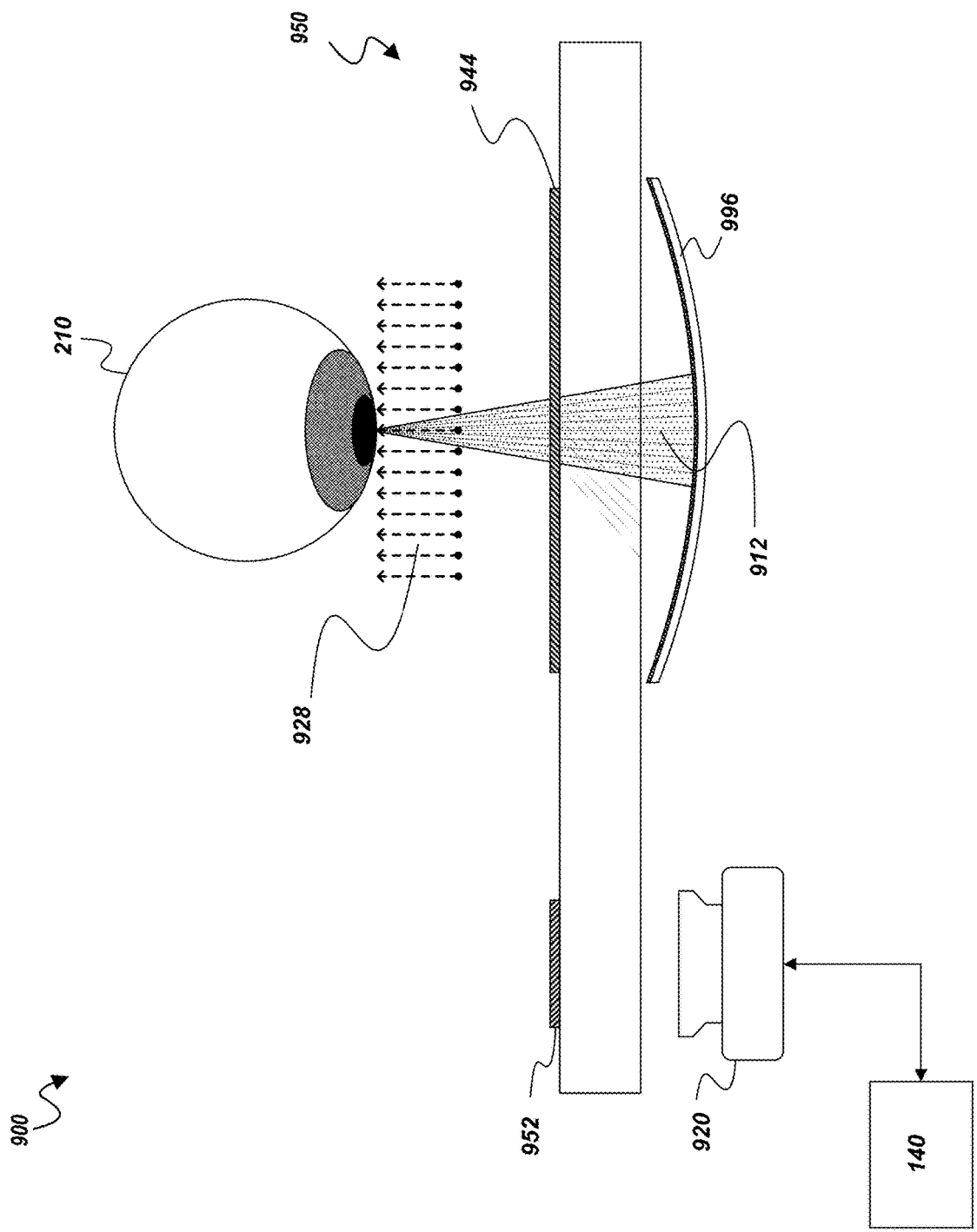
Figure 20D:
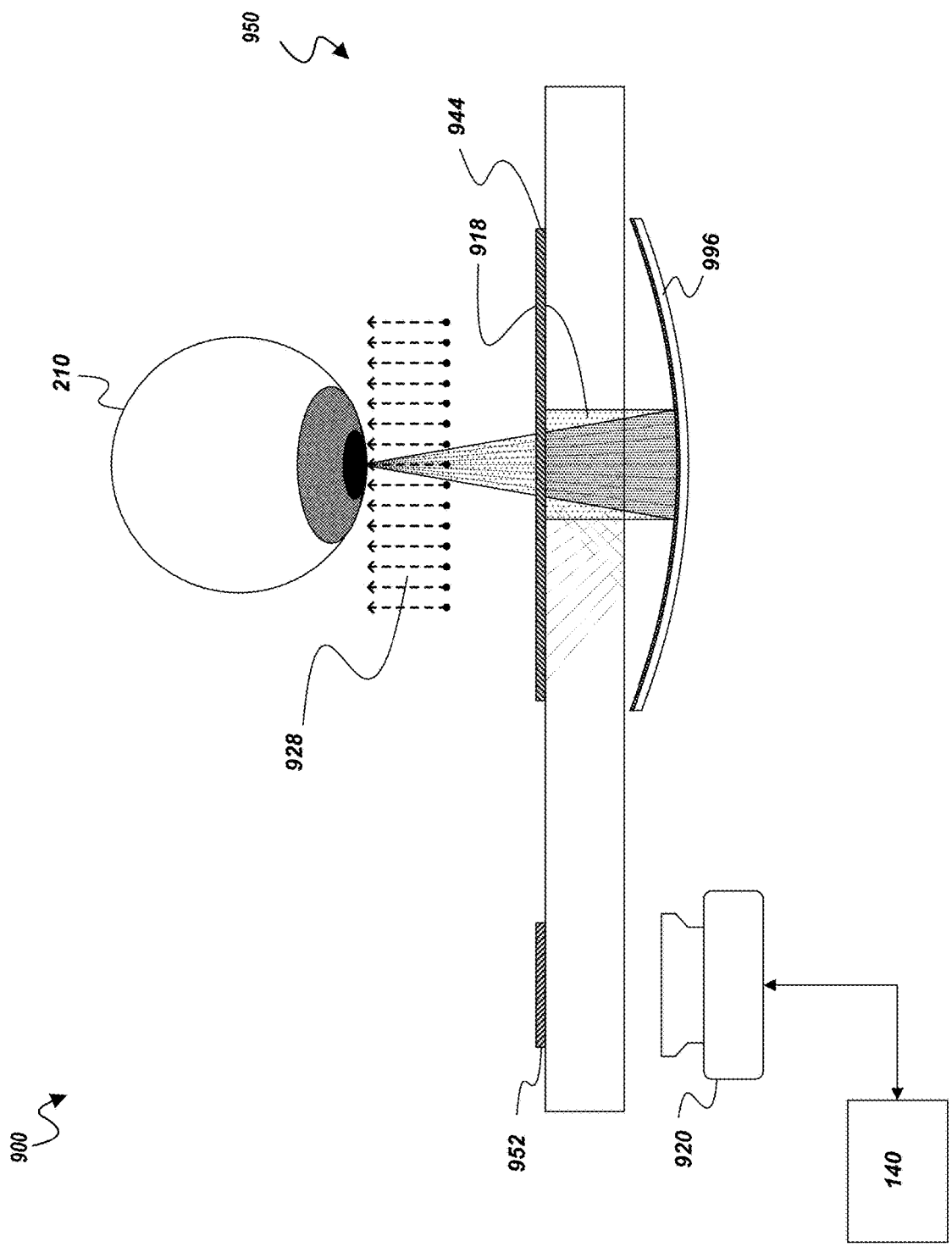
Figure 20E:
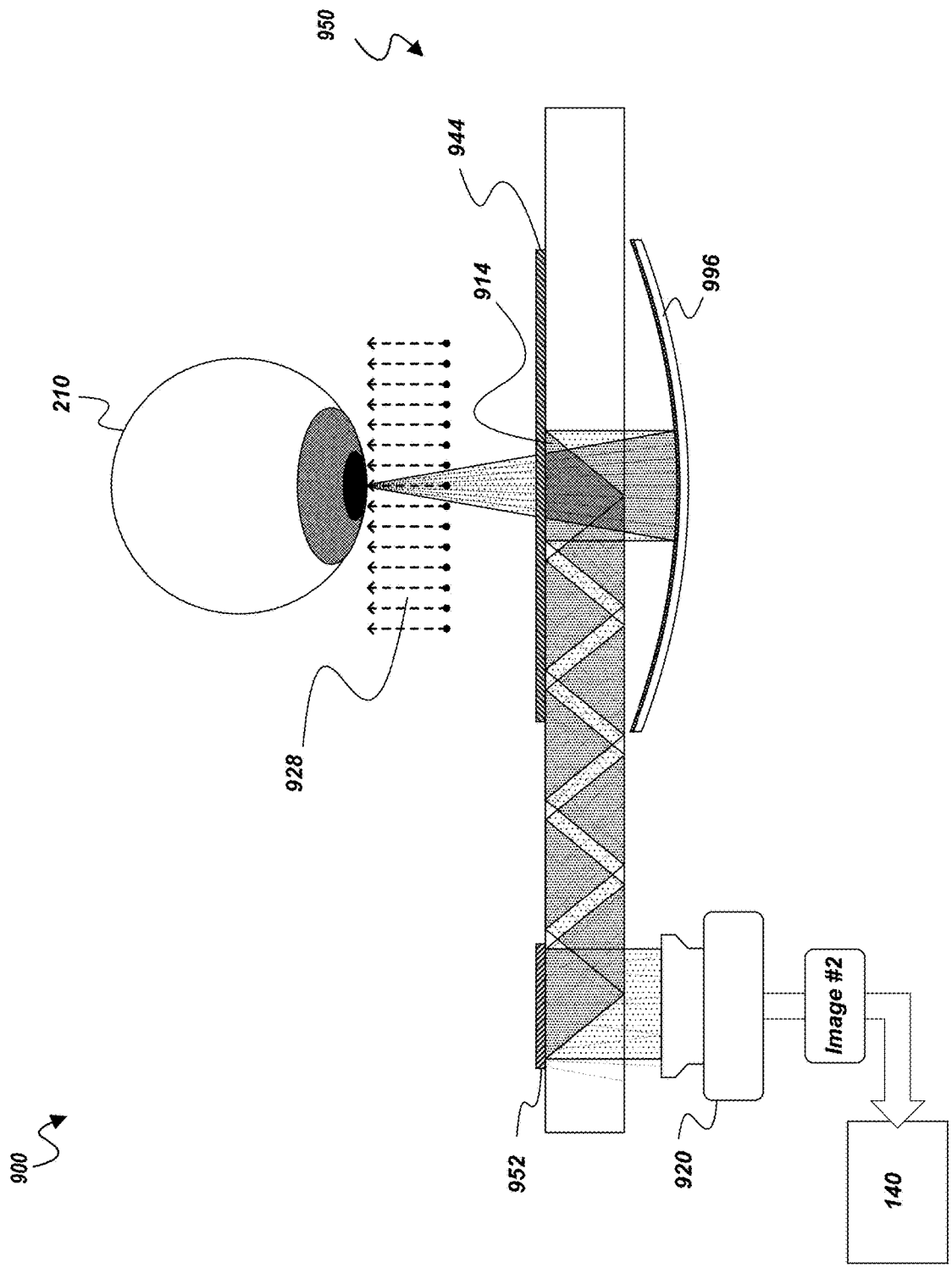

FIGS. 20-20E illustrate an example imaging system 900 configured to use wavelength modulation to measure and subtract out the noise component, N, as discussed above. The imaging system 900 in FIGS. 20A-20E includes a curved transmissive optical element 996 that is wavelength selective (such as described with reference to FIGS. 17 and 18 above). For example, the curved transmissive optical element 996 has a wavelength dependent reflective coating 998 on a curved surface thereof. The imaging system 900 may also include one or more light sources or illumination sources (not shown) configured to illuminate the eye 210. The one or more light sources may be configured to emit infrared light. The one or more light sources, however, can be configured to emit different color or wavelength light at different times. Such wavelength modulation can enable the measurement of N separately so as to be subtracted out from the total signal, T.

In various implementations, for example, the one or more illumination sources 960, 934 may be configured in a first state to emit one or more wavelengths that are reflected by the curved reflective optical element, $\lambda_{Reflect}$, and in a second state one or more wavelengths that are not reflected $\lambda_{Not\ Reflect}$. In the second state, no more than negligible amounts of wavelengths that are reflected by the curved reflective optical element, $\lambda_{Reflect}$, are emitted. Similarly, in the first state, no more than negligible amounts of wavelengths that are not reflected $\lambda_{Not\ Reflect}$ are emitted.

In some examples, the reflected wavelength(s), $\lambda_{Reflect}$, may be between about 800 nm and 950 nm. The reflected wavelength(s), $\lambda_{Reflect}$, may be between about 835 nm and 915 nm. The reflected wavelength(s), $\lambda_{Reflect}$, may be between about 840 nm and 870 nm. In some designs, the reflected wavelength, $\lambda_{Reflect}$, is about 850 nm. The light emission 928 from the one or more light sources 960 may illuminate the eye.

As shown in FIG. 20B, light 988 having the wavelength(s) that are not reflected by the curved reflective optical element 944, $\lambda_{Not\ Reflect}$, (and no more than negligible amounts of light that is reflected by the curved reflective optical element 944, $\lambda_{Reflect}$) is reflected off part of the eye 210 (e.g., the cornea). Because this light comprises wavelength(s) that are not reflected by the curved reflective optical element 944, $\lambda_{Not\ Reflect}$, rays of light 916 are shown propagating through the curved reflective optical element 996 to the environment forward the user.

Although the light 988 incident on the coupling optical element 944 is not collimated, the coupling optical element nevertheless couples at least some light 914 into the waveguide 940 to be guided to the camera 920. According, the camera 920 may capture an image (Image #1) corresponding to the noise component, N, that results from uncollimated light that is turned by the coupling optical element 944 on the initial pass to the curved reflective optical element 996. This image (Image #1) is background noise and does is not a recognizable image of the eye. Processing electronics 140 is shown as receiving this first image (Image #1).

In FIGS. 20C-20E, the illumination sources (not shown) emit one or more wavelengths that are reflected by the curved reflective optical element, $\lambda_{Reflect}$, and no more than negligible amounts of wavelengths that are not reflected $\lambda_{Not\ Reflect}$. This wavelength, $\lambda_{Reflect}$, may be, for example, 850 nm.

As shown in FIG. 20C, some of the light 988 reflected from the eye 210 that is incident on coupling optical element 944 in the first pass through the coupling optical element 944 is coupled by the coupling optical element 944 into the waveguide 940 (as in FIG. 20B) and directed toward the camera 920. Additionally, the curved transmissive optical element 996, which selectively reflect light of wavelength $\lambda_{Reflect}$, reflects and collimates the non-incoupled light 918 reflected from the eye 210 that is incident on the curved transmissive optical element. As illustrated in FIG. 20E, the coupling optical element 944 turns and couples this collimated reflected light into the waveguide 940 toward the camera 920. FIG. 20E shows both components reaching the camera 920, light 988 reflected from the eye 210 that is incident on coupling optical element 944 in the first pass through the coupling optical element 944 is coupled by the coupling optical element into the waveguide 940 and light reflected and collimate by the curved transmissive optical element 996 that is coupled by the coupling optical element into the waveguide. The camera 920 may capture an image (Image #2) corresponding to this total image component, T. Processing electronics 140 is shown as receiving this second image (Image #2).

As discussed above, the processing electronics may subtract the noise from the image, T−N. In this example, Image #1 can be subtracted from Image #2. Accordingly, the processing electronics 140 may be configured to modify the second image based on the first image. Other approaches, however, are possible. For example, the processing electronics 140 may be configured to create a new image that represents a version of the second image with reduced optical noise. Implementations for subtracting noise from the image may be used in implementations described above. For example, implementations shown in FIGS. 10, 11A-11E, and/or FIGS. 12A-12E can include a shutter 936 and/or a curved transmissive optical element 996 having a wavelength dependent reflective coating 998 configured to selectively reflect non-incoupled light 912 and to direct the light to an imaging device 920.

As discussed above, the Image #1 was obtained for the case where the light was illuminated with one or more wavelengths that are not reflected by the curved reflective optical element, $\lambda_{Not\ Reflect}$, and no more than negligible amounts of wavelengths that are reflected $\lambda_{Reflect}$. Image #2 was obtained for the case where the light was illuminated with one or more wavelengths that are reflected by the curved reflective optical element, $\lambda_{Reflect}$, and no more than negligible amounts of wavelengths that are not reflected $\lambda_{Not\ Reflect}$. Accordingly, the one or more illumination sources 960, 934 may be configured to modulate in wavelength. For example, in certain designs the one or more illumination sources 960, 934 may comprise a first illumination source configured to output one or more wavelengths not reflected by the curved reflective optical element, $\lambda_{Not\ Reflect}$, and no more than negligible amounts of wavelengths that are reflected $\lambda_{Reflect}$. The one or more illumination sources may further comprise a second illumination source configured to output one or more wavelengths that are reflected by the curved reflective optical element, $\lambda_{Reflect}$, and no more than negligible amounts of wavelengths that are not reflected $\lambda_{Not\ Reflect}$. The intensity of the first and second illumination sources can be alternately increased and decreased, turned on and off, attenuated and not attenuated, passed and blocked to provide modulation in the wavelength of light illuminating the eye. For example, during a first time interval the first illumination source can be blocked while the second illumination source is not blocked. During a subsequent second time interval, the second illumination source can be blocked while the first illumination source is not blocked. This process can be repeated to provide modulation of the wavelength of light illuminating the eye. In other designs, the wavelength of a light source may be tuned and detuned to shifted the wavelength back and forth between Reflect and $\lambda_{Not\ Reflect}$. Other arrangements are possible.

As described above, imaging systems 900 may be included in head mounted displays such as augmented reality displays that additionally provide the ability to image the eye by collecting light with the eyepiece 950. Such imaging systems 900 may be used for eye tracking. Multiple images of the retina or an anterior portion of the eye may be obtained. Movement and/or repositioning of the eye can be ascertained from these images to track the eye position and/or orientation. These imaging system may also be use as for biometric imaging and/or for identifying the user. For example, an image of the user's eye such as of the retina or iris may be obtained and recorded. A subsequent image of the eye (e.g., retina, or iris) of the wearer may be obtained at a later time. The two images may be compared to determine whether the wearer in that later instance was the wearer in the first instance. Other uses for the imaging systems however are possible.

Although illumination systems may be described above as waveguide based and comprising one or more waveguides, other types of light turning optical elements may be employed instead of a waveguide. Such light turning optical elements may include turning features to eject the light out of the light turning optical element, for example, onto the spatial light modulator. Accordingly, in any of the examples described herein as well as any of the examples below, any reference to waveguide may be replaced with light turning optical element instead of a waveguide. Such a light turning optical element may comprise, for example, a polarizing beam splitter such as a polarizing beam splitting prism.

As discussed above the systems described herein can allow for collection of biometric data and/or biometric identification. For example, the eye or portions thereof (e.g., the retina) can be imaged to provide such biometric data and/or biometric identification. Images of the eye such as of the retina may be obtained at various times when the head mounted display system is being worn by a user, presumably the same user. A collection of such images can be recorded, for example, in a database. These images may be analyzed to collect biometric data. Such biometric data may be useful for monitoring the user's health or medical status. Different medical parameters can be monitored by imaging the patient, for example, the patient eye (e.g., retina). The medical parameters can be recorded and compared with subsequent measurements obtained when the user is wearing the head mounted display system.

In addition, if a person begins wearing the head mounted display system and an image of the user's eye is captured that does not match the images stored in the database a conclusion may be drawn that the person currently wearing the head mounted display system is different from the previous user. This can be useful in determining whether the intended user is wearing the headset or if it is being worn by a new user. Such a feature may allow for certain medical, security, and/or convenience-in-use applications or functionality. For example, the head mounted display may be configured to identify a wearer based on characteristics of the wearer's eye. For example, the system can be configured to determine an individual based on features of a wearer's retina (e.g. blood vessels), cornea, or other eye features. In some implementations for example, a series of markers may be determined for a particular wearer. Based on the series of markers, the system may be able to determine that the previous user is wearing the headset or, alternatively, that another user is wearing the headset. The markers may include a shape or center of a user's cornea, a configuration of blood vessels in the user's retina, an intensity and/or position of a reflection of light from the cornea, a shape of an aspect of the eye, and/or any other biometric marker. In certain implementations a confusion matrix can be determined. As discussed above for example in the discussion of developing a retinal map using a virtual/fixation target at a variety of location (see, e.g., FIG. 13B), the system may have a user look in a set of predetermined directions or eye poses and develop a matrix of characteristics of the eye or part of the eye (e.g., cornea, retina, etc.) associated with each direction or eye pose. Using such a matrix, the system can determine an identity of the individual. Other methods are possible.

Figure 21:
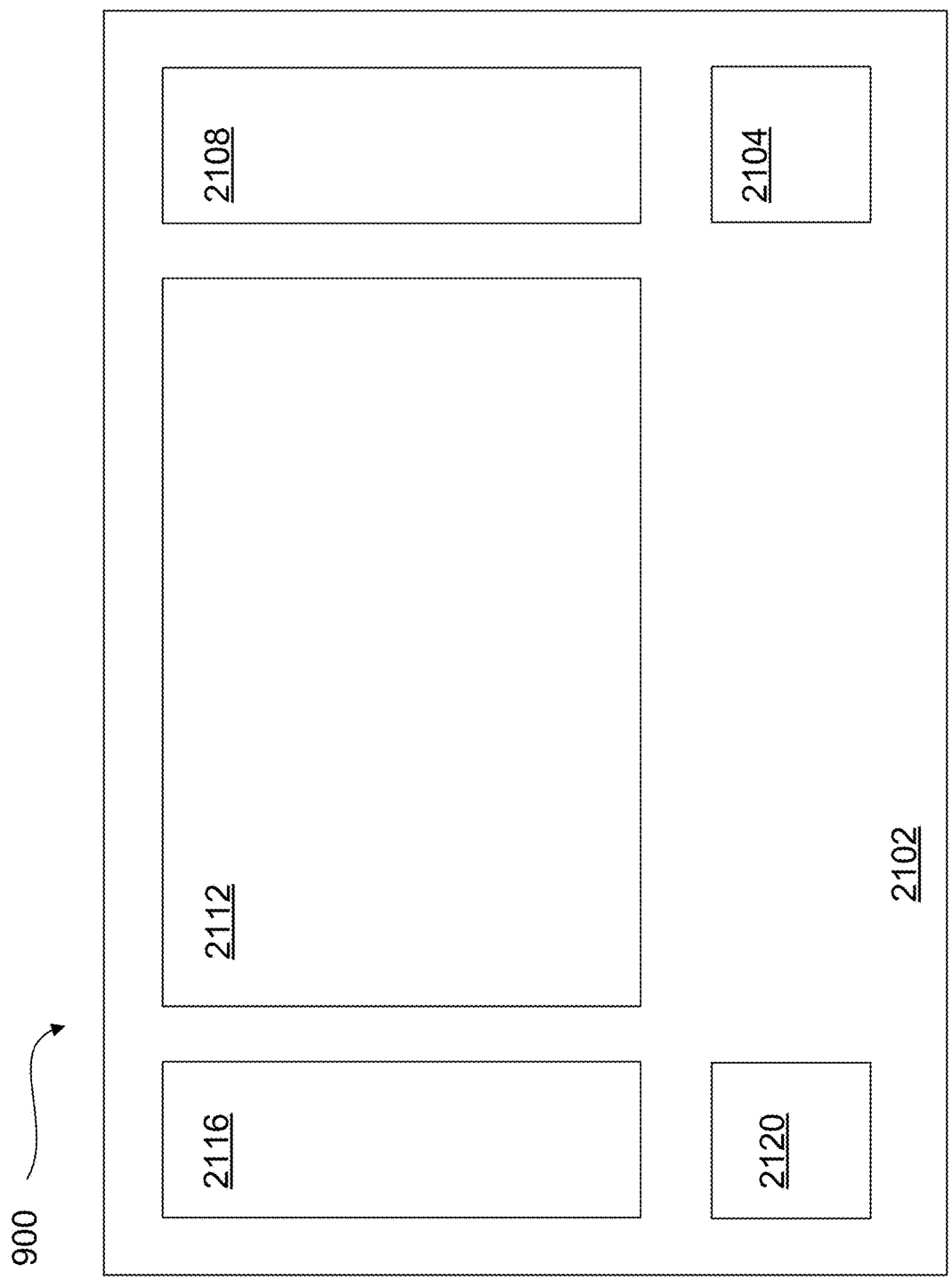
FIG. 21 shows an example eyepiece that can be used to simultaneously project light into a user's eye to provide image content thereto while receiving image data of the user's eye or of the environment in front of the user.

Similarly, as discussed above, a wide variety of configurations of the system are possible. For example, FIG. 21 shows an example eyepiece 900 that can be used to simultaneously project light into a user's eye while imaging the user's eye. The eyepiece 900 shown includes an incoupling optical element 2104, a light distributing element 2108, and a light consolidating element 2116, and an outcoupling optical element 2120 on opposite sides of a coupling optical element 2112. Each of these optical elements may be disposed within or on a waveguide 2102. The waveguide 2102 may correspond, for example, to one of the waveguides 670, 680, 690 described herein (see, e.g., FIG. 9A-9C). The incoupling optical element 2104 may correspond to one of incoupling optical elements 700, 710, 720 described herein and/or to the incoupling optical element 942 (see, e.g., FIG. 10) and may be configured to inject image content from a projector into the waveguide and/or illumination from a light source 960. The light distributing element 2108 may correspond to one of the light distributing elements 730, 740, 750 described herein (see, e.g., FIGS. 9A-9C and may be used to spread light in a given direction and redirect the light from the incoupling optical element 2104 to the coupling optical element 2112. The coupling optical element 2112 may correspond to the coupling optical element 944 described herein (see, e.g., FIG. 10). In some designs, the coupling optical element 2112 includes functionality described herein with respect to the outcoupling optical elements 800, 810, 820 (see FIGS. 9A-9C). The light consolidating element 2116 may be configured to reduce the lateral spatial extent of light received from the coupling optical element 2112 and redirect said light toward the outcoupling optical element 2120. The outcoupling optical element 2120 may correspond to the outcoupling optical element 952 described herein (see, e.g., FIG. 10).

The incoupling optical element 2104 may be disposed within or on the waveguide 2102 so as to receive light, such as from a projector (e.g., the image projector 930) and/or an illuminator (e.g., the light source 960). The light may be passed via the waveguide 2102 to the associated light distributing optical element 2108. Any of the incoupling optical element 2104, light distributed optical element 2108 or coupling optical element 2112 may be disposed on a major surface of (e.g., on a top or bottom surface) of the waveguide or within the waveguide. Similarly, any one or combination of the light consolidating element 2116, and/or the outcoupling optical element 2120 may be disposed on the major surface (e.g., a top or both major surface) of the waveguide 2102 or within the waveguide.

The coupling optical element 2112 may receive the light (e.g., via TIR) from the light distributing element 2108 and expand the light to enter the user's eye. Thus, the coupling optical element 2112 may be disposed in front of a user's eye and project image content therein. Additionally or alternatively, the coupling optical element 2112 may be configured to provide illuminating light onto and/or into the user's eye.

Light that is reflected from the eye (e.g., the illumination light from the illumination source) may be reflected and captured by the coupling optical element 2112. Thus, in some embodiments, the coupling optical element 2112 can serve to both outcouple light received from the light distributing element 2108 and incouple light received from the eye into the waveguide 2102.

In some embodiments, the coupling optical element 2112 may include one or more diffractive optical elements (DOEs) such that the coupling optical element 2112 has dual functionality. A first DOE (e.g., a grating, holographic region) may be configured to outcouple light as well and a second DOE may be configured to incouple reflected light from the eye into the waveguide 2102. In some embodiments, both the first and second DOEs are superimposed (e.g., occupy the same or approximately the same volume) within the waveguide 2102.

Alternatively, in some embodiments, the coupling optical element 2112 includes at least two DOEs that are stacked on over or in front of the other. For example, with reference to FIG. 21, the first DOE of the coupling optical element 2112 may be disposed over, whereas the second diffractive element may be disposed under the first DOE. The order of each DOE may be reversed in other implementations.

Cholesteric Liquid Crystal Mirror

Some liquid crystals are in a phase referred to as a chiral phase or a cholesteric phase. In a cholesteric phase, the liquid crystals can exhibit a twisting of the molecules along an axis perpendicular to the director, where the molecular axis is parallel to the director. As described herein, a cholesteric liquid crystal (CLC) layer comprises a plurality of liquid crystal molecules in a cholesteric phase that extend in a direction, e.g., a direction perpendicular to the director such as a layer depth direction, and that are successively rotated or twisted in a rotation direction, e.g., clockwise or counterclockwise. The directors of the liquid crystal molecules in a chiral structure can be characterized as a helix having a helical pitch (p), which corresponds to a length in the layer depth direction corresponding to a net rotation angle of the liquid crystal molecules of the chiral structures by one full rotation in the first rotation direction. In other words, the helical pitch refers to the distance over which the liquid crystal molecules undergo a full 360° twist. The liquid crystals displaying chirality can also be described as having a twist angle, or a rotation angle (4)), which can refer to, for example, the relative azimuthal angular rotation between successive liquid crystal molecules in the layer normal direction, and as having a net twist angle, or a net rotation angle, which can refer to, for example, the relative azimuthal angular rotation between an uppermost liquid crystal molecule and a lowermost liquid crystal molecule across a specified length, e.g., the length of a chiral structure or the thickness of the liquid crystal layer. As described herein, a chiral structure refers to a plurality of liquid crystal molecules in a cholesteric phase that extend in a direction, e.g., a direction perpendicular to the director such as a layer depth direction, and are successively rotated or twisted in a rotation direction, e.g., clockwise or counterclockwise. In one aspect, the directors of the liquid crystal molecules in a chiral structure can be characterized as a helix having a helical pitch.

Figure 22:
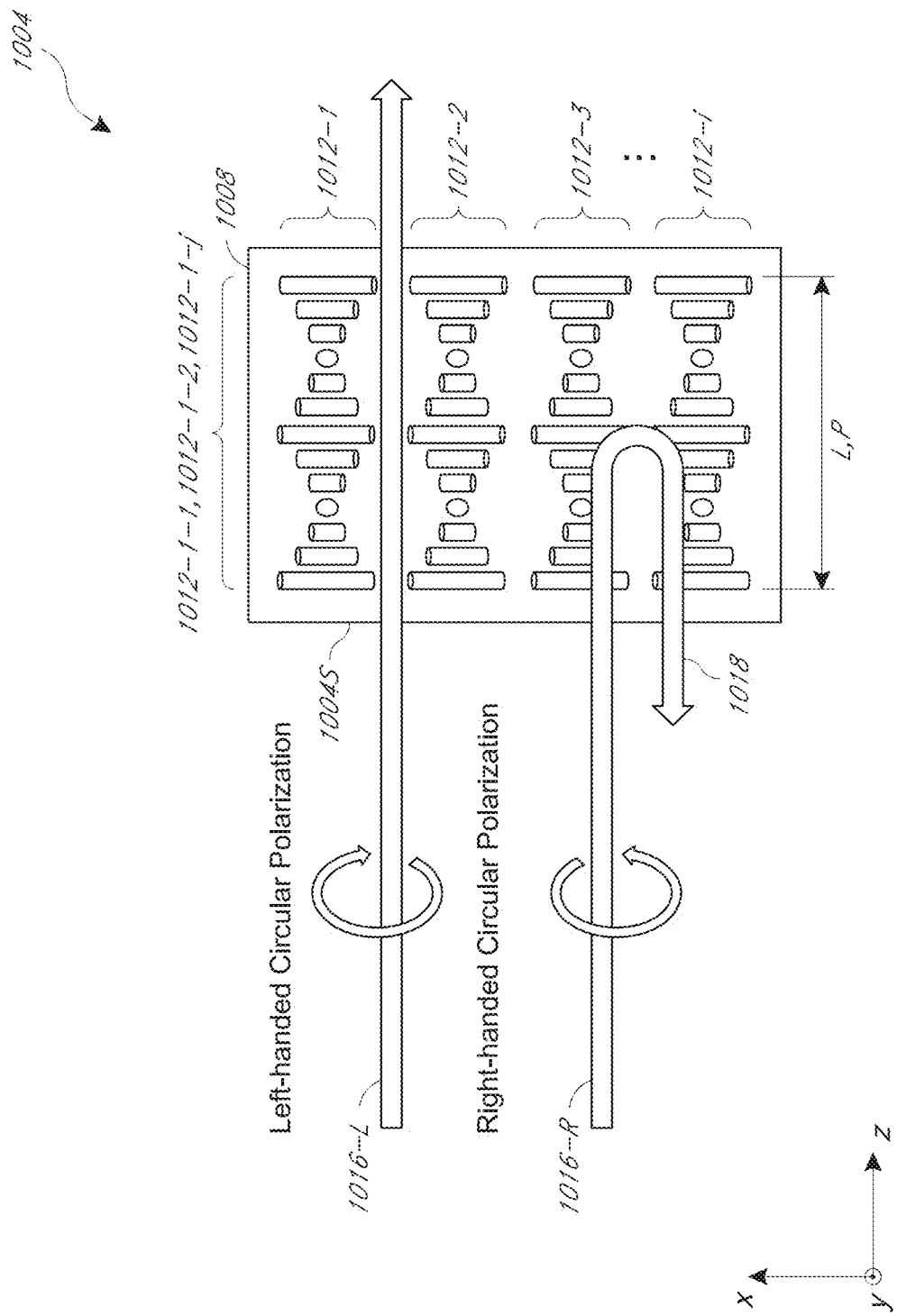
FIG. 22 illustrates a cross-sectional side view of an example of a cholesteric liquid crystal diffraction grating (CLCG) having a plurality of uniform chiral structures.

FIG. 22 illustrates a cross-sectional side view of a cholesteric liquid crystal (CLC) layer 1004 comprising a plurality of uniform chiral structures, according to embodiments. In the CLC layer 1004, the chiral structures that are adjacent in a lateral direction, e.g., x-direction, have similarly arranged liquid crystal molecules. In the illustrated embodiment, the chiral structures 1012-1, 1012-2, ... 1012-$i$ are similarly configured such that liquid crystal molecules of the different chiral structures that are at about the same depth, e.g., the liquid crystal molecules closest to the light-incident surface 1004S, have the same rotation angle, as well as successive rotation angles of successive liquid crystal molecules at about the same depth, as well as the net rotation angle of the liquid crystal molecules of each chiral structure.

The CLC 1004 comprises a CLC layer 1008 comprising liquid crystal molecules arranged as a plurality of chiral structures 1012-1, 1012-2, ... 1012-$i$, wherein each chiral structure comprises a plurality of liquid crystal molecules, where i is any suitable integer greater than 2. In operation, when incident light having a combination of light beams having left-handed circular polarization and light beams having right-handed circular polarization are incident on the surface 1004S of the CLC layer 1008, by Bragg-reflection, light with one of the circular polarization handedness is reflected by the CLC layer 1004, while light with the opposite polarization handedness is transmitted through the CLC layer 1008 without substantial interference. As described herein and throughout the disclosure, the handedness is defined as viewed in the direction of propagation. According to embodiments, when the direction of polarization, or handedness of the polarization, of the light beams 1016-L, 1016-R is matched such that it and has the same direction of rotation as the liquid crystal molecules of the chiral structures 1012-1, 1012-2, ... 1012-$i$, the incident light is reflected. As illustrated, incident on the surface 1004S are light beams 1016-L having left-handed circular polarization and light beams 1016-R having a right-handed circular polarization. In the illustrated embodiment, the liquid crystal molecules of the chiral structures 1012-1, 1012-2, ... 1012-$i$ are rotated in a clockwise direction successively in the direction in which incident light beams 1016-L, 1016-R travel, i.e., positive x-direction, which is the same rotation direction as the light teams 1016-R having right-handed circular polarization. As a result, the light beams 1016-R having right-handed circular polarization are substantially reflected, whereas the light beams 1016-L having left-handed circular polarization are substantially transmitted through the CLC layer 1004.

Figure 23:
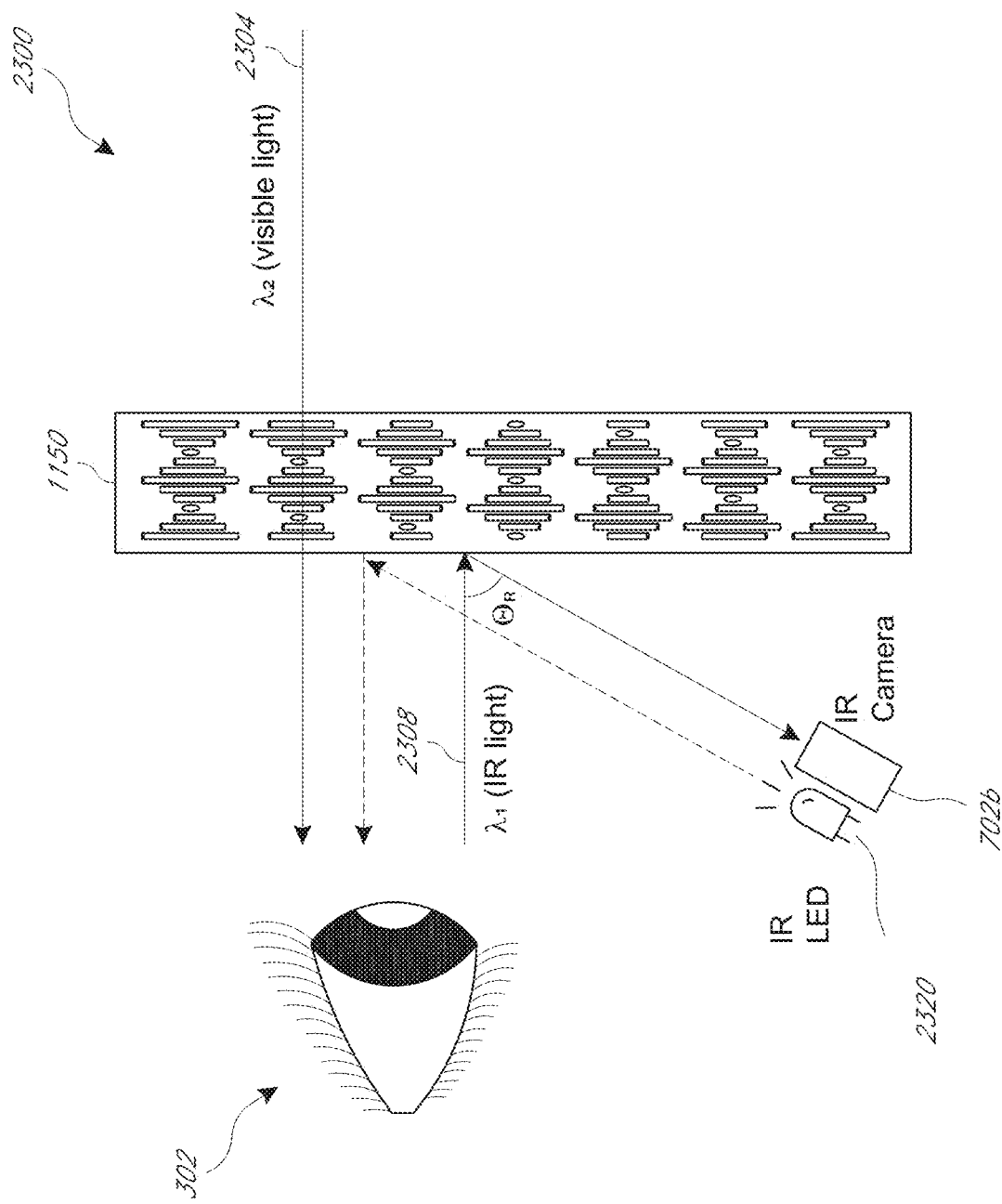
FIG. 23 illustrates an example of an imaging system comprising a forward-facing camera configured to images a wearer's eye using a cholesteric liquid crystal (CLC) off-axis mirror.

As described supra, by matching the handedness of polarization of incident elliptically or circularly polarized light with the direction of rotation as the liquid crystal molecules of the chiral structures of a CLC layer, the CLC layer can be configured as a Bragg reflector. Furthermore, one or more CLC layers having different helical pitches can be configured as a wave-length selective Bragg reflector with high bandwidth. Based on the concepts described herein with respect to various embodiments, the CLC layers can be configured as an off-axis or on-axis mirror configured to selectively reflect a first range of wavelengths, for example, infrared wavelengths (e.g., the near infrared), while transmitting another range of wavelengths, e.g., visible wavelengths. In some embodiments, one or more of the retinal imaging techniques described above with reference to FIGS. 13A-13B may be performed by utilizing one or more of the off-axis mirror (OAM) configurations described below with reference to FIGS. 23-24H FIG. 23 illustrates an example of an eye-tracking system 2300 employing a cholesteric liquid crystal reflector (CLCR), e.g., a wavelength-selective CLCR 1150 configured to image an eye 302 of a viewer, according to various embodiments. Unlike the CLC layer 1004 described above with respect to FIG. 22, the chiral structures in the wavelength-selective CLCR 1150 that are adjacent in a lateral direction, e.g., x-direction, have differently arranged liquid crystal molecules. That is, the chiral structures are configured such that liquid crystal molecules of the different chiral structures that are at about the same depth, e.g., the liquid crystal molecules closest to the light-incident surface 1004S, have different rotation angle. As a result, light incident on the CLCR 1150 is reflected at an angle (OR) relative to the layer depth direction, as described further below in the context of the eye-tracking system 2300.

Eye tracking can be a useful feature in interactive vision or control systems including wearable display systems described elsewhere in the specification, for virtual/augmented/mixed reality display applications, among other applications. To achieve effective eye tracking, it may desirable to obtain images of the eye 302 at low perspective angles, for which it may in turn be desirable to dispose an eye-tracking camera 702b near a central position of viewer's eyes. However, such position of the camera 702b may interfere with user's view. Alternatively, the eye-tracking camera 702b may be disposed to a lower position or a side. However, such position of the camera may increase the difficulty of obtaining robust and accurate eye tracking since the eye images are captured at a steeper angle. By configuring the CLCR 1150 to selectively reflect infrared (IR) light 2308 (e.g., having a wavelength of 850 nm) from the eye 302 while transmitting visible light 2304 from the world, the camera 702b can be placed away from the user's view while capturing eye images at normal or low perspective angles. Such configuration does not interfere with user's view since visible light is not reflected. The same CLCR 1150 can also be configured as an IR illumination source 2320 by reflecting IR light from an IR source, e.g., IR LED, into the eye 302, as illustrated. A low perspective angle of IR illuminator can results in less occlusions, e.g., from eye lashes, which configuration allows more robust detection of specular reflections, which can be useful feature in modern eye-tracking systems.

Still referring to FIG. 23, according to various embodiments, the CLCR 1150 comprises one or more cholesteric liquid crystal (CLC) layers each comprising a plurality of chiral structures, wherein each chiral structure comprises a plurality of liquid crystal molecules that extend in a layer depth direction (e.g., z-direction) and are successively rotated in a first rotation direction, as described supra. The arrangements of the liquid crystal molecules of the chiral structures vary periodically in a lateral direction perpendicular to the layer depth direction such that the one or more CLC layers are configured to substantially Bragg-reflect a first incident light having a first wavelength ($\lambda_1$) while substantially transmitting a second incident light having a second wavelength ($\lambda_2$). As described above, each of the one or more CLC layers are configured to substantially Bragg-reflect elliptically or circularly polarized first and second incident light having a handedness of polarization that is matched to the first rotation direction, when viewed in the layer depth direction, while being configured to substantially transmit elliptically or circularly polarized first and second incident light having a handedness of polarization that is opposite to the first rotation direction, when viewed in the layer depth direction. According embodiments, the arrangements of the liquid crystal molecules varying periodically in the lateral direction are arranged to have a period in the lateral direction such that a ratio between the first wavelength and the period is between about 0.5 and about 2.0. According to embodiments, the first wavelength is in the near infrared range between about 600 nm and about 1.4 µm, for instance about 850 nm and the second wavelength in is in the visible range having one or more colors as described elsewhere in the specification. According to various embodiments, the liquid crystal molecules of the chiral structures are pre-tilted relative to a direction normal to the layer depth direction. As configured, the one or more CLC layers are configured such that the first incident light is reflected at an angle ($\theta_R$) relative to the layer depth direction (z-direction) exceeding about 50°, about 60°, about 70° or about 80° degrees relative to the layer depth direction.

Thus configured, the wavelength-selective CLCR 1150 comprises one or more cholesteric liquid crystal (CLC) layers each comprising a plurality of liquid crystal molecules that extend in a layer depth direction and are successively rotated in a first rotation direction, wherein arrangements of the liquid crystal molecules of the chiral structures vary periodically in a lateral direction perpendicular to the layer depth direction such that the one or more CLC layers are configured to substantially Bragg-reflect a first incident light having a first wavelength, e.g., an IR wavelength, while substantially transmitting a second incident light having a second wavelength, e.g., a visible wavelength.

Similar liquid crystal layers and structures may be used for the reflector 996 and coating 998 described above in connection with FIGS. 17-20E. The coating 998 may for example comprise a liquid crystal coating and may be wavelength and/or polarization selective in certain implementations. Other types of coatings 998 and reflectors 996, however, may be employed.

Off-Axis Imaging

As discussed above, eye tracking can be a beneficial feature in interactive vision or control systems including wearable displays, e.g., the systems 700 described in FIGS. 24A-24H below, for virtual/augmented/mixed reality display applications, among other applications. To achieve good eye tracking, it may desirable to obtain images of the eye 302 at low perspective angles, for which it may in turn be desirable to dispose an eye-tracking camera 702b near a central position of viewer's eyes. However, such position of the camera 702b may interfere with user's view. Alternatively, the eye-tracking camera 702b may be disposed to a lower position or a side. However, such position of the camera may increase the difficulty of obtaining robust and accurate eye tracking since the eye images are captured at a steeper angle. By configuring the reflector (e.g. CLCR 1150) to selectively reflect infrared (IR) light 2308 (e.g., having a wavelength of 850 nm) from the eye 302 while transmitting visible light 2304 from the world (e.g., as shown in FIG. 6), the camera 702b can be placed away from the user's view while capturing eye images at normal or low perspective angles. Such configuration does not interfere with user's view since visible light is not reflected.

Figure 24A:
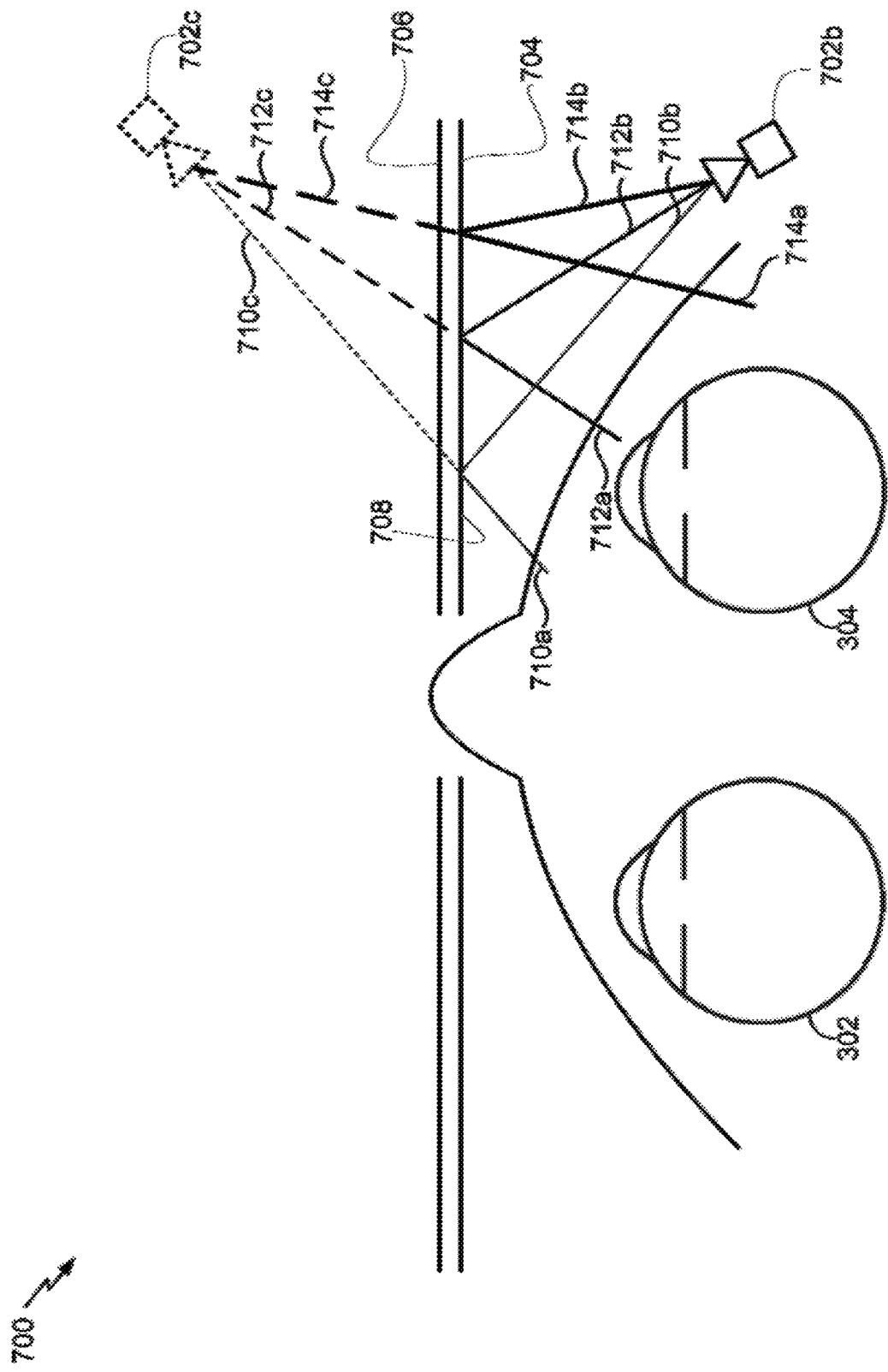
FIGS. 24A-24F illustrate examples of imaging systems comprising a forward-facing camera configured to images a wearer's eye using a CLC off-axis mirror.

FIG. 24A schematically illustrates an example of an imaging system 700 that comprises an imager 702b which is used to view the eye 304, and which is mounted in proximity to the wearer's temple (e.g., on a frame 64 of the wearable display system 200, FIG. 2, for example, an ear stem or temple). In other embodiments, a second imager is used for the wearer's other eye 302 so that each eye is separately imaged. The imager 702b can include an infrared digital camera that is sensitive to infrared radiation. The imager 702b is mounted so that it is facing forward (in the direction of the wearer's vision), rather than facing backward and directed at the eye 304 (as with the camera 500 shown in FIG. 6). By disposing the imager 702b nearer the ear of the wearer, the weight of the imager 702b is also nearer the ear, and the HMD may be easier to wear as compared to an HMD where the imager is backward facing and disposed nearer to the front of the HMD (e.g., close to the display 70, FIG. 2). Additionally, by placing the forward-facing imager 702b near the wearer's temple, the distance from the wearer's eye 304 to the imager is roughly twice as large as compared to a backward-facing imager disposed near the front of the HMD (e.g., compare with the camera 500 shown in FIG. 4). Since the depth of field of an image is roughly proportional to this distance, the depth of field for the forward-facing imager 702b is roughly twice as large as compared to a backward-facing imager. A larger depth of field for the imager 702b can be advantageous for imaging the eye region of wearers having large or protruding noses, brow ridges, etc.

The imager 702b is positioned to view an inside surface 704 of an otherwise transparent optical element 706. The optical element 706 can be a portion of the display 708 of an HMD (or a lens in a pair of eyeglasses). The optical element 706 can be transmissive to at least 10%, 20%, 30%, 40%, 50%, 60%, 70%, 80%, 90%, 95% or more of visible light incident on the optical element or any range between any of these values. In other implementations, the optical element 706 need not be transparent (e.g., in a virtual reality display). The optical element 706 can comprise a CLC off-axis mirror 708. The CLC off-axis mirror 708 can be a surface reflecting a first range of wavelengths while being substantially transmissive to a second range of wavelengths (that is different from the first range of wavelengths). The first range of wavelengths can, for example, be in the infrared, and the second range of wavelengths can be in the visible. For example, the CLC off-axis mirror 708 can comprise a hot mirror, which reflects infrared light while transmitting visible light. In such designs, infrared light 710a, 712a, 714a from the wearer propagates to and reflects from the optical element 706, resulting in reflected infrared light 710b, 712b, 714b which can be imaged by the imager 702b. In some implementations, the imager 702b can be sensitive to or able to capture at least a subset (such as a non-empty subset and/or a subset of less than all) of the first range of wavelengths reflected by the CLC off-axis mirror 708. For example, the CLC off-axis mirror 708 may reflect infrared light in the range of 700 nm to 1.5 μm, and the imager 702b may be sensitive to or able to capture near infrared light at wavelengths from 700 nm to 900 nm. As another example, the CLC off-axis mirror 708 may reflect infrared light in the a range of 700 nm to 1.5 μm, and the imager 702b may include a filter that filters out infrared light in the range of 900 nm to 1.5 μm such that the imager 702b can capture near infrared light at wavelengths from 700 nm to 900 nm.

Visible light from the outside world (1144, FIG. 6) is transmitted through the optical element 706 and can be perceived by the wearer. In effect, the imaging system 700 shown in FIG. 24A acts as if there were a virtual imager 702c directed back toward the wearer's eye 304. The virtual imager 702c can image virtual infrared light 710c, 712c, 714c (shown as dotted lines) propagated from the wearer's eye 304 through the optical element 706. Although the hot mirror (or other DOE described herein) can be disposed on the inside surface 704 of the optical element 706, this is not a limitation. In other configurations, the hot mirror or DOE can be disposed on an outside surface of the optical element 706 or within the optical element 706 (e.g., a volume HOE).

Figure 24B:
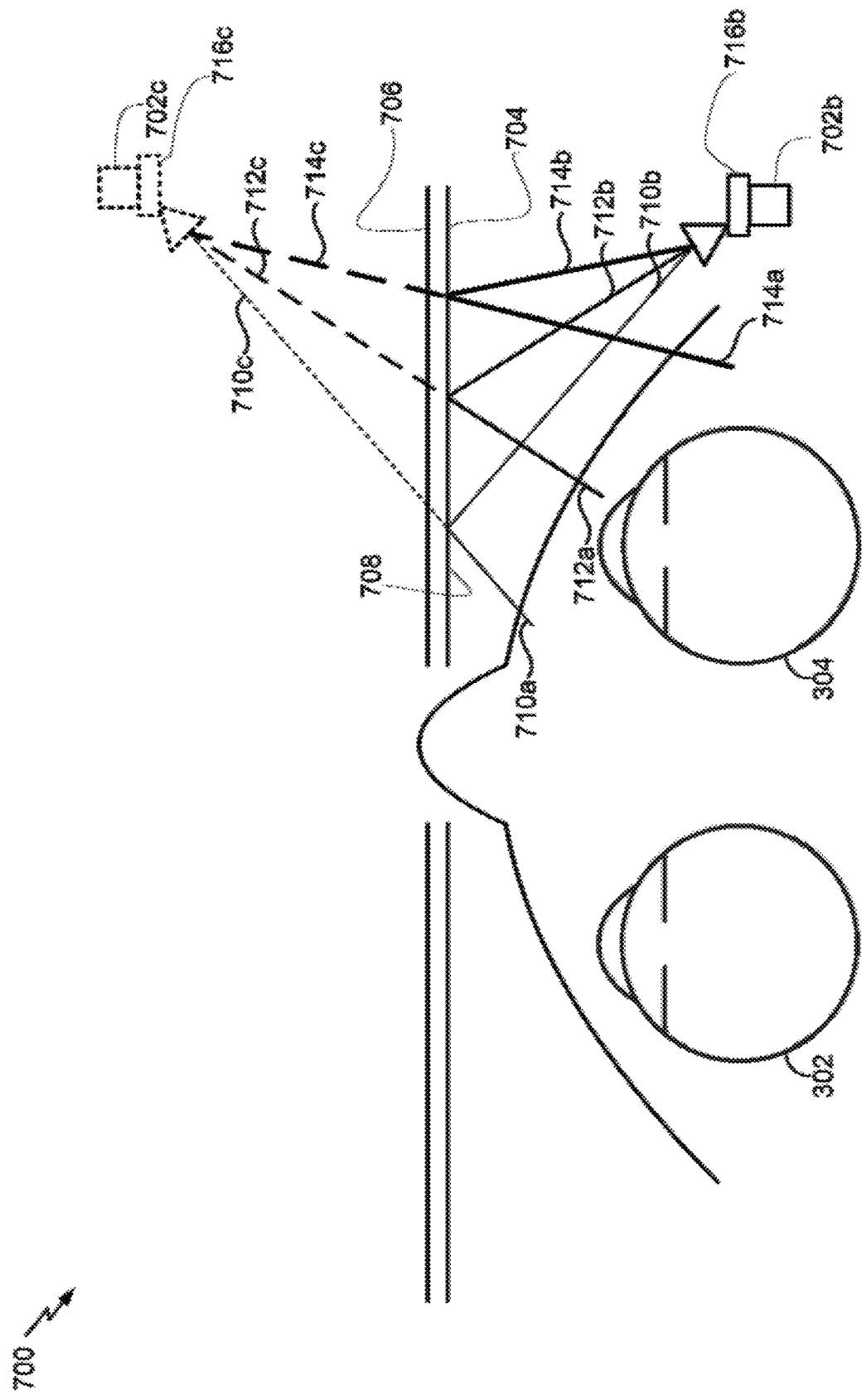

FIG. 24B schematically illustrates another example of the imaging system 700. In this design, perspective distortions may be reduced or eliminated by the use of a perspective control lens assembly 716b (e.g., a shift lens assembly, a tilt lens assembly, or a tilt-shift lens assembly) with the imager 702b. In some implementations, the perspective control lens assembly 716b may be part of the lens of the imager 702b. The perspective control lens 716b can be configured such that a normal to the imager 702b is substantially parallel to a normal to the region of the surface 704 that includes the DOE (or HOE) or hot mirror. In effect, the imaging system 700 shown in FIG. 24B acts as if there were a virtual imager 702c with a virtual perspective control lens assembly 716c directed back toward the wearer's eye 304.

Figure 24C:
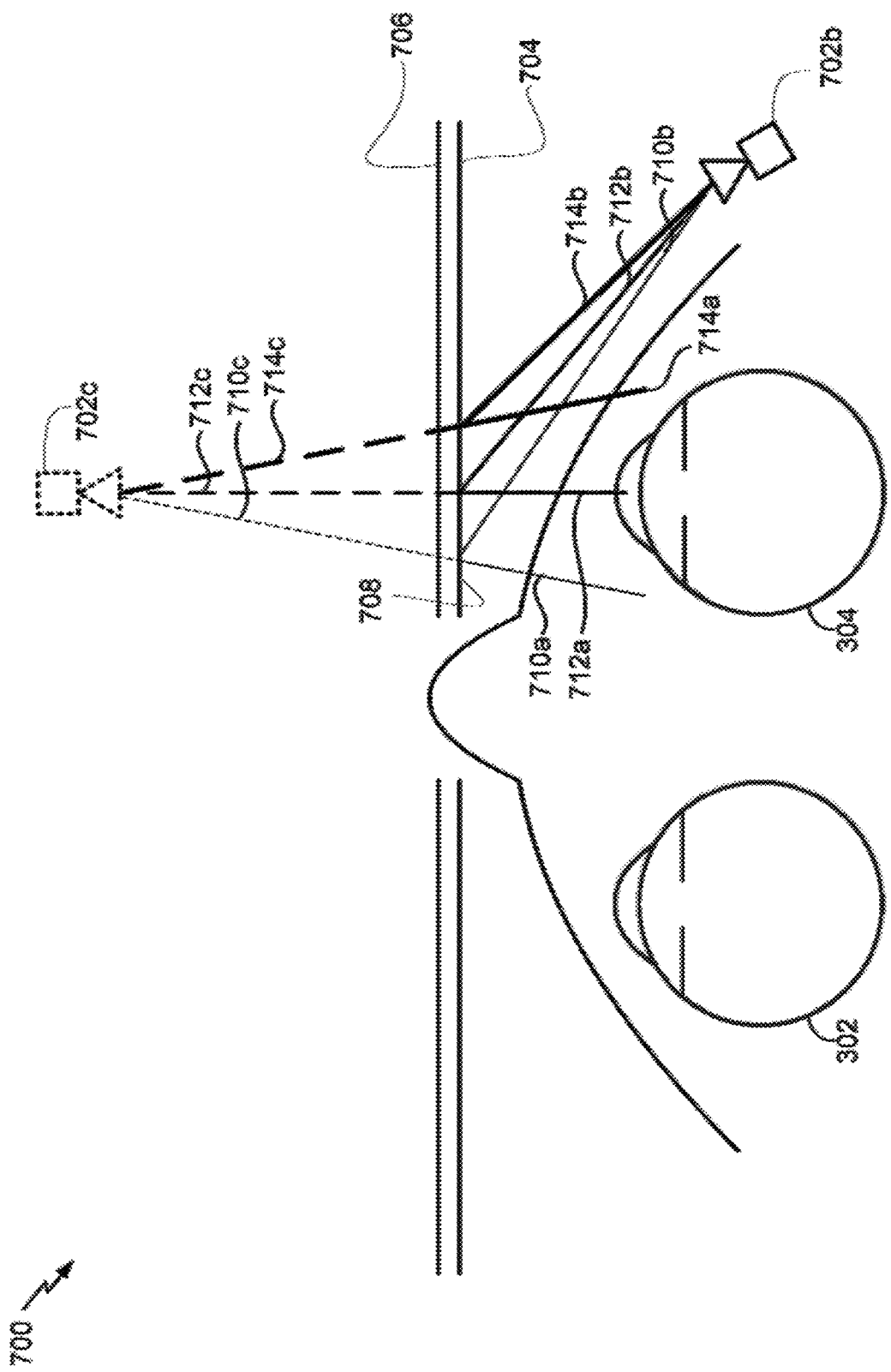
Figure 24D:
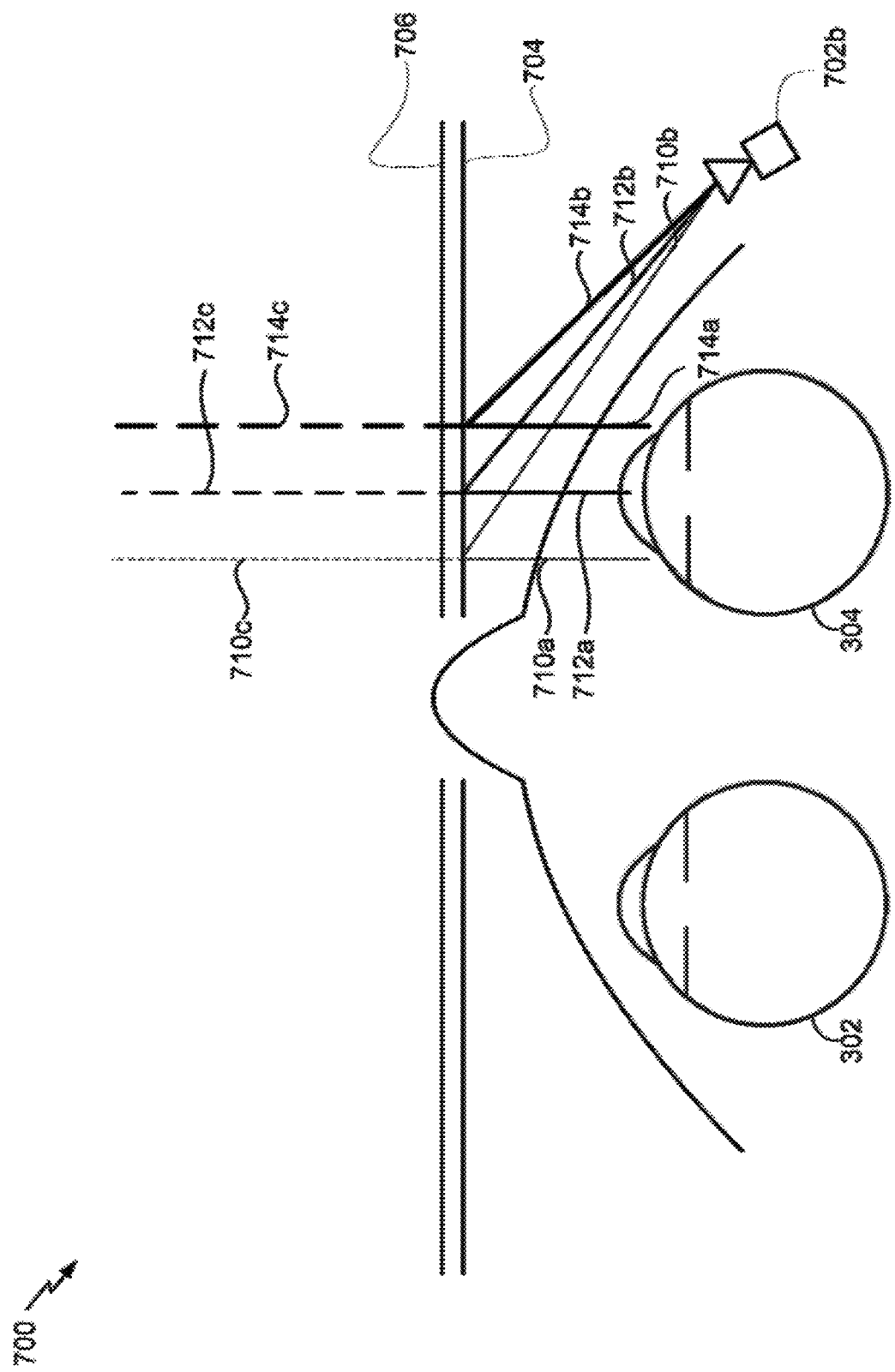

Additionally or alternatively, as schematically shown in FIG. 24C, the CLC off-axis mirror 708 of the optical element 706 may have, on its surface 704, an off axis holographic mirror (OAHM), which is used to reflect light 710a, 712a, 714a to facilitate viewing of the eye 304 by the camera imager 702b which captures reflected light 710b, 712b, 714b. Instead of reflecting light such that the angle of incidence is equal to the angle of reflection, the off-axis mirror may reflect light at an angle other than an angle equal to the angle of incidence. This property, which is illustrated in FIG. 24C may be provided by a diffractive optical element (DOE) or a holographic optical element (HOE). The diffractive optical element or holographic optical element may be configured to receive light from the eye, potentially at a smaller angle with respect to the normal to the DOE or HOE and diffract at least a portion of the light at a different angle, e.g., at a larger angle with respect to the normal to the DOE or HOE, to the camera. The diffractive optical element or holographic optical element may therefore include tilt. (These reflective elements may comprise diffractive optical element (DOE) or holographic optical elements (HOE) with different amounts of tilt programmed into the DOE or HOE. In such cases, the tilt refers to deflection of the beam as a result of diffraction. Diffractive or holographic features such as lines of a grating are configured, e.g., shaped and spaced with respect to each other, to redirect light incident thereon at an angle akin to the tilting of a beam. This tilt need not be produced by a tilted surface but may be produce interferometrically and/or via diffraction.) In various implements, the diffractive optical element or holographic optical element may include optical power. As illustrated in FIG. 24D, light rays incident on the mirror 708 are collimated but when reflected/diffracted, the rays are converging as a result of the optical power incorporated in the diffractive or holographic mirrors. Accordingly, the OAHM 708 may have optical power and in some implementations may comprise an off-axis volumetric diffractive optical element (OAVDOE), as schematically shown in FIG. 24D. In the example shown in FIG. 24D, the effective location of the virtual camera 702c is at infinity (and is not shown in FIG. 24D) as a result of the optical power of the diffractive or holographic mirror. An infinity focused camera can have an advantage when imaging the eye of imaging the retina via the natural lens of the eye while providing reduced imaging of other features of the eye such as eyelashes which can interfere with image processing.

Figure 24E:
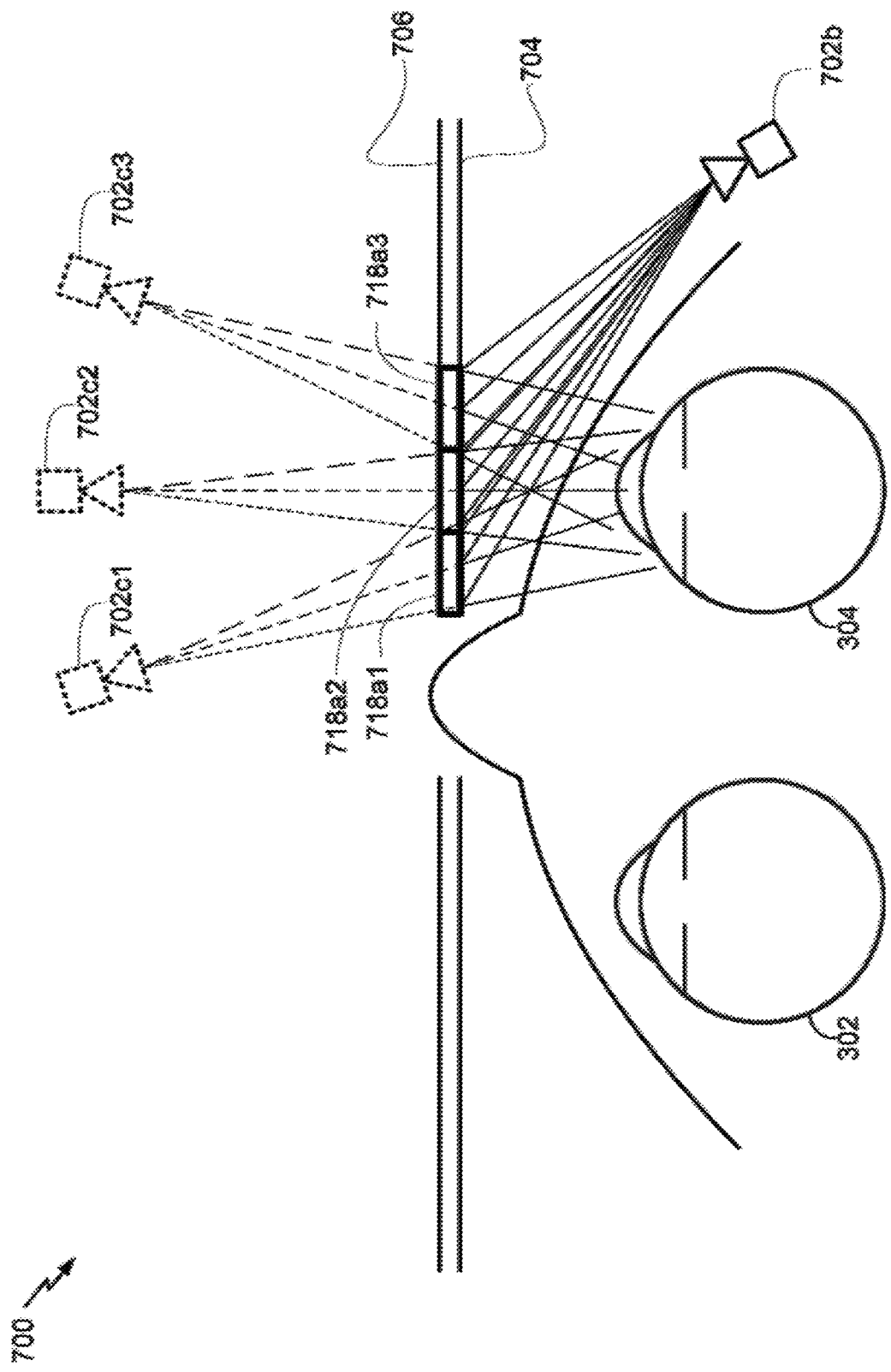

In some implementations, the HOE (e.g., the OAHM or OAVDOE) can be divided into a plurality of segments. Different segments, possibly each of the segments, can have different optical properties or characteristics, including, for example, reflection angles at which the segments reflect the incoming (infrared) light (which may be referred to as tilt) and/or optical power. (As discussed above, these reflective elements may comprise diffractive optical element (DOE) or holographic optical elements (HOE) with different amounts of tilt programmed into the DOE or HOE. In such cases, the tilt refers to deflection of the beam as a result of diffraction. Diffractive or holographic features such as lines of a grating are configured, e.g., shaped and spaced with respect to each other, to redirect light incident thereon at an angle akin to the tilting of a beam. This tilt need not be produced by a tilted surface but may be produce interferometrically and/or via diffraction.) Different amounts of tilt included in the different segments of the diffractive or holographic optical element can cause the light incident on the different segments to be diffracted different amounts. The segments can be configured so that light is reflected from different segments, e.g., each segment, toward the imager 702b. As a result of different amounts of tilt programmed into different segments, the image acquired by the imager 702b will also be divided into a corresponding number of segments as are different segments or types of segments, which can, for example, effectively provide a view the eye from a different angle. FIG. 24E schematically illustrates an example of the display system 700 having an OAHM with three segments 718a1, 718a2, 718a3, each of which acts as a respective virtual camera 702c1, 702c2, 702c3 imaging the eye 304 at a different angular location. The three different segments diffract and deflect or reflect light different amounts providing different perspective of the eye possibly also providing images of different portions of the retina.

Figure 24F:
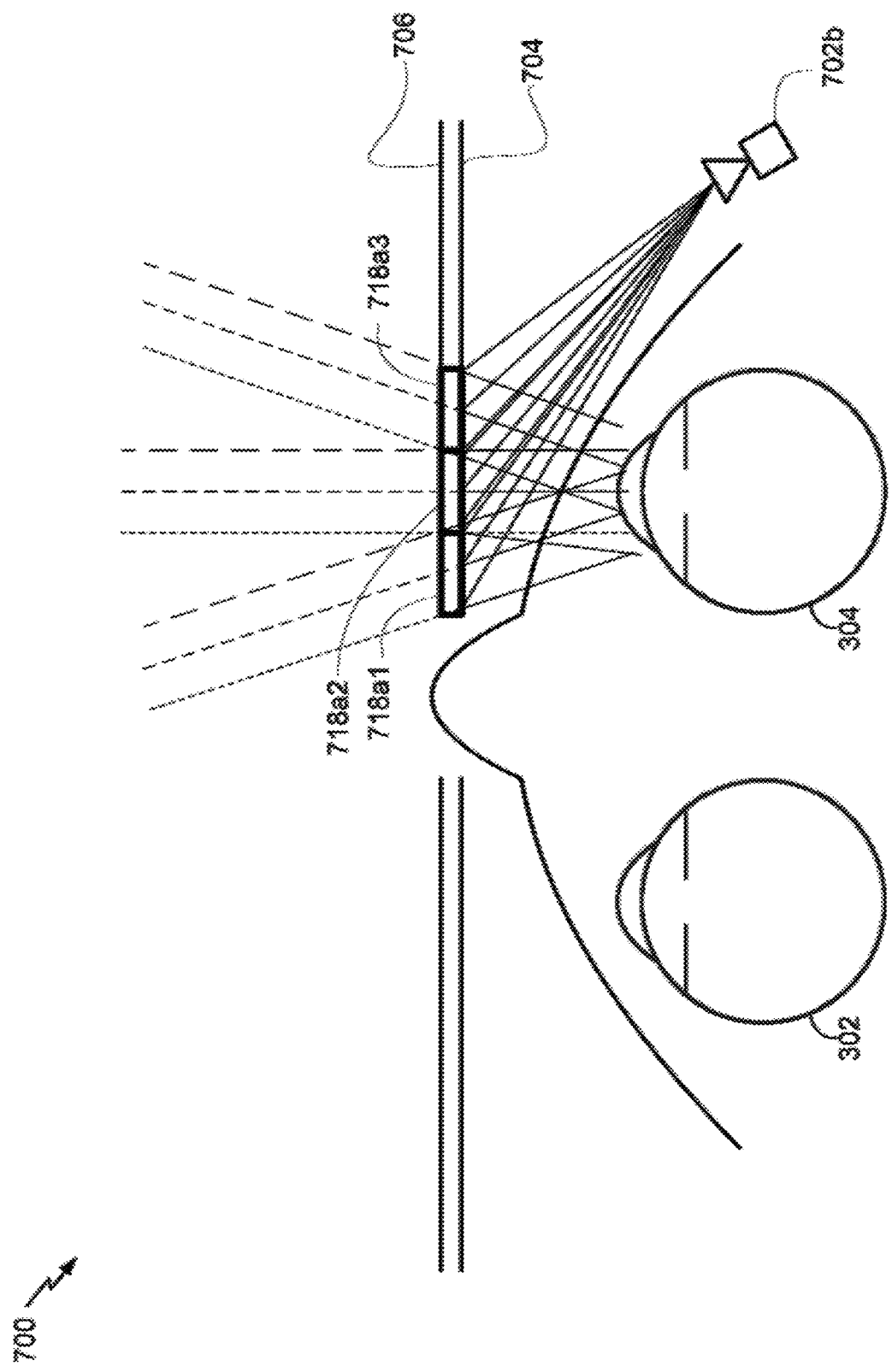

FIG. 24F schematically illustrates another example of the display system 700 having an OAHM with three segments 718a1, 718a2, 718a3, each also having optical power and different amounts of tilt (e.g., a segmented OAVDOE), with each segment thereby generating a virtual camera at infinity imaging the eye 304 at a different angular location. Although three segments are schematically illustrated in FIGS. 24E and 24F, this is for illustration and not limitation. In other designs, two, four, five, six, seven, eight, nine, or more segments, or any range between any of these values, can be utilized. None, some, or all of these segments of the HOE can have optical power.

Figure 24G:
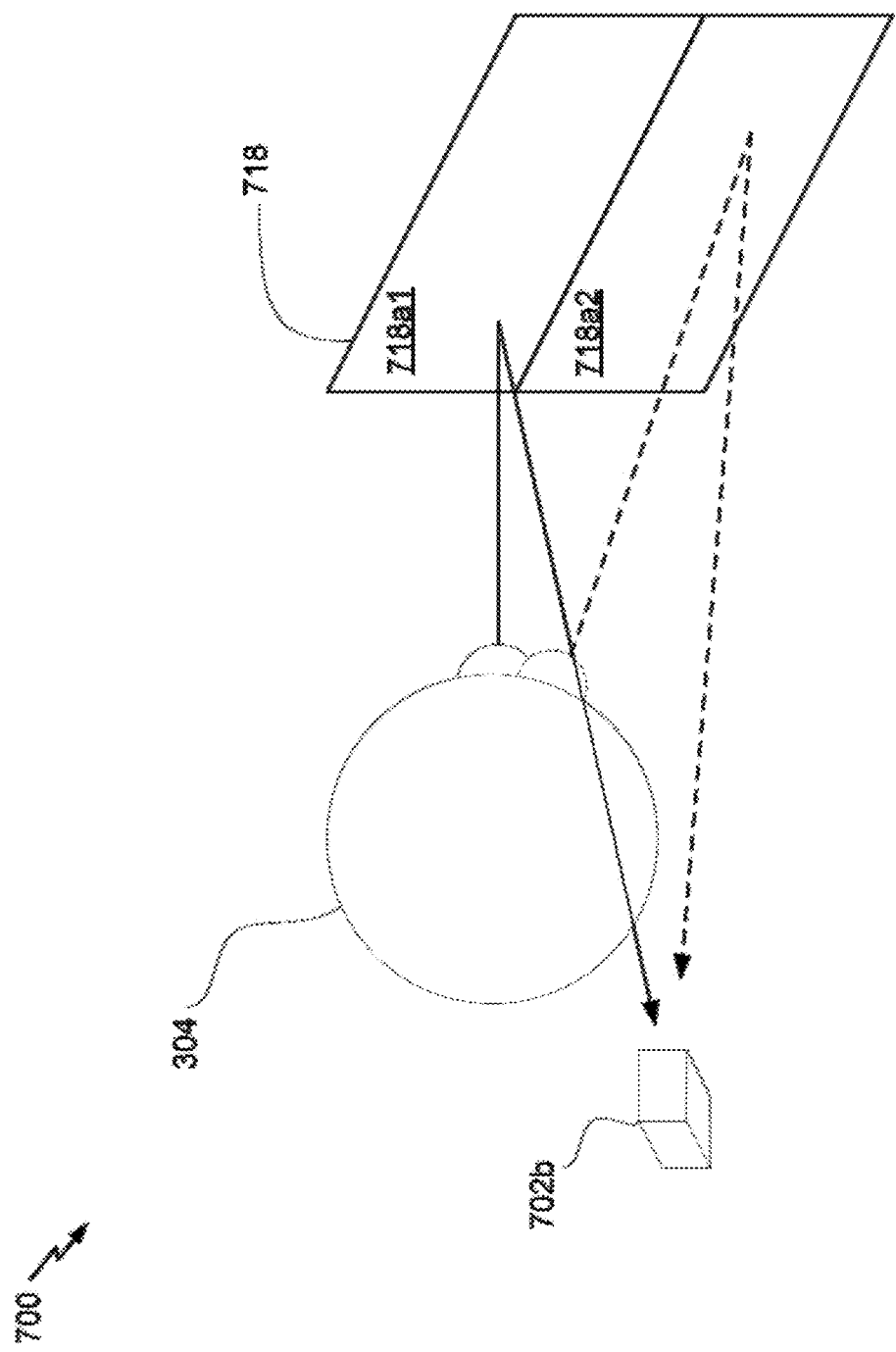
FIGS. 24G and 24H illustrate examples of imaging systems comprising a forward-facing camera configured to images a wearer's eye using a diffractive optical element comprising a plurality of segments including one more CLC off-axis mirrors, where each of the segments can have different optical properties.
Figure 24H:
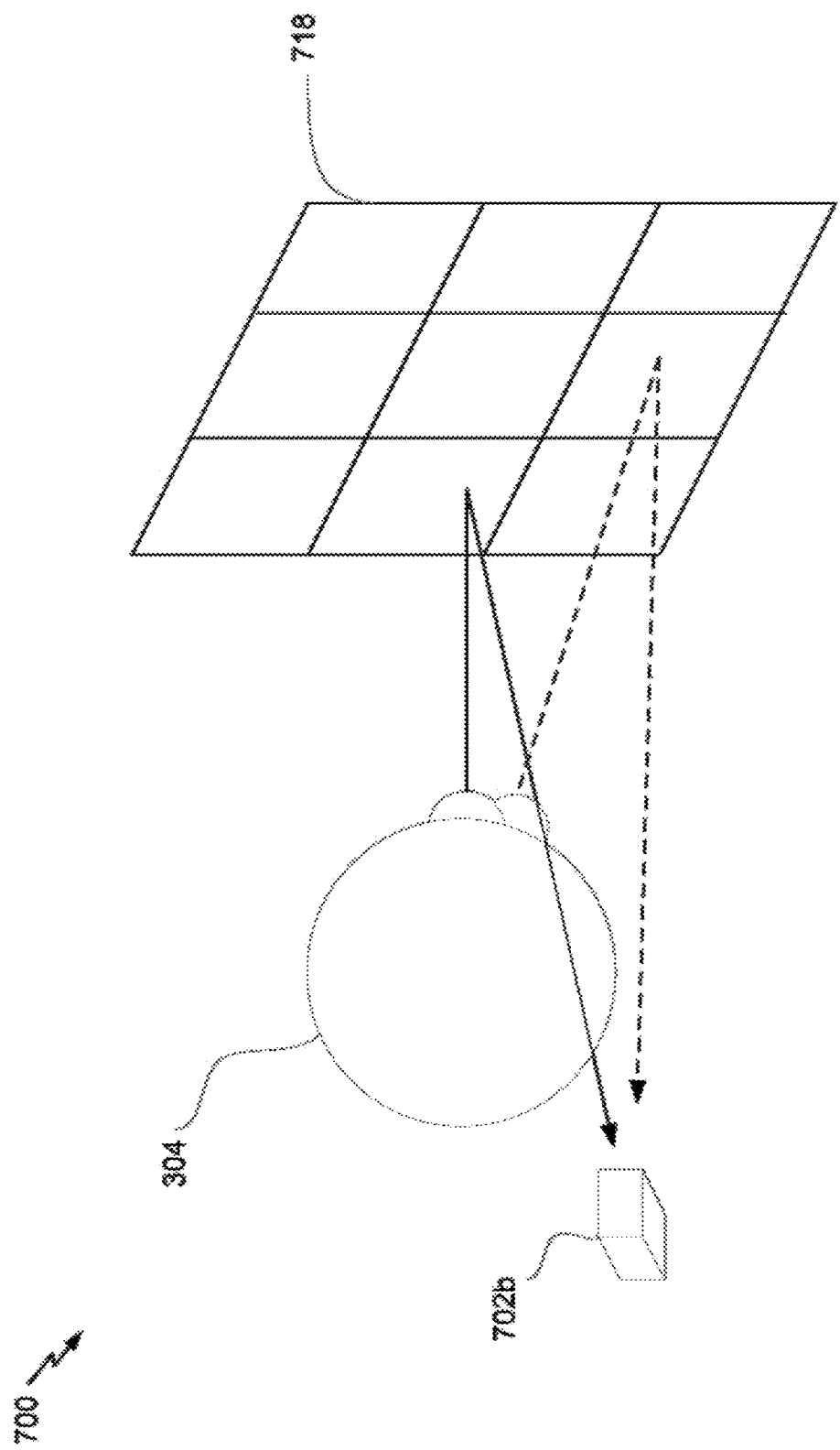

The three segments 718a1, 718a2, 718a3 are shown as spaced horizontally across the optical element 706 in FIGS. 24E and 24F. In other designs, the segments can be spaced vertically on the optical element 706. For example, FIG. 24G schematically shows a DOE 718 having two vertically spaced segments 718a1 and 718a2, with the segment 718a1 comprising a CLC off-axis mirror configured to reflect light back toward the imager 702b (which may be in the same general horizontal plane as the segment 718a1), and the segment 718a2 configured to reflect light upwards toward the imager 702b. Similar to bifocal lenses, the arrangement shown in FIG. 24G can be advantageous in allowing the imaging system 700 to use reflection imagery acquired by the imager 702b from the upper segment 718a1 when the wearer is looking forward through the upper portion of the HMD (schematically shown via the solid arrowed line) and to use reflection imagery from the lower segment 718a2 when the wearer is looking downward through the lower portion of the HMD (schematically shown via the dashed arrowed line).

A mix of horizontally spaced and vertically spaced segments can be used in other designs. For example, FIG. 24H shows another example of the HOE 718 with a 3×3 array of segments each comprising a CLC off-axis mirror. The imager 702b can acquire reflection data from each of these nine segments, which represent light rays coming from different areas of and angular directions from the eye region. Two example light rays propagating from the eye region to the HOE 718 and reflecting back to the imager 702b are shown as solid and dashed lines. The imaging system 700 (or processing module 224 or 228) can analyze the reflection data from the plurality of segments to multiscopically calculate the three-dimensional shape of the eye or the gaze direction (e.g., eye pose) of the eye.

Implementations of the optical system 700 utilizing segments may have multiple benefits. For example, the segments can be used individually, by selecting the particular segments which best suit a particular task, or they can be used collectively to multiscopically estimate the three-dimensional shape or pose of the eye. In the former case, this selectivity can be used to, for example, select the image of the wearer's iris which has the least occlusion by eyelids or eyelashes. In the latter case, the three dimensional reconstruction of the eye can be used to estimate orientation (by estimation of, for example, the location of the bulge of the cornea) or accommodation state (by estimation of, for example, the lens induced distortion on the apparent location of the pupil). Although described primarily with reference to liquid crystal polarization gratings (LCPGs), in some implementations, one or more of off-axis reflectors 1150, 708 as described above with reference to FIGS. 23-24H may take the form of other types of diffractive optical element/holographic optical element. Volume Phase Holographic gratings and/or Blazed gratings or other type of diffractive optical elements or holographic optical elements can be used and need not be limited to structures comprising liquid crystal. As mentioned above, in some designs, one or more of the retinal imaging techniques described above with reference to FIGS. 13A-13B may be performed by utilizing one or more of the off-axis mirror (OAM) configurations described above with reference to FIGS. 23-24H. Additional details are disclosed in U.S. patent application Ser. No. 15/271,802, filed on Sep. 21, 2016, entitled "EYE IMAGING WITH AN OFF-AXIS IMAGER", now U.S. Pat. No. 10,466,478, issued on Nov. 5, 2019 and U.S. patent application Ser. No. 15/902,927, filed on Feb. 22, 2018, entitled "VARIABLE-FOCUS VIRTUAL IMAGE DEVICES BASED ON POLARIZATION CONVERSION," each of which is hereby incorporated by reference herein in its entirety.

Various implementations described herein can be used to reduce chromatic aberrations and/or increase a field of view of one or more cameras or imagers. As discussed above, the camera or imager may be off to the side and may possibly be forward-facing (although may be rearward facing, e.g., in the case where an additional reflector is used). As noted above, the camera may be disposed off to the side of the wearer's face (temporally) and may be mounted near a temple or an ear of the user (e.g., behind the eye) to image the eye. The camera may for, example, be disposed on a temple or ear stem of the eyewear. The camera may be pointed more in the forward direction than in the rearward direction. The camera may be pointed more towards a front view of the wearer than rearward to the wearer and/or to a rearward view of the wearer. However, as referred to above, the camera may face more rearward, for example, if an additional reflector is used. Other configurations are possible.

The camera can be configured to image the eye, for example, the pupil, iris or glints on the eye and/or the retina of the user's eye. Light may be reflected off a reflective element from the eye to the camera. The reflective element may be disposed on (e.g., overlaid on) the eyepiece of the head-mounted display system. As discussed above, the eyepiece may be transparent such that the wearer may see through the eyepiece to the environment in front of the user. The eyepiece, however, may include a reflective element or surface. The reflective element may comprise a diffractive optical element such as a diffraction grating or a holographical optical element. The reflective element may comprise, for example, a liquid crystal diffractive optical element such as a cholesteric liquid crystal diffractive optical element and/or a liquid crystal polarization grating although the diffractive or holographic optical element need not be liquid crystal based and need not comprise liquid crystal. The reflective element may be a surface or volume diffractive optical element and may comprise a blazed grating in some implementations. Optical properties may be programmed into the diffractive or holographical element such as optical power or tilt. The reflective optical element may comprise an off-axis reflective optical element or off-axis mirror (OAM). Light from the eye may be received by the reflective element, reflected therefrom, for example, away from an optical axis of the reflective element toward to a temporally located camera in some implementations. The angle of incidence need not equal the angle of reflection as the diffractive or holographic optical element. As discussed above the diffractive optical element and/or holographic optical element may be diffracted the light angles larger or smaller than the incident angle.

As referred to above, in some implementations, the reflective element or surface can include optical power. This optical power may be positive optical power in some cases. Optical power in the reflective element or off-axis mirror may increase the field-of-view of the camera and possible enable a larger region of the retina to be imaged.

Figure 25A:
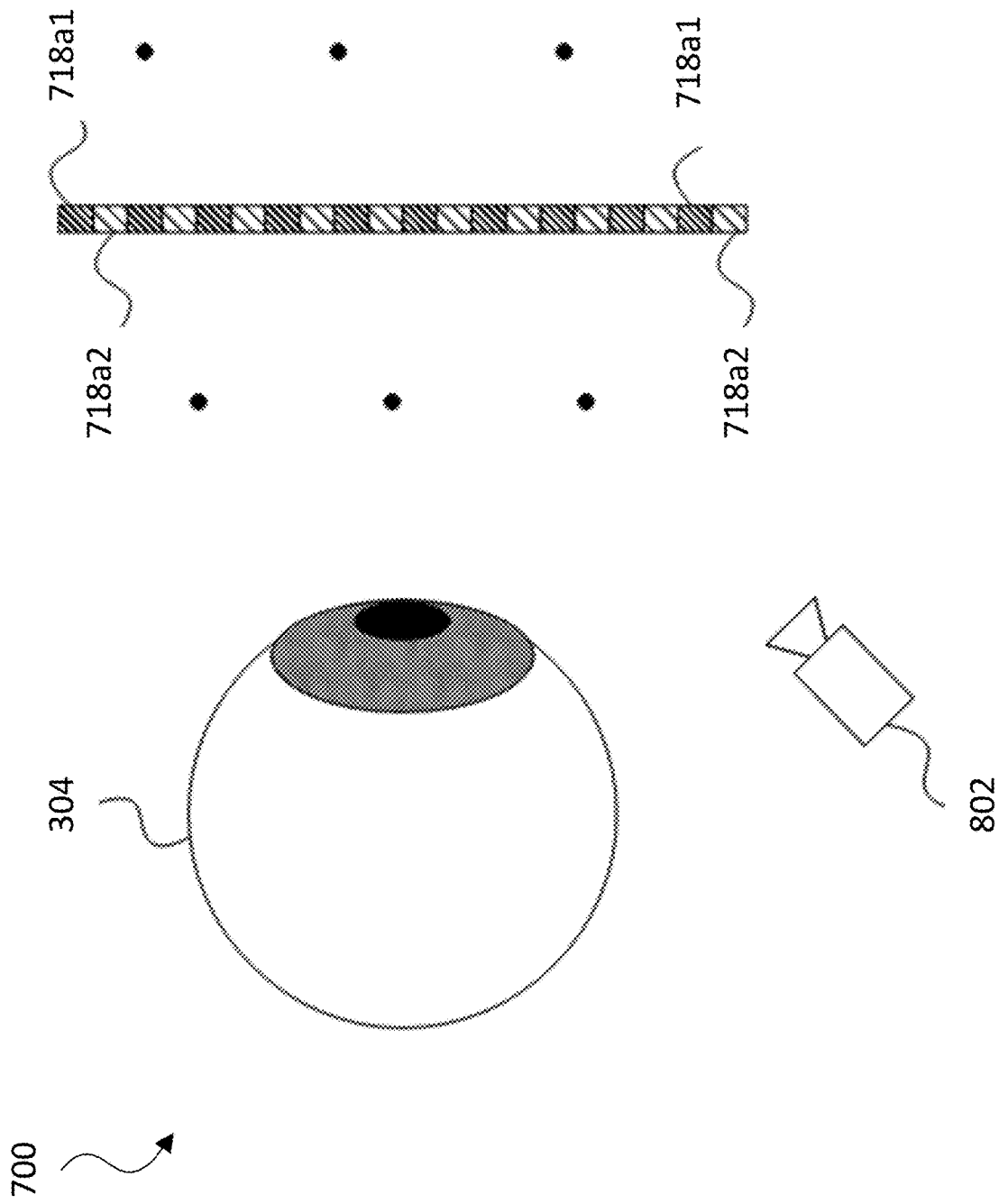
FIG. 25A schematically shows an example illumination system that includes a plurality of reflective elements.

As discussed above, in some implementations, the reflective element or off-axis mirror may be segmented. FIG. 25A schematically shows an example illumination system 700 that includes a reflective element comprising plurality of segments. In the implementation shown, the segments of the reflective elements 718a1, 718a2 may be alternating in their optical properties. For example, a first set of segments 718a1 may have first optical properties while a second set of segments 718a2 may have a second optical properties different than the first optical properties. For example, the first set of segments may have a different amount of tilt than the second set of segments. The two segments may therefore provide the camera with different perspective of the eye and possibly increase the region of the retina that can be imaged. A distance from a center of a first segment to a center of a neighboring second segment may be about 0.5 microns, about 1 microns, about 1.5 microns, about 2 microns, about 3 microns, about 4 microns, about 5 microns, about 7 microns, about 10 microns, about 12 microns, about 15 microns, about 20 microns, any value therebetween, or fall within a range having two of those values as endpoints. In some embodiments this distance is about 1.5 microns. Such a small distance may allow for simultaneous images of different parts of the eye without a significant loss in image fidelity.

The reflective elements may include optical power. In some implementations, the optical power of the first set of reflective elements 718a1 may be different from the optical power of the second set of reflective element 718a2 although the optical power may be the same in some implementations. This optical power may potentially provide an increased field of view (FOV) of the camera in imaging the user's eye. Additionally or alternatively, the amount of tilt for the reflective elements 718a1, 718a2 may be different from each other. For example, the first set of reflective elements 718a1 may diffract light a larger amount than the second set of reflective elements 718a2. Such a design may provide different perspective of the eye to the camera. Imaging the eye from different perspective may be beneficial, for example, to increase the field of view of the eye, e.g., of the retina, that is imaged as well as to facilitate determining the position of the eye or features thereof as discussed herein.

Additionally or alternatively, one or more lenses (e.g., having positive optical power) may be disposed between the camera and the eye to capture a greater amount of light and/or increase the field of view of the retina, e.g., of the eye. For example, the one or more lenses, possibly having positive optical power, may be disposed between the eye and the reflective element. Positive optical power may in some implementations, be introduced between the eye and the reflective element. Additionally or alternatively, one or more lenses may be disposed between the reflective element and the camera. In some designs, a random phase pattern may be built into the system to reduce spherical aberrations in the reflective element, for example, if the reflective element has optical power.

As noted above, additionally or alternatively, the reflective element may be segmented into two or more segments or portions having different optical properties such as tilt angle. In particular, different segments may have different angular orientation and thus provide different perspectives of the eye. For example, light may be collected from different fields-of-view and/or different portions of the eye and directed to the camera by different segments. The reflective elements may comprise for example reflective diffractive optical elements with an optical axis that is not identical for the two segments, for example, one segment may have an optical axis that is tilted with respect to the other to provide a different perspective. Two segments may be included or more than two segments may be included. If more than two segments are included, the segments may be in a regular pattern (e.g., an alternating pattern) of different orientation. For example, a first plurality of segments 718a1 may be configured to reflect light in a at a first angle (e.g., at a first average angle or beam angle for a range of angles) into and/or from the eye, and a second plurality of segments 718a2 may be configured to reflect light at a second angle (e.g., at a second average angle or beam angle for a range of angles) into and/or from the eye. The first and second segments may in some implementations repeat over and over alternating between the first and second segments and thus the first and second perspectives. If three different segments are included in the reflective element, the three segments may be repeated over and over as well. A larger number of different segments having different perspectives or optical axes may also be used. In various implementations, these segments may be repeated in order over and over. Alternatively, a more irregular pattern may be used. Segmented optical elements such as segmented reflectors may yield image data from two or more different perspectives, such as two or more of the perspectives that are similar or equivalent to the perspectives of two or more of virtual cameras 702c1, 702c2, and 702c3 described above.

In various implementations disclosed herein, the camera 802 may disposed off-center with respect to the eye and/or eyepiece. The camera 802 may be disposed temporally with respect to the eye, e.g., the center of the eye, or even the edge of the eye, or of the head. The camera 802 may be integrated into a frame of the illumination system 700, such as a temple or temple arm. In some implementations, the camera 802 may be disposed rearward of the front of the eye, of the center of the eye, or of the entire eye 304. In some implementations, the camera and/or above the center of eye 304 or the entire eye and may be near a wearer's temple in some cases. The camera may face forward and may be tilted inward medially or nasally (e.g., toward the nose). Accordingly, in some implementations the one or more reflective elements may comprise an off-axis reflector or off-axis reflective element. Light from the eye may be directed by the reflective element temporally toward the side where the camera is located. The angle of incidence need not be equal to the angle of reflection. For example, light reflected from the eye may be incident on the reflective element at an angle closer to the normal to the reflective element and may be reflected and/or diffracted at a larger angle farther from normal to the reflective element.

In some designs, the one or more reflective elements may be forward or rearward the eyepiece. The reflective element may, for example, comprise a cover for the eyepiece. In some designs the reflective element is integrated in the eyepiece, for example, on a forward or rearward portion thereof or integrated elsewhere within the eyepiece. The reflective element may itself include a plurality of layers in some implementations. For example, as shown in FIG. 25B, the one or more reflective elements may comprise two layers or reflective elements 718a1 and 718a2. One layer or reflective element 718a1 may be closer to the eye 304 than the other 718a2. The other layer or reflective element 718a2, for example, may be closer to the world in front of the eye 304 than the other 718a1. In some implementations, the first reflective element 718a1 may be configured to reflect and/or diffract light at a first angle (e.g., at a first average angle for a range of angles) into and/or from the eye 304, and a second reflective element 718a2 may be configured to selectively reflect light at a second angle (e.g., at a second average angle for a range of angles) into and/or from the eye 304. However, in some implementations, the first and second layers or reflective elements 718a1 and 718a2 reflect light toward the same direction and/or location such as toward the camera. In some implementations, the first and second layers or reflective elements 718a1 and 718a2 receive light from different angles, for example, from different location and direct the light to the at least one camera, which may be temporally positioned with respect to the eye (e.g., the center of the eye or temporal edge of the eye) and may, for example, be disposed on the temple arm. By collecting light from different directions or locations, the first and second layers or reflective elements 718a1 and 718a2 may increase the field-of-view of the camera and facilitate imaging different portions of the retina.

The plurality of reflective elements may reflect and/or diffract light of the same or different wavelengths. For example, in some implementations, the first reflective element 718a1 and the second reflective element 718a2 may correspond to first and second layers and may be configured to selectively reflect light, for example, of first and second respective wavelengths. Each of the first reflective element 718a1 and the second reflective element 718a2 can be configured to reflect and/or diffract light at corresponding angles or angular ranges, for example, at first and second angles (e.g., at first and second average angles or beam angles for respective first and second ranges of angles or beams). For example, the first reflective element 718a1 may be configured to selectively reflect and/or diffract most light of a first wavelength at the first angle (e.g., at a first average angle or beam angle for a first range of angles or first beam) and selectively transmit most light of a second wavelength while the second reflective element 718a2 may be configured to selectively reflect and/or diffract most light of the second wavelength at the second angle (e.g., at a second average angle or beam angle for a second range of angles or a second beam) and selectively transmit most light of the first wavelength. However, in some implementation, the first reflective element 718a1 reflects light of a first wavelength range toward the camera and the second reflective element 718a2 reflects a second wavelength range in toward the camera. The directions that the light is directed need not be different. More than two such reflective elements that selectively reflects other different wavelengths may be included in different designs. As discussed above, the different reflective elements or layers may receive light from different directions and/or locations and diffract them by different amount, for example, both to the camera. In this manner, different portions of the retina may be imaged and/or the field of view may possibly be increased.

Figure 26:
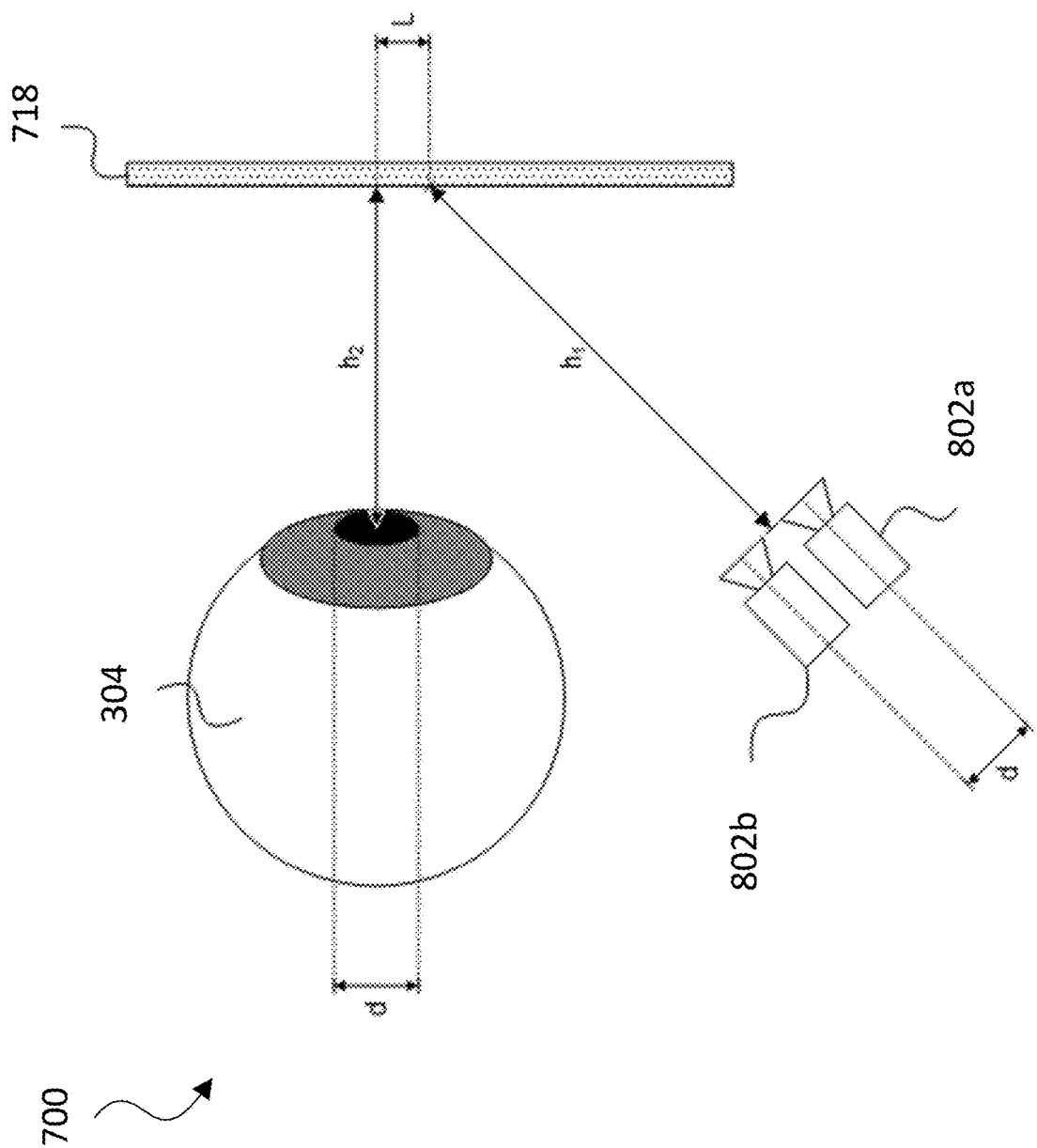
FIG. 26 schematically shows another example illumination system that includes a plurality of cameras.

Another way of increasing the field of view of the camera 802 is to include a plurality of cameras, the respective cameras configured to image different parts of the eye and/or the same part of the eye from different angles. FIG. 26 shows an example illumination system 700 that includes a first camera 802a and a first camera 802b configured to image the eye 304. As shown the cameras 802a, 802b are separated from one another by a distance d. In some implementations, the distance d may be similar to a circumference of the pupil of the eye 304. For example, the distance d may be about 0.5 mm, about 1 mm, about 1.5 mm, about 2 mm, about 3 mm, about 4 mm, about 5 mm, about 7 mm, about 10 mm, about 12 mm, about 15 mm, about 20 mm, any value therebetween, or fall within a range having two of those values as endpoints. In some embodiments, d is about 4 mm. In some embodiments, one or both cameras 802a, 802b are disposed from a point on the reflective element 718 (or elements/layers, see above) by a distance $h_1$. The second point may be separated from the pupil of the eye 304 by a distance $h_2$. The distance $h_2$ may be about 0.5 cm, about 1 cm, about 1.5 cm, about 2 cm, about 3 cm, about 4 cm, about 5 cm, about 7 cm, about 10 cm, any value therebetween, or fall within a range having two of those values as endpoints. Other values are possible. The cameras 802a and 802b, located at different positions, may image the eye from different perspectives possibly providing images of different parts of the retina. In some case, the two cameras 802a, 802b provide a larger field of view in the aggregate as compared to use of just one of the cameras.

Figure 27A:
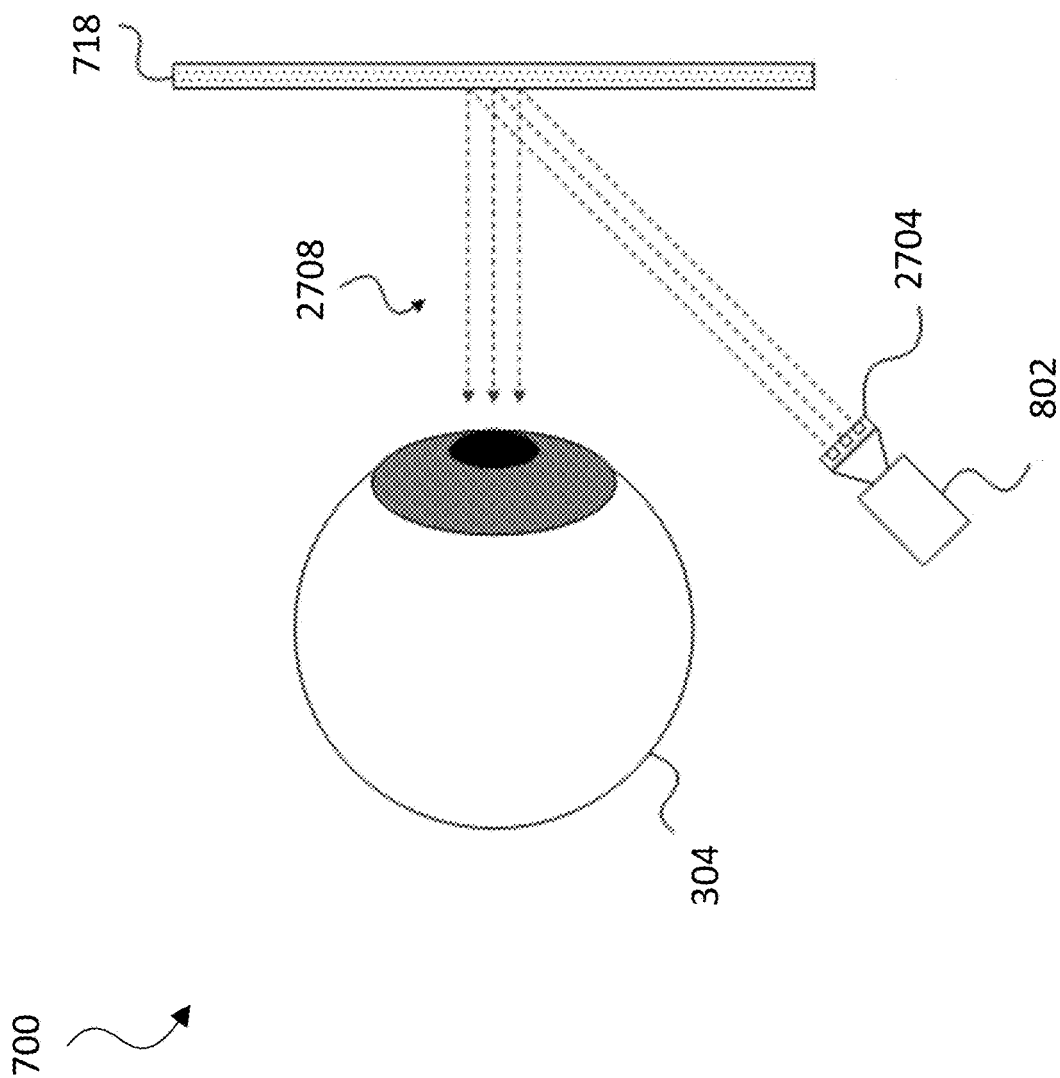
FIG. 27A shows an example illumination system that includes a VCSEL array coupled to a camera.

To assist in imaging the eye, which can be accomplished using a variety of different arrangements and used for various reasons, illumination of the eye may be provided. In some implementations, one or more illumination sources may be included to illuminate the eye. The illumination source may comprise emitters such as solid-state emitters. The illumination sources may include vertical-cavity surface-emitting lasers (VCSELs) and/or LEDs. For example, one or more VCSELs may be used to illuminate one of the eyes, which may in some cases offer a source of bright narrow band illumination. In some implementations, an array of VCSELs may be employed. FIG. 27A shows an example illumination system 700 that includes a VCSEL array 2704 coupled to and/or integrated with the camera 802. The VCSEL array 2704 can emit illuminating light 2708 at a wavelength or wavelengths described herein, such as in the infrared range. A VCSEL may provide particular benefit by emitting a narrow band of wavelengths. This feature can reduce the amount of chromatic aberration resultant during the imaging for example from a reflective elements comprising a diffractive optical element or holographic optical element such as a liquid crystal based diffractive optical element such as a cholesteric liquid crystal diffractive optical element or liquid crystal polarization grating, etc. VCSELs also provide relatively high brightness while having a relatively small footprint. Accordingly, one or more VCSELs may be disposed (e.g., mounted) on the camera or integrated therein (e.g., as shown in FIG. 27A) or between multiple camera such as a pair of cameras. The number and arrangement of VCSELs that can be integrated with the camera or cameras can vary. In one implementation, nine VCSELs can be included with two cameras. For example, eight VSCELs can surround the two cameras or at least the input of the two cameras. One VCSEL may be between the two cameras. More or less VCSELs and/or cameras may be integrated together. In some implementations, an array of 20 VCSELs may be used. The VCSELs may include one or more lens to shape the output of the beam. The VCSELs and/or camera may be included temporally with respect to the eyepiece, the eye (e.g., the center of the eye or the temporal side of the eye) and may for example be mounted on the frame such as the temple or temple arm.

In some implementations the VCSELs are imaged in front of the eye (e.g., forming a magnified image of the VCSEL). In some cases, diverging light from the VCSEL can create a spot on the retina. In some implementations, different VCSELs in the plurality or array create an illumination pattern (e.g., the same illumination pattern) in front of the eye. Light from the different VCSELs may, for example, be incident on the reflective element/off-axis mirror with the same angle of incidence. One difference (e.g., the primary difference) may be the illumination source (e.g., VCSEL) is translated to different lateral positions, which may cover different parts of the eye box. In some designs, different parts of the VCSEL array (e.g., different VCSELs) can be turned on and off or otherwise have the intensity of their output changed. Likewise, different parts of the VCSEL array can be turned on with respect to eye position. Electronics configured to control the output of the VCSELs may be employed to selectively adjust the output (e.g., turn on and off) the different pixels.

Figure 27B:
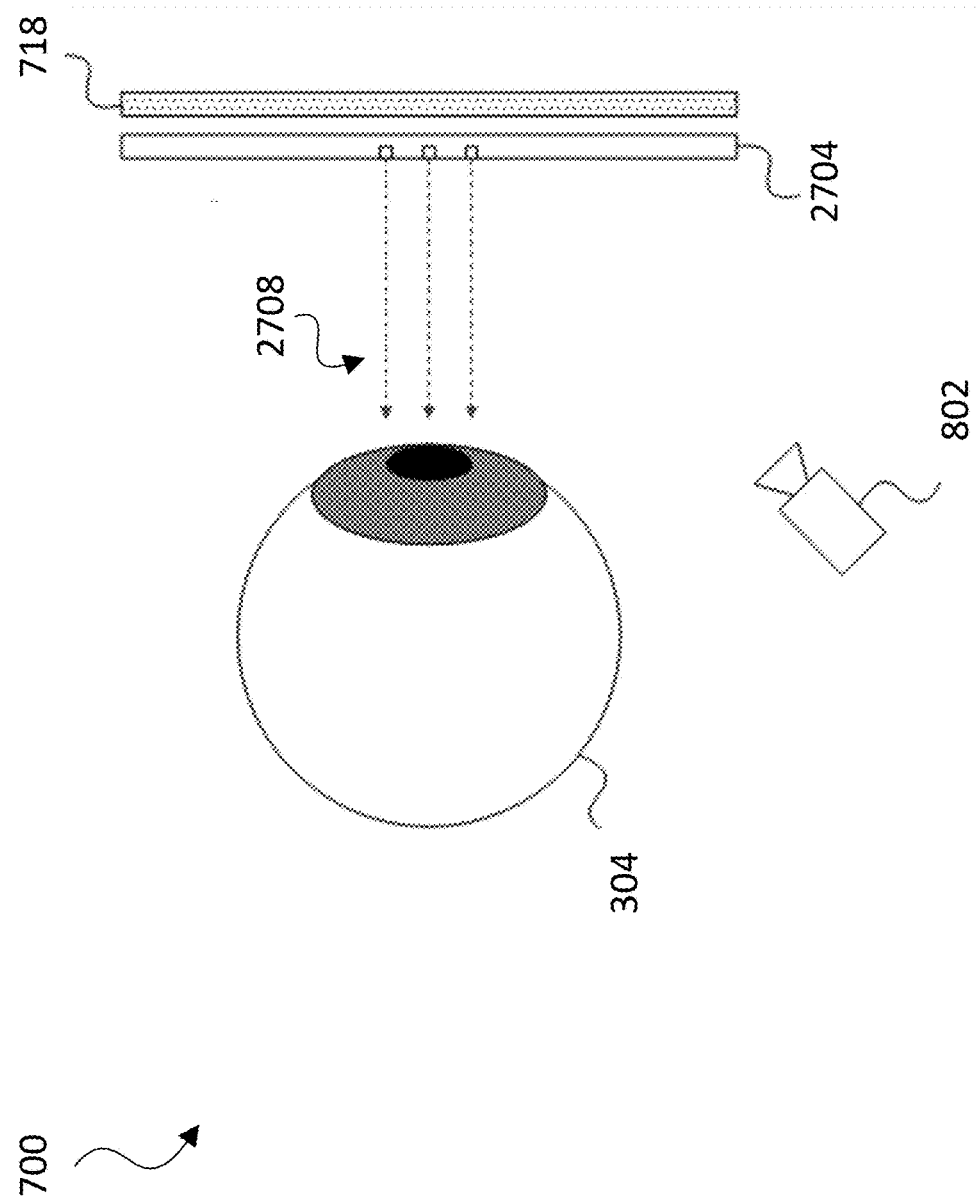
FIG. 27B shows an example illumination system that includes a VCSEL array coupled to a reflective element.

Additionally or alternatively, one or more VCSELs can be disposed on and/or integrated into the reflective element 718 (e.g., as shown in FIG. 27B) or the eyepiece or one or more layers (e.g., a substrate) disposed thereon or integrated therewith. For example, in some embodiments the VCSELs 2704 may be disposed in a first layer of an eyepiece and the reflective element 718 comprise a second layer. The VCSELs 2704 can be disposed nearer the eye 304 than the reflective element 718 as shown in FIG. 27B or vice versa. In some implementation, the VCSELs 2704 are disposed on a cover, cover layer, or cover glass layer. The layer on which the VCSELs may be disposed may be transparent to at least some visible light such that the wearer can see through the layer to the world in front of the wearer. In some implementations, the VCSELs 2704 may be disposed on the reflective element 718 in some embodiments. Other designs are possible. The VCSELs 2704 may be included in a VCSEL array in some implementations such as a 1D or 2D array. In various implementations, for example, whether the VCSELs are mounted on the reflective element 718 or another layer, the VCSELs may have a small size (e.g., footprint or cross-sectional area as seen from the output end of the VCSEL) and may be spaced apart sufficiently such that the wearer can see through the layer to the world in front of the wearer.

As discussed above the reflective layer 718 may comprise a diffractive optical element or holographic optical element such as a grating. In some implementations the diffractive optical element or holographic optical element may comprise liquid crystal such as a liquid crystal grating (e.g., liquid crystal polarization grating) and may comprise cholesteric liquid crystal, e.g., a cholesteric liquid crystal grating. In some implementation, the diffractive optical element or holographic optical element may comprise a volume or surface diffractive optical element or holographic optical element or grating such as a blazed diffractive optical element or holographic optical element, e.g., blazed grating. As discussed above, the reflective layer 718 may comprise an off-axis mirror or reflective element. Light from the eye may be reflected to a camera locate temporally with respect to the eye, e.g., the center of the eye or the temporal edge of the eye. For example, the camera may be disposed on the temple or temple arm. In some implementations, the angle of incidence does not equal the angle of reflection. In some implementations, the reflective element includes optical power (and/or tilt) which may, for example, be programed into the diffractive or holographic optical element.

In some implementation, regardless of where disposed, the VCSEL may include one or more optical element such as a lens, polarizer (e.g. linear polarizer), retarder (e.g., quarter wave retarder) or any combination disposed thereon and/or in the path of light output from the VCSEL. In some implementations, the light from the VCSEL (possibly passing through a lens) may have a divergence of less than ±20°, ±15°, ±10°, ±5°, ±1°, or any range between any of these values. In some designs, one or more VCSELs may be modulated such as with pulse width modulation (PWM), which reduce coherent artifacts, such as laser speckle. Modulation may reduce the temporal coherence of the VCSEL(s). Accordingly, electronics may be included to modulate the VCSEL or other solid state emitter. Additionally, in configurations where multiple VCSELs are included, the output of different VCSELs can be altered, for example turned on or shut off using, for example, electronics that power and/or control the VCSELs.

In various designs, the camera may be configured to image the retina while reducing collection of light reflected from the cornea. Glint from the cornea may, for example, introduce glare that makes imaging of the retina more difficult. (See, for example, discussion above with respect to FIG. 15B for additional disclosure.) In some implementations, the eye may be illuminated with polarized light and the camera may be configured to attenuate light of that polarization. A first polarizer, for example, a first linear polarizer, may be disposed on or integrated into the illumination source (e.g., VCSEL) if, for example, the illumination source is not configured to output suitably polarized light. In addition, one or more polarizers (e.g., linear polarizers) may be disposed between the camera and the user's eye. For example, a second polarizer may be disposed between the camera and the reflective element, for example, at the camera. In some configurations, the second polarizer is mounted on the imaging device. Light reflected off the specularly reflective corneal surface will retain its incident polarization, e.g., the first polarization of the light source. Conversely, light reflected from the diffusely reflective retina will not retain its polarization but the light scattered therefrom will include multiple polarizations both the first polarization as well as an orthogonal second polarization. Likewise, a polarizer such as a linear polarizer at the camera that block the light of the first polarization can be used to block the specular light reflected from the cornea. Some light diffusely reflected from the retina, however, will comprise the second orthogonal polarization and will reach the camera providing an image of the retina with reduced glare from light reflected from the cornea. The polarizer at the camera may be a transmissive or reflective polarizer. In some implementations where the VCSELs are located such that light from the VCSEL reflects from the reflect element to the eye, the VCSEL need not include a polarizer, e.g., a linear polarizer. For example, the VCSELs may be mounted temporally with respect to the eye (e.g., the center of the eye or the temporal edge of the eye) such as on the temple or temple arm, possibly with the camera. In some designs, the reflective element may include polarization selectivity and operate as a linear polarizer such as when the reflective element comprises liquid crystal, e.g., a liquid crystal polarization grating. As discussed above, however, the reflective element 718 may comprise a surface grating such as a blazed grating and the a VCSELs may include one or more polarizers (e.g., a linear polarizer) to polarize the light if the VCSEL does not output polarized light (e.g., linearly polarized light).

Figure 28A:
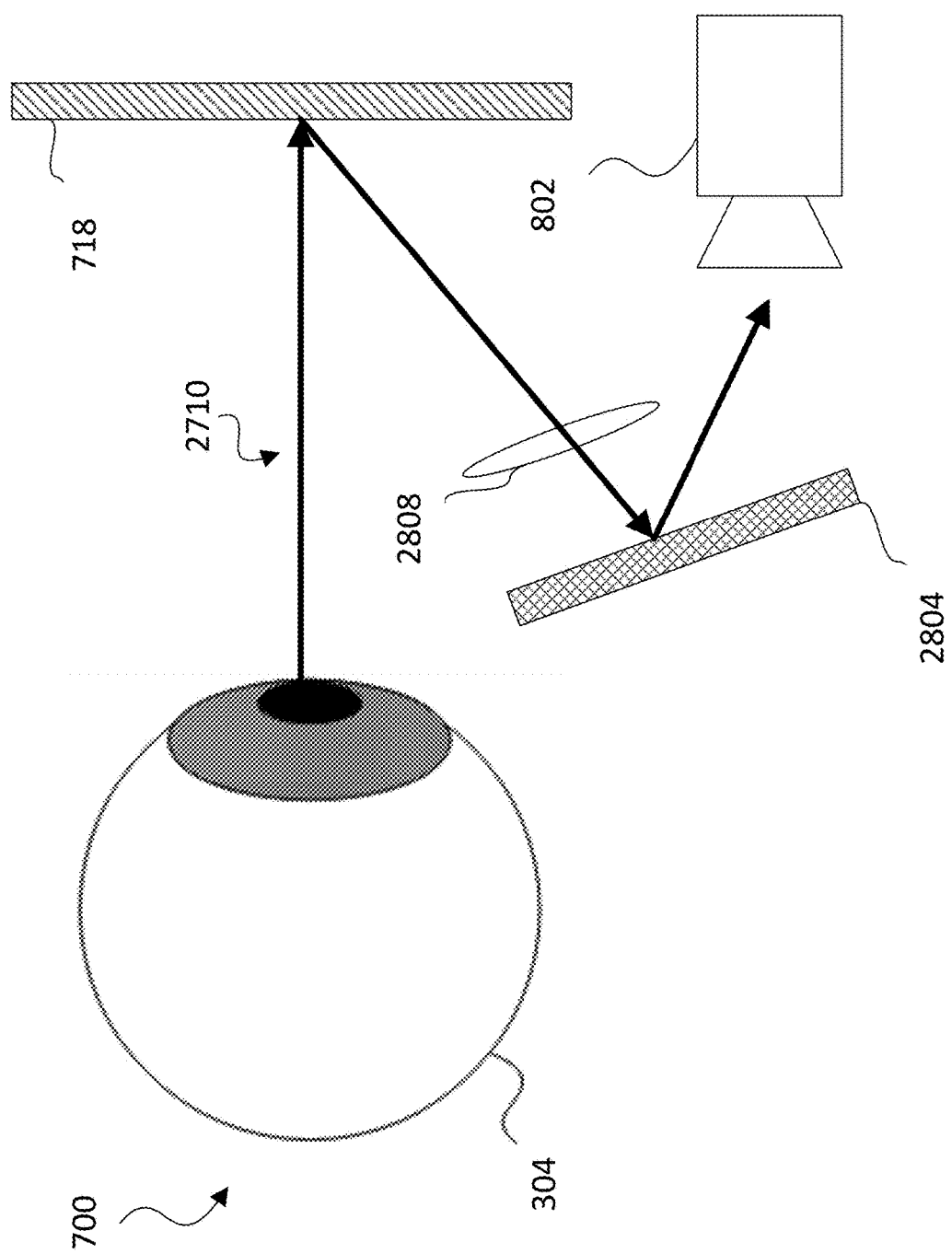
FIG. 28A shows an example arrangement of an illumination system that include a reflective diffractive optical element and a focusing optical element.

In some designs, to reduce the effects of chromatic aberration introduced by the reflective element or off-axis mirror (e.g., if the reflective element comprises a diffractive optical element such as a diffractive optical element having optical power), an additional corrective diffractive optical element may be provided to introduce counteracting chromatic dispersion. FIG. 28A and FIG. 28B show various example arrangements of an illumination system 700 that includes a corrective diffractive optical element 2804. As shown in FIG. 28A and FIG. 28B, the corrective diffractive optical element maybe disposed between the camera 802 and the reflective element 718 (e.g., as a separate reflector between the camera and the reflective element, or as an additional diffractive optical element integrated with the reflective element). The diffractive optical element 2804 can be configured to correct, reduce, or counter chromatic aberration from the reflective element. In some embodiments, the corrective diffractive optical element 2804 includes a hologram or diffractive optical element which may be programmed with suitable chromatic dispersion to counter or reduce the chromatic aberration of the reflective optical element 718. The corrective diffractive optical element 2804 may be transmissive or reflective. In some implementations, the corrective diffractive optical element 2804 has a similar or same pitch as the reflective element 718. In some implementations, one or more additional powered optical elements such as a refractive optical element 2808 (e.g., a lens or lenses) may be disposed between the camera and the reflective element (e.g., as shown in FIG. 28A and FIG. 28B) and/or between the reflective element and the user's eye, such as in implementations where the reflective element has optical power. This additional powered optical element 2808 may be configured, e.g., have optical power and be positioned to increase collimation of light onto the diffractive optical element and/or camera in certain designs.

In some implementations, a beam splitter 2812 (which may comprise a partially reflective partially transmissive optical element) can be included in the illumination system 700. In some implementations, the beamsplitter comprises a 50/50 beamsplitter. The beam splitter 2812 may have one or more characteristics of the partially reflective element described above with respect to FIG. 12C. The beam splitter 2812 can be configured to transmit the image light 2710 while also reflecting some of the illuminating light 2708 back toward the diffractive optical element 2804. The resulting light entering the camera 802 can be a combination of image light 2710 and illuminating light 2708.

In some designs, a plurality of cameras (e.g., two camera laterally offset from one another or an array of cameras) may be used to capture images of the eye. Thus, although reference to "the camera," "the imaging device," or "the imager" may be used herein, each of these may refer to a plurality of such devices. For example, a first camera can image a first portion of the eye and a second camera can image a second (overlapping or non-overlapping) portion of the eye. Multiple cameras that can provide multiple perspectives and/or multiple images of the eye can increase the field-of-view of the imaging capability of the system. As discussed below, images from multiple perspective can be used to provide information regarding the eye such as position. Other types of information, such as gaze, movement, etc. can also be obtained. Images of the first and second portions of the eye can in some cases be used to improve the accuracy and/or speed at which the eye can be imaged and/or gaze, position, movement of the eye or any combination thereof can be tracked. Additional details of the plurality of cameras can be found above with reference to FIG. 26.

Although description various designs employed VCSELs has been provided herein, other types of emitters such as other types of solid state emitters may alternatively be used in such designs and may have similar features, configurations and arrangements.

In some designs, a plurality of cameras (e.g., two camera laterally offset from one another or an array of cameras) may be used to capture images of the eye. Thus, although reference to "the camera," "the imaging device," or "the imager" may be used herein, each of these may refer to a plurality of such devices. For example, a first camera can image a first portion of the eye and a second camera can image a second (overlapping or non-overlapping) portion of the eye. Multiple cameras that can provide multiple perspectives and/or multiple images of the eye can increase the field-of-view of the imaging capability of the system. Images of the first and second portions of the eye can, for example, be used to improve the accuracy and/or speed at which the eye can be imaged and/or gaze, position, movement of the eye or any combination thereof can be tracked.

Determining the Location of the Center of the Eyeball

Various imaging systems described above may be used to capture images usable for determining the position of the eye or a part or feature of the eye such as location of the center of eyeball of a user a head mounted display. Knowing the center of the eyeball or the center of rotation of the eye may be useful in presenting image content to the user for augmented and virtual reality. In some implementations, for example, image content is presented from the vantage point of the center of rotation of the eye, for example, a location where a camera imaging the image content would be located. Other uses for the center of rotation or eyeball center are also possible. In some implementations described herein retinal imaging systems may be used to determine the position of the eye and/or track eye gaze. These imaging systems may include a plurality of cameras configured to capture images of different portions of the retina of an eye of the user from various angles and/or distances. In some implementations, one or more images of the retina (e.g., different portions of the retina) may be used to determine the three-dimensional (3D) position of the center pupil of the eye of the user (herein referred to as "pupil center"). In some such implementations, the 3D position of the pupil center may be used to estimate the 3D position of the center of the eye of the user (here in referred to as "eyeball center"). The 3D position of the pupil center and of the eyeball center may be estimated or determined with respect to a reference frame, for example, of the plurality of cameras used to capture the images of the retina.

In some implementations, the plurality of cameras may obtain images of the retina from different perspectives and use the information in the respective images and/or the relative location of the cameras to determine the location of the pupil center. In some implementations, the position of the pupil center may be triangulated based on information extracted from the images of the retina. In some other implementations, one camera may obtain an image of the retina comprising regions or portions associated with different perspectives of the retina. In these implementations, the position of the pupil center may be triangulated based on information extracted from the different portions or regions of the images of the retina.

In some implementations, the system may include processing electronics (e.g., the controller 560) configured to identify a portion of different images that corresponds to a portion of the retina of the user's eye. For example, a portion of an image that contains blood vessels may be selected and compared to a map of the retina of the user's eye (herein referred to as "retinal map") to verify that the selected portion of the images matches with a region of the retinal map by comparing the corresponding blood vessel shapes and/or arrangements. The map of the retina of the eye of the user or retinal map may be generated by a computing system of the HMD during a calibration process. During such calibration process a plurality of different spatially located targets may be presented to the eye via the display while images of the retina are captured. The targets are located in different portions of the field-of-view of the user causing the user to alter the gaze direction of their eye. Images of the retina are capture when the eye is at different gaze positions providing different views of the retina thereby enabling images of different portions of the retina to be captured.

In some implementations, during the calibration process the computing system of the HMD may also calculate and/or generate a gaze direction mapping matrix based on the association of different retinal images captured from different perspectives and the corresponding gaze directions. The gaze direction mapping matrix, may be used to estimate the gaze direction of an eye when the retina of the eye is imaged to determine the position of the center of pupil of the eye. Subsequently, the estimated gaze direction may be used to calculate the position of the center of eye ball.

A portion of the retina can be identified in the image of the retina and a center of mass (or centroid) for the identified retinal portion can be calculated. If multiple (e.g., two) cameras are employed, the center of mass (or centroid) values are determined for the same retinal portion identified in different images by the respective cameras. The processing electronics (e.g., a computing system of the HMD), may use the center of masses, or one or more positions or distances associate therewith, to determine the location of the pupil center possibly using triangulation techniques. In some implementations, the system may further determine the location of the center of the eyeball or eyeball center (EBC) or center of rotation of the eye based at least in part on the determined the location of the pupil center or other parameters determined through the use of these techniques.

These techniques can additionally or alternatively be used with a single-camera configuration. For example, the camera may obtain multiple images of the eye at different times. Based on these images, the system can determine a position of the pupil center. Additionally, or alternatively, a camera may determine the position of the pupil based on one or more images obtained from a segmented optical element such as a segmented reflective element. For example, various designs are disclosed herein where the system is capable of capturing an image that includes portions of the retina obtained from two or more different perspectives. Some such designs, for example, employ a segmented optical element such as a segmented reflective element (where different segments provide different tilts, reflection angles, diffraction angles and/or perspectives). In some examples, the segmented optical element or segmented reflective element may be an off-axis refractive element that reflects light incident on the element at a reflection angle different from an angle of incidence of light. Similarly, if a plurality of perspectives are provided by a plurality of reflective elements with different tilts, such as reflective elements that reflect different respective wavelengths and have different tilts or orientations and perspectives, the triangulation technique described herein may be employed based on the respective different images obtained. As discussed above, a plurality of reflective elements with different tilts that operate on the same or different wavelengths can be included in or with the eyepiece, one farther from the eye than the other. These reflective elements may comprise diffractive optical element (DOE) or holographic optical elements (HOE) with different amounts of tilt programmed into the DOE or HOE. In such cases, the tilt refers to deflection of the beam as a result of diffraction. Diffractive or holographic features such as lines of a grating are configured, e.g., shaped and spaced with respect to each other, to redirect light incident thereon at an angle akin to the tilting of a beam. This tilt need not be produced by a tilted surface but may be produce interferometrically and/or via diffraction. In some implementations, a dual camera configuration can be employed to provide the images of the retina from said two perspectives. These image pairs may be used to determine features of the eye such as the location of pupil position and eye ball center. In various implementations described herein, a segmented optical element such as a segmented reflector is employed. Such a segmented optical element may comprise a diffractive optical element with segments formed by different diffractive regions. Additionally, reflective optical elements described herein may comprise reflective surfaces. However, reflective optical elements may produce reflection via a volume effect. For example, a volume hologram or volume diffractive optical element may be reflective and be reflective optical elements. Other types of reflective optical elements are possible.

In various implementations, a lateral distance between a center of mass (or centroid) of an image of the retina of an eye and the center of the image sensor or sensor field used to capture the image of the retina may be employed to determine ratio between a lateral distance between the pupil center and the center of the sensor or sensor field and a longitudinal distance between the pupil center and the optical center of the camera lens (or imaging system). The center of the sensor or sensor field may be determined by the center of the camera lens or imaging system for example by the optical axis thereof, in some cases for example. Other reference points besides the center of the sensor or sensor field may be used in other implementations.

Figure 29:
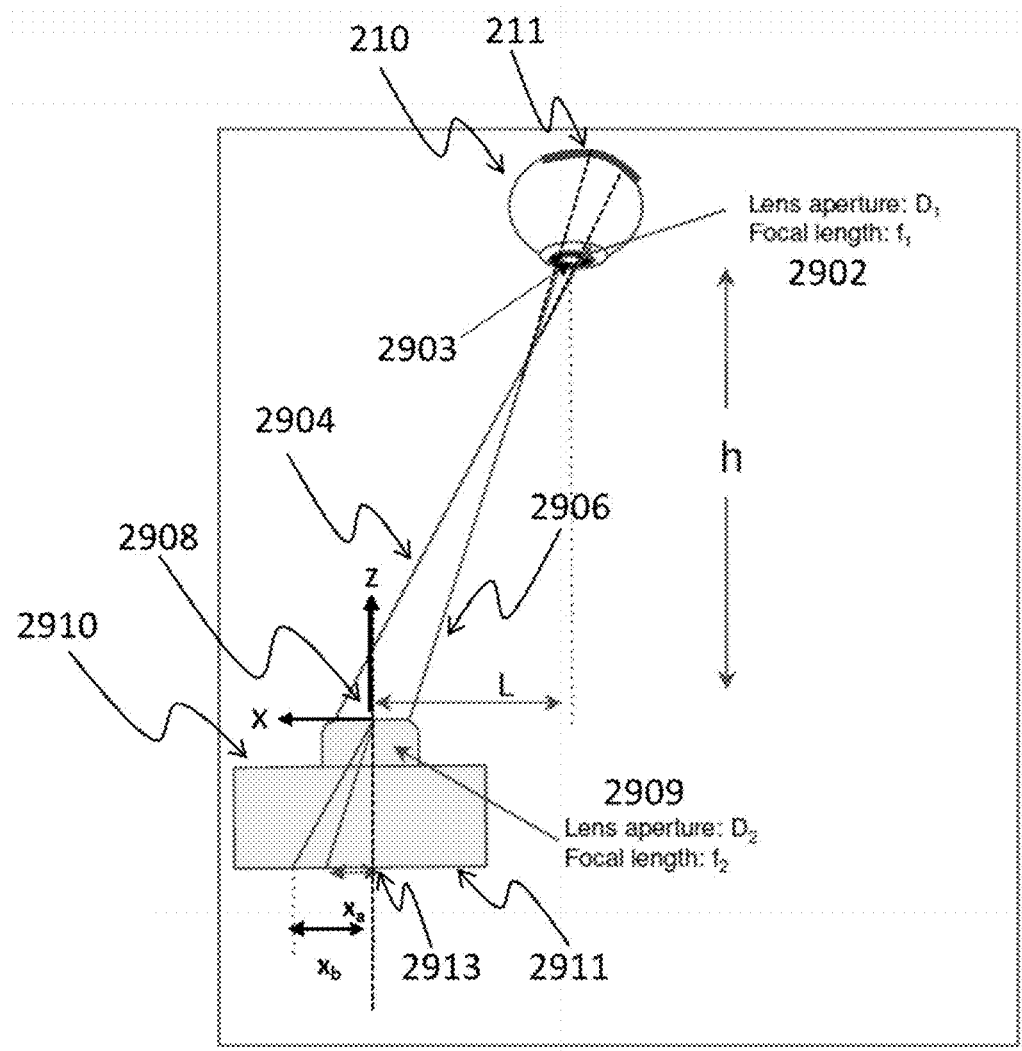
FIG. 29 schematically illustrates an example configuration for capturing images of the retina of an eye usable for determining the location of pupil center of the eye with respect to a coordinate system of the camera.

FIG. 29 illustrates an example configuration for capturing images of a retina of an eye usable for determining the location of pupil center of the eye with respect to a reference coordinate system such as a coordinate system of the camera. The camera 2910 may be an infinity focused camera. A camera focused at infinity can offer an advantage of being able to image the retina as light from the retina is collimated by the natural lens of the eye; however, the camera focused at infinity will not bring into focus features such as eyelashes or the eyelid. The camera 2910 may include a lens system 2909 (e.g., one or more lenses) with a focal length or effective focal length of $f_2$ and an image sensor 2911 (e.g., a sensor array like a CCD sensor comprising a plurality or array of light sensitive pixels). The image sensor 2911 may be parallel to an image plane of the lens system 2909 in various designs. The lens system 2909 projects an image of a portion the retina 211 of the eye 210 on the image sensor 2911, e.g., onto the array of pixels. The portion of the retina imaged on the senor 2911 may depend on one or more of a relative distance and orientation between the eye 210 and camera 2910, the size of the optical aperture of the eye 210 through which the retina 211 is imaged (e.g., the diameter of the pupil 2902), the size of the aperture ($D_2$) of the lens system 2909, the focal length of the lens system 2909 and the focal length of the lens of the eye 210. At least in some cases, the size and the location of the image on the image sensor may depend on a lateral (L) and a longitudinal distance (h) between the optical center of the lens system 2909 and the pupil center 2903. For illustrative purposes, FIG. 29 shows light rays extending to the margin of the portion of retina that can be projected on the image sensor. In the example shown in FIG. 29 the position of a first ray 2906 is limited by a first edge the pupil 2902 and a first edge of the aperture of lens system 2909, and a position of a second ray 2904 is limited by a second edge of the pupil 2902 and a second edge of the aperture of lens system 2909. The projection of corresponding rays 2904 and 2906 on the image sensor 2911 are schematically shown in FIG. 29 as defining the margins of the projected image on the image sensor 2911. In some examples, a coordinate system whose origin is located at an optical center of the lens system 2909 (which is part of camera 2910) may be used to find a relation between $f_2$, $D_2$, $D_1$, lateral positions of the margins of the projected image and lateral and longitudinal positions of the pupil center with respect to the camera 2910. In the example shown, the origin of the xyz coordinate system is located at the optical center 2908 of the lens system 2909, x-axis (shown) and y-axis (out the paper) are parallel with an image plane of the image sensor 2911 and the z-axis (shown) is perpendicular to the image plane. With respect to such coordinate system the lateral distance (e.g., the x coordinates) of the margins of the image projected onto the image plane of the sensor 2911 may be given by:

$$X_b = \frac{f_2}{h}\left(L + \frac{D_1 + D_2}{2}\right) \quad (1)$$

$$X_a = \frac{f_2}{h}\left(L - \frac{D_1 + D_2}{2}\right) \quad (2)$$

where $X_a$ and $X_b$ are the x coordinates of the first margin and second margin of the projected image (e.g., image of the retina) on the image sensor 2911, his the z coordinate of the pupil center, L is the x coordinate of the pupil center, $D_1$ is the diameter of the aperture (e.g., the entrance aperture) of the lens system 2909 and $D_2$ is the diameter of the aperture of the eye (e.g., the diameter of the pupil 2902.

The configuration illustrated if FIG. 29 is optically equivalent to the imaging system 24A where camera (e.g., the camera 702b) is facing forward (e.g., in the direction of the eye vision) and captures the image of the retina 211 via an reflective optical element (e.g., an off-axis mirror 708 or an off-axis diffractive element, an off-axis holographic mirror) positioned in front of the eye 211 and the camera. In such a configuration, the camera 2910 may be a virtual image of the forward-facing camera (e.g., virtual image 702c in FIG. 24B) or a virtual camera as described above with respect to FIG. 24A. As such, Equations 1 and 2 may be used to determine the margins of an image formed on an image sensor of a forward-facing camera with respect to a coordinate system associated with the corresponding virtual camera (a virtual image of the forward facing camera formed by the reflecting optical element).

In some cases, $X_a$ and $X_b$ may be used to determine the coordinate (e.g., x coordinate) of a center of mass for the image of the retina formed on the image sensor 2911:

$$X_{CM} = \frac{X_b + X_a}{2} = \frac{Lf_2}{h} \quad (3)$$

Equation 3 shows that for a given value of $f_2$ (the effective focal length of the lens system 2909), the ratio L/h may be calculated using the x coordinate of the center of mass $X_{CM}$ of the image. The x coordinate of the center of mass $X_{CM}$ of an image (image of the retina) formed on the image sensor 2911 can be determined by measuring the distance between the margins (e.g., extreme margins in x direction) of the image and a center of the image sensor 2913 defined, for example, by the cross-section between the image plane (or sensor plane) and the z-axis (or the optical axis of the lens system 2909). Other approached to measuring the center of mass may be employed as well. As such, L/h may be determined uniquely determined by the image data associated with an image of retina captured by the camera 2910.

In some implementations, two cameras at different positions relative to the eye 210 may capture two images of the retina 211, where images from the respective cameras corresponds to different perspectives of the retina viewed from a different angle; as such a different center of mass may be measured for captured images from the two cameras, respectively. In some cases, the center of mass may be with respect to a joint coordinate system defined based on the position of the two cameras however other approaches are possible. Since Equation 3 is valid for the center of masses of both images, the values of L and h may be uniquely determined using the coordinates of the two centers of masses calculated for the two respective images from the two cameras. As a result, various configurations, may use two images of the retina captured from different angles or perspectives, to determine the 3D location of the pupil center (i.e., L and h) possibly with respect to a joint coordinate system of the cameras (or the corresponding virtual cameras) used to capture the images.

As described above, in some implementations, a single virtual camera (e.g., the camera 2910) may receive light rays from the retina 211 from two different perspectives or directions. For example, a forward-facing camera 702b of an imaging system (e.g., imaging system shown in FIG. 24F or 24H), may image the retina of the eye via a segmented optical element such as a segmented reflecting (or diffracting) optical element (e.g., a reflecting/refracting element with multiple off-axis reflecting/diffracting segments). As a result, the camera 702b may receive multiple (e.g., partially duplicative) images of the retina via different segments of the segmented reflecting optical element where different images are received from different directions and corresponds to different perspectives of the retina seen via the pupil. In such imaging systems, the segmented reflecting optical element may generate multiple virtual cameras. Using at least two virtual cameras generated by two segments of a reflecting optical element, the two images of the retina may be captured from different perspective and used to determine the 3D position of the pupil center. The images captured by the two virtual cameras may be included in a single image captured by the actual single camera (e.g., they may be two regions or portions of the single image). The imaging optics (e.g., one or more lenses on the camera and/or the reflective optical element, which may be powered) may image the same portion of the retina on different portions of the sensor array. The locations of the center of mass of those portions of the retina may be determined such as described above to calculate the position of the eye, e.g., of the pupil. The number of segments and/or perspectives and/or portions of the retina evaluated may vary and, more specifically, may be larger than two in different implementations. Other variations are possible. For example, as described above, the segmented reflecting optical element may include a plurality of sets of reflecting or diffracting segments, wherein the different sets have different respective tilts (e.g., or diffractive properties) to provide different perspective and views of the retina such as shown in FIG. 25A.

As described above, once the 3D position of the pupil center is determined the 3D position of the eyeball center (EBC) may be calculated using the 3D position of the pupil center and a gaze direction mapping matrix determined, for example, during a calibration process.

Figure 30:
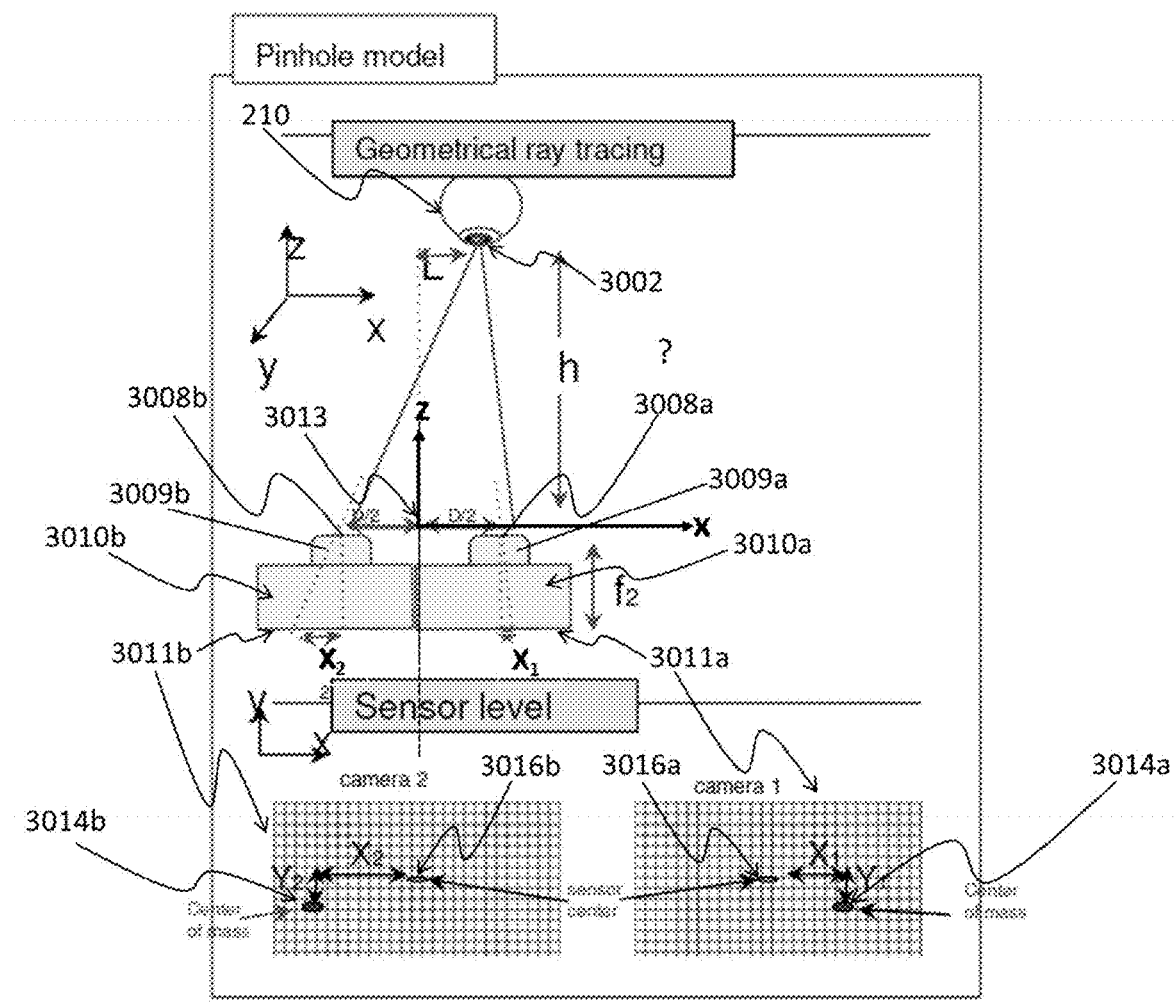
FIG. 30 schematically illustrates an example configuration for capturing images of the retina of an eye from different perspectives for determining the three-dimensional location of pupil center of the eye using two cameras for capturing the images.

FIG. 30 illustrates an example of a configuration for capturing two images of the retina 211 from two different perspectives. In this example, two cameras may be used to capture the two images of the retina 211. A first camera may include a first optical imaging system or first lens system or first camera lens 3009a and a first image sensor 3011a, and a second camera may include a second optical imaging system or a second lens system or second camera lens 3009b and a second image sensor 3011b. In some examples, the first camera 3010a and the second camera 3010b may be identical. In some examples, the first and the second camera may be infinity focused cameras (cameras set to focus on an infinite distance from the image sensor plane). For example, the image sensor may be disposed a focal length away from the camera lens. In some such examples, a focal length of first and the second lens system may be equal to $f_2$. In some implementations, the first camera 3010a and the second camera 3010b may be virtual cameras. In some such implementations, the first camera 3010a and the second camera 3010b may be virtual cameras associated with two forward facing cameras (e.g., the mirror images of one or more forward facing cameras generated by a reflective optical element such as an off-axis mirror or off-axis diffractive element). In some such implementations, the first camera 3010a and the second camera 3010b may be virtual cameras associated with a single camera and may be generated by a segmented reflecting optical element (e.g., the mirror images of one or more forward facing cameras generate by an off-axis mirror or off-axis diffractive element; similar to the example shown in FIG. 24F).

In the example shown in FIG. 30, the first camera 3010a and the second camera 3010b are positioned side-by-side such that their image sensors 3011a/3011b (and therefore image planes) are parallel to each other. In some cases, the first and the second image sensors 3011a/3011b may be in the same plane. In some examples, a joint reference frame (coordinate system) xyz may be defined whose origin is located on a plane parallel to image sensors (image planes) and at a middle point between a first optical center 3008a of the first lens system and the optical center of the second lens system 3008b. For example, the x coordinate of the first optical center 3008a may be +D/2 and the x coordinate system of the second optical center maybe −D/2 resulting in a total distance of D between the two optical centers 3008a/3008b along the x-axis (shown). The x-y plane of the xyz coordinate system (y into the paper) may be parallel to the image sensors. A center 3016a of the first image sensor 3011a may be defined as the intersection of the optical axis of the first lens system or first camera lens and the image plane of the first image sensor and a center 3016b of the second image sensor 3011b may be defined the intersection of the optical axis of the second lens system or second camera lens and the image plane of the second image sensor. In some implementations, other joint coordinate systems or joint reference frames or other coordinate systems or reference frames may be selected. For example, the origin of a joint coordinate system may be closer to one camera and/or between the image sensors 3011a/3011b and the optical centers 3008a/3008b.

The first lens system 3008a may project a first image of the retina 211 on the first image sensor 3011a from a first perspective. The second lens system 3008b may project a second image of the retina 211 on the second image sensor 3011b from a second perspective. In some examples, the location of the center of mass for the first and the second images of the retina may be measured from the center 3016a of the first image sensor 3011a and the center 3016b of the second image sensor 3011b respectively. In some other examples, the location of the center of mass for the first and the second images of the retina may be measured from a first reference point on the first image sensor 3011a and a second reference point on the second image sensor 3011b, respectively. Accordingly, other reference points may be used besides the center of the image sensor in certain implementations. In the example shown, $X_1$ and $Y_1$ are the x and y coordinates of the center of mass of the first image 3014a with respect to the center 3016a of the first image sensor 3011a, and $X_2$ and $Y_2$ are the x and y coordinates of the center of mass of the second image 3014b with respect to the center 3016b of the second image sensor 3011b. In some other examples, the $X_1$ and $Y_1$ may be the x and y coordinates of the center of mass of a selected portion of the first image 3014a with respect to the center 3016a of the first image sensor 3011a, and $X_2$ and $Y_2$ may be the x and y coordinates of the center of mass of a selected portion the second image 3014b with respect to the center 3016b of the second image sensor 3011b. In some such examples, the portions of the first image and the second image 3014a/3014b may be selected based on a retinal pattern (for example, each portion may include a specific retinal pattern). In some cases, the retinal pattern may be associated with one or more blood vessels of the retina. The selected portions may have any shape (e.g., rectangular, circular, triangular, polygonal, and the like). Using Equation 3, the x coordinates of the centers of mass of the first 3014*a* and the second 3014*b* image may be expressed as:

$$X_1 = f_2 * \frac{\frac{D}{2} - L_x}{h} \quad (3)$$

$$X_2 = f_2 * \frac{\frac{D}{2} + L_x}{h} \quad (4)$$

Similar equations may be relate $Y_1$ and $Y_2$ to $f_2$, D/2, $L_y$ and h. Here, $L_x$, $L_y$ and h are the x, y and z coordinated of the pupil center with respect to the joint xyz reference frame. Using Equation 3, 4 and similar equations for $Y_1$ and $Y_2$, the 3D coordinates of the pupil center with respect to the joint reference frame may be calculated as a function of measured coordinates of the centers of mass of the first and the second image, $f_2$ and D:

$$h = \frac{f_2 D}{X_1 + X_2} \quad (5)$$

$$L_x = \frac{D}{2} * \frac{X_2 - X_1}{X_2 + X_1} \quad (6)$$

$$L_y = \frac{D}{2} \frac{Y_1 + Y_2}{X_1 + X_2} \quad (7)$$

The values of D and $f_2$ may be known and stored in a memory of a computing system of the HMD (e.g., during manufacturing). In some implementations, the computing system may use the two images of retina captured from two different perspectives to calculate $X_1$, $X_2$, $Y_1$ and $Y_2$. Using the calculated values of $X_1$, $X_2$, $Y_1$ and $Y_2$ and the known values of D and h, the computing system may determine the 3D position of the pupil center by calculating $L_x$, $L_y$ and h using Equations 5, 6 and 7. In some implementation, more images may be employed, for example, to increase accuracy.

In the example described above, a portion of the image may be identified, such as a particular recognizable arrangement of blood vessels and that portion may be identified in multiple images. The center of mass of the portion may be used in the calculations.

In some implementations, $X_i$ and $Y_i$ (i=1,2) may be x-y coordinates of the center of mass of the entire retina image projected on the image sensor. The boundary of such image may be determined or limited by the aperture of the camera (e.g., the lens system of the camera) and/or the diameter of the pupil of the eye whose retina is images. In some examples, the image may have a circular or oval boundary and the center of mass may be located at the center of the circle or the oval. In some cases, the boundary of such an image may not be sharp. A sharp boundary however may be determined, for example, by fitting a circle, oval, polygon or other shape to more blurry image boundary.

In some implementations, a single camera may be used to capture a portion of the retina from two different perspectives. In such implementation, the camera may be a forward-facing camera that captures images of the retina via a segmented reflective element. As described above, e.g., with respect to FIGS. 24E, 24F, and 24H, a segmented reflective element (e.g., a segmented off-axis mirror or a segmented off-axis holographic mirror) may generate virtual cameras (i.e., virtual images of the single camera), at different angular locations and thereby enable capturing multiple views of the retina associated with a different respective perspectives or views of the retina. In some examples, different segments of the reflecting optical element may project different perspectives of the retina on different regions of the image sensor of the camera. In various implementations, a portion of the retina imaged may be identified based, for example, on the pattern of blood vessels (e.g., their shape, size, arrangement or any combination thereof). In some examples, different segments of the reflecting and/or diffracting optical element may project different perspectives of the retina on different regions of the image sensor of the camera. Accordingly, multiple portions may be identified in the imaging having this pattern of blood vessels as the camera images this part of the retina and the associate pattern of blood vessels from two perspectives via the two different segments. The center of mass of this pattern in both locations may be determined to obtain $X_1$, $Y_1$ and $X_2$, $Y_2$. In some implementations, these portions are framed by a polygon or other boundary and the center of mass of this frame is used in the calculations. Other approaches are possible. A similar process may be employed when a single camera is employed with two reflective or refractive or diffractive elements (possibly for same or different wavelengths) that introduce different amounts of tilt to project light from different parts of the retina to the camera. In some examples, the two reflective or diffractive or refractive optical elements may be off-axis reflective or diffractive or refractive optical elements.

Similarly, in the case where a segmented reflective (or diffractive or refractive) element is employed with a single camera, $X_i$ and $Y_i$ (i=1, 2) may be x-y coordinates of the center of mass of the entire retina image projected on the image sensor via the two segments. As discussed above, the boundary of such image may be determined or limited by the aperture of the camera (e.g., the lens system of the camera) and/or the diameter of the pupil of the eye whose retina is images. In some examples, the image may comprise two circular or oval boundaries that overlap or merged to some extent. The center of mass or centroid may still be located at the center of the circle or the oval shapes that are discernable. As discussed above, in some cases, the boundary of such an image may not be sharp. A sharp boundary however may be determined, for example, by fitting partial circle, oval, polygon shapes to the more blurry image boundary. A similar process may be employed when a single camera is employed with two reflective (e.g., diffractive) elements (possibly for same or different wavelengths) that introduce different amounts of tilt, for example, via diffraction to provide different perspectives of the retina for example directing light from different portions of the retina to the same camera.

In some implementations, a plurality of images may be captured by the first and the second camera (or by a single camera in combination with a reflective or diffractive optical element such as an off-axis mirror with multiple segments having different amounts of tile to provide different perspectives or a single camera in combination with multiple reflective elements that provide different amounts of tilt) to calculate a plurality of values for $L_x$, $L_y$ and h (each value associated with a pair of images captured by a different camera or possibly associated with a multiple instances of a portion of the retina captured in a single image captured by a single camera). The computing system of the HMD may also calculate an averaged value for $L_x$, $L_y$ and h using the plurality of calculated values. Advantageously, using this method a more accurate value may be obtained for the 3D location of the pupil center. In some implementations, a plurality of camera pairs may be used where each pair may capture two retina images from two different perspectives. In some such implementations, a pair of cameras may be used with a segmented off-axis reflective optical components to generate a plurality of virtual camera pairs where each pair may capture at least one portion of the retina that are imaged from two different perspectives that is used for calculations.

As referred to above the camera(s) used for capturing the required retina images for calculating the 3D position of the pupil center, may be infinity focused cameras. Advantageously, using infinity focused cameras may reduce the sensitivity of the calculated 3D positions of the pupil center to relative movement between the user's eye and the HMD.

Figure 31:
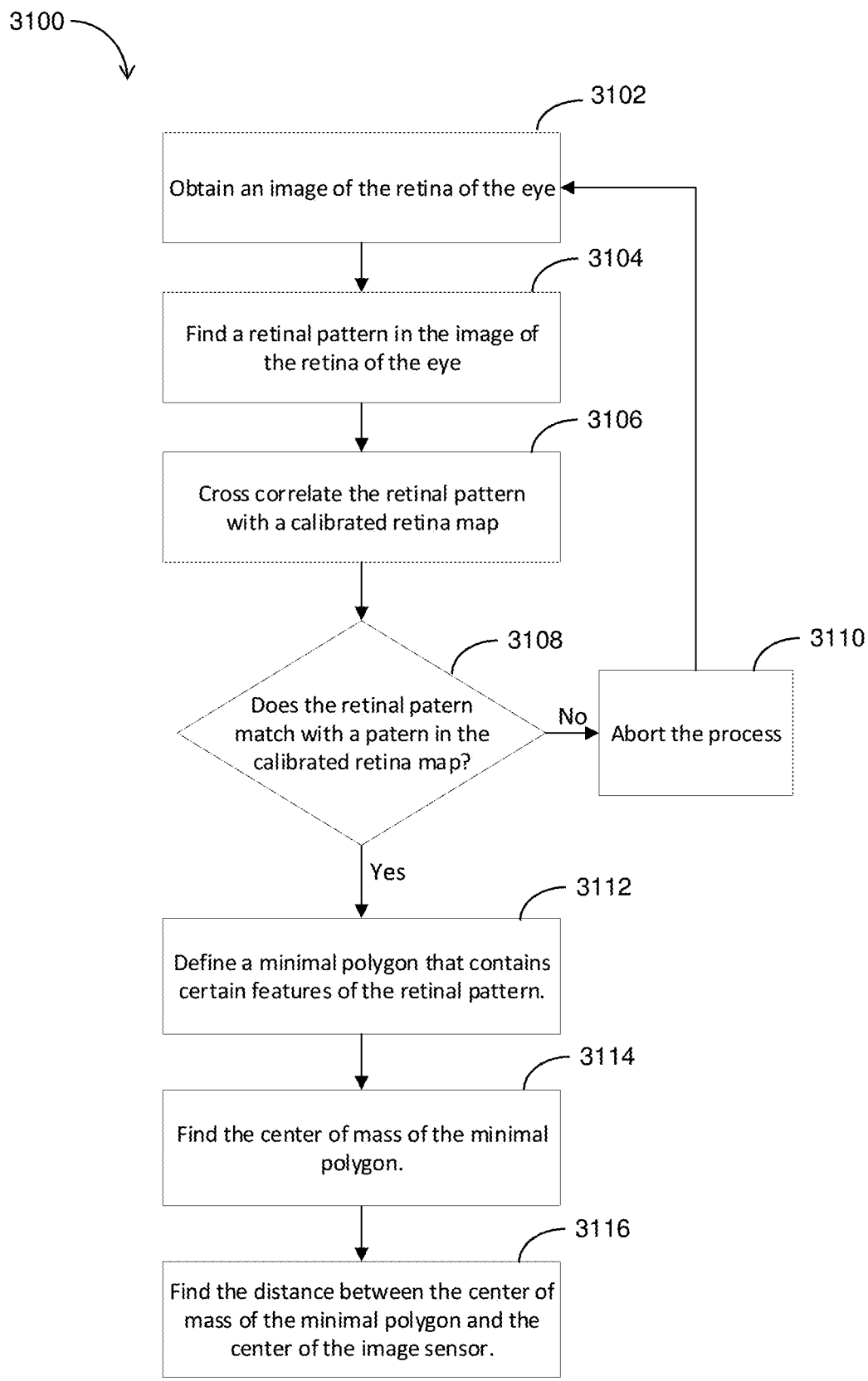
FIG. 31 is a flow diagram showing an example method for calculating the coordinates of a center of mass of a portion of a retina image captured by a camera.

As discussed above, in some implementations, the computing system may select a portion of an image of the retina (e.g., based on a retinal pattern included in the selected portion). In these implementations, $X_1$, $X_2$, $Y_1$ and $Y_2$ may be the x-y coordinates of the selected image portions. FIG. 31 is a flow diagram showing an example of a method that may be used by a computing system of the HMD to estimate coordinates of a center of mass of a portion of a retina image captured by a camera (e.g., a camera mounted on the HMD).

The process 3100 begins at block 3102 where the computing system obtains an image of the retina of the eye of the user (e.g., a wearer of the HMD) from a first perspective. In some cases, the computing system may obtain the image from a memory of the computing system or the camera used to capture the image. In some cases, the computing system, may trigger the camera (e.g., by sending a signal) to capture an image of the retina and transfer the image to the computing system. In some implementations, the camera may be forward-facing camera mounted on the HMD, for example, on a frame of the HMD in proximity to the wearer's temple (e.g., on a frame 64 of the wearable display system 200, FIG. 2, for example, an ear stem or temple). As mentioned above, an off-axis reflective optical element (e.g., an off-axis mirror, an off-axis diffractive element, an off-axis holographic mirror and the like) disposed on the waveguide display of the HMD in front of the forward-facing camera and the eye may redirect light rays reflected from the retina to the camera and thereby enable imaging the retina using the forward-facing camera (as shown, for example, in FIG. 24A or 24H).

At block 3104, the computing system may find a retina pattern in the retina image obtained at block 3102. In some cases, the retinal pattern may be a predetermined retina pattern. In some cases, the computing system may select a portion of the retina image that includes the retinal pattern. The selected portion of the retina may have a rectangular, circular, triangular or other shapes. In some cases, the retinal pattern may be associated with retinal blood vessels in the selected portion of the retina image. In some examples, the computing system may modify a contrast, a color balance or other parameters of the image. In some such examples, the image may be modified or filtered using one or more digital image processing algorithms. Image noise reductions can be employed in one or more various stages of processes described herein. In some cases, Frangi filtering and/or Meijering method can be employed in one or more process described herein.

At block 3106, the computing system may cross correlate the selected portion at block 3104 of the retinal image with a calibrated retina map saved in a memory of the computing system to determine whether the retinal pattern found at block 3104 and/or the selected portion matches or sufficiently matches with a region in the calibrated retina map. In some examples, the computing system may generate a score indicating a level of correlation between the retinal pattern (or the selected portion) with a region in the calibrated retina map.

As described above, the calibrated retina map may be generated and stored during a calibration process when a plurality of targets images (e.g., virtual target images) are presented to the user via the display of the HMD. By presenting the targets located at different positions with respect to the eye of the user, different portions of the retina may be imaged as the gaze direction of the eye of the user changes to observe each target image. FIG. 32B shows an example of calibrated retina map stored in the memory of the computing system.

At the decision block 3108, the computing system may determine whether the selected portion of the retina image (or the retina image) matches with a region of the calibrated retina map. In some implementations, the computing system may determine that the selected portion matches with a region of the calibrated retina map by determining the score generated at block 3106 is larger than a threshold score. In the example shown in FIG. 32A, the portion of the retina image 3214 may be a match for a region of the retinal map shown in FIG. 32B (e.g., the region included in the white rectangle may correspond to the portion of retina image 3214 projected on the image sensor 3212).

Upon determining that the selected portion of image matches with a region in the calibrated retina map, the process proceeds to block 3112. If the computing system determines the selected portion of the image does not match with a region in the calibrated retina map (e.g., by determining that the score generated at block 3106 is smaller than a threshold score), the process may proceed to block 3110 and abort the process. Subsequently, the process may return to block 3102 where the computing system may obtain a new image (e.g., by triggering the camera).

Figure 32C:
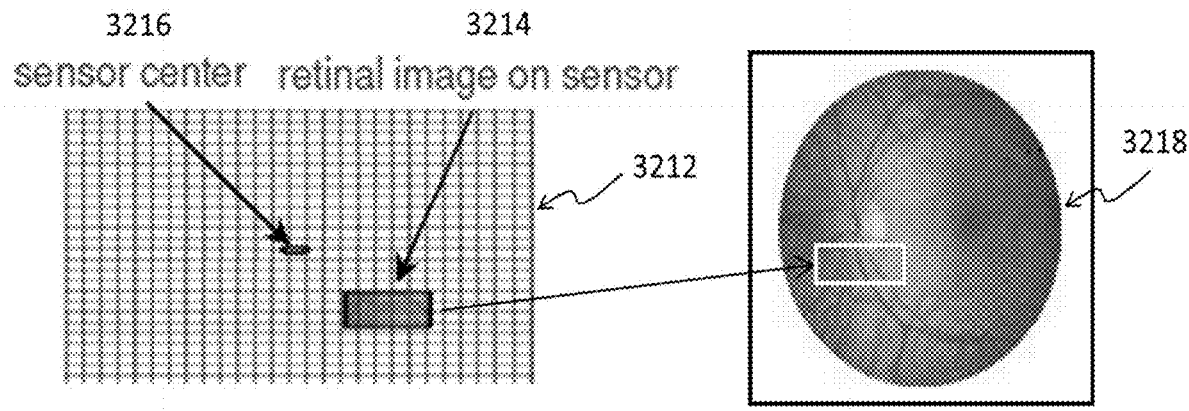
FIG. 32C illustrates the image of a portion of the retina (shown in FIG. 32A) where a blood vessel pattern is identified.
Figure 32C:
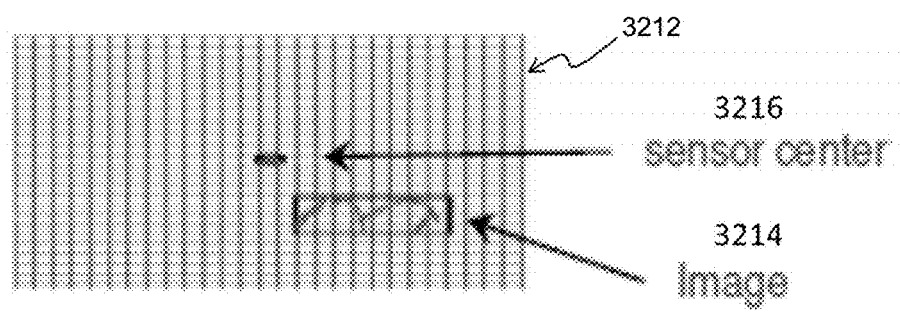
Figure 32D:
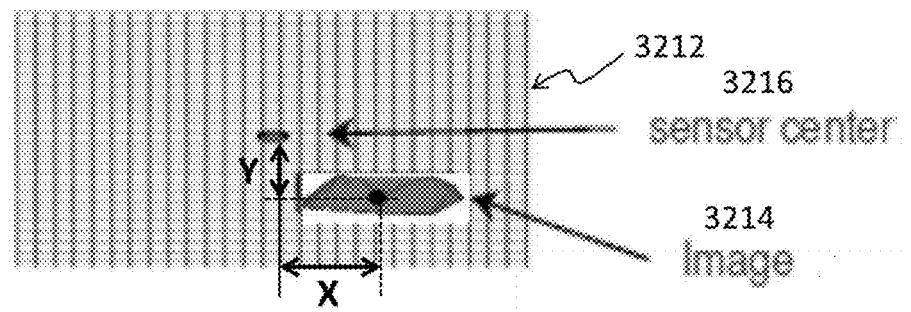
FIG. 32D illustrates the image of a portion of the retina containing blood vessels (shown in FIG. 32C) where a bounding region, e.g., polygon or minimal polygon, has been defined around the blood vessels.

In some implementations, at block 3108, the computing system may further determine a gaze direction associated with the retina image using a gaze direction mapping matrix stored in a memory of the computing system. At block 3112 the computing system may define a bounding region such as a polygon, e.g., minimal polygon, that contains the retinal pattern (e.g., region of one or more blood vessels). In some examples, the bounding region may include all the selected blood vessels. In some implementations, the bounding region is a polygon with all of its internal angles less than 180 degrees. FIG. 32C shows a portion 3314 of an image projected on the image sensor 3212 that contains blood vessels. In the examples shown, the image of the blood vessels may be a modified image where a high contrast has been generated between the blood vessels and surrounding tissue. FIG. 32D shows an example bounding region such as a polygon, e.g., minimal polygon, around the blood vessels identified and selected in FIG. 32C.

At block 3114, the computing system may find a center of mass of the minimal polygon or the portion of retina image 3214 included in the bounding region, for example, polygon or minimal polygon.

At block 3116, the computing system may calculate the x-y coordinates of the center of mass X and Y (or $X_1$ and $Y_1$ defined in FIG. 30), for example, with respect to a coordinate system whose origin is the center of the image sensor 3212. The x-axis and y-axis may be parallel to the edges of the image sensor 3212. FIG. 32A illustrates a selected portion of a retina image (or a retina image) 3214 projected on the image sensor 3212 of the camera. As described above, a center 3216 of the image sensor 3212 may be defined by the intersection of the optical axis of the lens system (e.g., camera lens) that generates the image and the plane of the image sensor.

The computing system may repeat the process 3100 by capturing a second image of the retina or second instance of the portion of the retina in the image produced from a different perspective and calculate the x-y coordinates of the center of mass X and Y (or $X_2$ and $Y_2$ defined in FIG. 30) of the corresponding binding region (e.g., polygon) or portion of retina image in the image.

In some other implementations, the computing system may repeat the process 3100 by capturing a second retina image using a second camera that is located at a different position with respect to the user's eye. The position of the second camera may be selected to enable capturing images of retina from a different perspective compared to the retina images captured by the first camera. For example, the second camera can be a forward-facing camera mounted on the HMD at one side of the first camera (e.g., similar to configuration shown in FIG. 30). The second camera may image the retina through a reflecting optical element e.g., a reflecting optical element of the display of the HMD).

As describe above, in some implementations, a single camera may be used in the process 3100 the is configured to view the retina from two different perspectives. In such implementation, the camera may be a forward-facing camera that captures images of the retina via multiple reflective and/or diffractive elements or a segmented reflective and/or diffractive elements having multiple segments that introduce different amounts of tilt or beam steering to provide to provide for different views or perspectives of retina. As described above, e.g., with respect to FIGS. 24E, 24F, and 24H, a segmented reflective optical element (e.g., a segmented off-axis mirror or a segmented off-axis holographic mirror) or multiple reflective layers (e.g., multiple off-axis mirrors or a off-axis holographic mirrors) having different amounts of tilt may generate virtual cameras (i.e., virtual images of the single camera), at different angular locations and thereby enable capturing multiple renderings of retina each associated with a different perspective of the retina. In some examples, different segments of the reflecting optical element or different reflective layers may project different perspectives (or different portions) of the retinal on different regions of the image sensor of the camera. In these examples, the computing system may obtain a first and a second portions of the image by reading the signals generated by the pixels of the image sensor illuminated by a first and a second segment of the segmented reflecting optical element or the first and second reflective layers. Subsequently, the computing system may perform the process 3100 twice using the first portion or bounded region and then the second portion or bounded region to calculate $X_1$, $X_2$, $Y_1$ and $Y_2$.

In some cases, where the single camera receives a single image associated with two different perspectives of retina (e.g., from a segmented reflective and/or diffractive surface or segmented reflective and/or diffractive optical element), at block 3104 the computing system may find a retinal pattern based at least in part on an overlap region between a first portion of the single image associated with a first perspective and a second portion of the single image associated with a second perspective. In some such cases, the computing system may select two identical retinal patterns that are located outside of the overlap region. (These retinal patterns may be the images of a single pattern of the retina of the user's eye captured from different perspectives).

Once the coordinates of the two centers of mass ($X_1$, $X_2$, $Y_1$ and $Y_2$) are calculated by repeating the process 3100 twice based on retina images or portions of an image captured show two different views of the retina from two different perspectives, the computing system may use equations 5-7 and $X_1$, $X_2$, $Y_1$ and $Y_2$, to calculate the 3D position of the pupil center, for example, with respect to a joint coordinate system. In some implementations, the joint coordinate system (or joint reference frame) may be a coordinate system whose origin is equally distanced from the center of the image sensors of the two cameras (or the center of virtual image sensors of the two virtual cameras generated by segmented reflecting optical element). The x-axis and y-axis of the coordinate system (reference frame) may be parallel to the edges of the image sensor 3212. For example, in some implementations, the computing system may determine the 3D position of the pupil center by calculating $L_x$, $L_y$, and h based on a first retina image 3014a and a second retina image 3014b projected on the first image sensor 3011a and the second image sensor 3011b, and with respect to the xyz reference frame whose origin is located at the middle point 3013 between the optical centers 3008a and 3008b of the two lens systems.

Figure 33A:
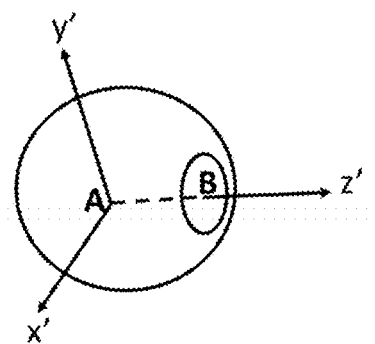
FIG. 33A schematically illustrates a coordinate system of an eyeball defined based on the eyeball center and pupil center when the eye is a in a neutral orientation.
Figure 33B:
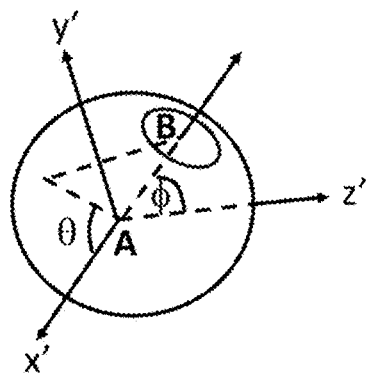
FIG. 33B schematically illustrates the angular coordinates of the pupil center in the coordinate system defined in FIG. 33A, when the eyeball is not in a neutral orientation.

As described above once the 3D position of the pupil center is determined, the 3D position of the eyeball center (EBC) may be calculated using the 3D position of the pupil center and the gaze direction associated with the retina images used to calculate the pupil center. The gaze direction may be defined using a local coordinate system whose origin is at the EBC and one of its axes that (e.g., z-axis) passes through the pupil center when the orientation of the eye is associated with a reference gaze direction (e.g., when the user looks straight through the eyewear, e.g., display or eyepiece, for example such that the optical axis of the eye is perpendicular to the eyepiece or associated layers, such as the waveguides and/or the reflective element, etc.). FIG. 33A illustrates such an x'y'z' coordinate system where the origin of the x'y'z' system is located at the EBC (point A) and the z'-axis and is perpendicular to the eyepiece of the HMD. The z'-axis passes through pupil center B when the eye ball is oriented to look straight through the eyepiece (i.e., neutral orientation). As shown in FIG. 33B, an arbitrary gaze direction may be defined using the polar it, and azimuthal angles θ with respect to z-axis and x-axis, respectively.

Figure 33C:
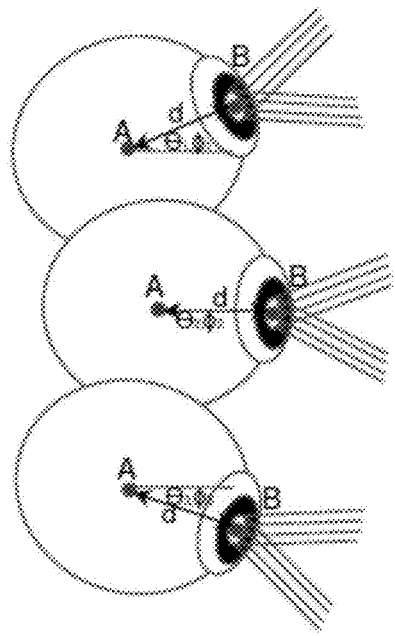
FIG. 33C shows the relative position of the pupil center (B) with respect to eyeball center (A) for three different gaze directions.

Assuming that EBC position is degenerate under eyeball rotation, at any given time t, the 3D coordinate of EBC and the coordinate of the pupil center, with respect to the joint coordinate system (e.g., the joint coordinate system xyz defined in FIG. 30), are related by the following equation:

$$A_{(x,y,z,t)} = B_{(x,y,z,t)} - d(\sin_{(\phi(t))}\cos_{(\Theta(t))}, \sin_{(\phi(t))}\sin_{(\Theta(t))}, \cos_{(\phi(t))}) \quad (8)$$

where A(x,y,z,t) is a vector pointing to EBC and B(x,y,z,t) is a vector pointing to pupil center. d is the linear distance between EBC and pupil center. In some cases, d may be considered to be constant for a given eye. In some implementations, the computing system of the HMD may determine the value of d for a user of the HMD such as during a calibration process. As such by knowing the 3D location of the pupil center and the gaze direction (φ and θ) at which the pupil center has been determined, the 3D location of the EBC can be calculated. FIG. 33C shows the relative position of the pupil center (B) with respect to EBC (A) for three different gaze directions. The orientation of the eyeball in the middle diagram is a neutral orientation and is associated with a reference gaze direction (φ=θ=0) where the eye is looking along the direction of the z-axis (e.g., directly forward and/or normal to the eyepiece).

Given that the position of the EBC may change under eyeball rotation (e.g., with respect to a reference frame of the HMD, in some implementations, the computing system of the HMD may determine the 3D location of the EBC by averaging the variation of the right hand side of the equation 8 over time (as the gaze direction and therefore B change):

$$A_{(x,y,z,t)} = <B_{(x,y,z)} - d(\sin_{(\phi(t))}\cos_{(\Theta(t))}, \sin_{(\phi(t))}\sin_{(\Theta(t))}, \cos_{(\phi(t))})>t \quad (9)$$

An error in the determined 3D position of the EBC may be reduced by increasing the averaging time.

The gaze direction ($\phi$ and $\theta$) associated with a pupil center location may be calculated based on the one or more retina images used to calculate the pupil center. As mentioned above, during the calibration process a gaze direction mapping matrix may be generated that maps different gaze directions to different retina images captured by a camera from a specific perspective. FIGS. 13A and 13B, for example, shows how a retinal map may be created by presenting the user with different targets during a calibration process and how the user's gaze can subsequently be determine base on the retinal image obtained and how that retinal image fits within the retinal map.

Figure 34:
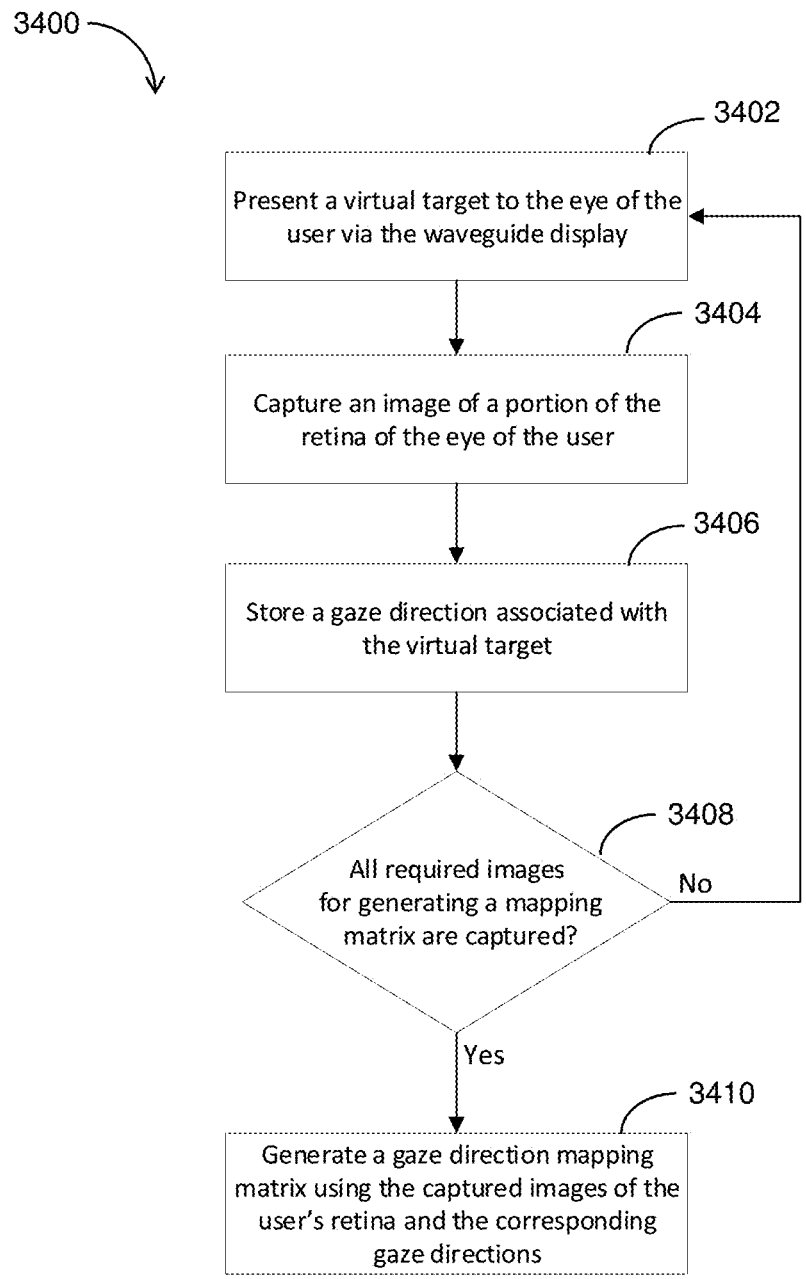
FIG. 34 is a flow diagram showing an example method that may be used to generate a gaze direction mapping matrix for an eye.

FIG. 34 is a flow diagram showing an example of a method that may be used by a computing system of the HMD, for example during the calibration process to generate a gaze direction mapping matrix. The computing system may initially present multiple targets approximately located in front of the eye of the user and ask the user (e.g., via a user interface of the HMD) to select a virtual target that is approximately at the center of the user's view when the user looks straight through the eyepiece. When such target is selected by the user, that virtual target may be labeled as a reference virtual target that is associated with a reference gaze direction (e.g., gaze direction defined by $\phi=\theta=0$). Using the reference target, the computing system may determine a series of targets associated with different gaze directions with respect to the reference gaze direction. These targets may be used during the process 3400 to generate the gaze direction mapping matrix. As a result, the different virtual targets can be uniquely associated with specific values of ($\phi$ and $\theta$).

The process 3400 begins at block 3402 where the computing system presents a first virtual target to the user via the waveguide display of the HMD and asks the user to look at the target. In some implementations, the first virtual target may be a reference target determined before the process 3400 begins.

At block 3404, the computing system may capture an image of a portion of the retina of the eye of the user using one or more cameras. The portion of retinal captured is determined by the gaze direction associated with the target (determined before the process begins). In some implementations, no initial target is presented. Rather the user is simply requested to look directly forward and a retinal image is obtained and associated with the reference (e.g., straight forward) gaze direction.

At block 3406, the computing system may store the retina image captured at block 3404 along with the corresponding gaze direction (i.e., values of $\phi$ and $\theta$ associated with the target presented at block 3402).

At the decision block 3408, the computing system determined whether the acquired image and previously acquired images are sufficient to generate a gaze direction mapping matrix. In some examples, the computing system may determine that the acquired images are sufficient by checking the gaze directions associated with the targets presented to the user. If the computing systems determines that the images associated with the various gaze directions have been captured, the process proceeds to block 3410, otherwise the process returns to block 3402 to capture more images using different targets.

The process from block 3402 to block 3408 may be repeated until retina images associated with the gaze angles are captured.

At block 3410, the computing system may generate the gaze direction mapping matrix using the retina images captured and the corresponding gaze angles ($\phi$ and $\theta$).

In some implementations, for different targets (and different gaze angles) multiple images may be captures using multiple cameras or multiple virtual cameras. In these implementations, the resulting gaze direction mapping matrix may be used to determine gaze directions based on multiple images captured using multiple cameras or multiple portions of the image corresponding to the same portion of the retina. Advantageously determining the gaze direction based on multiple cameras and/or multiple perspectives may improve the accuracy of the determined gaze direction.

In some implementations, during the process 3400 (performed during a calibration stage), the computing system may also estimate the value of d (i.e., the linear distance between the pupil center and the EBC) for the user of the HMD. In such implementations, at block 3404, two cameras (or two virtual cameras associated with a single camera) may be used to capture two images of the retinal of the user's eye from two different perspectives. The computing systems may use the corresponding image pairs to calculate the 3D position of the pupil center (B vector) at the different gaze direction (associated with respective targets). The computing system may use the method described above to calculate a plurality of 3D positions of the pupil centers. Subsequently, the computing system may use the plurality of 3D positions of the pupil center (plurality of B vectors) and the associated plurality of gaze directions (plurality of $\phi$ and $\theta$ values) to estimate d. For example, the computing system may calculate a plurality of 3D EBC positions (plurality of A vectors) using, equation 8, the plurality of B vectors and the plurality of $\phi$ and $\theta$ values, as it varies the value of d. Through this process, the computing system may determine what value of d results in the smallest possible variation of A vector (3D EBC position) as the location of the pupil center (and the associated gaze direction) change. Such value of d may be stored in a memory of the computing system and may be used for subsequent determination of the EBC based on the methods described above. Other methods of determining d may be employed. As discussed above, with the retinal camera calibrated such that gaze direction can be determined and a value for d is established, the EBC can be calculated based on measurements of the pupil position. With the pupil position and the gaze direction known, the EBC is determined by translating back along the gaze direction from the pupil position a distance, d. The EBC is located as this position.

A wide range of variations are possible. For example, although the camera shown as forward facing in many of the figures, the method is not limited to forward facing cameras that employ off-axis mirrors. Similarly, although VCSEL's have been discussed as above as a desirable source of illumination, light sources different than VCSEL's, including other solid state light source, can be employed. Additionally, although the location of the center of mass or centroid is discussed measured with respect to the center of the image sensor at the image plane of the image sensor, other reference locations may be employed. Similarly, other reference frames and reference coordinate systems may be used. Also, other positions besides the center of mass or centroid may potentially be used with appropriate adjustments. Additionally, the reflecting and/or diffractive optical element (e.g. off-axis reflector or mirror) discussed herein that may be used to reflect light from the eye (e.g., retina) to the camera may comprise a reflective and/or diffractive optical surface in some implementations.

Computer Vision to Detect Objects in an Image

As discussed above, the display system may be configured to detect objects in or properties of an image. The detection may be accomplished using a variety of techniques, including various sensors (e.g., cameras, audio sensors, temperature sensors, etc.), as discussed herein.

In some embodiments, objects present may be detected using computer vision techniques. For example, as disclosed herein, the display system's camera may be configured to image the user's eye and the display system may be configured to perform image analysis on the images to determine the presence of objects. The display system may analyze the images acquired by the imaging system to perform object recognition, learning, indexing, motion estimation, or image restoration, etc. As other examples, the display system may be configured to perform face and/or eye recognition to determine the presence and location of faces and/or human eyes in the user's field of view. One or more computer vision algorithms may be used to perform these tasks. Non-limiting examples of computer vision algorithms include: Scale-invariant feature transform (SIFT), speeded up robust features (SURF), oriented FAST and rotated BRIEF (ORB), binary robust invariant scalable keypoints (BRISK), fast retina keypoint (FREAK), Viola-Jones algorithm, Eigenfaces approach, Lucas-Kanade algorithm, Horn-Schunk algorithm, Mean-shift algorithm, visual simultaneous location and mapping (vSLAM) techniques, a sequential Bayesian estimator (e.g., Kalman filter, extended Kalman filter, etc.), bundle adjustment, Adaptive thresholding (and other thresholding techniques), Iterative Closest Point (ICP), Semi Global Matching (SGM), Semi Global Block Matching (SGBM), Feature Point Histograms, various machine learning algorithms (such as e.g., support vector machine, k-nearest neighbors algorithm, Naive Bayes, neural network (including convolutional or deep neural networks), or other supervised/unsupervised models, etc.), and so forth.

One or more of these computer vision techniques may also be used together with data acquired from other sensors (such as, e.g., microphone) to detect and determine various properties of the objects detected by the sensors.

As discussed herein, the objects may be detected based on one or more criteria. When the display system detects the presence or absence of the criteria for example in an image using a computer vision algorithm or using data received from one or more sensor assemblies (which may or may not be part of the display system), the display system may then signal the presence of the object.

Machine Learning

A variety of machine learning algorithms may be used to learn to identify the presence of objects in an image. Once trained, the machine learning algorithms may be stored by the display system. Some examples of machine learning algorithms may include supervised or non-supervised machine learning algorithms, including regression algorithms (such as, for example, Ordinary Least Squares Regression), instance-based algorithms (such as, for example, Learning Vector Quantization), decision tree algorithms (such as, for example, classification and regression trees), Bayesian algorithms (such as, for example, Naive Bayes), clustering algorithms (such as, for example, k-means clustering), association rule learning algorithms (such as, for example, a-priori algorithms), artificial neural network algorithms (such as, for example, Perceptron), deep learning algorithms (such as, for example, Deep Boltzmann Machine, or deep neural network), dimensionality reduction algorithms (such as, for example, Principal Component Analysis), ensemble algorithms (such as, for example, Stacked Generalization), and/or other machine learning algorithms. In some embodiments, individual models may be customized for individual data sets. For example, the wearable device may generate or store a base model. The base model may be used as a starting point to generate additional models specific to a data type (e.g., a particular user), a data set (e.g., a set of additional images obtained), conditional situations, or other variations. In some embodiments, the display system may be configured to utilize a plurality of techniques to generate models for analysis of the aggregated data. Other techniques may include using predefined thresholds or data values.

The criteria for detecting an object may include one or more threshold conditions. If the analysis of the data acquired by the image sensor indicates that a threshold condition is passed, the display system may provide a signal indicating the detection the presence of the object in the image. The threshold condition may involve a quantitative and/or qualitative measure. For example, the threshold condition may include a score or a percentage associated with the likelihood of the reflection and/or object being present in the image. The display system may compare the score calculated from the sensor's data with the threshold score. If the score is higher than the threshold level, the display system may detect the presence of the reflection and/or object. In some other embodiments, the display system may signal the presence of the object in an image if the score is lower than the threshold. In some embodiments, the threshold condition may be determined based on the user's emotional state and/or the user's interactions with the ambient environment.

In some embodiments, the threshold conditions, the machine learning algorithms, or the computer vision algorithms may be specialized for a specific context. For example, in a diagnostic context, the computer vision algorithm may be specialized to detect certain responses to the stimulus. As another example, the display system may execute facial recognition algorithms and/or event tracing algorithms to sense the user's reaction to a stimulus, as discussed herein.

In various implementations, the display system (HMD) may comprise a computing system, e.g., electronics or processing electronics, in communication with one or more cameras used to captures images (e.g., images of the retina of a user of the HMD). The computing system may comprise a memory and an electronic processor configured to execute machine readable instructions stored in the memory. The computing system may be connected to the image sensors of the one of more cameras and receive image data (e.g., digital image data) from the image sensors. In some cases, the computing system may be configured to trigger the camera and/or one or more light sources to project one or more images on one or more image sensors and cause the one or more cameras to capture one or more images. Subsequently, the computing system may receive the corresponding image data from the one or more image sensors. One or more image processing algorithms may be stored in the memory of the computing system to modify the image data and extract information related to various aspects of the image data (e.g., position of a specific pattern on the image sensor). In some examples, the computing system and the image sensors may be configured to enable the computing system to receive image data from a selected sub-set of pixels of each image sensor.

EXAMPLES

Some nonlimiting examples of embodiments described herein are offered below merely by way of illustration.
Section I Example 1: A head mounted display system configured to project light to an eye of a user to display augmented reality image content in a vision field of said user, said head-mounted display system comprising:
- a frame configured to be supported on a head of the user;
- an image projector configured to project images into the user's eye to display image content in the vision field of the user;
- a camera;
- an eyepiece disposed on the frame, said eyepiece configured to direct light into said user's eye to display augmented reality image content to the user's vision field;
- a reflective element disposed on the frame, at least a portion of said eyepiece and said reflective element being transparent to visible light and disposed at a location in front of the user's eye when the user wears said head-mounted display such that said transparent portions transmit light from an environment in front of the user to the user's eye to provide a view of the environment in front of the user; and
- at least one VCSEL disposed to illuminate said eye,
- wherein said camera is disposed with respect to said reflective element such that light from said VCSEL is reflected from the user's eye to said reflective element and is reflected from said reflective element to said camera to form images of said eye that are captured by said camera.

Example 2: The system of Example 1, wherein said at least one VCSEL comprises an IR light source that outputs more infrared light than visible light.

Example 3: The system of any of the examples above, wherein said at least one VCSEL comprises a plurality of VCSELs.

Example 4: The system of any of the examples above, wherein said at least one VCSEL is mounted temporally on said frame on a temporal side of said user's head when worn by the user.

Example 5: The system of any of the examples above, wherein said at least one VCSEL is mounted on a layer on said eyepiece.

Example 6: The system of any of Examples 1-4, wherein said at least one VCSEL is mounted on a layer in front of the user's eye such that when the user wears said head-mounted display said layer transmits light from an environment in front of the user to the user's eye to provide a view of the environment in front of the user.

Example 7: The system of any of the examples above, wherein said VCSEL is configured to output polarized light.

Example 8: The system of any of the examples above, further comprising a polarizer disposed between said VCSEL and said user's eye.

Example 9: The system of any of the examples above, further comprising a polarizer on said VCSEL.

Example 10: The system of any of the examples above, further comprising electronics configured to modulate said VCSEL to reduce speckle.

Example 11: The system of any of the claims above, wherein said at least one VCSEL is integrated with the camera.

Example 12: The system of any of the examples above, wherein said a camera is disposed on said frame 7

Example 13: The system of any of the examples above, wherein said a camera is disposed on said frame temporally with respect to the center of the user's eye.

Example 14: The system of any of the examples above, wherein said a camera is disposed temporally on said frame such that said camera is on a temporal side of the user's head.

Example 15: The system of any of the examples above, further comprising electronics configured to modulate said VCSEL.

Example 16: The system of any of the examples above, wherein said eyepiece is configured to project light into said user's eye to display virtual image content to the user's vision field such that the displayed virtual image content appears to originate from different depths.

Example 17: The system of any of the examples above, wherein said eyepiece is configured to project light into said user's eye to display virtual image content to the user's vision field at different amounts of at least one of divergence such that the displayed virtual image content appears to originate from different depths.

Example 18: The system of any of the examples above, wherein said eyepiece is configured to project light into said user's eye that divergences and to project light into said user's eye that is collimated to display virtual image content to the user's vision field that appears to originate from different depths.

Example 19: The system of any of the examples above, wherein said eyepiece comprises one or more waveguides.

Example 20: The system of any of the examples above, wherein said eyepiece comprises one or more waveguides configured to direct light from said image projector to said user's eye to present image content to the user.

Example 21: The system of any of the examples above, wherein the reflective optical element comprises a diffractive optical element or a holographic optical element.

Example 22: The system of any of the examples above, wherein the reflective optical element comprises an off axis mirror.

Example 23: A head mounted display system configured to project light to an eye of a user to display augmented reality image content in a vision field of said user, said head-mounted display system comprising:
- a frame configured to be supported on a head of the user;
- an image projector configured to project images into the user's eye to display image content in the vision field of the user;
- a camera;
- an eyepiece disposed on the frame, said eyepiece configured to direct light into said user's eye to display augmented reality image content to the user's vision field, at least a portion of said eyepiece being transparent to visible light and disposed at a location in front of the user's eye when the user wears said head-mounted display such that said transparent portions transmit light from an environment in front of the user to the user's eye to provide a view of the environment in front of the user; and at least one VCSEL disposed to illuminate said eye, wherein said camera is disposed such that light from said VCSEL is reflected from the user's eye to said camera to form images of said eye that are captured by said camera.

Example 24: The system of Example 23, wherein said at least one VCSEL comprises an IR light source that outputs more infrared light than visible light.

Example 25: The system of any of the examples above, wherein said at least one VCSEL comprises a plurality of VCSELs.

Example 26: The system of any of the examples above, wherein said at least one VCSEL is mounted temporally on said frame on a temporal side of said user's head when worn by the user.

Example 27: The system of any of the examples above, wherein said at least one VCSEL is mounted on a layer on said eyepiece.

Example 28: The system of any of Examples 23-26, wherein said at least one VCSEL is mounted on a layer in front of the user's eye such that when the user wears said head-mounted display said layer transmits light from an environment in front of the user to the user's eye to provide a view of the environment in front of the user.

Example 29: The system of any of the examples above, wherein said VCSEL is configured to output polarized light.

Example 30: The system of any of the examples above, further comprising a polarizer disposed between said VCSEL and said user's eye.

Example 31: The system of any of the examples above, further comprising a polarizer on said VCSEL.

Example 32: The system of any of the examples above, further comprising electronics configured to modulate said VCSEL to reduce speckle.

Example 33: The system of any of the claims above, wherein said at least one VCSEL is integrated with the camera.

Example 34: The system of any of the examples above, wherein said a camera is disposed on said frame.

Example 35: The system of any of the examples above, wherein said a camera is disposed on said frame temporally with respect to the center of the user's eye.

Example 36: The system of any of the examples above, wherein said a camera is disposed temporally on said frame such that said camera is on a temporal side of the user's head.

Example 27: The system of any of the examples above, further comprising electronics configured to modulate said VCSEL.

Example 38: The system of any of the examples above, wherein said eyepiece is configured to project light into said user's eye to display virtual image content to the user's vision field such that the displayed virtual image content appears to originate from different depths.

Example 39: The system of any of the examples above, wherein said eyepiece is configured to project light into said user's eye to display virtual image content to the user's vision field at different amounts of at least one of divergence such that the displayed virtual image content appears to originate from different depths.

Example 40: The system of any of the examples above, wherein said eyepiece is configured to project light into said user's eye that divergences and to project light into said user's eye that is collimated to display virtual image content to the user's vision field that appears to originate from different depths.

Example 41: The system of any of the examples above, wherein said eyepiece comprises one or more waveguides.

Example 42: The system of any of the examples above, wherein said eyepiece comprises one or more waveguides configured to direct light from said image projector to said user's eye to present image content to the user.

Example 43: The system of any of the examples above, wherein said at least one VCSEL is mounted on a temporal side of the center of the user's eye when worn by the user.

Example 44: The system of any of the examples above, wherein said at least one VCSEL is mounted on said frame on a temporal side of the center of the user's eye when worn by the user.

Section II

Example 1: A head mounted display system configured to project light to an eye of a user to display augmented reality image content in a vision field of said user, said head-mounted display system comprising:

a frame configured to be supported on a head of the user;
an image projector configured to project images into the user's eye to display image content in the vision field of the user;
a camera;
an eyepiece disposed on the frame, said eyepiece configured to direct light into said user's eye to display augmented reality image content to the user's vision field,
a reflective element disposed on the frame, at least a portion of said eyepiece and said reflective element being transparent to visible light and disposed at a location in front of the user's eye when the user wears said head-mounted display such that said transparent portions transmit light from an environment in front of the user to the user's eye to provide a view of the environment in front of the user, said reflective element having chromatic aberration; and
at least one light source disposed to illuminate said eye,
at least one diffractive optical element having chromatic dispersion that counters at least a portion of the chromatic aberration introduced by said reflective element,
wherein said camera is disposed with respect to said reflective element such that light from said at least one light source is reflected from the user's eye to said reflective element and is reflected from said reflective element to said camera to form images of said eye that are captured by said camera.

Example 2: The system of Example 1, wherein said at least one light source comprises in infrared light source configured to provide more infrared light than visible light.

Example 3: The system of any of the examples above, further comprising a focusing optical element disposed within an optical path between the diffractive optical element and the reflective element.

Example 4: The system of the examples above, wherein the diffractive optical element is a diffractive optical element configured to reflect the light into the camera.

Example 5: The system of the examples above, wherein the diffractive optical element is a reflective diffractive optical element configured to pass the light therethrough into the camera.

Example 6: The system of the examples above, further comprising a partially reflective optical element configured to transmit the light therethrough and to reflect light from the light source toward the diffractive optical element.

Example 7: The system of any of the examples above, wherein said a camera is disposed on said frame.

Example 8: The system of any of the examples above, wherein said a camera is disposed on said frame temporally with respect to the center of the user's eye.

Example 9: The system of any of the examples above, wherein said a camera is disposed temporally on said frame such that said camera is on a temporal side of the user's head.

Example 10: The system of the examples above, wherein said light source comprises a laser.

Example 11: The system of the examples above, wherein said light source comprises a VCSEL.

Example 12: The system of any of the examples above, wherein said eyepiece is configured to project light into said user's eye to display virtual image content to the user's vision field such that the displayed virtual image content appears to originate from different depths.

Example 13: The system of any of the examples above, wherein said eyepiece is configured to project light into said user's eye to display virtual image content to the user's vision field at different amounts of at least one of divergence such that the displayed virtual image content appears to originate from different depths.

Example 14: The system of any of the examples above, wherein said eyepiece is configured to project light into said user's eye that divergences and to project light into said user's eye that is collimated to display virtual image content to the user's vision field that appears to originate from different depths.

Example 15: The system of any of the examples above, wherein said eyepiece comprises one or more waveguides.

Example 16: The system of any of the examples above, wherein said eyepiece comprises one or more waveguides configured to direct light from said image projector to said user's eye to present image content to the user.

Example 17: The system of any of the examples above, wherein the reflective optical element comprises a diffractive optical element or a holographic optical element.

Example 18: The system of any of the examples above, wherein the reflective optical element comprises an off axis mirror.

Section III

Example 1: A head mounted display system configured to project light to an eye of a user to display augmented reality image content in a vision field of said user, said head-mounted display system comprising:
  a frame configured to be supported on a head of the user;
  an image projector configured to project images into the user's eye to display image content in the vision field of the user;
  a camera;
  an eyepiece disposed on the frame, said eyepiece configured to direct light into said user's eye to display augmented reality image content to the user's vision field,
  a reflective element disposed on the frame, at least a portion of said eyepiece and said reflective element being transparent to visible light and disposed at a location in front of the user's eye when the user wears said head-mounted display such that said transparent portions transmit light from an environment in front of the user to the user's eye to provide a view of the environment in front of the user; and
  at least one light source disposed to illuminate said eye, said at least one light source mounted on a layer in front of the user's eye such that when the user wears said head-mounted display said layer transmits light from an environment in front of the user to the user's eye to provide a view of the environment in front of the user,
  wherein said camera is disposed with respect to said reflective element such that light from said at least one light source is reflected from the user's eye to said reflective element and is reflected from said reflective element to said camera to form images of said eye that are captured by said camera.

Example 2: The system of Example 1, wherein said layer is part of said eyepiece.

Example 3: The system of any of the examples above, wherein said a camera is disposed on said frame.

Example 4: The system of any of the examples above, wherein said a camera is disposed on said frame temporally with respect to the center of the user's eye.

Example 5: The system of any of the examples above, wherein said a camera is disposed temporally on said frame such that said camera is on a temporal side of the user's head.

Example 6: The system of the examples above, wherein said light source comprises a laser.

Example 7: The system of the examples above, wherein said light source comprises a VCSEL.

Example 8: The system of any of the examples above, wherein said eyepiece is configured to project light into said user's eye to display virtual image content to the user's vision field such that the displayed virtual image content appears to originate from different depths.

Example 9: The system of any of the examples above, wherein said eyepiece is configured to project light into said user's eye to display virtual image content to the user's vision field at different amounts of at least one of divergence such that the displayed virtual image content appears to originate from different depths.

Example 10: The system of any of the examples above, wherein said eyepiece is configured to project light into said user's eye that divergences and to project light into said user's eye that is collimated to display virtual image content to the user's vision field that appears to originate from different depths.

Example 11: The system of any of the examples above, wherein said eyepiece comprises one or more waveguides.

Example 12: The system of any of the examples above, wherein said eyepiece comprises one or more waveguides configured to direct light from said image projector to said user's eye to present image content to the user.

Example 13: The system of any of the examples above, wherein the reflective optical element comprises a diffractive optical element or a holographic optical element.

Example 14: The system of any of the examples above, wherein the reflective optical element comprises an off axis mirror.

Example 15: A head mounted display system configured to project light to an eye of a user to display augmented reality image content in a vision field of said user, said head-mounted display system comprising:
  a frame configured to be supported on a head of the user;
  an image projector configured to project images into the user's eye to display image content in the vision field of the user;
  a camera;
  an eyepiece disposed on the frame, said eyepiece configured to direct light into said user's eye to display augmented reality image content to the user's vision field, at least a portion of said eyepiece being transparent to visible light and disposed at a location in front of the user's eye when the user wears said head-mounted display such that said transparent portions transmit light from an environment in front of the user to the user's eye to provide a view of the environment in front of the user; and at least one light source disposed to illuminate said eye, said at least one light source mounted on a layer in front of the user's eye such that when the user wears said head-mounted display said layer transmits light from an environment in front of the user to the user's eye to provide a view of the environment in front of the user, wherein said camera is disposed such that light from said at least one light source is reflected from the user's eye to said camera to form images of said eye that are captured by said camera.

Example 16: The system of Example 15, wherein said layer is part of said eyepiece.

Example 17: The system of any of the examples above, wherein said a camera is disposed on said frame.

Example 18: The system of any of the examples above, wherein said a camera is disposed on said frame temporally with respect to the center of the user's eye.

Example 19: The system of any of the examples above, wherein said a camera is disposed temporally on said frame such that said camera is on a temporal side of the user's head.

Example 20: The system of the examples above, wherein said light source comprises a laser.

Example 21: The system of the examples above, wherein said light source comprises a VCSEL.

Example 22: The system of any of the examples above, wherein said eyepiece is configured to project light into said user's eye to display virtual image content to the user's vision field such that the displayed virtual image content appears to originate from different depths.

Example 23: The system of any of the examples above, wherein said eyepiece is configured to project light into said user's eye to display virtual image content to the user's vision field at different amounts of at least one of divergence such that the displayed virtual image content appears to originate from different depths.

Example 24: The system of any of the examples above, wherein said eyepiece is configured to project light into said user's eye that divergences and to project light into said user's eye that is collimated to display virtual image content to the user's vision field that appears to originate from different depths.

Example 25: The system of any of the examples above, wherein said eyepiece comprises one or more waveguides.

Example 26: The system of any of the examples above, wherein said eyepiece comprises one or more waveguides configured to direct light from said image projector to said user's eye to present image content to the user.

Section IV

Example 1: A head mounted display system configured to project light to an eye of a user to display augmented reality image content in a vision field of said user, said head-mounted display system comprising:

a frame configured to be supported on a head of the user;

an image projector configured to project images into the user's eye to display image content in the vision field of the user;

a camera;

an eyepiece disposed on the frame, said eyepiece configured to direct light into said user's eye to display augmented reality image content to the user's vision field, a reflective element disposed on the frame, at least a portion of said eyepiece and said reflective element being transparent to visible light and disposed at a location in front of the user's eye when the user wears said head-mounted display such that said transparent portions transmit light from an environment in front of the user to the user's eye to provide a view of the environment in front of the user; and at least one light source disposed to illuminate said eye, said light source disposed on said eyepiece, wherein said camera is disposed with respect to said reflective element such that light from said at least one light source is reflected from the user's eye to said reflective element and is reflected from said reflective element to said camera to form images of said eye that are captured by said camera.

Example 2: The system of Example 1, wherein said at least one light source comprises a VCSEL.

Example 3: The system of any of the examples above, wherein said a camera is disposed on said frame.

Example 4: The system of any of the examples above, wherein said a camera is disposed on said frame temporally with respect to the center of the user's eye.

Example 5: The system of any of the examples above, wherein said a camera is disposed temporally on said frame such that said camera is on a temporal side of the user's head.

Example 6: The system of the examples above, wherein said light source comprises a laser.

Example 7: The system of any of the examples above, wherein said eyepiece is configured to project light into said user's eye to display virtual image content to the user's vision field such that the displayed virtual image content appears to originate from different depths.

Example 8: The system of any of the examples above, wherein said eyepiece is configured to project light into said user's eye to display virtual image content to the user's vision field at different amounts of at least one of divergence such that the displayed virtual image content appears to originate from different depths.

Example 9: The system of any of the examples above, wherein said eyepiece is configured to project light into said user's eye that divergences and to project light into said user's eye that is collimated to display virtual image content to the user's vision field that appears to originate from different depths.

Example 10: The system of any of the examples above, wherein said eyepiece comprises one or more waveguides.

Example 11: The system of any of the examples above, wherein said eyepiece comprises one or more waveguides configured to direct light from said image projector to said user's eye to present image content to the user.

Example 12: The system of any of the examples above, wherein the reflective optical element comprises a diffractive optical element or a holographic optical element.

Example 13: The system of any of the examples above, wherein the reflective optical element comprises an off axis mirror.

Example 14: A head mounted display system configured to project light to an eye of a user to display augmented reality image content in a vision field of said user, said head-mounted display system comprising:

a frame configured to be supported on a head of the user;

an image projector configured to project images into the user's eye to display image content in the vision field of the user;

a camera;
an eyepiece disposed on the frame, said eyepiece configured to direct light into said user's eye to display augmented reality image content to the user's vision field, at least a portion of said eyepiece being transparent to visible light and disposed at a location in front of the user's eye when the user wears said head-mounted display such that said transparent portions transmit light from an environment in front of the user to the user's eye to provide a view of the environment in front of the user; and
at least one light source disposed to illuminate said eye, said light source disposed on said eyepiece,
wherein said camera is disposed that light from said at least one light source is reflected from the user's eye to said camera to form images of said eye that are captured by said camera.

Example 15: The system of Example 14, wherein said at least one light source comprises a VCSEL19

Example 16: The system of any of the examples above, wherein said a camera is disposed on said frame.

Example 17: The system of any of the examples above, wherein said a camera is disposed on said frame temporally with respect to the center of the user's eye.

Example 18: The system of any of the examples above, wherein said a camera is disposed temporally on said frame such that said camera is on a temporal side of the user's head.

Example 19: The system of the examples above, wherein said light source comprises a laser.

Example 20: The system of any of the examples above, wherein said eyepiece is configured to project light into said user's eye to display virtual image content to the user's vision field such that the displayed virtual image content appears to originate from different depths.

Example 21: The system of any of the examples above, wherein said eyepiece is configured to project light into said user's eye to display virtual image content to the user's vision field at different amounts of at least one of divergence such that the displayed virtual image content appears to originate from different depths.

Example 22: The system of any of the examples above, wherein said eyepiece is configured to project light into said user's eye that divergences and to project light into said user's eye that is collimated to display virtual image content to the user's vision field that appears to originate from different depths.

Example 23: The system of any of the examples above, wherein said eyepiece comprises one or more waveguides.

Example 24: The system of any of the examples above, wherein said eyepiece comprises one or more waveguides configured to direct light from said image projector to said user's eye to present image content to the user.

Section V

Example 1: A head mounted display system configured to project light to an eye of a user to display augmented reality image content in a vision field of said user, said head-mounted display system comprising:
a frame configured to be supported on a head of the user;
an image projector configured to project images into the user's eye to display image content in the vision field of the user;
a camera;
an eyepiece disposed on the frame, said eyepiece configured to direct light into said user's eye to display augmented reality image content to the user's vision field,
a reflective element disposed on the frame, at least a portion of said eyepiece and said reflective element being transparent to visible light and disposed at a location in front of the user's eye when the user wears said head-mounted display such that said transparent portions transmit light from an environment in front of the user to the user's eye to provide a view of the environment in front of the user;
at least one light source disposed to illuminate said eye; and
at least one lens disposed between the reflective optical element and the camera, the reflective element and the eye, or both,
wherein said camera is disposed with respect to said reflective element such that light from said at least one light source is reflected from the user's eye to said reflective element and is reflected from said reflective element to said camera to form images of said eye that are captured by said camera.

Example 2: The system of any of the examples above, wherein said at least one lens is disposed between the reflective optical element and the camera.

Example 3: The system of any of the examples above, wherein said at least one lens is disposed between the reflective element and the eye.

Example 4: The system of any of the examples aims above, wherein said at least one lens is disposed between the reflective optical element and the camera and said at least one lens is disposed between the reflective element and the eye.

Example 5: The system of any of the examples above, wherein said at least one lens increases the camera's field of view of the eye.

Example 6: The system of any of the examples above, wherein the camera comprises detector array and at least one imaging lens in addition to said at least one lens.

Example 7: The system of any of the examples above, wherein the reflective optical element comprises a diffractive optical element or a holographic optical element.

Example 8: The system of any of the examples above, wherein the reflective optical element comprises an off axis mirror.

Example 9: The system of any of the examples above, wherein said a camera is disposed on said frame.

Example 10: The system of any of the examples above, wherein said a camera is disposed on said frame temporally with respect to the center of the user's eye.

Example 11: The system of any of the examples above, wherein said a camera is disposed temporally on said frame such that said camera is on a temporal side of the user's head.

Example 12: The system of the examples above, wherein said light source comprises a laser.

Example 13: The system of the examples above, wherein said light source comprises a VCSEL.

Example 14: The system of any of the examples above, wherein said eyepiece is configured to project light into said user's eye to display virtual image content to the user's vision field such that the displayed virtual image content appears to originate from different depths.

Example 15: The system of any of the examples above, wherein said eyepiece is configured to project light into said user's eye to display virtual image content to the user's vision field at different amounts of at least one of divergence such that the displayed virtual image content appears to originate from different depths.

Example 16: The system of any of the examples above, wherein said eyepiece is configured to project light into said user's eye that divergences and to project light into said user's eye that is collimated to display virtual image content to the user's vision field that appears to originate from different depths.

Example 17: The system of any of the examples above, wherein said eyepiece comprises one or more waveguides.

Example 18: The system of any of the examples above, wherein said eyepiece comprises one or more waveguides configured to direct light from said image projector to said user's eye to present image content to the user.

Section VI

Example 1: A head mounted display system configured to project light to an eye of a user to display augmented reality image content in a vision field of said user, said head-mounted display system comprising:
- a frame configured to be supported on a head of the user;
- an image projector configured to project images into the user's eye to display image content in the vision field of the user;
- a camera;
- an eyepiece disposed on the frame, said eyepiece configured to direct light into said user's eye to display augmented reality image content to the user's vision field,
- a reflective element disposed on the frame, at least a portion of said eyepiece and said reflective element being transparent to visible light and disposed at a location in front of the user's eye when the user wears said head-mounted display such that said transparent portions transmit light from an environment in front of the user to the user's eye to provide a view of the environment in front of the user; and
- at least one light source disposed to illuminate said eye, said illumination configured to be polarized when incident on said eye,
- wherein said camera is disposed with respect to said reflective element such that light from said at least one light source is reflected from the user's eye to said reflective element and is reflected from said reflective element to said camera to form images of said eye that are captured by said camera, said camera configured to be polarization selective and to receive more light of one polarization than another polarization such that glare from said cornea is reduced.

Example 2: The system of any of the claims above, further comprising a polarizer disposed in an optical path between said light source and said user's eye.

Example 3: The system of any of the claims above, wherein said light source is configured to output polarized light.

Example 4: The system of any of the claims above, wherein a polarizer is disposed on said light source.

Example 5: The system of any of the claims above, further comprising a polarizer disposed between said eye and said camera.

Example 6: The system of any of the claims above, wherein the camera includes a polarizer.

Example 7: The system of any of the claims above, wherein the polarization output by said light source is attenuated prior to reaching said camera more than other polarization states.

Example 7: The system of any of the examples above, wherein the reflective optical element comprises a diffractive optical element or a holographic optical element.

Example 8: The system of any of the examples above, wherein the reflective optical element comprises an off axis mirror.

Example 9: The system of any of the examples above, wherein said a camera is disposed on said frame.

Example 10: The system of any of the examples above, wherein said a camera is disposed on said frame temporally with respect to the center of the user's eye.

Example 11: The system of any of the examples above, wherein said a camera is disposed temporally on said frame such that said camera is on a temporal side of the user's head.

Example 12: The system of the examples above, wherein said light source comprises a laser.

Example 13: The system of the examples above, wherein said light source comprises a VCSEL.

Example 14: The system of any of the examples above, wherein said eyepiece is configured to project light into said user's eye to display virtual image content to the user's vision field such that the displayed virtual image content appears to originate from different depths.

Example 15: The system of any of the examples above, wherein said eyepiece is configured to project light into said user's eye to display virtual image content to the user's vision field at different amounts of at least one of divergence such that the displayed virtual image content appears to originate from different depths.

Example 16: The system of any of the examples above, wherein said eyepiece is configured to project light into said user's eye that divergences and to project light into said user's eye that is collimated to display virtual image content to the user's vision field that appears to originate from different depths.

Example 17: The system of any of the examples above, wherein said eyepiece comprises one or more waveguides.

Example 18: The system of any of the examples above, wherein said eyepiece comprises one or more waveguides configured to direct light from said image projector to said user's eye to present image content to the user.

Example 19: A head mounted display system configured to project light to an eye of a user to display augmented reality image content in a vision field of said user, said head-mounted display system comprising:
- a frame configured to be supported on a head of the user;
- an image projector configured to project images into the user's eye to display image content in the vision field of the user;
- a camera;
- an eyepiece disposed on the frame, said eyepiece configured to direct light into said user's eye to display augmented reality image content to the user's vision field, at least a portion of said eyepiece being transparent to visible light and disposed at a location in front of the user's eye when the user wears said head-mounted display such that said transparent portions transmit light from an environment in front of the user to the user's eye to provide a view of the environment in front of the user; and
- at least one light source disposed to illuminate said eye, said illumination configured to be polarized when incident on said eye; and
- a polarization selective optical element disposed to receive light reflected from the eye;
- wherein said camera is disposed such that light from said at least one light source is reflected from the user's eye to said camera to form images of said eye that are captured by said camera, said polarization selective optical element disposed such that said camera receives more light of one polarization than another polarization such that glare from said cornea is reduced.

Example 20: The system of any of the examples above, further comprising a polarizer disposed in an optical path between said light source and said user's eye.

Example 21: The system of any of the examples above, wherein said light source is configured to output polarized light.

Example 22: The system of any of the examples above, wherein a polarizer is disposed on said light source.

Example 23: The system of any of the examples above, wherein the camera includes said polarization selective optical element.

Example 24: The system of any of the examples above, wherein said polarization selective optical element comprises a polarizer disposed between said eye and said camera.

Example 25: The system of any of the examples above, wherein the polarization output by said light source is attenuated prior to reaching said camera more than other polarization states.

Example 26: The system of any of the examples above, said illumination is configured to be linear polarized when incident on said eye.

Example 27: The system of any of the examples above, wherein said a camera is disposed on said frame.

Example 28: The system of any of the examples above, wherein said a camera is disposed on said frame temporally with respect to the center of the user's eye.

Example 29: The system of any of the examples above, wherein said a camera is disposed temporally on said frame such that said camera is on a temporal side of the user's head.

Example 30: The system of the examples above, wherein said light source comprises a laser.

Example 31: The system of the examples above, wherein said light source comprises a VCSEL.

Example 32: The system of any of the examples above, wherein said eyepiece is configured to project light into said user's eye to display virtual image content to the user's vision field such that the displayed virtual image content appears to originate from different depths.

Example 33: The system of any of the examples above, wherein said eyepiece is configured to project light into said user's eye to display virtual image content to the user's vision field at different amounts of at least one of divergence such that the displayed virtual image content appears to originate from different depths.

Example 34: The system of any of the examples above, wherein said eyepiece is configured to project light into said user's eye that divergences and to project light into said user's eye that is collimated to display virtual image content to the user's vision field that appears to originate from different depths.

Example 35: The system of any of the examples above, wherein said eyepiece comprises one or more waveguides.

Example 36: The system of any of the examples above, wherein said eyepiece comprises one or more waveguides configured to direct light from said image projector to said user's eye to present image content to the user.

Section VII

Example 1: A head mounted display system configured to project light to an eye of a user to display augmented reality image content in a vision field of said user, said head-mounted display system comprising:

a frame configured to be supported on a head of the user;
an image projector configured to project images into the user's eye to display image content in the vision field of the user;
a camera;
an eyepiece disposed on the frame, said eyepiece configured to direct light into said user's eye to display augmented reality image content to the user's vision field,
at least first and second reflective elements disposed on the frame, at least a portion of said eyepiece and said first and second reflective elements being transparent to visible light and disposed at a location in front of the user's eye when the user wears said head-mounted display such that said transparent portions transmit light from an environment in front of the user to the user's eye to provide a view of the environment in front of the user; and
at least one light source disposed to illuminate said eye, wherein said camera is disposed with respect to said first and second reflective elements such that light from said at least one light source is reflected from the user's eye to said first and second reflective elements and is reflected from said first and second reflective elements to said camera to form images of said eye that are captured by said camera.

Example 2: The system of any of the examples above, wherein said first reflective element and said second reflective element are configured to reflect light at different angles from each other.

Example 3: The system of any of the examples above, wherein said first reflective element and said second reflective element comprise diffractive optical elements or holographic optical elements with different amounts of tilt.

Example 4: The system of any of the examples above, wherein said first reflective element and said second reflective element comprise diffractive optical elements or holographic optical elements with different amounts of tilt programed into the diffractive optical element or holographic optical element.

Example 5: The system of any of the examples above, wherein said second reflective element is more forward than said first reflective element and thus farther from said eye than said first reflective element.

Example 6: The system of any of the examples above, wherein said reflective element comprises a diffractive optical element or a holographic optical element.

Example 7: The system of any of the examples above, wherein said eyepiece is configured to receive light from said image projector and to direct said light into said user's eye to display augmented reality image content to the user's vision field.

Example 8: The system of any of the examples above, wherein said eyepiece comprises said at least one waveguide.

Example 9: The system of any of the examples above, wherein said reflective element is disposed on said eyepiece.

Example 10: The system of any of the examples above, wherein reflective element is part of said eyepiece.

Example 11: The system of any of the examples above, wherein said first reflective element is more reflective of light at a first wavelength than a second wavelength and said second reflective element being more reflective of light at said second wavelength than said first wavelength.

Example 12: The system of any of the examples above, wherein said first and second reflective elements are configured to collect light from different directions and direct said light to said camera.

Example 13: The system of any of the examples above, wherein said first and second reflective elements are configured to collect light from different portions of said retina and direct said light to said camera.

Example 14: The system of any of the examples above, wherein said first and second reflective elements provide different perspectives of said retina to camera.

Example 15: The system of any of the examples above, wherein said first and second reflective elements provide different views of said retina to camera.

Example 16: The system of any of the examples above, wherein the reflective optical element comprises an off axis mirror.

Example 17: The system of any of the examples above, wherein said a camera is disposed on said frame.

Example 18: The system of any of the examples above, wherein said a camera is disposed on said frame temporally with respect to the center of the user's eye.

Example 19: The system of any of the examples above, wherein said a camera is disposed temporally on said frame such that said camera is on a temporal side of the user's head.

Example 20: The system of the examples above, wherein said light source comprises a laser.

Example 21: The system of the examples above, wherein said light source comprises a VCSEL.

Example 22: The system of any of the examples above, wherein said eyepiece is configured to project light into said user's eye to display virtual image content to the user's vision field such that the displayed virtual image content appears to originate from different depths.

Example 23: The system of any of the examples above, wherein said eyepiece is configured to project light into said user's eye to display virtual image content to the user's vision field at different amounts of at least one of divergence such that the displayed virtual image content appears to originate from different depths.

Example 24: The system of any of the examples above, wherein said eyepiece is configured to project light into said user's eye that divergences and to project light into said user's eye that is collimated to display virtual image content to the user's vision field that appears to originate from different depths.

Example 25: The system of any of the examples above, wherein said eyepiece comprises one or more waveguides.

Example 26: The system of any of the examples above, wherein said eyepiece comprises one or more waveguides configured to direct light from said image projector to said user's eye to present image content to the user.

Section VIII

Example 1: A head mounted display system configured to project light to an eye of a user to display augmented reality image content in a vision field of said user, said head-mounted display system comprising:
 a frame configured to be supported on a head of the user;
 an image projector configured to project images into the user's eye to display image content in the vision field of the user;
 first and second cameras;
 an eyepiece disposed on the frame, said eyepiece configured to direct light into said user's eye to display augmented reality image content to the user's vision field;
 a reflective element disposed on the frame, at least a portion of said eyepiece and said reflective element being transparent to visible light and disposed at a location in front of the user's eye when the user wears said head-mounted display such that said transparent portions transmit light from an environment in front of the user to the user's eye to provide a view of the environment in front of the user; and
 at least one light source disposed to illuminate said eye, wherein said first and second cameras are disposed with respect to said reflective element such that light from said illumination source is reflected from the user's eye to said reflective element and is reflected from said reflective element to said first and second cameras to form images of said eye that are captured by said first and second cameras.

Example 2: The system of any of the examples above, wherein said first and second cameras are disposed laterally with respect to each other.

Example 3: The system of any of the examples above, wherein said first and second cameras are disposed side-by-side.

Example 4: The system of any of the examples above, wherein said first and second cameras provide different perspectives of said retina.

Example 5: The system of any of the examples above, wherein said first and second cameras provide different views of said retina.

Example 6: The system of any of the examples above, wherein said first and second cameras together provide an increased field of view of said retina.

Example 7: The system of any of the examples above, wherein said first and second cameras are disposed on said frame.

Example 8: The system of any of the examples above, wherein said first and second cameras is disposed on said frame temporally with respect to the center of the user's eye.

Example 9: The system of any of the examples above, wherein said first and second cameras are disposed temporally on said frame such that said camera is on a temporal side of the user's head.

Example 10: The system of any of the examples above, wherein the reflective optical element comprises a diffractive optical element or a holographic optical element.

Example 11: The system of any of the examples above, wherein the reflective optical element comprises an off axis mirror.

Example 12: The system of the examples above, wherein said light source comprises a laser.

Example 13: The system of the examples above, wherein said light source comprises a VCSEL.

Example 14: The system of any of the examples above, wherein said eyepiece is configured to project light into said user's eye to display virtual image content to the user's vision field such that the displayed virtual image content appears to originate from different depths.

Example 15: The system of any of the examples above, wherein said eyepiece is configured to project light into said user's eye to display virtual image content to the user's vision field at different amounts of at least one of divergence such that the displayed virtual image content appears to originate from different depths.

Example 16: The system of any of the examples above, wherein said eyepiece is configured to project light into said user's eye that divergences and to project light into said user's eye that is collimated to display virtual image content to the user's vision field that appears to originate from different depths.

Example 17: The system of any of the examples above, wherein said eyepiece comprises one or more waveguides.

Example 18: The system of any of the examples above, wherein said eyepiece comprises one or more waveguides configured to direct light from said image projector to said user's eye to present image content to the user.

Example 19: A head mounted display system configured to project light to an eye of a user to display augmented reality image content in a vision field of said user, said head-mounted display system comprising:
- a frame configured to be supported on a head of the user;
- an image projector configured to project images into the user's eye to display image content in the vision field of the user;
- first and second cameras;
- an eyepiece disposed on the frame, said eyepiece configured to direct light into said user's eye to display augmented reality image content to the user's vision field, at least a portion of said eyepiece being transparent to visible light and disposed at a location in front of the user's eye when the user wears said head-mounted display such that said transparent portions transmit light from an environment in front of the user to the user's eye to provide a view of the environment in front of the user; and
- at least one light source disposed to illuminate said eye,
- wherein said first and second cameras are disposed such that light from said illumination source is reflected from the user's eye to said first and second cameras to form images of said eye that are captured by said first and second cameras.

Example 20: The system of any of the examples above, wherein said first and second cameras are disposed laterally with respect to each other.

Example 21: The system of any of the examples above, wherein said first and second cameras are disposed side-by-side.

Example 22: The system of any of the examples above, wherein said first and second cameras provide different perspectives of said retina.

Example 23: The system of any of the examples above, wherein said first and second cameras provide different views of said retina.

Example 24: The system of any of the examples above, wherein said first and second cameras together provide an increased field of view of said retina.

Example 25: The system of any of the examples above, wherein said first and second cameras are disposed on said frame.

Example 26: The system of any of the examples above, wherein said first and second cameras is disposed on said frame temporally with respect to the center of the user's eye.

Example 27: The system of any of the examples above, wherein said first and second cameras are disposed temporally on said frame such that said camera is on a temporal side of the user's head.

Example 28: The system of the examples above, wherein said light source comprises a laser.

Example 29: The system of the examples above, wherein said light source comprises a VCSEL.

Example 30: The system of any of the examples above, wherein said eyepiece is configured to project light into said user's eye to display virtual image content to the user's vision field such that the displayed virtual image content appears to originate from different depths.

Example 31: The system of any of the examples above, wherein said eyepiece is configured to project light into said user's eye to display virtual image content to the user's vision field at different amounts of at least one of divergence such that the displayed virtual image content appears to originate from different depths.

Example 32: The system of any of the examples above, wherein said eyepiece is configured to project light into said user's eye that divergences and to project light into said user's eye that is collimated to display virtual image content to the user's vision field that appears to originate from different depths.

Example 33: The system of any of the examples above, wherein said eyepiece comprises one or more waveguides.

Example 34: The system of any of the examples above, wherein said eyepiece comprises one or more waveguides configured to direct light from said image projector to said user's eye to present image content to the user.

Section IX

Example 1: A display system configured to project light to an eye of a user to display virtual image content in a vision field of said user, said eye having a retina and a pupil, said display system comprising:
- a frame configured to be supported on a head of the user;
- a head-mounted display disposed on the frame, said display configured to project light into said user's eye to display virtual image content to the user's vision field;
- at least one light source configured to direct light into said retina;
  - one or more cameras configured to image the user's retina, said camera comprising an image sensor and a camera lens; and
- processing electronics in communication with the display and the one or more cameras, the processing electronics configured to:
  - receive one or more images of the user's retina captured by the one or more cameras; and
- estimate a location of a first feature of said eye based on one or more images produced by said one or more cameras.

Example 2: The display system of Example 1, wherein said location of said first feature of said eye comprises a location in 3D space.

Example 3: The display system of Example 1 or 2, wherein said location of said first feature of said eye is not a feature of said retina.

Example 4: The display system of any of the examples above, wherein processing electronics is further configured to estimate a location of a second feature of said eye based on said location of said first feature of said eye.

Example 5: The display system of Example 4, wherein said location of said second feature of said eye comprises a location in 3D space.

Example 6: The display system of any of Example 4 or 5, wherein said location of said second feature of said eye is not a feature of said retina.

Example 7: The display system of any of Examples 4-6, wherein said location of said second feature of said eye is estimated based on a gaze direction of said eye.

Example 8: The display system of any of Examples 4-7, wherein said location of said second feature of said eye is estimated by translating a distance along a gaze direction of said eye from said location of said first feature of said eye to the location of said second feature of said eye.

Example 9: The display system of Example 8, wherein said processing electronics is configured to estimate said distance based on a plurality of measurements of gaze direction.

Example 10: The display system of any of the examples above, wherein said processing electronics is configured to determine gaze direction of said user's eye based on an image of said retina obtained by said one or more cameras.

Example 11: The display system of any of the examples above, wherein said processing electronics is configured to determine gaze direction of said user's eye based on assessing where at least part of an image of said retina obtained by said camera fits within a retinal map.

Example 12: The display system of any of the examples above, wherein said processing electronics is configured to produce a retinal map based on a plurality of retinal images obtained for different user eye gazes.

Example 13: The display system of any of the examples above, wherein a retinal map is produced in part by displaying a plurality of targets to said user's eye, said targets located at different positions, to thereby cause said user's eye to alter gaze direction, said different gaze directions correlated to images obtained of said retina by said one or more cameras at said respective gaze directions.

Example 14: The display system of any of the examples above, wherein said processing electronics is configured to produce a gaze matrix based on correlating images of said user's retina with gaze directions of said user's eye.

Example 15: The display system of any of the examples above, wherein said location of said first feature is estimated based on at least first and second images of said retina captured by said one or more cameras, said first and second images of said retina obtain from different perspectives.

Example 16: The display system of any of the examples above, wherein said one or more cameras comprise first and second cameras and said location of said first feature of said eye is estimated based on at least first and second images of said retina captured by said first and second cameras, respectively.

Example 17: The display system of any of the examples above, wherein said one or more cameras comprise first and second cameras and said location of said first feature of said eye is estimated based on a plurality of first and second images of said retina captured by said first and second cameras, respectively.

Example 18: The display system of any of the examples above, wherein said location of said first feature of said eye is estimated based on the determination of the location of features of said retina projected onto said image sensor.

Example 19: The display system of any of the examples above, wherein said location of said first feature is estimated based on the determination of the location of blood vessels of said retina projected onto said image sensor.

Example 20: The display system of any of the examples above, wherein said location of said first feature of said eye is estimated based on the determination of the location of features of said retina projected onto said image sensor relative to a reference location on said image sensor.

Example 21: The display system of any of the examples above, wherein said location of said first feature of said eye is estimated based on the determination of the location of blood vessels of said retina projected onto said image sensor relative to a reference location on said image sensor.

Example 22: The display system of any of the examples above, wherein said location of said first feature of said eye is estimated based on the determination of the location of a spot in an image captured by said camera formed by light from the at least one light source reflected from said retina and projected onto said image sensor.

Example 23: The display system of any of the examples above, wherein said location of said first feature of said eye is estimated based on the determination of the location of a spot in an image captured by said camera formed by light from the at least one light source reflected from said retina and projected onto said image sensor relative to a reference on said images sensor.

Example 24: The display system of any of the examples above, wherein said processing electronics is configured to determine the center of mass or centroid of a spot in an image captured by said one or more cameras that is formed by light from the at least one light source that is reflected from said retina and projected onto said image sensor.

Example 25: The display system of any of the examples above, wherein said one or more cameras comprise first and second cameras and said location of said first feature of said eye is estimated based on a comparison of the location of spots in first and second image captured by said first and second cameras, respectively, said spots formed by light reflected from the at least one light source reflected from said retina and projected onto said image sensor.

Example 26: The display system of any of the examples above, wherein said location of said first feature of said eye is estimated based on the determination of the location of a plurality of spots in an image captured by said one or more cameras formed by light from said at least one light source reflected from said retina and projected onto said image sensor.

Example 27: The display system of any of the examples above, wherein said location of said first feature of said eye is estimated based on a comparison of the location of a plurality of spots in an image captured by said one or more cameras, said spots formed by light reflected from said at least one light source reflected from said retina and projected onto said image sensor.

Example 28: The display system of any of the examples above, wherein said processing electronics is configured to determine a plurality of centers of mass or centroids of a plurality of respective spots in an image captured by said one or more cameras formed by light from said at least one light source reflected from said retina and projected onto said image sensor.

Example 29: The display system of any of the examples above, wherein said processing electronics is configured to determine a plurality of centers of mass or centroids of a plurality of respective spots in an image captured by said one or more cameras formed by light from said at least one illumination source reflected from said retina and projected onto said image sensor relative to a reference on said image sensor.

Example 30: The display system of any of the examples above, wherein said processing electronics is configured to determine said location of said first feature of said eye using triangulation.

Example 31: The display system of any of the examples above, further comprising a segmented optical element configured to provide different perspectives of said retina to said one or more cameras.

Example 32: The display system of Example 31, wherein said segmented optical element comprises a reflective optical element that is segmented to provide different perspectives of said retina to said one or more cameras.

Example 33: The display system of any of the Examples 31 or 32, wherein said segmented optical element comprises a segmented diffractive or holographic optical element.

Example 34: The display system of any of the Examples 31-33, wherein said segmented optical element comprises different segments configured to collect light from different directions and direct said light to said one or more cameras.

Example 35: The display system of any of the examples above, further comprising a plurality of optical elements configured to provide different perspectives of said retina to said one or more cameras.

Example 36: The display system of Example 35 above, wherein said plurality of optical elements configured to provide different perspectives of said retina to said one or more cameras comprise a plurality of reflective optical elements.

Example 37: The display system of any of Examples 35 or 36, wherein said plurality of optical elements comprises diffractive or holographic optical elements.

Example 38: The display system of any of Examples 35-37, wherein respective ones of said plurality of optical elements are configured to collect light from different respective directions and direct said light to said at least one camera.

Example 39: The display system of any of Examples 35-38, wherein said plurality of optical elements configured to provide different perspectives of said retina to said one or more cameras comprises a plurality of diffractive or holographic optical elements.

Example 40: The display system of any of Examples 35-39, wherein said plurality of optical elements configured to provide different perspectives of said retina to said one or more cameras comprises a plurality of reflective diffractive or holographic optical elements.

Example 41: The display system of any of the examples above, wherein said processor is configured to determine said location of said first feature of said eye based on multiple images of said retina captured for different gaze directions.

Example 42: The display system of any of Examples 1-16, 18-24, and 26-41, wherein said at least one camera comprises a single camera.

Example 43: The display system of any of the examples above, wherein said location of said first feature comprises the location of the said pupil.

Example 44: The display system of any of the examples above, wherein said location of said first feature comprises the location of the center of said pupil.

Example 45: The display system of any of Examples 4-44, wherein said location of said second feature comprises the location of the eyeball center or center of rotation of the eye.

Example 46: A method of determining a characteristic of the eye in a display system configured to project light to an eye of a user to display virtual image content in a vision field of said user, said eye having a retina and a pupil, said display system comprising a frame configured to be supported on a head of the user, a head-mounted display disposed on the frame, said display configured to project light into said user's eye to display virtual image content to the user's vision field, at least one light source and one or more cameras, said method comprising:
  directing light form said light source into said retina;
  imaging said retina with said one or more cameras; and
  estimating a location of a first feature of said eye based on one or more images produced by said one or more cameras.

Example 47: The method of Example 46, wherein said location of said first feature of said eye comprises a location in 3D space.

Example 48: The method of Example 46 or 47, wherein said location of said first feature of said eye is not a feature of said retina.

Example 49: The method of any of Example 46-48, further comprising estimating a location of a second feature of said eye based on said location of said first feature of said eye.

Example 50: The method of Example 49, wherein said location of said second feature of said eye comprises a location in 3D space.

Example 51: The method of any of Examples 49 or 50, wherein said location of said second feature of said eye is not a feature of said retina.

Example 52: The method of any of Examples 46-51, wherein said location of said first feature comprises the location of the said pupil.

Example 53: The method of any of Example 46-52, wherein said location of said first feature comprises the location of the center of said pupil.

Example 54: The method of any of Example 49-53, wherein said location of said second feature comprises the location of the eyeball center or center of rotation of the eye.

Other Considerations

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than restrictive sense.

Indeed, it will be appreciated that the systems and methods of the disclosure each have several innovative aspects, no single one of which is solely responsible or required for the desirable attributes disclosed herein. The various features and processes described above may be used independently of one another, or may be combined in various ways. All possible combinations and subcombinations are intended to fall within the scope of this disclosure.

Certain features that are described in this specification in the context of separate embodiments also may be implemented in combination in a single embodiment. Conversely, various features that are described in the context of a single embodiment also may be implemented in multiple embodiments separately or in any suitable subcombination. Moreover, although features may be described above as acting in certain combinations and even initially exampled as such, one or more features from an exampled combination may in some cases be excised from the combination, and the exampled combination may be directed to a subcombination or variation of a subcombination. No single feature or group of features is necessary or indispensable to each and every embodiment.

Each of the processes, methods, and algorithms described herein and/or depicted in the attached figures may be embodied in, and fully or partially automated by, code modules executed by one or more physical computing systems, hardware computer processors, application-specific circuitry, and/or electronic hardware configured to execute specific and particular computer instructions. For example, computing systems can include general purpose computers (e.g., servers) programmed with specific computer instructions or special purpose computers, special purpose circuitry, and so forth. A code module may be compiled and linked into an executable program, installed in a dynamic link library, or may be written in an interpreted programming language. In some implementations, particular operations and methods may be performed by circuitry that is specific to a given function.

Further, certain implementations of the functionality of the present disclosure are sufficiently mathematically, computationally, or technically complex that application-specific hardware or one or more physical computing devices (utilizing appropriate specialized executable instructions) may be necessary to perform the functionality, for example, due to the volume or complexity of the calculations involved or to provide results substantially in real-time. For example, animations or video may include many frames, with each frame having millions of pixels, and specifically programmed computer hardware is necessary to process the video data to provide a desired image processing task or application in a commercially reasonable amount of time.

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Java, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, iOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

As described above, in various embodiments certain functionality may be accessible by a user through a web-based viewer (such as a web browser), or other suitable software program). In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

These computer programs, which may also be referred to as programs, software, software applications, applications, components, or code, may include machine instructions for a programmable controller, processor, microprocessor or other computing or computerized architecture, and may be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium may store such machine instructions non-transitorily, such as for example as would a non-transient solid-state memory or a magnetic hard drive or any equivalent storage medium. The machine-readable medium may alternatively or additionally store such machine instructions in a transient manner, such as for example as would a processor cache or other random access memory associated with one or more physical processor cores.

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

It will be appreciated that conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended examples are to be construed to mean "one or more" or "at least one" unless specified otherwise. Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted may be incorporated in the example methods and processes that are schematically illustrated. For example, one or more additional operations may be performed before, after, simultaneously, or between any of the illustrated operations. Additionally, the operations may be rearranged or reordered in other embodiments. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products. Additionally, other embodiments are within the scope of the following examples. In some cases, the actions recited in the examples may be performed in a different order and still achieve desirable results.

Accordingly, the disclosure are not intended to be limited to the embodiments shown herein, but are to be accorded the widest scope consistent with this disclosure, the principles and the novel features disclosed herein. A variety of example systems and methods are provided below.

What is claimed:

1. A display system comprising:
    a frame configured to be wearable on a head of a user;
    at least one image projector supported by the frame, the at least one image projector configured to project augmented reality image content;
    an eyepiece supported by the frame, the eyepiece configured to receive the augmented reality image content from the at least one image projector and direct the augmented reality image content to an eye of the user;
    at least one light source configured to direct light to the eye;
    at least one reflective element disposed on at least one of the frame or the eyepiece, wherein the at least one reflective element comprises a segmented optical element;
    at least one camera supported by the frame on at least one temple side of the head of the user, the at least one camera arranged to receive a portion of the light that is reflected from the eye to the at least one reflective element and that is reflected from the at least one reflective element to the at least one camera to form at least one image of the eye that is captured by the at least one camera;
    processing electronics in communication with the at least one image projector; and
    memory storing instructions that, when executed by the processing electronics, cause the processing electronics to performing operations comprising
        receiving the at least one image of the eye that is captured by the at least one camera,
        estimating a location of at least one feature of the eye based on the at least one image, wherein the at least one feature includes a retina of the eye, and
        determining a gaze direction of the eye based on assessing where at least part of the retina captured by the at least one camera fits within a retinal map, wherein determining the gaze direction comprises
            defining a bounding region within a first image of the at least one image, wherein the first image contains the at least one feature,
            identifying a center of mass of the bounding region,
            determining a 3D position of a pupil center and an eye ball center based on the center of mass of the bounding region, and
            determining the gaze direction based on a coordinate system having an origin defined as a location of the eye ball center, wherein the gaze direction passes through the pupil center.

2. The display system of claim 1, wherein the at least one light source includes at least one vertical-cavity surface-emitting laser (VCSEL).

3. The display system of claim 1, wherein at least a portion of the eyepiece is transparent to visible light, to provide the user a view of the environment in front of the user while the frame is being worn by the user.

4. The display system of claim 1, wherein the at least one reflective element is transparent to visible light.

5. The display system of claim 1, wherein the at least one light source comprises an infrared light source that outputs more of the light as infrared light than visible light.

6. The display system of claim 1, wherein the at least one light source is supported by the frame on at least one temple side of the head of the user.

7. The display system of claim 1, wherein the at least one light source is mounted on the eyepiece.

8. The display system of claim 1, wherein the at least one light source is mounted on a side of the eyepiece that is proximal to the eye.

9. The display system of claim 1, wherein the at least one light source is mounted on a side of the eyepiece that is distal to the eye.

10. The display system of claim 1, wherein the at least one light source is integrated with the at least one camera.

11. The display system of claim 1, wherein the at least one light source is configured to output polarized light.

12. The display system of claim 1, further comprising electronics configured to modulate the at least one light source to reduce speckle.

13. The display system of claim 1, further comprising at least one diffractive optical element having a chromatic dispersion that counters at least a portion of the chromatic aberration introduced by the at least one reflective element.

14. The display system of claim 1, wherein the eyepiece is configured to direct the augmented reality image content to the eye of the user such that the augmented reality image content appears to originate from different depths.

15. The display system of claim 1, wherein the eyepiece comprises one or more waveguides.

16. The display system of claim 1, wherein the location of the at least one feature is estimated in three-dimensional space.

17. The display system of claim 1, wherein the at least one feature includes one or more of a pupil of the eye.

18. The display system of claim 1, wherein the location is a center of a pupil of the eye.

19. The display system of claim 1, wherein the operations further comprise producing the retinal map based on a plurality of retinal images obtained for different eye gazes.

20. The display system of claim 1, wherein the retinal map is produced in part by displaying a plurality of targets to the user's eye, wherein the targets are located at different positions to cause the user's eye to alter gaze direction, wherein different gaze directions of the user's eye are correlated to images of the retina obtained by the at least one camera at the different gaze directions, respectively.

21. The display system of claim 1, wherein the operations further comprises producing a gaze matrix based on correlating images of the user's retina with gaze directions of the user's eye.

22. The display system of claim 1, wherein the location of the at least one feature is estimated based on at least a first image of the retina and a second image of the retina captured by the at least one camera, wherein the first image of the retina and the second image of the retina are obtained at different perspectives.

23. The display system of claim 1, wherein the at least one camera comprises a first camera and a second camera, wherein the location of the at least one feature is estimated based on at least a first image and a second image of the retina captured by the first camera and the second camera, respectively.

24. The display system of claim 1, wherein the at least one camera comprises a first camera and a second camera, wherein the location of the at least one feature is estimated based on a plurality of first images of the retina captured by the first camera and a plurality of second images of the retina captured by the second camera.

25. The display system of claim 1, wherein the location of the at least one feature is estimated based on a determination of a location of blood vessels of the retina.

26. The display system of claim 25, wherein the location of the at least one feature is estimated based on a determination of the location of the blood vessels of the retina relative to a reference location.

27. The display system of claim 1, wherein the location of the at least one feature is based on a determination of a location of a spot in the image of the eye captured by the at least one camera.

28. The display system of claim 1, wherein the operations further comprise determining a center of mass or centroid of the spot in the image of the eye captured by the at least one camera.

29. The display system of claim 1, wherein the segmented optical element comprises a segmented diffractive or holographic optical element.

30. The display system of claim 1, wherein the segmented optical element comprises different reflective or diffractive segments arranged to collect light from different directions and direct the collected light to the at least one camera.

* * * * *